(12) United States Patent
Brehmer et al.

(10) Patent No.: US 12,327,303 B2
(45) Date of Patent: Jun. 10, 2025

(54) USING SEMANTIC ALIGNMENT TO PRESENT TIME SERIES METRICS

(71) Applicant: Salesforce, Inc., San Francisco, CA (US)

(72) Inventors: Matthew Michael Brehmer, Seattle, WA (US); Arjun Srinivasan, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/102,678

(22) Filed: Jan. 27, 2023

(65) Prior Publication Data

US 2024/0078254 A1 Mar. 7, 2024

Related U.S. Application Data

(60) Provisional application No. 63/408,057, filed on Sep. 19, 2022, provisional application No. 63/403,822, filed on Sep. 5, 2022.

(51) Int. Cl.
*G06F 16/28* (2019.01)
*G06F 3/0481* (2022.01)
(Continued)

(52) U.S. Cl.
CPC ............ *G06T 11/60* (2013.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS 5,574,908 A  11/1996 Harding
5,767,854 A   6/1998 Anwar
(Continued)

FOREIGN PATENT DOCUMENTS

CN  105512139 B  * 11/2019  ............ G06F 16/00
CN  111736823 A  * 10/2020

OTHER PUBLICATIONS

Brehmer, Office Action, U.S. Appl. No. 17/956,720, filed Feb. 15, 2024, 16 pgs.

(Continued)

*Primary Examiner* — Augustine K. Obisesan
(74) *Attorney, Agent, or Firm* — Morgan, Lewis & Bockius LLP

(57) ABSTRACT

A computing device displays, in a graphical user interface, a canvas region that includes a first scene. The first scene includes a first visualization card. The device also displays, in the graphical user interface, a recommendation region that includes one or more data visualizations. Each data visualization corresponds to a respective metric of one or more metrics of a data source. The respective metric has a respective temporal attribute. The device receives user selection to add a first data visualization, corresponding to a first metric of the one or more metrics, to the first visualization card. In response to the user selection, the device updates display of the first visualization card to include the first data visualization.

18 Claims, 102 Drawing Sheets

(51) Int. Cl.
*G06F 3/0482* (2013.01)
*G06F 3/04845* (2022.01)
*G06F 3/04847* (2022.01)
*G06F 16/2458* (2019.01)
*G06F 16/904* (2019.01)
*G06T 11/20* (2006.01)
*G06T 11/60* (2006.01)
*G06F 3/04842* (2022.01)

(52) U.S. Cl.
CPC ...... *G06F 3/04845* (2013.01); *G06F 3/04847* (2013.01); *G06F 16/2477* (2019.01); *G06F 16/287* (2019.01); *G06F 16/904* (2019.01); *G06T 11/206* (2013.01); *G06F 3/04842* (2013.01); *G06F 2203/04803* (2013.01); *G06T 2200/24* (2013.01)

(56) References Cited

U.S. PATENT DOCUMENTS

| | | | |
|---|---|---|---|
| 6,750,864 B1 | 6/2004 | Anwar | |
| 6,813,615 B1 | 11/2004 | Colasanti | |
| 6,995,768 B2* | 2/2006 | Jou | G06F 9/542 345/440 |
| 7,130,812 B1 | 10/2006 | Lyer et al. | |
| 7,461,077 B1 | 12/2008 | Greenwood | |
| 8,812,947 B1 | 8/2014 | Maoz et al. | |
| 9,202,297 B1 | 12/2015 | Winters | |
| 9,779,147 B1 | 10/2017 | Scott et al. | |
| 11,016,650 B1 | 5/2021 | Kritzer | |
| 11,269,871 B1 | 3/2022 | Bigdelu et al. | |
| 2003/0071814 A1* | 4/2003 | Jou | G06F 9/542 345/440 |
| 2005/0091640 A1 | 4/2005 | McCollum et al. | |
| 2006/0206512 A1 | 9/2006 | Hanrahan et al. | |
| 2007/0130113 A1 | 6/2007 | Ting | |
| 2009/0322755 A1* | 12/2009 | Holm-Peterson | G06F 40/197 345/440 |
| 2010/0313157 A1 | 12/2010 | Carlsson et al. | |
| 2011/0225525 A1 | 9/2011 | Chasman et al. | |
| 2012/0054331 A1 | 3/2012 | Dagan | |
| 2012/0272186 A1 | 10/2012 | Kraut | |
| 2012/0284259 A1 | 11/2012 | Jehuda | |
| 2013/0080444 A1 | 3/2013 | Wakefield | |
| 2013/0085961 A1* | 4/2013 | Naghshin | G06Q 10/06 705/348 |
| 2013/0097177 A1 | 4/2013 | Fan | |
| 2013/0232452 A1 | 9/2013 | Krajec et al. | |
| 2013/0275904 A1* | 10/2013 | Bhaskaran | G06F 3/0484 715/771 |
| 2013/0289774 A1 | 10/2013 | Day et al. | |
| 2014/0040182 A1 | 2/2014 | Gilder et al. | |
| 2014/0049557 A1* | 2/2014 | Hou | G06F 3/0488 345/660 |
| 2014/0157142 A1 | 6/2014 | Heinrich et al. | |
| 2014/0172654 A1 | 6/2014 | Wagner | |
| 2014/0207802 A1 | 7/2014 | Raghavan et al. | |
| 2015/0040047 A1 | 2/2015 | Baarz | |
| 2015/0040052 A1 | 2/2015 | Noel et al. | |
| 2015/0261737 A1 | 9/2015 | Devarajan et al. | |
| 2015/0356064 A1 | 12/2015 | Mizuno et al. | |
| 2016/0103871 A1 | 4/2016 | Zheng et al. | |
| 2016/0231900 A1 | 8/2016 | Meaney et al. | |
| 2016/0246490 A1 | 8/2016 | Cabral | |
| 2016/0246863 A1 | 8/2016 | Sexton | |
| 2016/0350389 A1 | 12/2016 | Kloke et al. | |
| 2016/0378843 A1 | 12/2016 | Cherwonka et al. | |
| 2017/0024651 A1 | 1/2017 | Mishra | |
| 2017/0052747 A1 | 2/2017 | Cervelli et al. | |
| 2017/0091246 A1 | 3/2017 | Risvik et al. | |
| 2018/0032216 A1 | 2/2018 | Naous | |
| 2018/0041411 A1* | 2/2018 | Shaked | H04L 43/045 |
| 2018/0253218 A1 | 9/2018 | Levesque et al. | |
| 2018/0260450 A1 | 9/2018 | Wang et al. | |
| 2018/0329587 A1* | 11/2018 | Ko | H04L 51/224 |
| 2019/0188333 A1* | 6/2019 | Williams | G06F 16/9038 |
| 2019/0201130 A1 | 7/2019 | Shelton | |
| 2019/0362525 A1* | 11/2019 | Stewart | G06F 3/0482 |
| 2020/0005509 A1 | 1/2020 | Gibb et al. | |
| 2020/0019546 A1 | 1/2020 | Lou | |
| 2020/0019548 A1* | 1/2020 | Agnew | G06F 3/0482 |
| 2020/0125559 A1 | 4/2020 | Talbot | |
| 2020/0233559 A1 | 7/2020 | Rueter et al. | |
| 2020/0320759 A1* | 10/2020 | Swider | G06T 11/40 |
| 2021/0142001 A1 | 5/2021 | Beers | |
| 2021/0224328 A1* | 7/2021 | Schrupp | G06F 16/9035 |
| 2021/0272029 A1 | 9/2021 | Gustafsson et al. | |
| 2022/0382779 A1* | 12/2022 | Ogievetsky | G06F 16/287 |

OTHER PUBLICATIONS

Kritzer, Office Action U.S. Appl. No. 16/578,180, filed May 14, 2020, 14 pgs.
Kritzer, Final Office Action, U.S. Appl. No. 16/578,180, filed Sep. 3, 2020, 14 pgs.
Kritzer, Notice of Allowance, U.S. Appl. No. 16/578,180, filed Jan. 25, 2021, 8 pgs.
Tableau Software, LLC, International Search-Report and Written Opinion, PCT/US2022/022878, Sep. 2, 2022, 15 pgs.
Salesforce, Inc., International Search-Report and Written Opinion, PCT/US2023/031055, Nov. 17, 2023, 28 pgs.
Whilden, Office Action, U.S. Appl. No. 17/589,690, filed Mar. 31, 022, 19 pgs.
Whilden, Notice of Allowance, U.S. Appl. No. 17/589,690, filed Sep. 7, 2023, 10 pgs.
Brehmer, Final Office Action, U.S. Appl. No. 17/956,720, filed Aug. 1, 2024, 18 pgs.
Brehmer, Notice of Allowance, U.S. Appl. No. 17/956,746, filed Oct. 16, 2024, 9 pgs.
Mitchell, "Moving Average Chart Meaning, Purpse, Limitations," https://www.investopedia.com/terms/m/movingaveragechart.asp, Apr. 25, 2022, (Year: 2022), 6 pgs.
Brehmer, Notice of Allowance, U.S. Appl. No. 17/956,720, filed Nov. 19, 2024, 5 pgs.
Whilden, Office Action, U.S. Appl. No. 18/420,746, filed Nov. 21, 2024, 25 pgs.
Brehmer, Office Action, U.S. Appl. No. 18/102,609, Jan. 15, 2025, 11 pgs.

* cited by examiner

```
Algorithm 1: getRecommendations(selectedCard,
            canvas)
 1  recommendations = []
 2  currentSlide = getSlide(selectedCard, canvas)
 3  leftCard = getLeftChartCard(selectedCard,
       currentSlide)
 4  rightCard = getRightChartCard(selectedCard,
       currentSlide)
 5  if isEmpty(selectedCard) then
 6  |   if isEmpty(currentSlide) then
 7  |   |   metricRecos =
    |   |      getSlideStartMetricRecos(selectedCard,
    |   |      canvas)
 8  |   |   recommendations.push(metricRecos)
 9  |   else if isNotEmpty(leftCard) then
10  |   |   if hasFilter(leftCard) then
11  |   |   |   overviewReco =
    |   |   |      getOverviewCard(leftCard,
    |   |   |      currentSlide)
12  |   |   |   recommendations.push(overviewReco)
13  |   |   filterRecos = getFilterRecos(leftCard,
    |   |      currentSlide)
14  |   |   recommendations.push(filterRecos)
15  |   |   metricRecos =
    |   |      getMetricSwitchRecos(selectedCard,
    |   |      canvas, rightCard)
16  |   |   recommendations.push(metricRecos)
17  |   else if isNotEmpty(rightCard) then
18  |   |   if hasFilter(rightCard) then
19  |   |   |   overviewReco =
    |   |   |      getOverviewCard(rightCard,
    |   |   |      currentSlide)
20  |   |   |   recommendations.push(overviewReco)
21  |   |   metricRecos =
    |   |      getMetricSwitchRecos(selectedCard,
    |   |      canvas, rightCard)
22  |   |   recommendations.push(metricRecos)
23  return recommendations
```

Figure 9

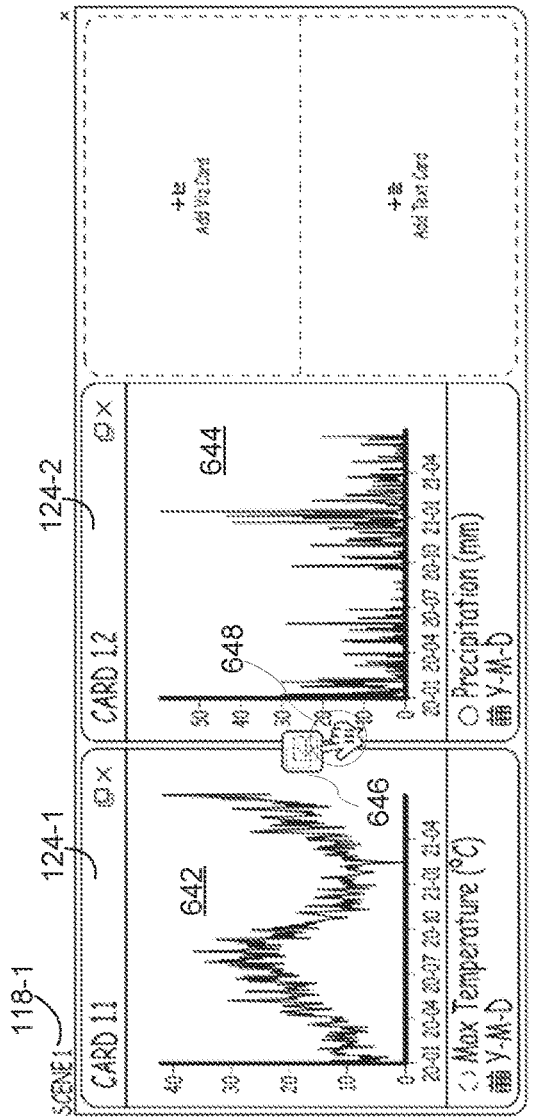
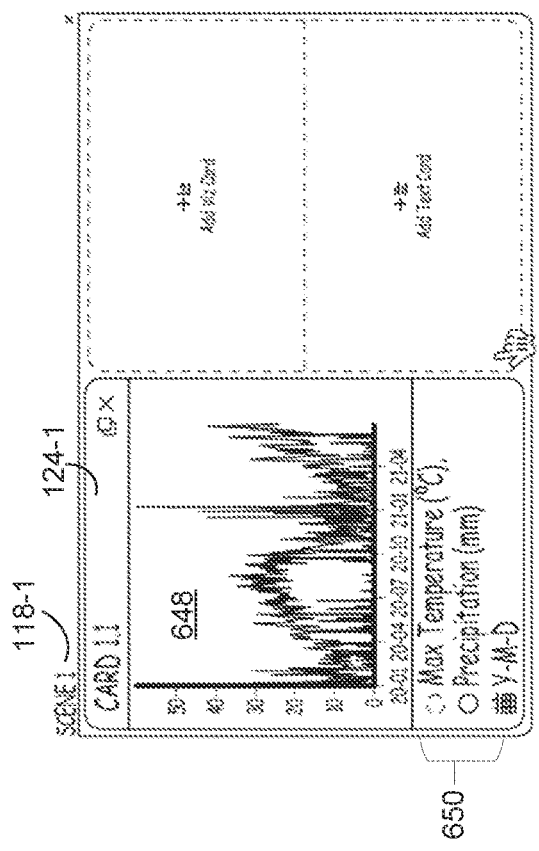
Figure 14A
Figure 14B

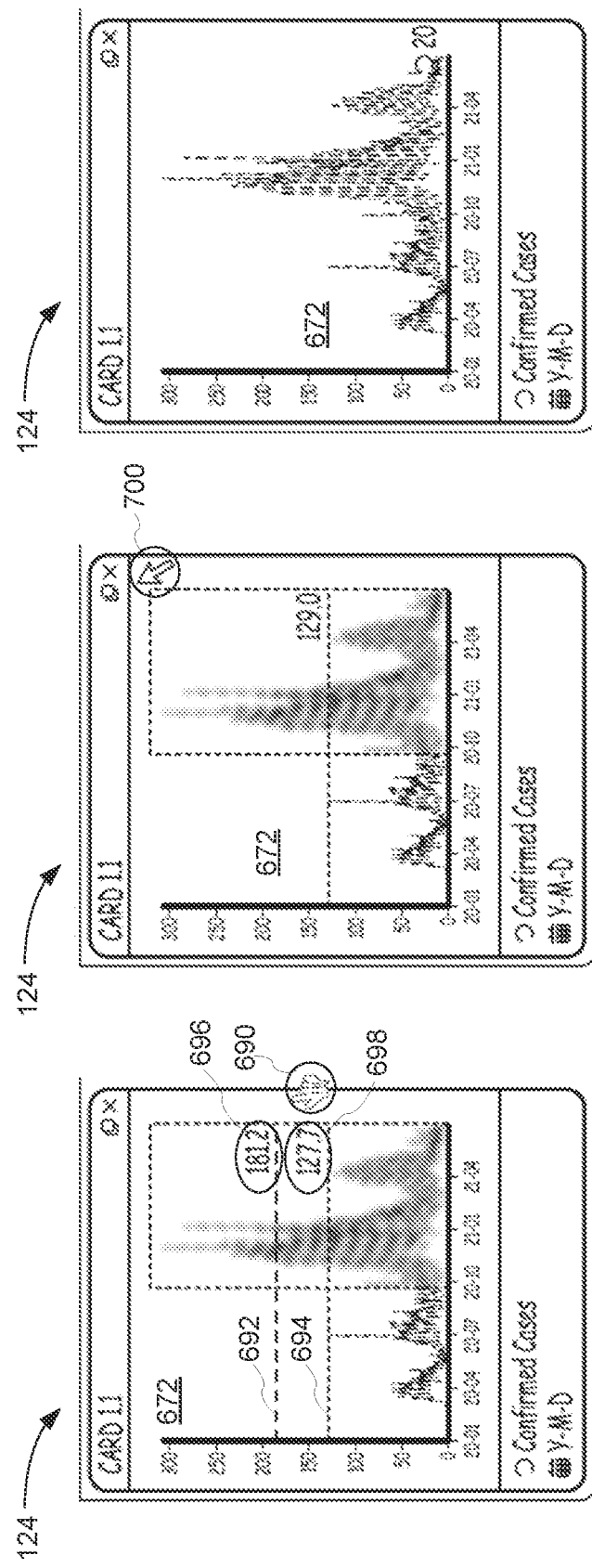

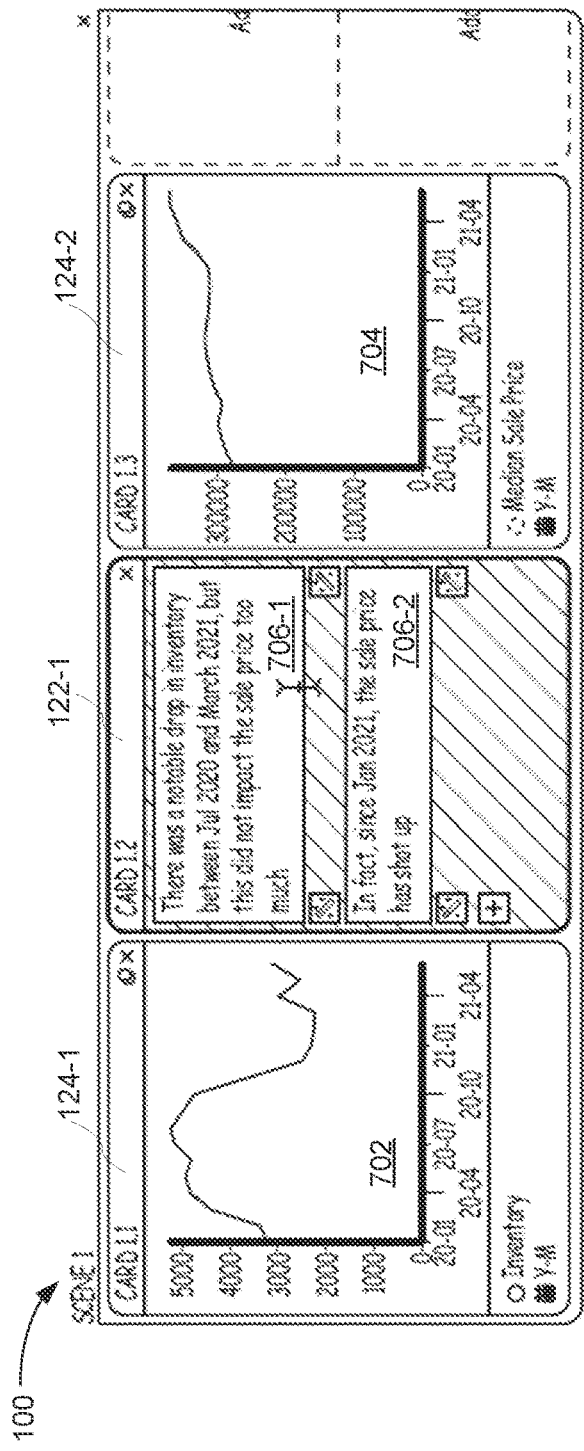

1070 After populating the first visualization card with the first data visualization, receive a second user input to add a second visualization card in the first scene.

1072 In response to the second user input, generate one or more visualization recommendations for the second visualization card.

1074 The one or more visualization recommendations include one or more of: (i) a first visualization recommendation that filters values of the first metric to a subset of data values, corresponding to a second date time range that is narrower than the first date/time range or (ii) a second visualization recommendation that spans an entire time period of the one or more data sources.

1076 The subset of data values corresponds to a local maximum or a local minimum of the first data visualization.

1078 Identify the subset of data values using a moving average algorithm.

1080 Generate a first line chart that includes the subset of data values.

1082 Display the first line chart in the recommendation region.

1084 The one or more visualization recommendations include a third visualization recommendation, corresponding to a second metric that is distinct from the first metric.

1086 Generate a third visualization recommendation that comprises a second line chart with a plurality of lines, each of the lines corresponding to a distinct data value of the categorical data field.

1088 Display the third visualization recommendation in the recommendation region.

Figure 18E

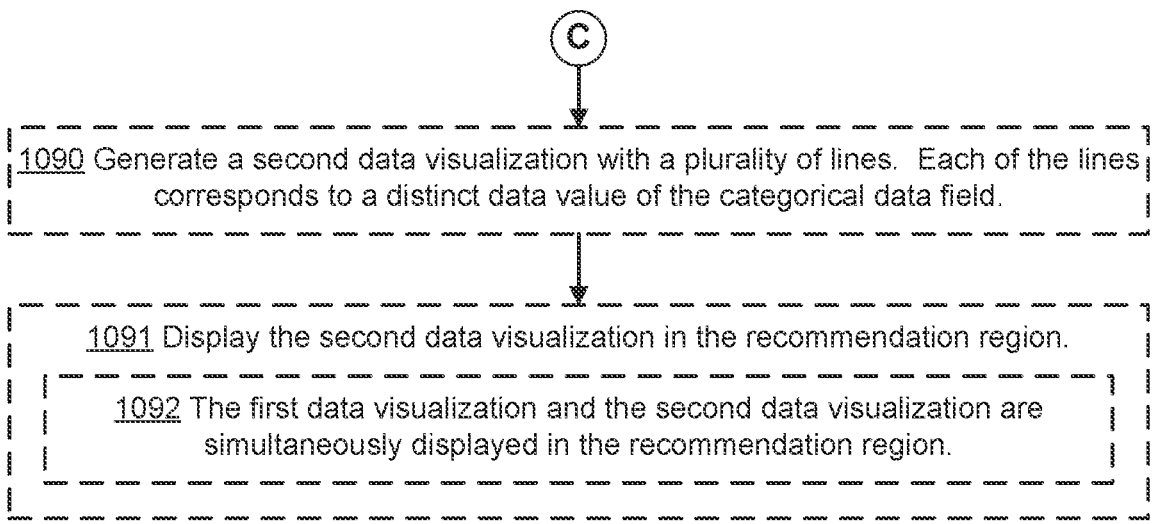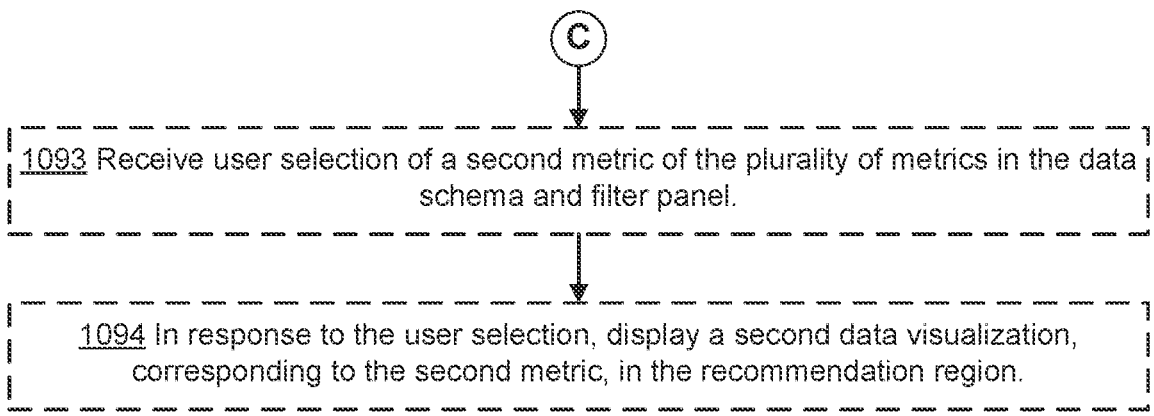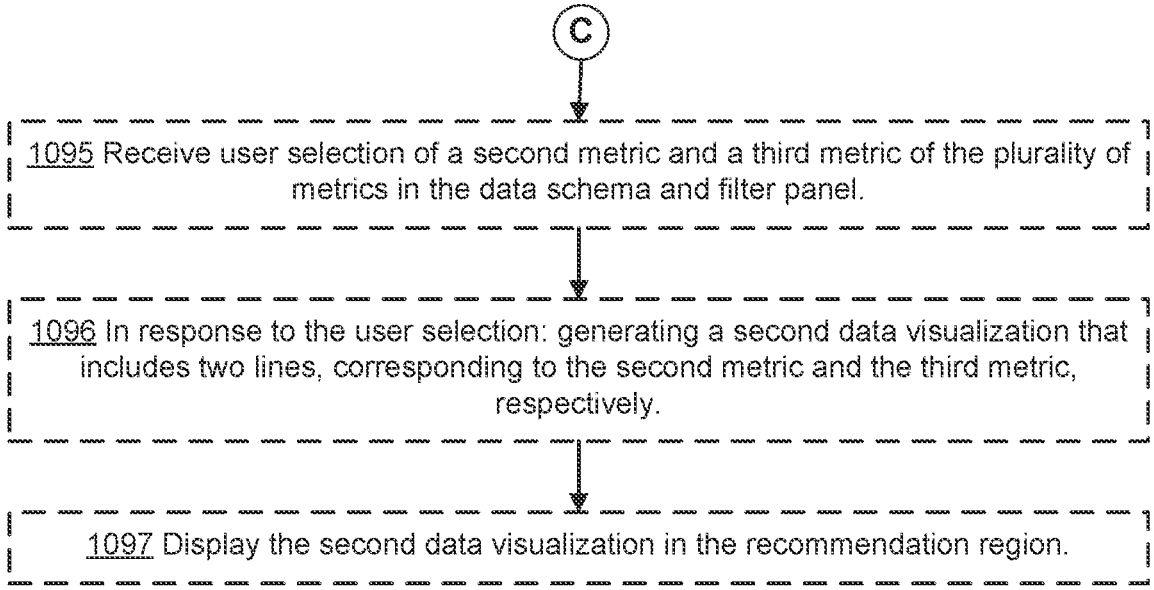
Figure 18F

1134 Display, in a recommendation region of the graphical user interface, a plurality of the generated data visualizations, in accordance with the determination.

1136 Each of the plurality of data visualizations is a line graph, which depicts changes in values of the respective metric, over a date/time range corresponding to the respective metric.

1138 Display the plurality of data visualizations as a list in the recommendation region.

1140 When the first subset of metrics includes the second metric, decrease a priority of the second metric in the first subset.

1142 Change an order in which the second data visualization is displayed in the list.

1144 Exclude the second visualization from the displayed plurality of data visualizations.

1146 Receive user selection of a first data visualization of the plurality of data visualizations, corresponding to a second metric of the subset of metrics.

1148 The first data visualization includes data values that span a first date/time range.

1150 In response to the user selection, populate the first visualization card with the first data visualization.

Figure 19C

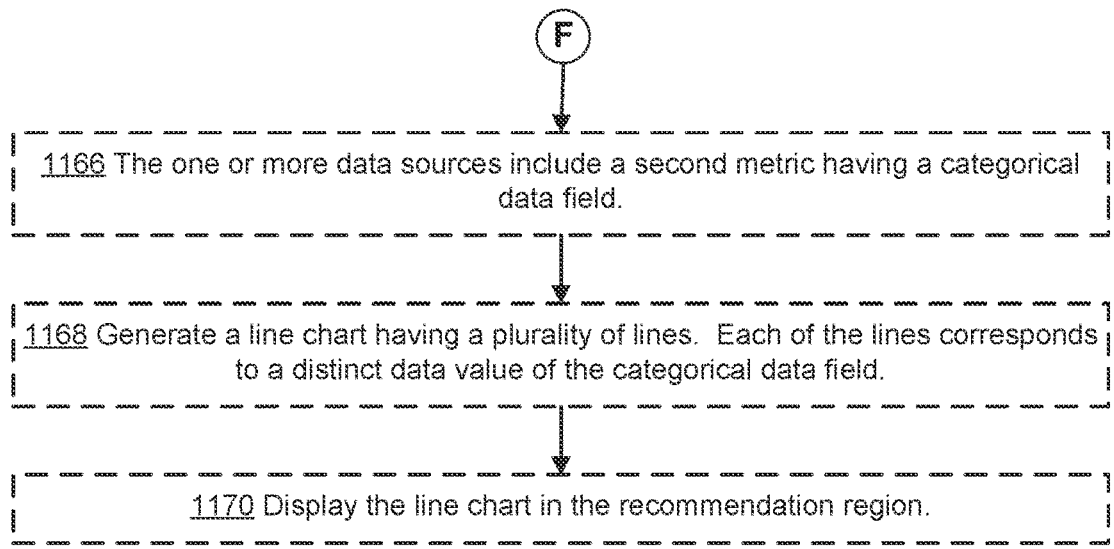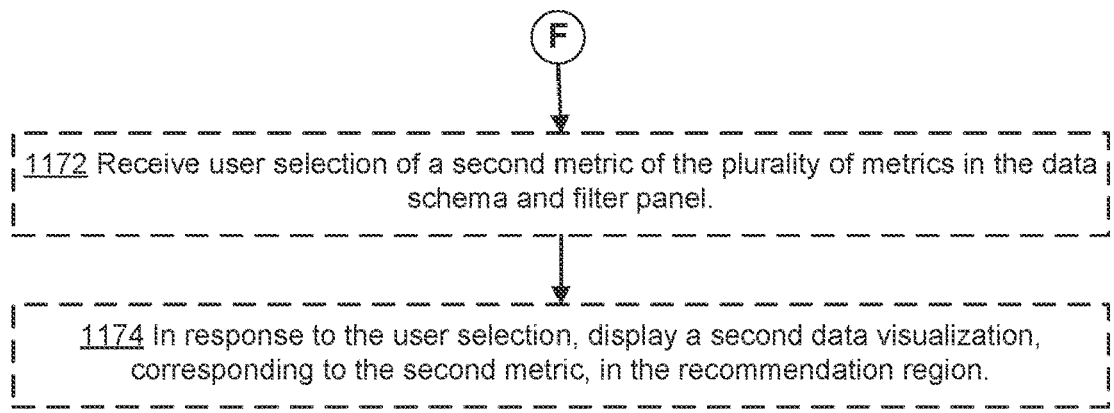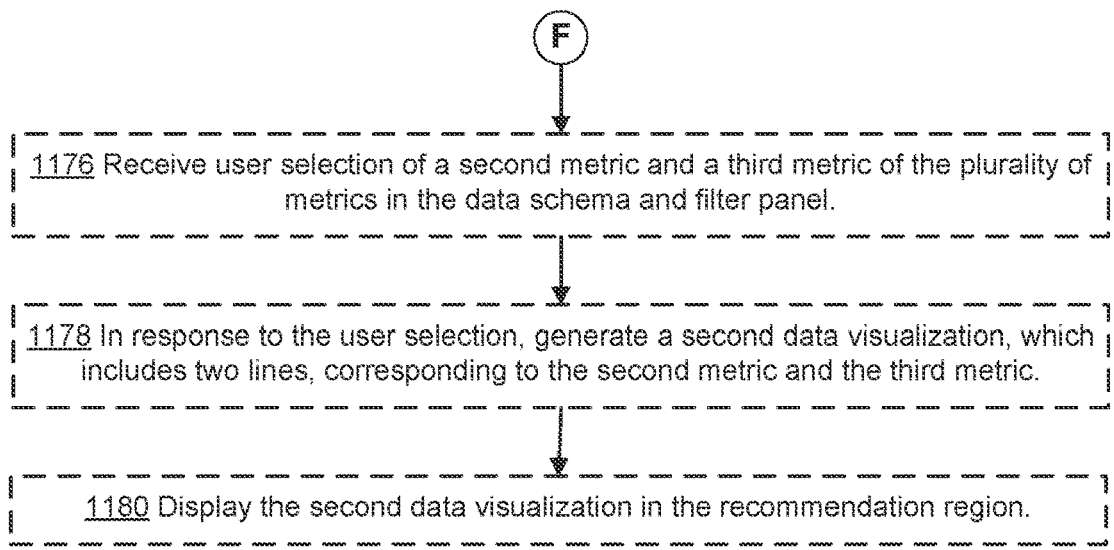
Figure 19E

1316 Responsive to the user input, when (i) the first data visualization and the second data visualization share a common time period and (ii) there is a substantial overlap between the first range of values on the vertical axis of the first data visualization and the second range of values on the vertical axis of the second data visualization, merge the first data visualization and the second data visualization into a single data visualization.

1318 The first range of values has a first unit of measurement. The second range of values has a second unit of measurement, distinct from the first unit of measurement.

1320 Display, with the single data visualization, a legend that includes the first unit of measurement and the second unit of measurement 1322 The single data visualization includes a horizontal axis having the common time period and a vertical axis having a range of values that is common to the first range of values and the second range of values.

1324 The single data visualization is a line graph that consists of two lines.

1326 Display the single data visualization on the first visualization card.

1328 Remove the second visualization card from the first scene.

Figure 21B

1330 Responsive to the user input, when (i) the first data visualization includes a first range of values on the vertical axis and (ii) the second data visualization includes a second range of values on the vertical axis that is substantially distinct from the first range of values, disable merging the two data visualizations.

1332 Responsive to a first user input selecting the vertical axis of the first data visualization, display a user-selectable interface element, adjacent to the vertical axis of the first data visualization, for transforming values in the vertical axis from absolute values to relative values.

1334 Receive a first user selection of the user-selectable interface element.

1336 In response to the first user selection, transform the first range of values to a relative scale relative to a first value appearing in the first data visualization.

1338 Responsive to a second user input selecting the vertical axis of the second data visualization, display the user-selectable interface element adjacent to the vertical axis of the second data visualization.

1340 Receive a second user selection of the user-selectable interface element.

1342 In response to the second user selection, transform the second range of values to a relative scale, relative to a first value appearing in the second data visualization.

1344 Receive third user input to specify merging the first data visualization with the second data visualization.

1346 In accordance with the third user input, merge the first and second data visualizations into a single data visualization.

Figure 21C

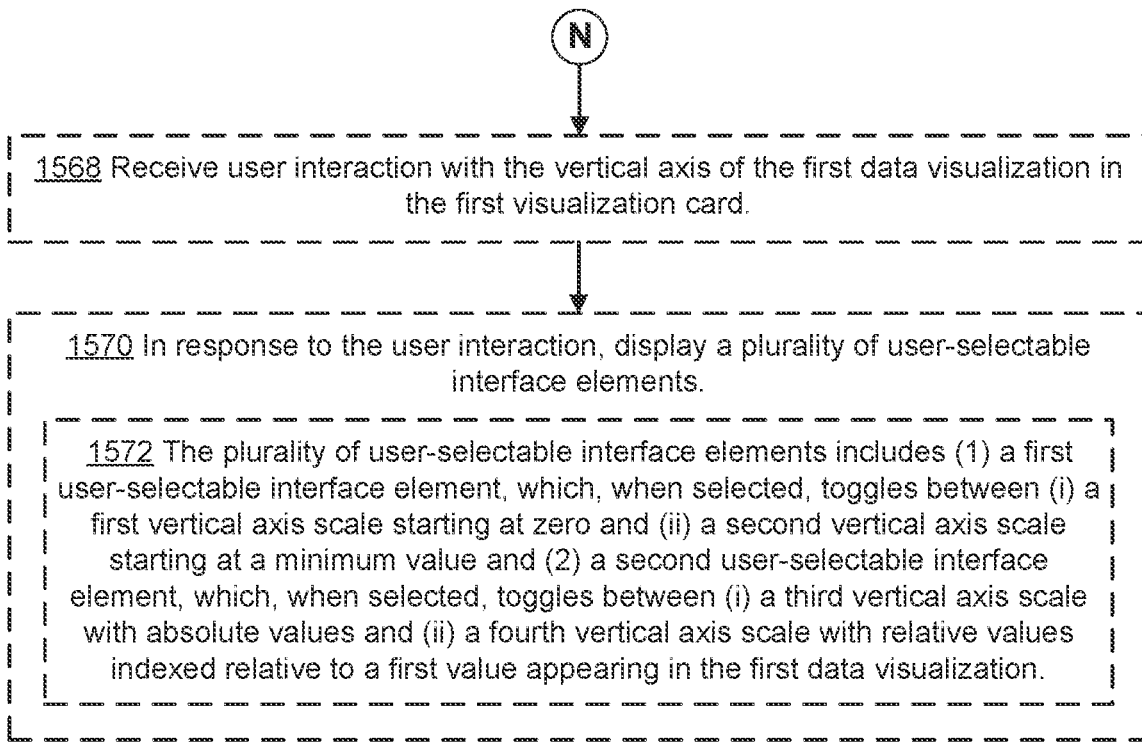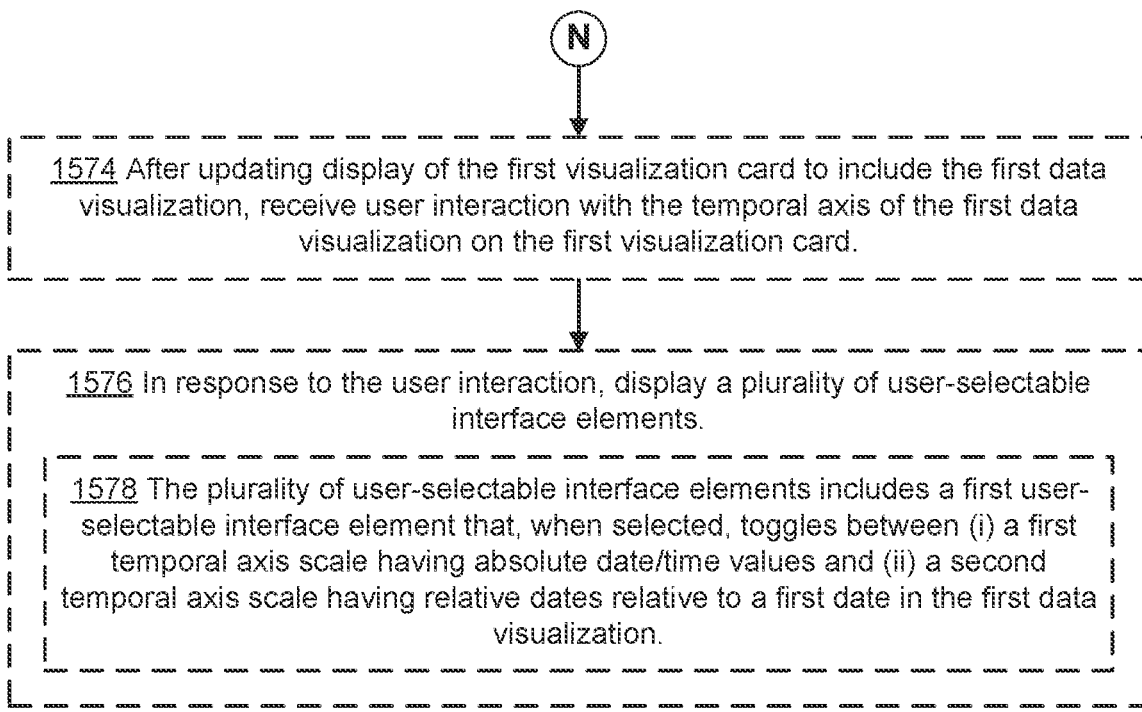
Figure 23F

USING SEMANTIC ALIGNMENT TO PRESENT TIME SERIES METRICS

RELATED APPLICATIONS

This application claims priority to: (i) U.S. Provisional Patent Application No. 63/403,822, filed Sep. 5, 2022, entitled "Using Semantic Alignment and Contextual Recommendations to Present Time Series Metrics" and (ii) U.S. Provisional Patent Application No. 63/408,057, filed Sep. 19, 2022, entitled "RemixTape: Curating Interactive Narratives Around Time Series Metrics with Semantic Alignment and Contextual Recommendations," each of which is hereby incorporated by reference herein in its entirety.

This application is related to the following applications, each of which is incorporated by reference herein in its entirety:
 (i) U.S. patent application Ser. No. 16/578,180, filed Sep. 20, 2019, entitled "Building Data Metric Objects Through User Interactions with Data Marks of Displayed Visual Representations of Data Sources," now U.S. Pat. No. 11,016,650, issued on May 25, 2021; and
 (ii) U.S. patent application Ser. No. 17/589,690, filed Jan. 31, 2022, entitled "Data Visualization Analytical Canvas with Functionally Independent Visual Containers."

TECHNICAL FIELD

The disclosed implementations relate generally to data visualizations and more specifically to systems, methods, and user interfaces that enable users to interact with and communicate data visualizations about time series metrics.

BACKGROUND

Data visualization applications enable a user to understand a data set visually and interact with data visualizations. Visual analyses of data sets, including distribution, trends, outliers, and other factors are important to making business decisions. Some data sets are very large or complex, and include many data fields. Some data elements are computed based on data from a selected data set. Various tools can be used to help understand and analyze the data, including dashboards that have multiple data visualizations and natural language interfaces that help with visual analytical tasks.

SUMMARY

Quantitative values (e.g., key performance indicator (KPI) values or metric values) and how they have changed over time is an increasingly prevalent topic of discussion within organizations.

Currently, a presenter who is preparing and communicating narratives about metrics tends to rely on slideware and screenshots from disparate sources and authors. For example, to communicate about metrics, a presenter can copy and paste metric values or static screenshots of line charts into a slide deck and discuss its contents at a meeting. However, in today's fast-paced environment, this data probably becomes stale between the time the charts were first made and when they are eventually shared and/or presented. Another approach for communicating narratives is for an owner of a metrics collection to share the data (e.g., a folder) with someone who is interested to learn about the metrics and their values. However, sharing a folder does not provide any narrative or structure about the values and how (or why) they evolve over time.

Accordingly, there is a need for improved systems, methods, and devices that provide a bridge between metric value conversations around collections of metrics. There is also a need to retain the interactivity of data visualizations (e.g., a feature that is found in some data dashboards such as Tableau) while ensuring an overall coherency across the content.

The present disclosure provides a system and method for collecting, annotating, and structuring narratives around ad-hoc collections of metrics. The disclosed system (e.g., application), also referred to as "RemixTape," simplifies the process of preparing and communicating narratives about metrics, while retaining the interactivity of visualizations and ensuring an overall coherency across the content.

As disclosed, RemixTape includes a graphical user interface (e.g., a canvas-based interface) for arranging interactive line chart representations of metrics.

As disclosed, RemixTape provides a scene- and card-based canvas, one where it is possible to remix interactive line chart representations of metrics, which includes juxtaposing, superimposing, and synchronizing sequences of charts, along with the ability to interleave charts with text commentary.

As disclosed, RemixTape provides semantic alignment between cards and the interface, by harmonizing how metrics are shown relative to one another (e.g., harmonizing the scale and providing descriptions of metrics adjacent to line chart visualizations).

As disclosed, RemixTape provides contextual recommendations for metric visualization as a user (e.g., an author) assembles the content on the canvas. For example, in some implementations, the recommendation incrementally refines as a user adds more content (e.g., more metrics or more visualizations) to the canvas.

As disclosed, RemixTape scopes the recommendations according to how a user segments the canvas into scenes and cards. For example, in some implementations, the RemixTape interface augments the process of metric curation and sequencing with recommendations of additional charts based on which metrics are currently placed on the canvas.

As disclosed, RemixTape hybridizes the functionality of presentation and data analysis tools. For example, on the continuum between slide presentation tools and dashboard applications or data analysis tools, RemixTape lies somewhere around the midpoint between these sets of tools in terms of its functionality and the use cases that it prioritizes. On the one hand, RemixTape provides line charts of available metrics, but it is not a visualization specification tool. On the other hand, RemixTape allows people to assemble linear sequences of visualization cards interleaved with text annotation cards, and unlike slideware, these components remain interactive and their values drive content recommendations that aim to enrich narratives and provide context.

As disclosed, RemixTape allows remixed sequences of visualizations and text to be delivered to audiences in synchronous meetings and presentations, or shared as card-based interactive documents via collaboration platforms such as Slack™ and Teams™.

Accordingly, the systems and/or methods disclosed advantageously improve preparation and communication of narratives about metrics. For example, recommendations in RemixTape focus on promoting a narrative sequence during presentation authoring (e.g., as opposed to promoting data coverage or analytic tasks/intents during open-ended data exploration). RemixTape considers the active state of a presentation and recommends visualizations that allow authors/presenters to drill-down into metrics they have previously discussed, zoom-out to give an overview when appropriate, or switch the presentation context by focusing on related metrics. This in turn improves the narrative structure. Furthermore, RemixTape allows users to reconcile differences between heterogeneous metrics (e.g., from disparate sources, with varied temporal domains, granularities, and/or quantitative scales) by juxtaposing, superimposing, and semantically aligning metrics through direct manipulation. These transformations serve to add coherency and semantic consistency to a presentation grounded in data. Accordingly, the disclosed systems and/or methods improve user experience and satisfaction.

The systems, methods, and devices of this disclosure each has several innovative aspects, no single one of which is solely responsible for the desirable attributes.

In accordance with some implementations, a method for recommending visualizations for interactive presentations of time-series metrics is performed at a computing device having a display, one or more processors, and memory. The memory stores one or more programs configured for execution by the one or more processors. The method includes receiving user selection of one or more data sources. The method includes identifying a plurality of metrics corresponding to the one or more data sources. Each metric of the plurality of metrics has a respective temporal attribute. The method includes displaying, in a graphical user interface, a data schema and filter panel, which includes the plurality of metrics. The interface also displays a canvas region for adding one or more scenes to an interactive presentation. The method includes receiving a first user input to add a data visualization to a first visualization card in a first scene of the interactive presentation. The method includes, in response to the first user input, when the first scene is an initial scene to be added to the canvas region, computing, for each metric of the plurality of metrics, a respective parameter that measures the variability of values of the respective metric. The method includes identifying a first subset of metrics, from the plurality of metrics, based on the computed parameters. The method includes generating, for each metric in the first subset of metrics, a respective data visualization. The method includes displaying, in a recommendation region of the graphical user interface, a plurality of the generated data visualizations. The method includes receiving user selection of a first data visualization of the plurality of data visualizations, corresponding to a first metric of the subset of metrics. The method includes, in response to the user selection, populating the first visualization card with the first data visualization.

In some implementations, generating the respective data visualization includes retrieving (i) a metric definition for a metric corresponding to the respective data visualization and (ii) data corresponding to the metric.

In some implementations, the first data visualization is a line chart.

In some implementations, the method further includes, prior to the first user input, receiving a second user input to add the first visualization card to the first scene. The method includes, in response to the second user input, displaying a blank visualization card in the first scene. Populating the first visualization card with the first data visualization includes updating the blank visualization card to include the first data visualization.

In some implementations, the first user input includes user selection of the blank visualization card.

In some implementations, the method includes, in response to the first user input, when the first scene has been populated with a second visualization card that has a second data visualization and corresponds to a second metric of the plurality of metrics, determining one or more metrics corresponding to the second visualization card. The method includes identifying, from the plurality of metrics, a second subset of metrics that excludes the one or more metrics. The method includes computing, for each metric in the second subset of metrics, a respective correlation coefficient between (i) values of the metric and (ii) data values displayed in the second data visualization. The method includes identifying a third metric, from the second subset of metrics, based on the computed correlation coefficients. The method includes generating a third data visualization corresponding to the third metric. The method includes displaying the third data visualization in the recommendation region.

In some implementations, generating the third data visualization corresponding to the third metric includes retrieving a metric definition and/or associated data corresponding to the third metric, and generating the third data visualization using the metric definition and the associated data.

In some implementations, the second visualization card immediately precedes the first visualization card in the first scene.

In some implementations, the third metric has the strongest correlation with the second metric amongst the second subset of metrics.

In some implementations, the first data visualization includes data values that span a first date/time range. The method further includes, after populating the first visualization card with the first data visualization, receiving a second user input to add a second visualization card in the first scene. The method includes, in response to the second user input, generating one or more visualization recommendations for the second visualization card. The one or more visualization recommendations include one of: a first visualization recommendation that filters values of the first metric to a subset of data values, corresponding to a second date/time range that is narrower than the first date/time range; or a second visualization recommendation that spans an entire time period of the one or more data sources.

In some implementations, the subset of data values corresponds to a local maximum or a local minimum of the first data visualization.

In some implementations, the method further includes identifying the subset of data values using a moving average algorithm, generating a first line chart that includes the subset of data values, and displaying the first line chart in the recommendation region.

In some implementations, the one or more data sources include a second metric having a categorical data field. The method further includes generating a third visualization recommendation that comprises a second line chart with a plurality of lines. Each of the lines corresponds to a distinct data value of the categorical data field. The method further includes displaying the third visualization recommendation in the recommendation region.

In some implementations, the one or more visualization recommendations include a third visualization recommendation, corresponding to a second metric that is distinct from the first metric.

In some implementations, the one or more data sources include a second metric having a categorical data field. The method includes generating a second data visualization with a plurality of lines. Each of the lines corresponds to a distinct data value of the categorical data field. The method includes displaying the second data visualization in the recommendation region.

In some implementations, the first data visualization and the second data visualization are simultaneously displayed in the recommendation region.

In some implementations, the method further includes receiving user selection of a second metric of the plurality of metrics in the data schema and filter panel. The method includes in response to the user selection, displaying a second data visualization, corresponding to the second metric, in the recommendation region.

In some implementations, the method further includes receiving user selection of a second metric and a third metric of the plurality of metrics in the data schema and filter panel. The method further includes, in response to the user selection, generating a second data visualization that includes two lines, corresponding to the second metric and the third metric, respectively. The method further includes displaying the second data visualization in the recommendation region.

In some implementations, each of the plurality of data visualizations is a line graph that depicts changes in values of the respective metric, over a date/time range corresponding to the respective metric.

In some implementations, identifying the first subset of metrics includes: ranking the plurality of metrics (e.g., in an ascending or a descending order) based on the respective computed parameters, and identifying the first subset of metrics according to the ranking.

In some implementations, identifying the first subset of metrics includes: determining that each metric in the first subset of metrics has a coefficient of variation that exceeds a predetermined threshold value.

In accordance with some implementations, a method for recommending visualizations for interactive presentations of time-series metrics is performed at a computing device having a display, one or more processors, and memory. The memory stores one or more programs configured for execution by the one or more processors. The method includes receiving user selection of one or more data sources. The method includes identifying a plurality of metrics corresponding to the one or more data sources. Each metric of the plurality of metrics has a respective temporal attribute. The method includes displaying, in a graphical user interface, a canvas region for adding one or more scenes to an interactive presentation. The method includes receiving a first user input to add a first data visualization to a first visualization card in a first scene of the interactive presentation. The method includes, in response to the first user input, when the canvas region includes a prior scene having a second visualization card with a second data visualization: computing, for each metric of the plurality of metrics, a respective parameter that measures the variability of values of the respective metric. The method includes identifying a first subset of metrics, from the plurality of metrics, based on the computed parameters. The method includes generating, for each metric in the first subset of metrics, a respective data visualization. The method includes identifying a first metric, of the plurality of metrics, to which the second data visualization corresponds. The method includes determining whether the first subset of metrics includes the first metric. The method includes displaying, in the recommendation region of the graphical user interface, a plurality of the generated data visualizations, in accordance with the determination.

In some implementations, generating the respective data visualization includes retrieving (i) a metric definition for a metric corresponding to the respective data visualization and/or (ii) data corresponding to the metric.

In some implementations, displaying the plurality of the generated data visualizations in accordance with the determination includes, when the first subset of metrics includes the second metric, decreasing the priority of the second metric in the first subset.

In some implementations, the plurality of data visualizations is displayed as a list in the recommendation region. Decreasing the priority of the second metric includes changing the order in which the second data visualization is displayed in the list.

In some implementations, decreasing the priority of the second metric includes excluding the second visualization from the displayed plurality of data visualizations.

In some implementations, the method includes receiving user selection of a first data visualization of the plurality of data visualizations, corresponding to a second metric of the subset of metrics. The method includes, in response to the user selection, populating the first visualization card with the first data visualization.

In some implementations, the first data visualization includes data values that span a first date/time range. The method includes, after populating the first visualization card with the first data visualization, receiving a second user input to add a third visualization card in the first scene. The method includes, in response to the second user input, generating one or more visualization recommendations for the third visualization card. The one or more visualization recommendations include one of: a first visualization recommendation that filters values of the first metric to a subset of data values, corresponding to a second date/time range that is narrower than the first date/time range, or a second visualization recommendation that spans an entire time period of the one or more data sources.

In some implementations, the subset of data values corresponds to a local maximum or a local minimum of the first data visualization.

In some implementations, the method further includes identifying the subset of data values using a moving average algorithm, generating a first line chart that includes the subset of data values, and displaying the first line chart in the recommendation region.

In some implementations, the one or more data sources include a second metric having a categorical data field. The method further includes generating a line chart having a plurality of lines, each of the lines corresponding to a distinct data value of the categorical data field and displaying the line chart in the recommendation region.

In some implementations, the graphical user interface includes a data schema and filter panel that displays the plurality of metrics. The method further includes receiving user selection of a second metric of the plurality of metrics in the data schema and filter panel. The method includes, in response to the user selection, displaying a second data visualization, corresponding to the second metric, in the recommendation region.

In some implementations, the graphical user interface includes a data schema and filter panel that displays the plurality of metrics. The method further includes receiving user selection of a second metric and a third metric of the plurality of metrics in the data schema and filter panel. The method includes, in response to the user selection: generating a second data visualization that includes two lines, corresponding to the second metric and the third metric, respectively. The method includes displaying the second data visualization in the recommendation region.

In some implementations, each of the plurality of data visualizations is a line graph that depicts changes in values of the respective metric, over a date/time range corresponding to the respective metric.

In some implementations, identifying the first subset of metrics includes ranking the plurality of metrics in a descending order based on the computed parameters and identifying the first subset of metrics according to the ranking.

In some implementations, identifying the first subset of metrics includes determining that each metric in the first subset of metrics has a coefficient of variation that exceeds a predetermined threshold value.

In accordance with some implementations, a method for presenting time series metrics is performed at a computing device having a display, one or more processors, and memory. The memory stores one or more programs configured for execution by the one or more processors. The method includes displaying, in a graphical user interface, a canvas region that includes one or more scenes. The one or more scenes including a first scene having a first visualization card. The method includes displaying, in the graphical user interface, a recommendation region that includes one or more data visualizations. Each data visualization of the one or more data visualizations corresponds to a respective metric of a data source. Each metric has a respective temporal attribute. The method includes displaying, in the graphical user interface, a scene summary that includes, for each scene of the one or more scenes: (i) a respective count of visualization cards corresponding to the scene, (ii) a respective count of text cards corresponding to the scene, (iii) a respective count of unique metrics corresponding to the scene, and (iv) a respective cumulative temporal span corresponding to the scene.

In some implementations, the respective cumulative temporal span is displayed as a graphical element having a length that is proportional to the cumulative temporal span.

In some implementations, the one or more data visualizations include a first data visualization having a first temporal granularity. The method further includes receiving user specification of a second temporal granularity for the first data visualization, distinct from the first temporal granularity. In accordance with the user specification, the method updates data marks in the first data visualization to include a subset of data marks, corresponding to the second temporal granularity.

In some implementations, the method further includes displaying, in the graphical user interface, a data schema and filter panel. The user specification comprises user selection of a user interface element, corresponding to the second temporal granularity, in the data schema and filter panel.

In some implementations, the method further includes displaying a plurality of metrics in a data schema and filter panel of the graphical user interface.

In some implementations, the plurality of metrics corresponds to one or more data sources. The method further includes determining, from the one or more data sources, a start date and an end date corresponding to the plurality of metrics. The method displays the start date and the end date in the data schema and filter panel.

In some implementations, the one or more data visualizations include a first data visualization having a time axis domain including the start date and the end date. The method further includes receiving user input modifying the start date and/or the end date. The method includes, in accordance with the user input: modifying the time axis domain of the first data visualization according to the modified start date and/or end date. The method displays, in the recommendation region, an updated first data visualization having the modified time axis domain.

In some implementations, the first data visualization includes a plurality of data marks, including data marks corresponding to the start date and the end date. The updated first data visualization includes a subset of the plurality of data marks that are filtered according to the modified time axis domain.

In some implementations, the first data visualization is a line chart.

In some implementations, the method receives user input to add a first data visualization, corresponding to a first metric, to the first visualization card. The method includes, in response to the user selection, updating display of the first visualization card to include the first data visualization.

In some implementations, the method includes, when the first data visualization corresponds to a distinct metric in the first scene, updating the scene summary by incrementing the respective count of unique metrics corresponding to the first scene.

In some implementations, the method includes, in response to the user selection, updating the scene summary by incrementing the respective count of visualization cards corresponding to the first scene.

In some implementations, the first scene includes a second visualization card adjacent to the first visualization card. The second visualization card has a second data visualization. The method includes receiving user input to specify merging the first data visualization with the second data visualization. The method includes, responsive to the user input, when (i) the first data visualization and the second data visualization share a common time period and (ii) there is a substantial overlap between a first range of values on a vertical axis of the first data visualization and a second range of values on a vertical axis of the second data visualization, merging the first data visualization and the second data visualization into a single data visualization.

In some implementations, the method includes, prior to displaying the one or more data visualizations in the recommendation region, generating the one or more data visualizations. The generating includes identifying a plurality of metrics corresponding to the data source, each metric of the plurality of metrics having a respective temporal attribute; computing, for each metric of the plurality of metrics, a respective parameter that measures the variability of values of the respective metric; identifying a subset of metrics, from the plurality of metrics, based on the computed parameters; retrieving, for each metric in the subset of metrics, a respective data visualization; and displaying the one or more retrieved data visualizations in the recommendation region.

In some implementations, generating the one or more data visualizations further includes: when the canvas region includes a second scene having a second visualization card with a second data visualization: (i) determining a second metric, of the plurality of metrics, to which the second data visualization corresponds, (ii) determining whether the subset of metrics includes the second metric, and (iii) when the subset of metrics includes the second metric, decreasing the priority of the second metric in the subset.

In accordance with some implementations, a method for combining visualization cards in a time series metrics presentation is performed at a computing device having a display, one or more processors, and memory. The memory stores one or more programs configured for execution by the one or more processors. The method includes displaying, in a graphical user interface, a canvas region that includes a first scene. The first scene includes a first visualization card having a first data visualization and a second visualization card, adjacent to the first visualization card. The second visualization card has a second data visualization. The method includes receiving user input to specify merging the first data visualization with the second data visualization. The method includes, responsive to the user input, when (i) the first data visualization and the second data visualization share a common time period and (ii) there is a substantial overlap between a first range of values on a vertical axis of the first data visualization and a second range of values on a vertical axis of the second data visualization, merging the first data visualization and the second data visualization into a single data visualization.

In some implementations, the first range of values has a first unit of measurement. The second range of values has a second unit of measurement, distinct from the first unit of measurement.

In some implementations, the method further includes displaying, with the single data visualization, a legend that includes the first unit of measurement and the second unit of measurement.

In some implementations, the single data visualization includes a horizontal axis having the common time period and a vertical axis having a range of values that is common to the first range of values and the second range of values.

In some implementations, the method further includes displaying the single data visualization on the first visualization card.

In some implementations, displaying the single data visualization on the first data visualization card includes removing the second visualization card from the first scene.

In some implementations, the first visualization card is positioned on the left of the second visualization card in the first scene.

In some implementations, each of the first data visualization and the second data visualization is a line graph.

In some implementations, the single data visualization is a line graph that consists of two lines.

In some implementations, the method determines whether (i) the first data visualization includes a first range of values on a vertical axis and (ii) the second data visualization includes a second range of values on the vertical axis that is substantially distinct from the first range of values. In this case, when a first user input selects the vertical axis of the first data visualization, the method displays a user-selectable interface element, adjacent to the vertical axis of the first data visualization, for transforming values on the vertical axis from absolute values to relative values. The method includes receiving a first user selection of the user-selectable interface element. The method includes, in response to the first user selection, transforming the first range of values to a relative scale, relative to the first value appearing in the first data visualization. The method includes, responsive to a second user input selecting the vertical axis of the second data visualization, displaying the user-selectable interface element adjacent to the vertical axis of the second data visualization. The method includes receiving a second user selection of the user-selectable interface element. The method includes, in response to the second user selection, transforming the second range of values to a relative scale, relative to a first value appearing in the second data visualization. The method includes receiving a third user input to specify merging the first data visualization with the second data visualization. The method includes, in accordance with the third user input, merging the first and second data visualizations into a single data visualization.

In some implementations, the method further includes displaying, in the graphical user interface, a recommendation region, which includes one or more data visualizations. Each data visualization of the one or more data visualizations corresponds to a respective metric of a data source, the respective metric having a respective temporal attribute.

In accordance with some implementations, a method for linking text and visualizations in a time series metric presentation is performed at a computing device having a display, one or more processors, and memory. The memory stores one or more programs configured for execution by the one or more processors. The method includes displaying, in a graphical user interface, a canvas region that includes a first scene. The first scene includes a first visualization card having a first data visualization and a first text card, adjacent to the first visualization card. The method includes receiving, via the first text card, (i) text input from a user and (ii) user selection of a first user interface element for linking the first text card to the first visualization card. The method includes, in accordance with the receiving, determining whether the text input includes a first expression having a first time span that intersects with a temporal domain of the first data visualization. The method includes, in accordance with a determination that the text input includes the first expression, and in response to a first user interaction with a first region of the first text card that includes the first expression, visually emphasizing a first portion of the first data visualization, corresponding to the first time span.

In some implementations, the method further includes, concurrently with visually emphasizing the first portion of the first data visualization, visually de-emphasizing other portions of the first data visualization.

In some implementations, the first data visualization is a line chart.

In some implementations, visually emphasizing the first portion of the first data visualization includes displaying a portion of the line chart corresponding to the first time span.

In some implementations, the first scene includes a second visualization card having a second data visualization. The method further includes receiving, via the first text card, user selection of a second user interface element for linking the first text card to the second visualization card. The method includes determining that the first time span included in the first expression intersects with the temporal domain of the second data visualization. The method includes receiving a second user interaction with the first region of the first text card. The method includes, in response to the second user interaction, simultaneously visually emphasizing (i) the first portion of the first data visualization and (ii) a second portion of the second data visualization, the first portion and the second portion corresponding to the first time span.

In some implementations, the first text card is positioned between the first visualization card and the second visualization card.

In some implementations, each of the first data visualization and the second data visualization is a line chart.

In some implementations, the first scene includes a second visualization card having a second data visualization. The text input includes a second expression, distinct from the first expression. The second expression includes a second time span. The method further includes receiving, via the first text card, user selection of a second user interface element for linking the first text card to the second visualization card. The method includes determining that the second expression intersects with the temporal domain of the second data visualization. The method includes receiving a second user interaction with a second region of the first text card that includes the second expression. The method includes, in response to the second user interaction, simultaneously (i) visually emphasizing a portion of the second data visualization corresponding to the second time span and (ii) displaying the first data visualization in its entirety.

In some implementations, the first text card includes a plurality of text input elements. The text input from the user is received via the plurality of text input elements.

In some implementations, the plurality of text input elements includes a first text input element and a second text input element. The first expression is located in the first text input element. The second expression is located in the second text input element.

In some implementations, the method further includes displaying, in the graphical user interface, a recommendation region that includes one or more data visualizations. Each data visualization of the one or more data visualizations corresponds to a respective metric of a data source. The respective metric has a respective temporal attribute.

In accordance with some implementations, a method for presenting time series metrics is performed at a computing device having a display, one or more processors, and memory. The memory stores one or more programs configured for execution by the one or more processors. The method includes displaying, in a graphical user interface, a canvas region that includes a first scene. The first scene has a first visualization card. The method includes displaying, in the graphical user interface, a recommendation region that includes one or more data visualizations. Each data visualization of the one or more data visualizations corresponds to a respective metric, of one or more metrics, of a data source. The respective metric has a respective temporal attribute. The method includes receiving user selection to add a first data visualization, corresponding to a first metric of the one or more metrics, to the first visualization card. The method includes, in response to the user selection, updating display of the first visualization card to include the first data visualization.

In some implementations, the method includes, prior to displaying the one or more data visualizations, generating the one or more data visualizations. Generating the one or more data visualizations includes retrieving, for each data visualization of the one or more data visualizations, a metric definition for the respective metric corresponding to the respective data visualization.

In some implementations, the first data visualization is a line chart.

In some implementations, the method further includes, after updating display of the first visualization card to include the first data visualization, receiving user interaction with the first visualization card, the user interaction further specifying a split point on a temporal axis of the first data visualization. The method includes in response to the user interaction, displaying one or more user-selectable interface elements for filtering a date/time range of the first data visualization. The one or more user-selectable interface elements include one or more of: a first user-selectable interface element that, when selected, retains data points of the first data visualization before the split point; a second user-selectable interface element that, when selected, retains data points of the first data visualization after the split point; and a third user-selectable interface element that, when selected, (i) retains data points of the first data visualization before the split point on the first visualization card and (ii) displays data points of the first data visualization after the split point on a second visualization card, adjacent to the first visualization card.

In some implementations, the first data visualization includes a temporal axis with values spanning from a starting date/time value to an ending date/time value. The method further includes, in response to user selection of the first user-selectable interface element, generating an updated first data visualization that includes an updated temporal axis with values spanning from (i) the starting date/time value to (ii) a date/time value corresponding to the split point. The method includes displaying the updated first data visualization on the first visualization card.

In some implementations, the first data visualization includes a temporal axis with values spanning from a starting date/time value to an ending date/time value. The method further includes, in response to user selection of the second user-selectable interface element, generating an updated first data visualization that includes an updated temporal axis with values spanning from (i) a date/time value corresponding to the split point to (ii) the ending date/time value. The method includes displaying the updated first data visualization on the first visualization card.

In some implementations, the first data visualization includes a temporal axis with values spanning from a starting date/time value to an ending date/time value. The method further includes, in response to user selection of the third user-selectable interface element, generating an updated first data visualization that includes an updated temporal axis with values spanning from (i) the starting date/time value to a first date/time value corresponding to the split point. The method includes generating a second data visualization that includes a temporal axis with values spanning from (ii) the first date/time value to (ii) the ending date/time value. The method includes simultaneously displaying (i) the updated first data visualization on the first visualization card and (ii) the second data visualization on a second visualization card, adjacent to the first visualization card.

In some implementations, the method further includes after updating display of the first visualization card to include the first data visualization, receiving user interaction with the first data visualization on the first visualization card. The user interaction further specifies a date/time range on a temporal axis of the first data visualization. The method includes, in response to the user interaction, displaying a plurality of user-selectable interface elements for filtering the date/time range of the first data visualization. The plurality of user-selectable interface elements includes a first user-selectable interface element that, when selected, retains data points of the first data visualization within the date/time range specified via the user interaction, and a second user-selectable interface element that, when selected, retains data points of the first data visualization outside the date/time range specified via the user interaction.

In some implementations, the date/time range specified via the user interaction spans from a first date/time value to a second date/time value. The method further includes, in response to user selection of the first user-selectable interface element, generating an updated first data visualization that includes an updated temporal axis with values spanning from the first date/time value to a second date/time value. The method includes displaying the updated first data visualization on the first visualization card.

In some implementations, the first data visualization includes a temporal axis with values spanning from a starting date/time value to an ending date/time value. The date/time range spans from a first date/time value to a second date/time value. The method further includes, in response to user selection of the second user-selectable interface element, generating an updated first data visualization that includes an updated temporal axis with values spanning from the starting date/time value to the first date/time value. The method includes generating a second data visualization including a temporal axis with values spanning from the second date/time value to the ending date/time value. The method includes simultaneously displaying (i) the updated first data visualization on the first visualization card and (ii) the second data visualization on a second visualization card, adjacent to the first visualization card.

In some implementations, the method further includes receiving user interaction with a vertical axis of the first data visualization in the first visualization card. The method includes, in response to the user interaction, displaying a plurality of user-selectable interface elements. The plurality of user-selectable interface elements includes (1) a first user-selectable interface element that, when selected, toggles between (i) a first vertical axis scale starting at zero and (ii) a second vertical axis scale starting at a minimum value and (2) a second user-selectable interface element that, when selected, toggles between (i) a third vertical axis scale with absolute values and (ii) a fourth vertical axis scale with relative values indexed relative to the first value appearing in the first data visualization.

In some implementations, the method further includes, after updating display of the first visualization card to include the first data visualization, receiving user interaction with a temporal axis of the first data visualization on the first visualization card. The method includes, in response to the user interaction, displaying a plurality of user-selectable interface elements. The plurality of user-selectable interface elements includes a first user-selectable interface element that, when selected, toggles between (i) a first temporal axis scale having absolute date/time values and (ii) a second temporal axis scale having relative dates, relative to the first date in the first data visualization.

In some implementations, the method further includes, after updating display of the first visualization card to include the first data visualization, when the first scene includes a second visualization card adjacent to the first visualization card and the second visualization card has a second data visualization: in response to user selection of a temporal axis of the second data visualization, displaying a user-selectable element. The method includes receiving user selection of the user-selectable element. The method includes, in response to user selection of the user-selectable element, generating an updated second data visualization having an updated temporal axis with data values that match data values of the temporal axis of the first data visualization. The method includes displaying the updated second data visualization.

In some implementations, the method further includes, after updating display of the first visualization card to include the first data visualization, when the first scene includes a second visualization card adjacent to the first visualization card and the second visualization card has a second data visualization: in response to user selection of the vertical axis of the second data visualization, displaying a user-selectable element. The method includes receiving user selection of the user-selectable element. The method includes, in response to user selection of the user-selectable element, generating an updated second data visualization having an updated vertical axis with data values that match data values of a vertical axis of the first data visualization. The method includes displaying the updated second data visualization.

In some implementations, a computing device includes a display, one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to collect, annotate, and structure narratives around ad-hoc collections of metrics.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 4A to 4H provide a series of screen shots for managing scenes in a graphical user interface, in accordance with some implementations.

FIGS. 7A to 7D provide a series of screen shots for interactions with a graphical user interface to specify date/time granularity, in accordance with some implementations.

FIG. 9 provides an algorithm that summarizes Remix-Tape's recommendation logic according to some implementations.

FIGS. 14A to 14H provide a series of screen shots for interactions with a visualization card according to some implementations.

FIGS. 15A to 15H provide a series of screen shots for interactions with a visualization card, in accordance with some implementations.

FIGS. 18A to 18F provide a flowchart of a method for recommending visualizations for interactive presentations of time-series metrics according to some implementations.

FIGS. 19A to 19E provide a flowchart of a method for recommending visualizations for interactive presentations of time-series metrics according to some implementations.

FIGS. 21A to 21C provide a flowchart of a method for combining data visualizations on visualization cards in a time series metrics presentation according to some implementations.

FIGS. 23A to 23H provide a flowchart of a method for presenting time series metrics according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1A:
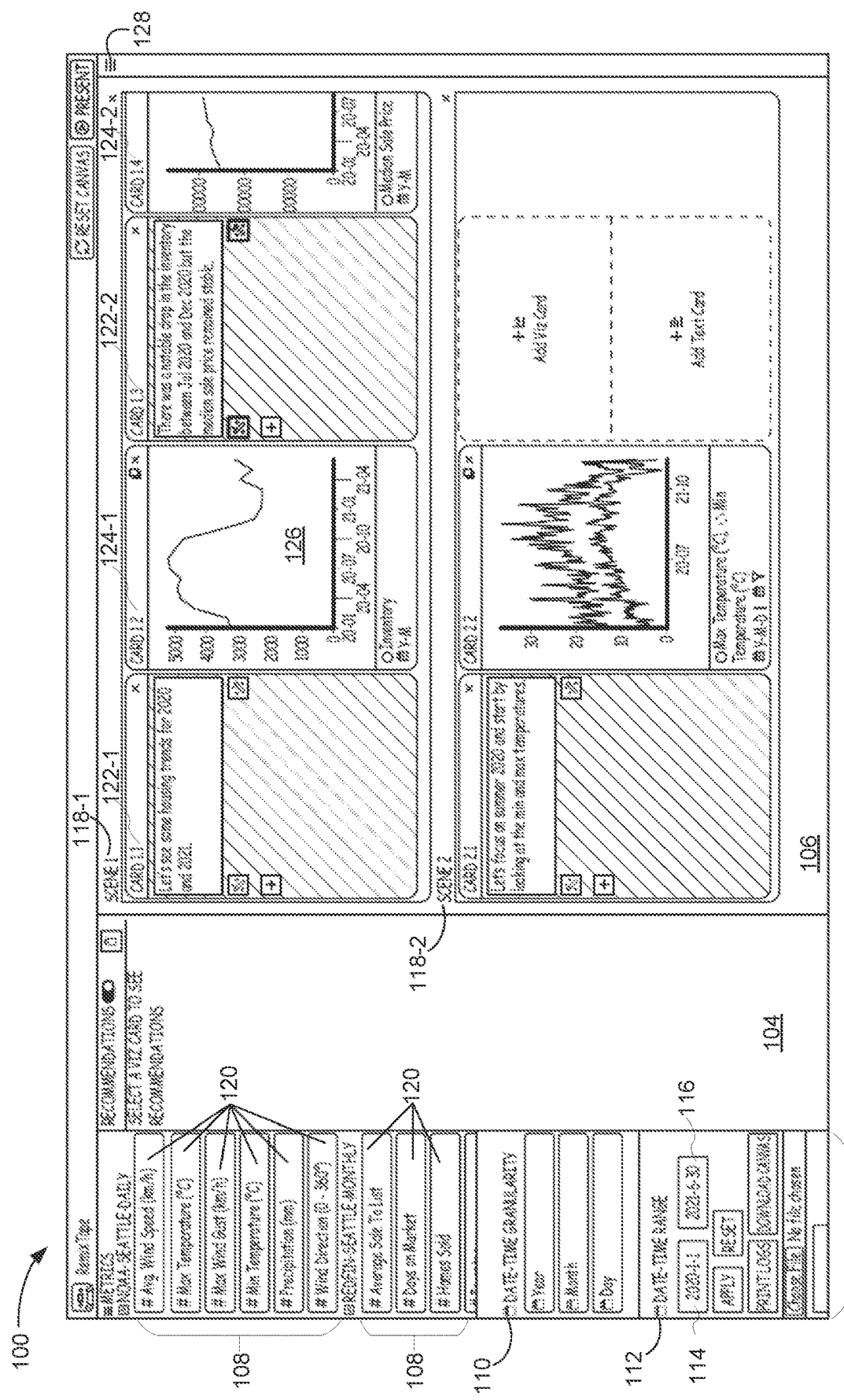
FIGS. 1A and 1B illustrate a graphical user interface according to some implementations.
Figure 1B:
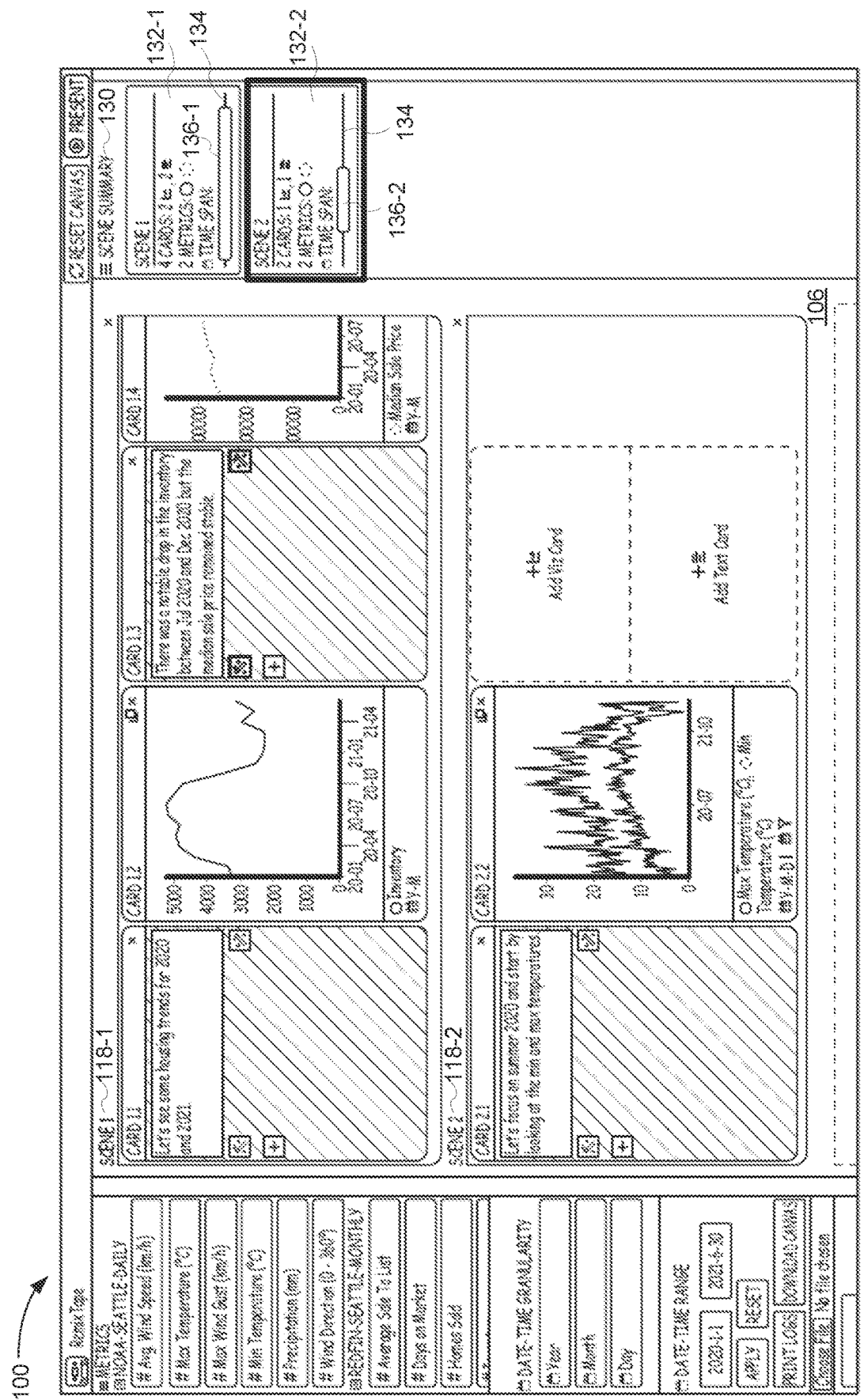

FIGS. 1A and 1B illustrate a graphical user interface 100 for interactive presentations of metrics (e.g., time series metrics) according to some implementations. In some implementations, the graphical user interface 100 is displayed on a computing device 200.

FIG. 1A illustrates that the user interface 100 includes a data schema and filter panel 102, a recommendation region 104, and a canvas region 106, in accordance with some implementations.

In some implementations, the data schema and filter panel 102 displays one or more groups of identifiers 108 (e.g., labels) corresponding to one or more metrics 120. As used herein, a metric is a univariate quantitative value that varies over time. In some instances, a metric 120 is a calculated data field with values that change over time. Stated another way, a metric 120 is a calculation (e.g., an aggregation) based on a measure data field (e.g., a quantitative data field or a numerical data field) over time. Typical aggregation operations include sum, average, count, distinct count, minimum, and maximum. In some implementations, a metric 120 is also referred to as time-oriented data or a time-series metric. For example, FIG. 1A shows one of the metrics 120 is "average wind speed," which is calculated by adding a group of numbers (e.g., wind speeds) and then dividing by the count of the measurements, over a period of time (e.g., 30 days, 12 months, or 3 years). Other examples of metrics include key performance indicators (KPIs) of an organization, such as revenue (e.g., over time), expenses (e.g., over time), profits (e.g., over time), and sales (e.g., over time).

In some implementations, each of the identifiers 108 is a user-selectable interface element (e.g., an icon, a button, an affordance, or an input element) that, when selected (e.g., manually, by a user), causes the computing device 200 to generate and display (e.g., in the recommendation region 104) a data visualization corresponding to the respective metric.

In some implementations, a metric 120 and its definition and/or associated data can be obtained (e.g., derived) from a data source 240, a metric definition depository that is cloud-based (e.g., a database 340), a unified, shared metrics layer provided by APIs 248, a visualization worksheet 246, a workbook 244, or determined on-the-fly.

In the example of FIG. 1A, the metrics 120 come from two sources: National Oceanic and Atmospheric Administration (NOAA) for daily weather conditions in Seattle, WA, and Redfin for monthly home sales in Seattle. The metrics 120 can be associated with different time periods and/or temporal granularities.

FIG. 1A illustrates that, in some implementations, the data schema and filter panel 102 displays a date/time granularity filter 110, which enables a user to adjust the temporal granularity (e.g., date/time granularity) of a data visualization. This will be described in further detail in FIGS. 7A to 7D.

In some implementations, as illustrated in FIG. 1A, the data schema and filter panel 102 displays a date/time range filter 112, which enables a user to adjust (e.g., edit or modify) the date/time range of a data visualization. In some implementations, the date/time range filter 112 allows a user to constrain the temporal span of metrics before adding them to a visualization card. In some implementations, the computing device 200 determines the entire date/time range of the metrics 120 that are displayed in the data schema and filter panel 102, and populates a start date 114 and an end date 116 in accordance with the determination. Further details of the date/time range filter 112 are described in FIGS. 8A to 8D.

FIG. 1A illustrates that the graphical user interface 100 includes a recommendation region 104 for displaying one or more data visualization recommendations. Details of the recommendation region and visualization recommendations are described in further detail in FIGS. 9 and 10A to 10K.

In some implementations, the graphical user interface 100 includes a canvas region 106 (e.g., a canvas) for displaying one or more scenes 118. For example, FIG. 1A illustrates two scenes (e.g., a first scene 118-1 and a second scene 118-2) that are displayed on the canvas region 106. In some instances, a scene 118 includes one or more text cards 122. For example, the first scene 118-1 includes two text cards 122-1 and 122-2. In some instances, a scene 118 includes one or more visualization cards 124. For example, the first scene 118-1 includes two visualization cards 124-1 and 124-2. In some instances, a visualization card 124 is a blank card that does not have any data visualization. In some instances, a visualization card 124 includes (e.g., displays) a data visualization. For example, the visualization card 124-1 displays a data visualization 126.

In some implementations, the text cards and/or visualization cards within a scene are numbered sequentially, according to their order of appearance in the scene. For example, FIG. 1A shows that the cards in the first scene 118-1 are numbered sequentially as "1.1, 1.2, 1.3, . . . " The cards in the second scene 118-2 are numbered sequentially as "2.1, and 2.2."

FIG. 1A illustrates that the graphical user interface includes an icon 128 (e.g., a button or a user-selectable interface element). In some implementations, user selection of the icon 128 causes the graphical user interface to display a scene summary 130, as illustrated in FIG. 1B. The scene summary 130 summarizes all the scenes on the canvas. In some implementations, the scene summary 130 includes, for each scene 118 in the canvas region 106, a respective count of visualization cards corresponding to the scene, and/or a respective count of text cards corresponding to the scene, and/or a respective count of unique (e.g., distinct) metrics corresponding to the scene, and/or a respective cumulative temporal span corresponding to the scene.

In the example of FIG. 1B, the scene summary 130 includes a respective box 132 (e.g., an area) for each scene 118 appearing in the canvas region 106. The first box 132-1 corresponds to the summary for first scene 118-1. The second box 132-2 corresponds to the summary for the second scene 118-2. Using the second box 132-2 as an example, there are four rows. The first row identifies the scene (i.e., "Scene 2"). The second row shows that there are a total of two cards in Scene 2. It further breaks down the number for each type of card (i.e., one visualization card and one text card). The third row identifies the number of unique (e.g., distinct) metrics appearing in the scene. In this example, the second scene 118-2 has two metrics, namely: maximum temperature and minimum temperature. The fourth row identifies the cumulative temporal span (e.g., time span) of the metrics. In some implementations, the cumulative temporal span is represented as a graphical element 136-2 (e.g., a bar or a rectangle) with a length that is proportional to the cumulative temporal span of the metrics in the scene. Note that the graphical element 136-1 in the first box 132-1 is larger, representing a greater span of time. In some implementations, the graphical element 132-2 is overlaid on a graphical element 134, such as a line. In some implementations, the graphical element has a length that represents the entire date/time range of the metrics 120 that are displayed the data schema and filter panel 102.

In some implementations, a user can reorder the scenes on the canvas region by moving (e.g., via a drag and drop action) the boxes 132 in the scene summary 130. For example, a user can select the second box 132-2 (e.g., via a mouse click), hold down the mouse button, and move the box 132-2 to a location above the first box 132-1 to reorder the second scene as the first scene.

A. Block Diagrams

Figure 2:
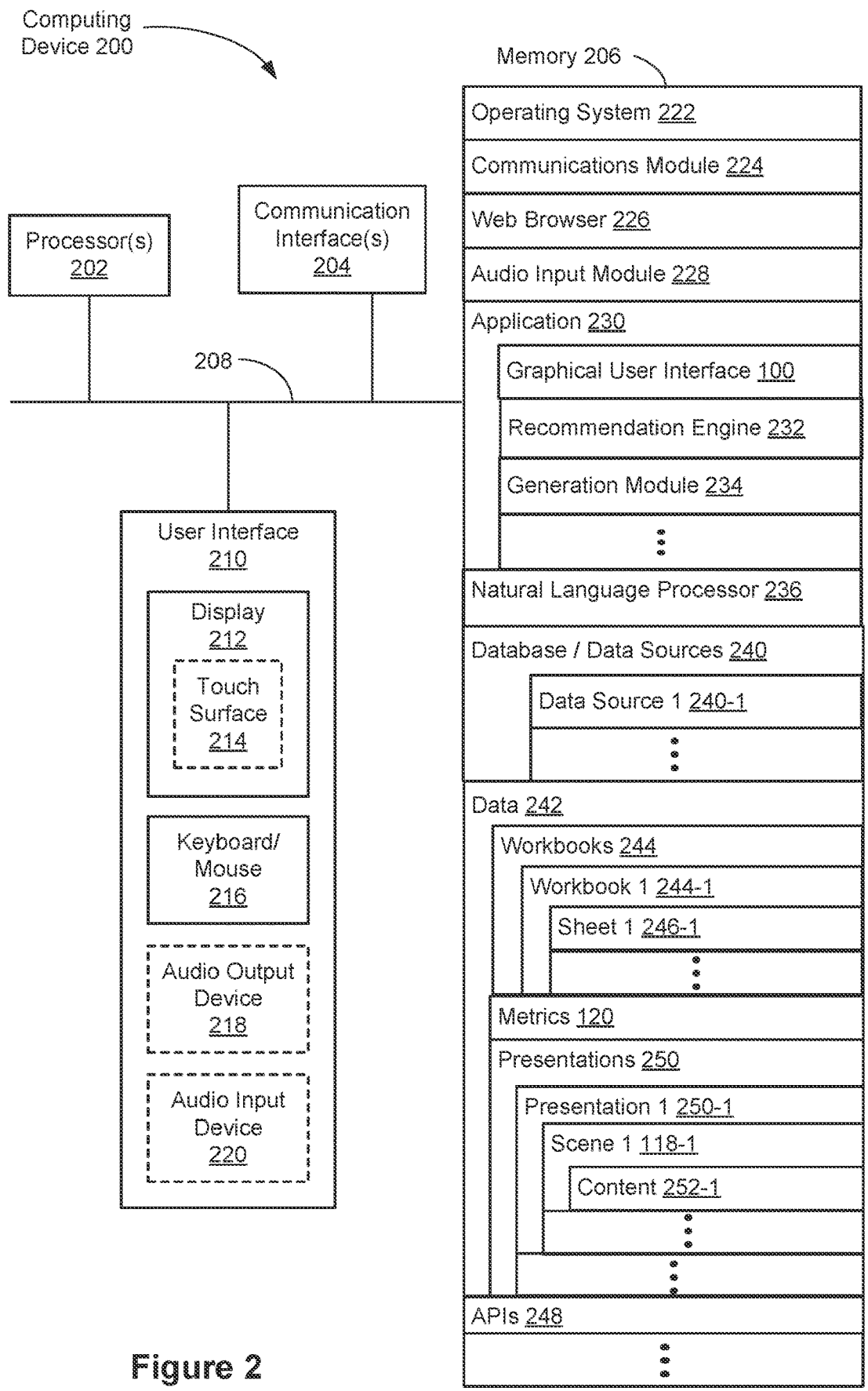
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206, or the computer-readable storage medium of the memory 206, stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module), which processes audio captured by the audio input device 220. The captured audio may be sent to a remote server (e.g., server system 300) and/or processed by an application executing on the computing device 200 (e.g., application 230 or natural language processor 232);

an application 230 (e.g., RemixTape), which collects, annotates, and structures narratives around collections of metrics 120. In some implementations, the application 230 includes:
  a graphical user interface 100 for a user to construct visual graphics (e.g., text and graphs);
  a recommendation engine 232 for generating visualization recommendations based on context (e.g., based on which metrics are currently shown in the canvas region 106); and
  a generation module 234, for automatically generating and displaying text cards 122, visualization cards 124, and/or visual graphics (also referred to as a "data visualization" or a "data viz") based on user input and/or recommendations from the recommendation engine 232;
a natural language processor 236, which receives and parses natural language input provided by a user. In some implementations, the natural language input is provided by a user via text cards 122. In some implementations, the natural language processor 236 comprises an off-the-shelf library (e.g., SUTime), which recognizes and normalizes time expressions in the user input. Details of SUTime can be found in A. X. Chang and C. D. Manning, "SUTime: A library for recognizing and normalizing time expressions," *Proceedings of the International Conference on Language Resources and Evaluation* (LREC), 2012, which is incorporated by reference herein in its entirety;
zero or more databases or data sources 240 (e.g., a first data source 240-1), which are used by the application 230. A data source can include one or more data fields and/or data values associated with the data fields. The data fields can include dimensional data fields (e.g., categorical data fields, having categorical data values). The data fields can include measure data fields (e.g., quantitative data fields). In some implementations, the data sources are stored as spreadsheet files, CSV files, XML files, flat files, or JSON files, or stored in a relational database. For example, a user selects one or more databases or data sources 240 (which may be stored on the computing device 200 or stored remotely), selects metrics from the data sources, and uses the selected metrics to define a visual graphic;
Data 242, including:
  zero or more workbooks 244 (e.g., a first workbook 244-1) (e.g., Tableau workbook);
  zero or more sheets 246 (e.g., a first sheet 246-1) contained in a workbook. In some implementations, a sheet is a worksheet, a dashboard, or a story. In some implementations, a sheet specifies one or more metrics, metric definitions and/or data associated with the metrics. In some implementations, the sheet specifies how a metric will be visually represented (e.g., text indicator+line chart vs. text indicator alone). In some implementations, a metric appears as a sibling to the workbook within the same folder in a server system 300 (e.g., Tableau Cloud/Server);
  zero or more metrics 120, as well as their associated definitions and/or data, that are favorited or added to an ad-hoc collection of a user. The metrics can be associated with one or more workbooks, folders, and/or data sources, or determined on-the-fly;
  zero or more presentations 250 (e.g., a first presentation 250-1) of time-series metrics. In some implementations, a presentation 250 includes one or more scenes (e.g., the first scene 118-1) and content 252 associated with a scene (e.g., content 252-1 corresponding to the first scene 1 118-1). The content can include metrics used in the scene, text cards, visualization cards, and/or the sequence in which the cards are presented in the scene; and
  APIs 248, which may be called from one or more applications (e.g., the web browser 226 and the application 230), and perform one or more actions.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above. In some implementations, a subset of the programs, modules, and/or data stored in the memory 206 is stored on and/or executed by the server system 300.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
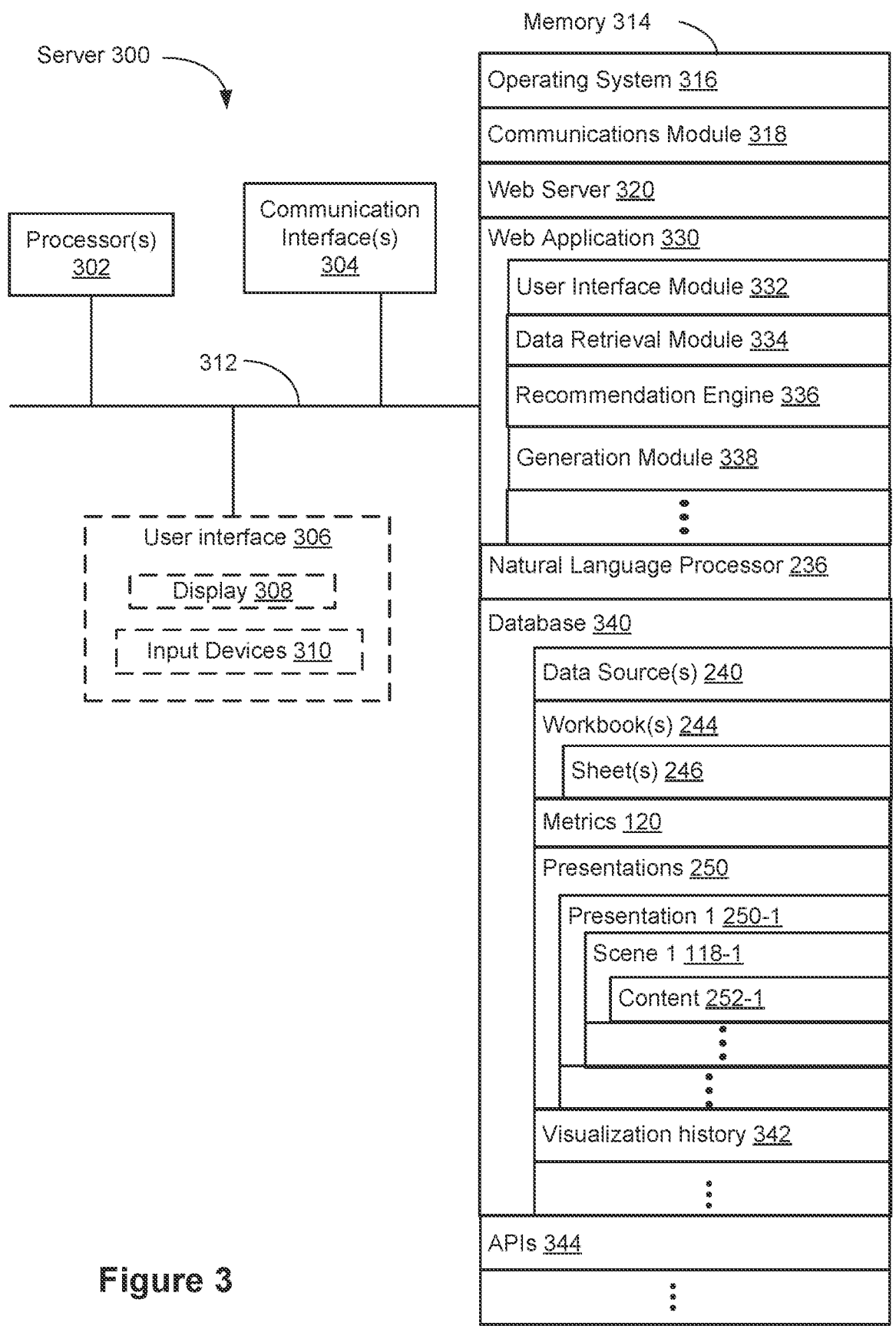
FIG. 3 is a block diagram of a server system according to some implementations.

FIG. 3 is a block diagram illustrating an example server system 300 (e.g., Tableau server) in accordance with some implementations. In some implementations, the server system 300 is a data visualization server. The server system 300 typically includes one or more processing units/cores (CPUs) 302, one or more network interfaces 304, memory 314, and one or more communication buses 312 for interconnecting these components. In some implementations, the server system 300 includes a user interface 306, which includes a display 308 and one or more input devices 310, such as a keyboard and a mouse. In some implementations, the communication buses 312 include circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory devices within the memory 314, comprises a non-transitory computer readable storage medium.

In some implementations, the memory 314 or the computer readable storage medium of the memory 314 stores the following programs, modules, and data structures, or a subset thereof:
  an operating system 316, which includes procedures for handling various basic system services and for performing hardware dependent tasks;
  a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a web application 330 (e.g., the RemixTape web application), which may be downloaded and executed by a web browser 226 on a user's computing device 200. In general, a web application 330 has the same functionality as a desktop application 230, but provides the flexibility of access from any device at any location with network connectivity, and does not require installation and maintenance. In some implementations, the web application 330 includes various software modules to perform certain tasks, such as:

a user interface module 332, which provides the user interface for all aspects of the web application 330;

a data retrieval module 334, which builds and executes queries to retrieve data from one or more data sources 240, workbooks 244, and/or sheets 246. The data sources 240, workbooks 244, and/or sheets 246 may be stored locally on the server system 300 or stored in an external database 340. In some implementations, data from two or more data sources may be blended;

a recommendation engine 336, which generates visualization recommendations based on context (e.g., based on which metrics are currently shown in the canvas region 106); and a generation module 338, which automatically generates and displays text cards 122, visualization cards 124, and/or visual graphics (also referred to as a "data visualization" or a "data viz") based on user input and/or recommendations from the recommendation engine 336; and a natural language processor 236;

In some implementations, the server system 300 includes a database 340. The database 340 stores:

zero or more data sources 240;

zero or more workbooks 244;

zero or more sheets 246;

zero or more metrics 120 and their associated definitions and/or data;

zero or more presentations 250, such as a first presentation 250-1. In some instances, a presentation 250-1 includes one or more scenes 118, such as a first scene 118-1 and content 252-1 associated with (e.g., corresponding to) the scene; and visualization history 342. In some implementations, the database 340 stores a visualization history 342 for each user. The visualization history 342 can include information about each data visualization (e.g., visualization recommendations) generated (e.g., based on which metrics are currently shown on the canvas region 106. In some implementations, the visualization history 342 includes information about data visualizations (e.g., metrics) selected by a user for use in a scene. In some implementations, the database 350 stores other information, including other information used by the application 230, the web application 330, or other applications.

The database 340 may be separate from the server system 300, or may be included with the server system 300 (or both).

The database 340 may store data in many different formats, and commonly includes many distinct tables, each with a plurality of data fields. Some data sources comprise a single table. The data fields include both raw data fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields are stored separately from the data source 240.

In some implementations, the server system 300 includes APIs 344. The APIs enable calls from one or more applications (e.g., applications on the computing device 200), translating the API calls into appropriate actions, and performing one or more actions.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server system 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices in a server system. As used herein, references to a "server" include various groups, collections, or arrays of servers that provide the described functionality, and the physical servers need not be physically colocated (e.g., the individual physical devices could be spread throughout the United States or throughout the world).

B. Canvas Actions

According to some implementations of the present disclosure, a canvas region 106 (or a canvas) is a reorderable container for scenes (e.g., scene 118), which are in turn containers for cards. A scene 118 is a reorderable container for cards, which can be either text cards 122 or visualization cards 124.

In some implementations, a text card 122 includes one or more text commentary statements (e.g., that are input by a user). A statement may include one or more date/time references. A date/time reference is a phrase that refers to temporal relations. Examples of date/time references include "before August 2020" and "between Nov. 21, 2020 and Feb. 3, 2021."

In some implementations, a visualization card 124 (also referred to herein as a "viz card") is a blank card or a card that includes a data visualization. A visualization card 124 is used for displaying a data visualization in a scene.

In some implementations, a data visualization comprises a line chart (e.g., a line plot) for one or more metrics 120 and spans some date/time range at a particular temporal granularity (e.g., a year granularity, a year-month granularity, or a year-month-day granularity).

FIGS. 4A to 4H provide a series of screen shots for managing scenes in a graphical user interface 100, in accordance with some implementations.

Figure 4A:
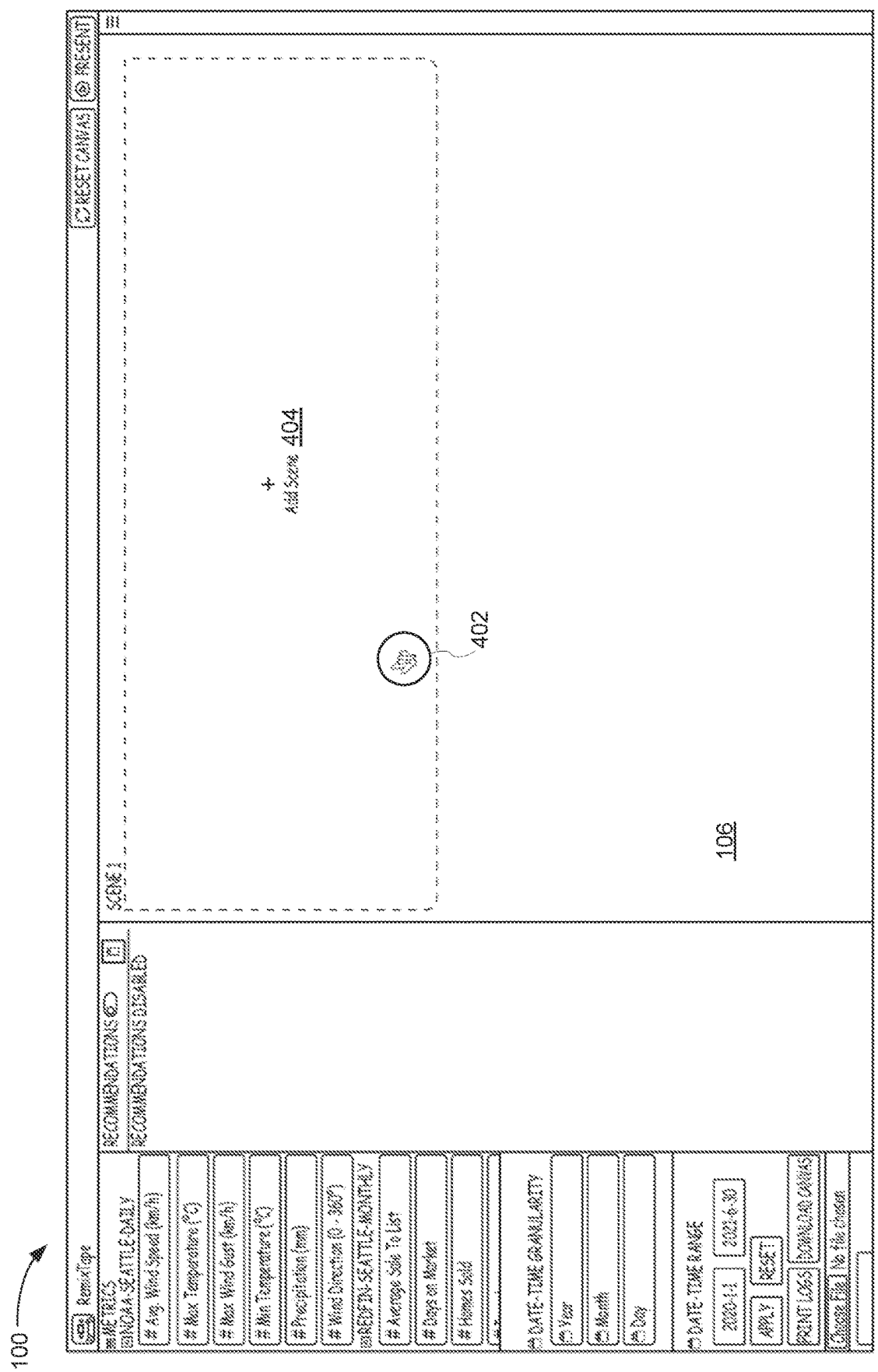
Figure 4B:
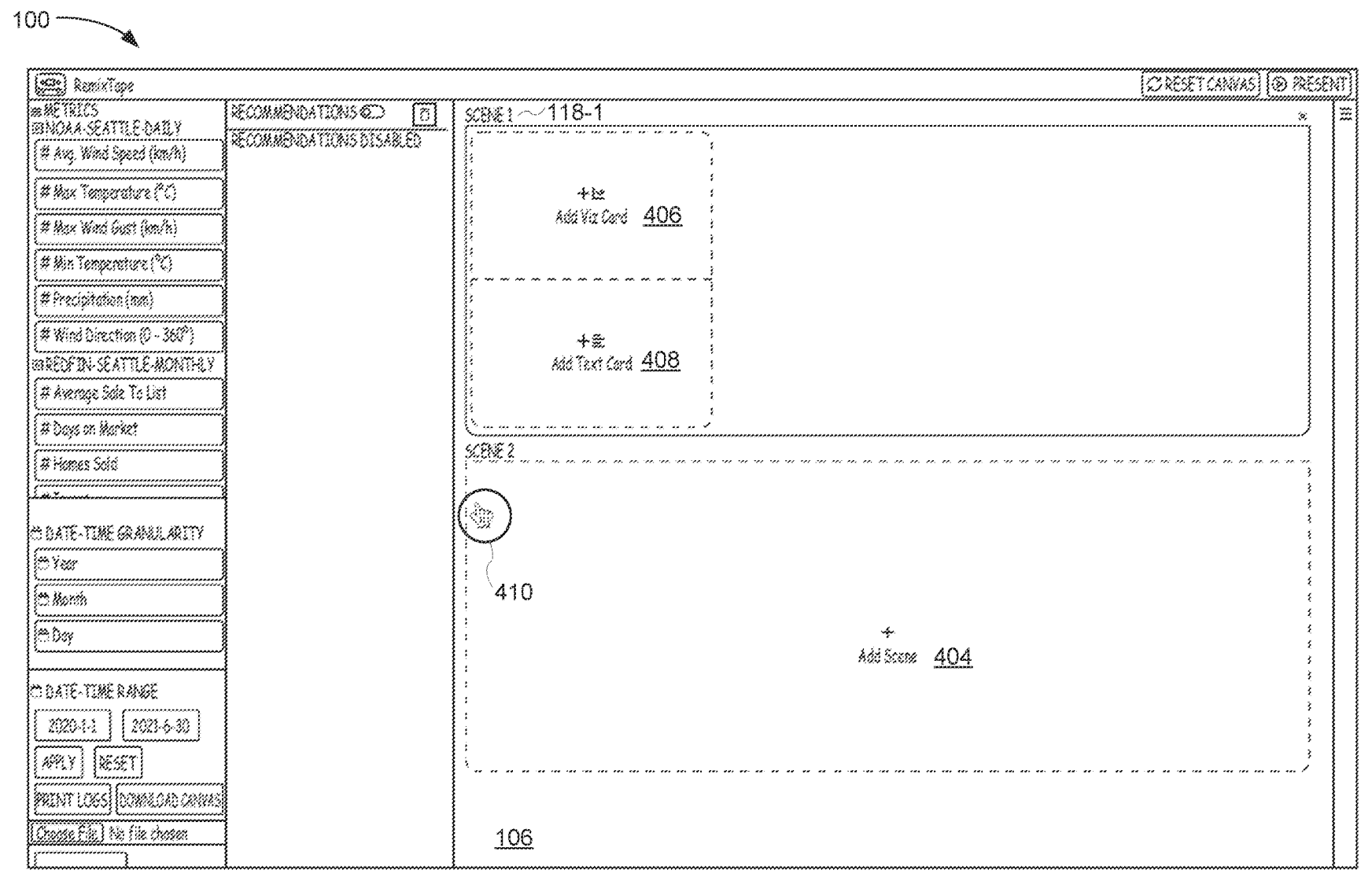
Figure 4C:
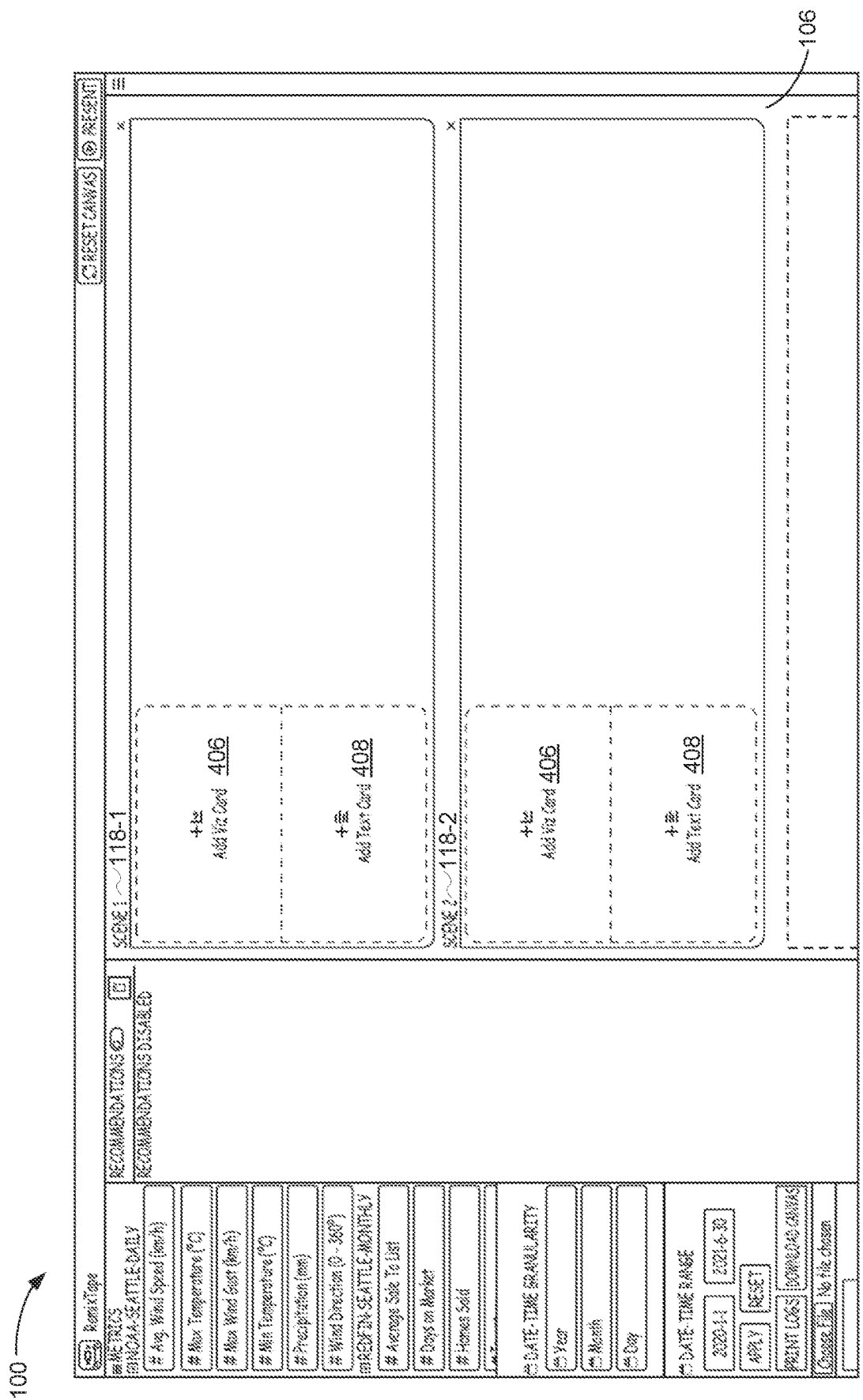

FIGS. 4A to 4C illustrate user interactions with the graphical user interface 100 to add a scene, according to some implementations. FIG. 4A shows the canvas region 106 is an empty (e.g., blank) canvas that does not include any scene. FIG. 4A illustrates a user interaction 402 (e.g., a mouse click) with an "Add scene" option 404, to add a first scene to the canvas region.

FIG. 4B illustrates that, in response to the user interaction, the graphical user interface 100 displays a first scene 118-1. The scene 118-1 is an empty scene. The graphical user interface 100 displays, in the first scene 118-1, a first option 406 to add a visualization card. The graphical user interface 100 also displays, in the first scene 118-1, a second option 408 to add a text card. The graphical user interface 100 displays, in the canvas region 106, an add scene option 404 to add a second scene to the canvas region 106. FIG. 4B illustrates a user interaction 410 (e.g., a mouse click) at the "Add Scene" option 404, to add a second scene to the canvas region.

FIG. 4C illustrates that, in response to the user interaction, the graphical user interface 100 displays a first scene 118-1 and a second scene 118-2. In this example, each of the scenes 118-1 and 118-2 is an empty scene. The graphical user interface 100 also displays, in each of the scenes 118-1 and 118-2, a first option 406 to add a viz card and a second option 408 to add a text card.

Figure 4D:
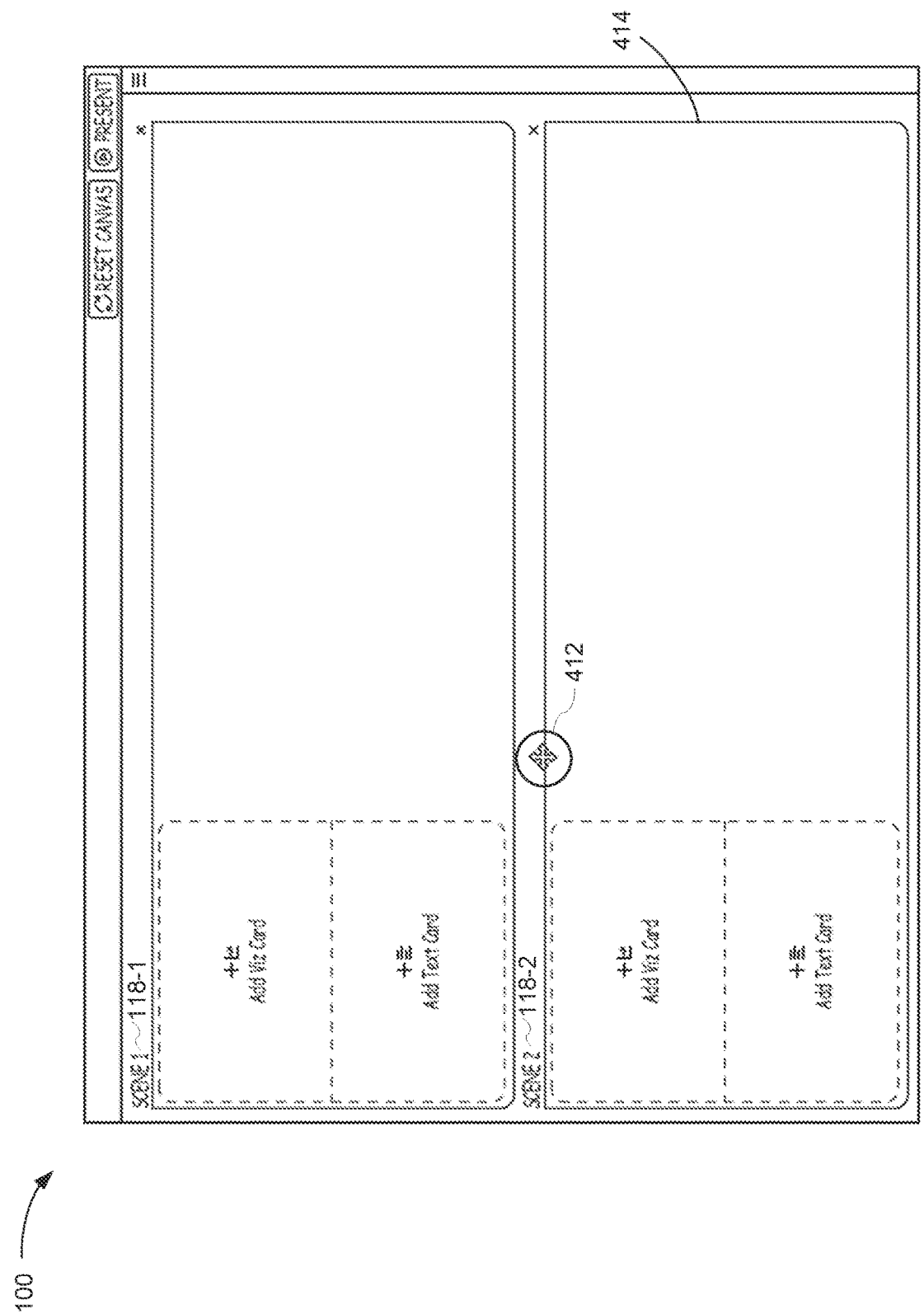
Figure 4E:
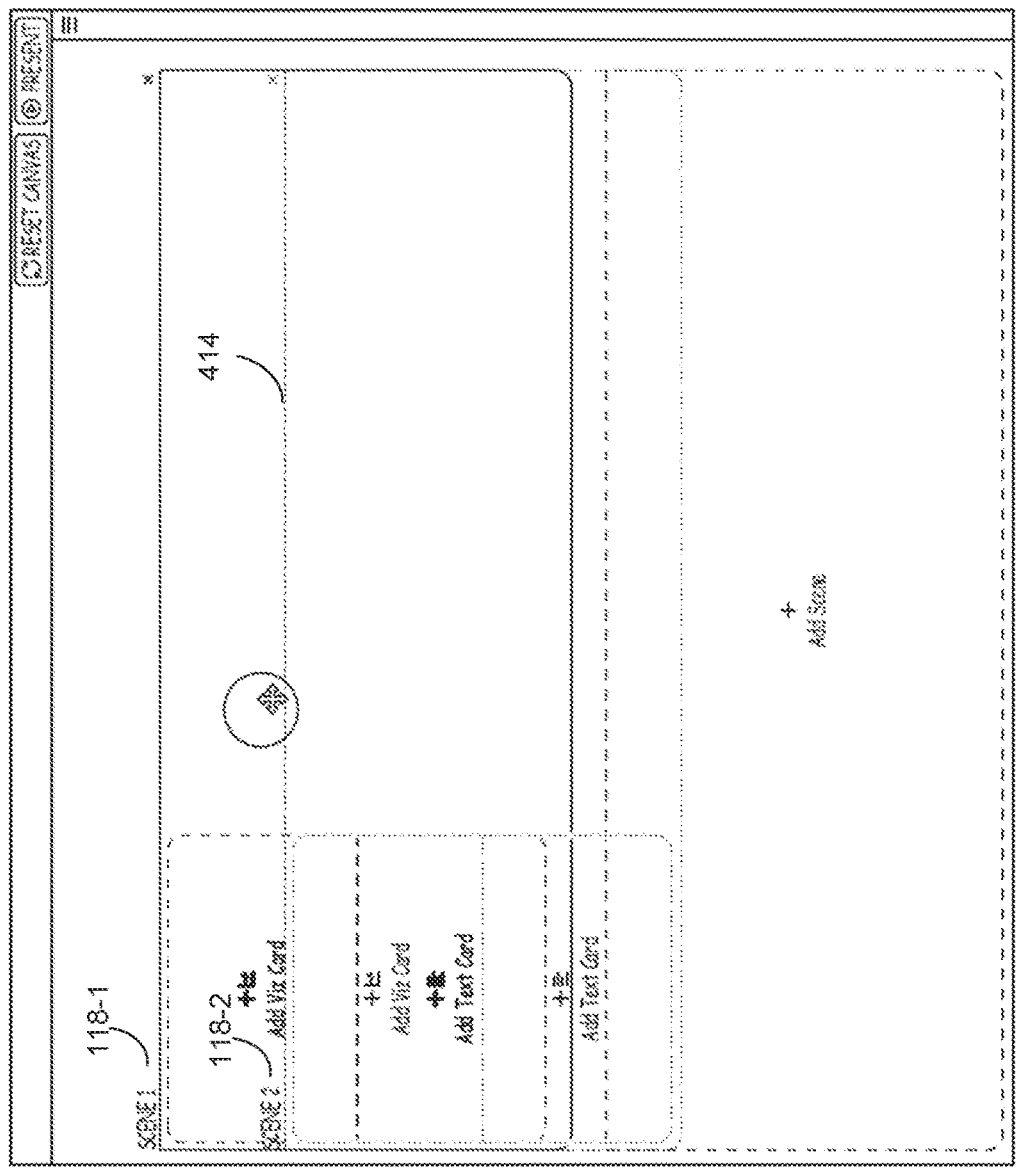
Figure 4F:
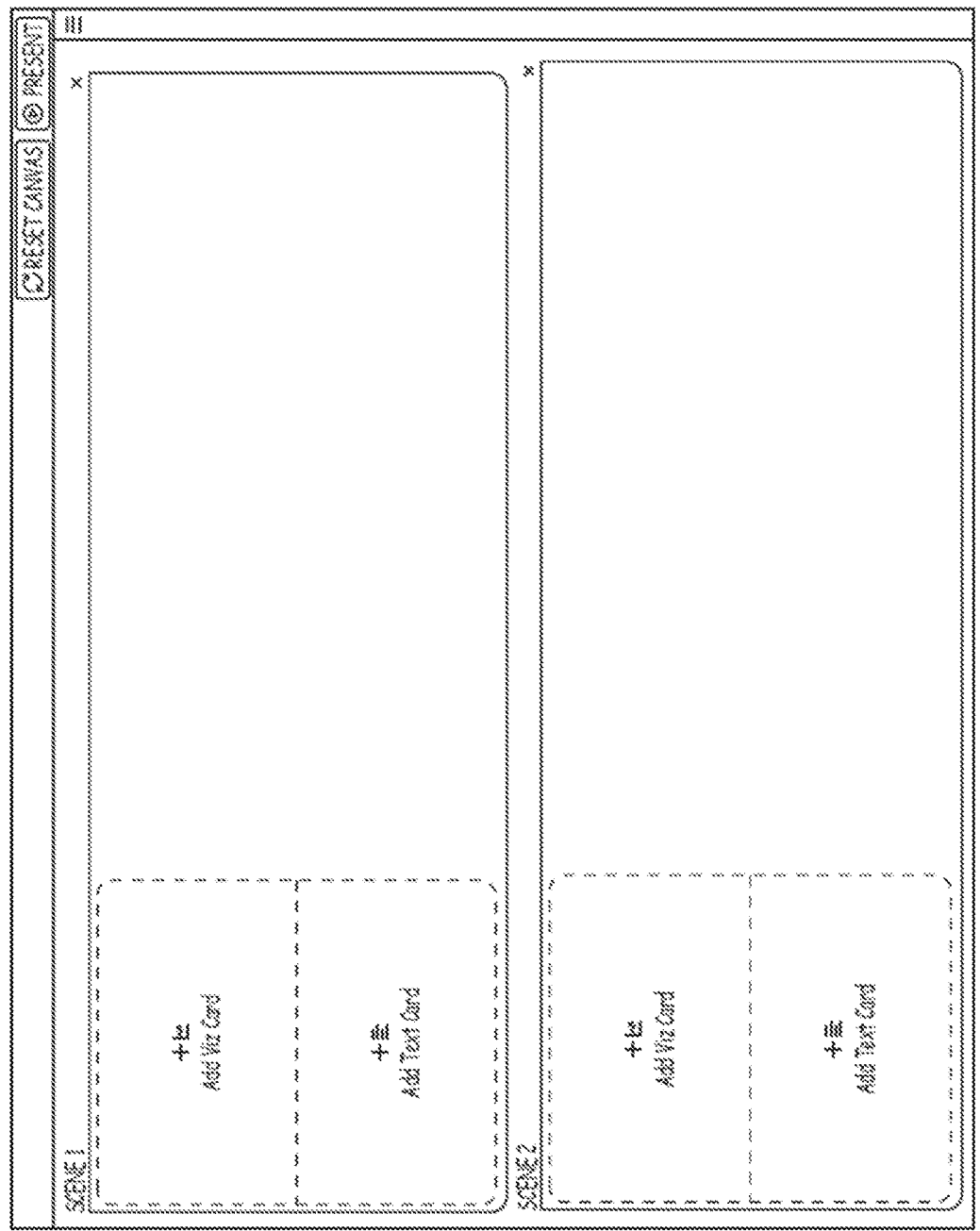
Figure 4G:
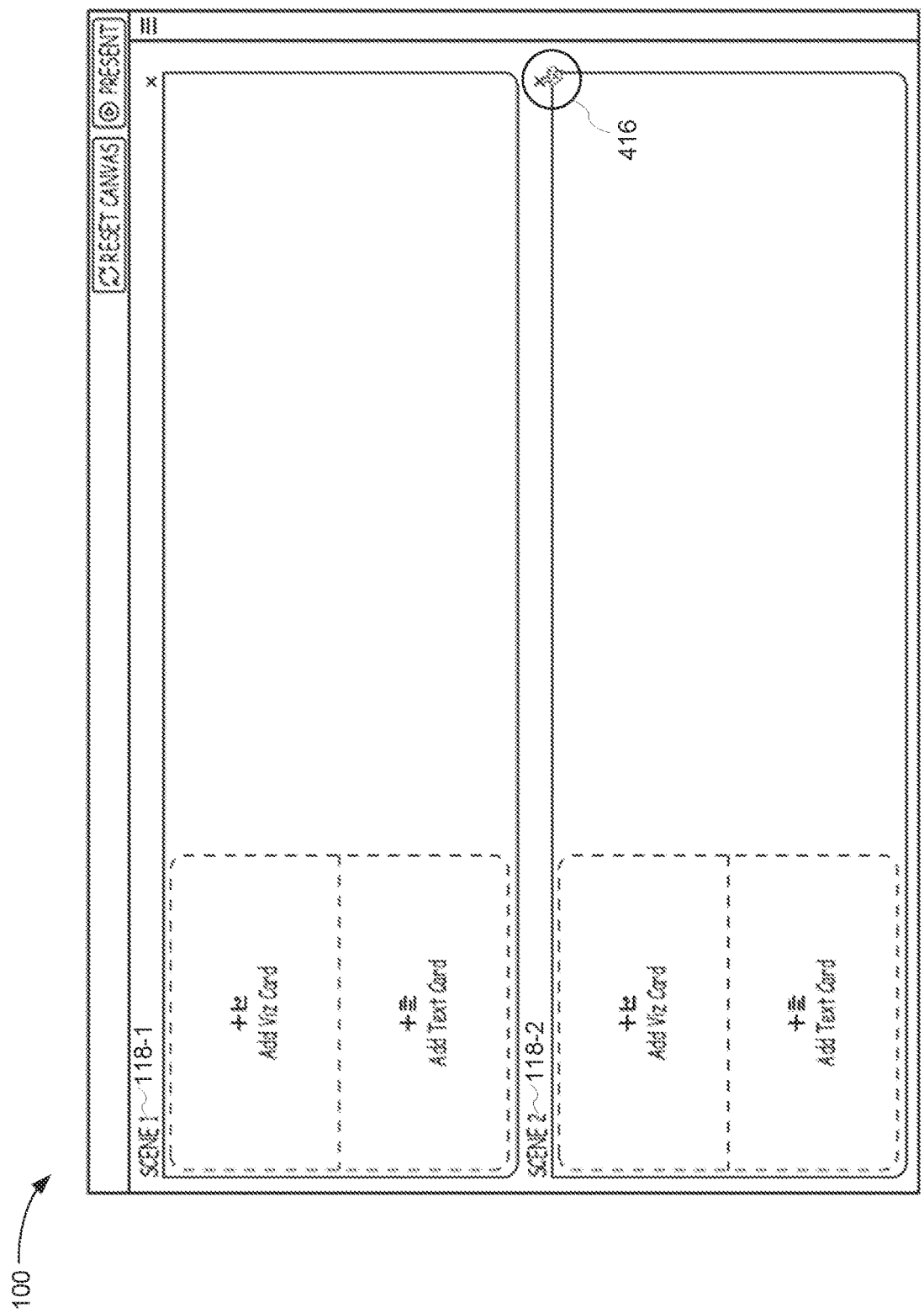
Figure 4H:
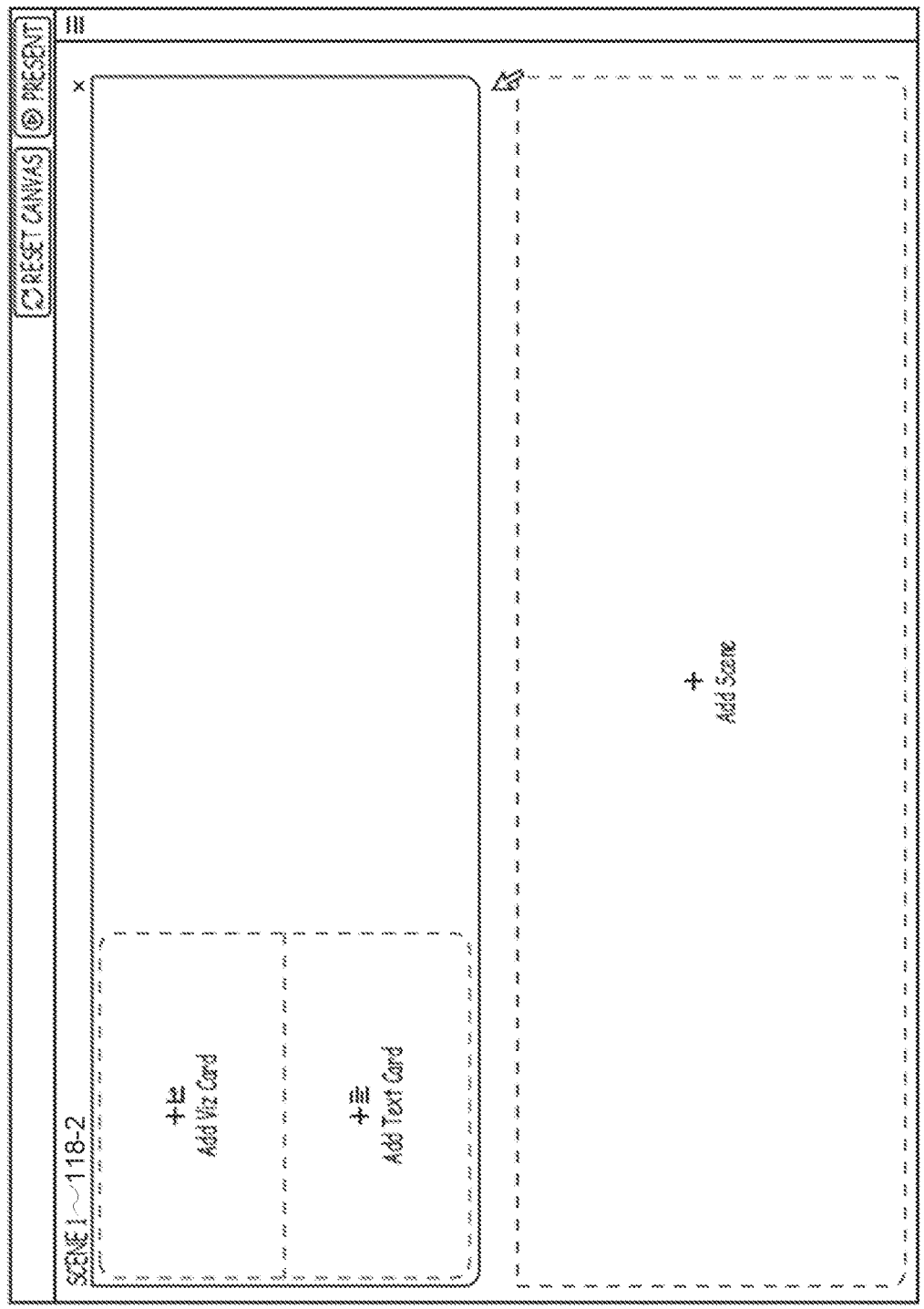

FIGS. 4D to 4F illustrate user interactions with the graphical user interface 100 to reorder a scene, according to some implementations. FIG. 4D illustrates a user interaction with the second scene 118-2. In this example, the user hovers the mouse cursor over an edge of a box 414 corresponding to the second scene 118-2. In accordance with the user interaction, the graphical user interface 100 displays an icon 412. FIG. 4E illustrates the user holding down the mouse button and dragging (e.g., by holding down the mouse button) the box 414 over (e.g., above) the first scene 118-1. FIG. 4F illustrates a partial view of the graphical user interface 100 after the scenes have been reordered. Because the two scenes do not yet have any content and because the scene moved to the top is relabeled as "SCENE 1", the switch is not visually apparent here. The method improves the process of arranging scenes via a drag and drop interaction FIGS. 4G and 4H illustrate user interaction with the graphical user interface 100 to remove a scene, according to some implementations. FIG. 4G illustrates user selection 416 of a "x" button (e.g., in the top right hand corner) of a scene 118-2. FIG. 4H illustrates that, in response to the user interaction, the graphical user interface 100 removes the scene 118-2 from display.

FIGS. 5A to 5I provide a series of screen shots for managing cards in a graphical user interface 100, in accordance with some implementations.

Figure 5A:
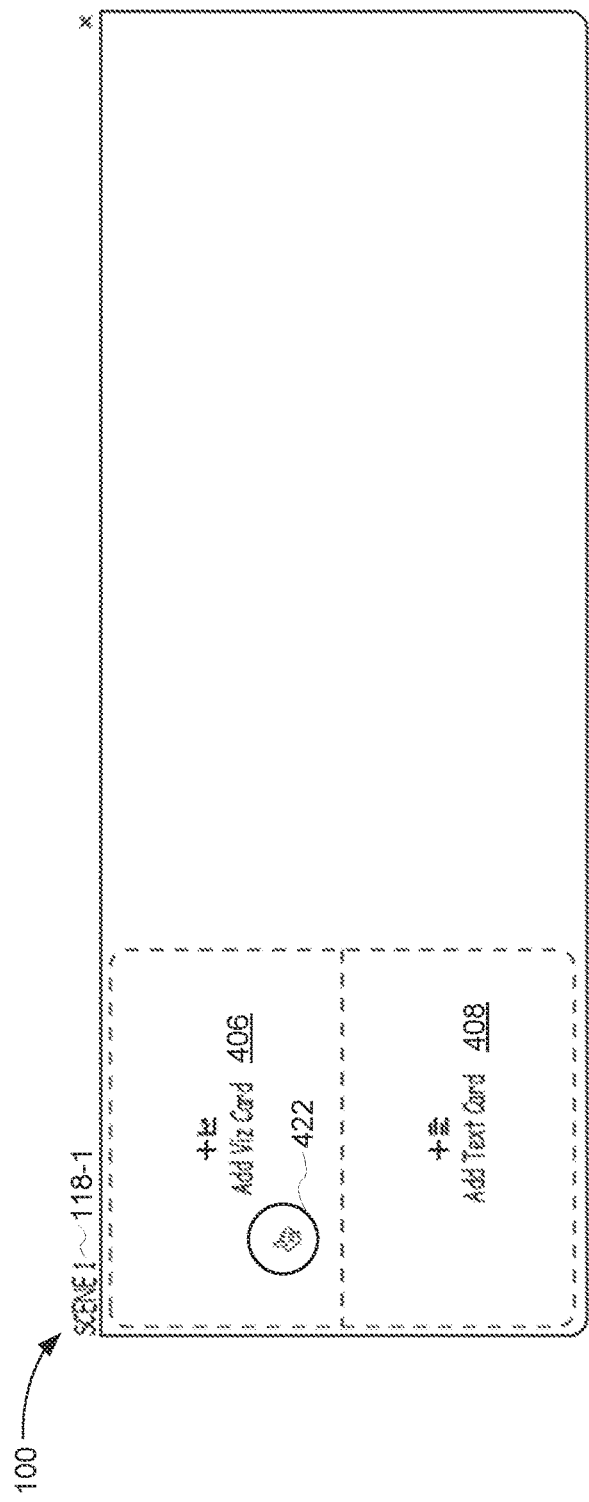
FIGS. 5A to 5I provide a series of screen shots for managing cards in a graphical user interface, in accordance with some implementations.
Figure 5B:
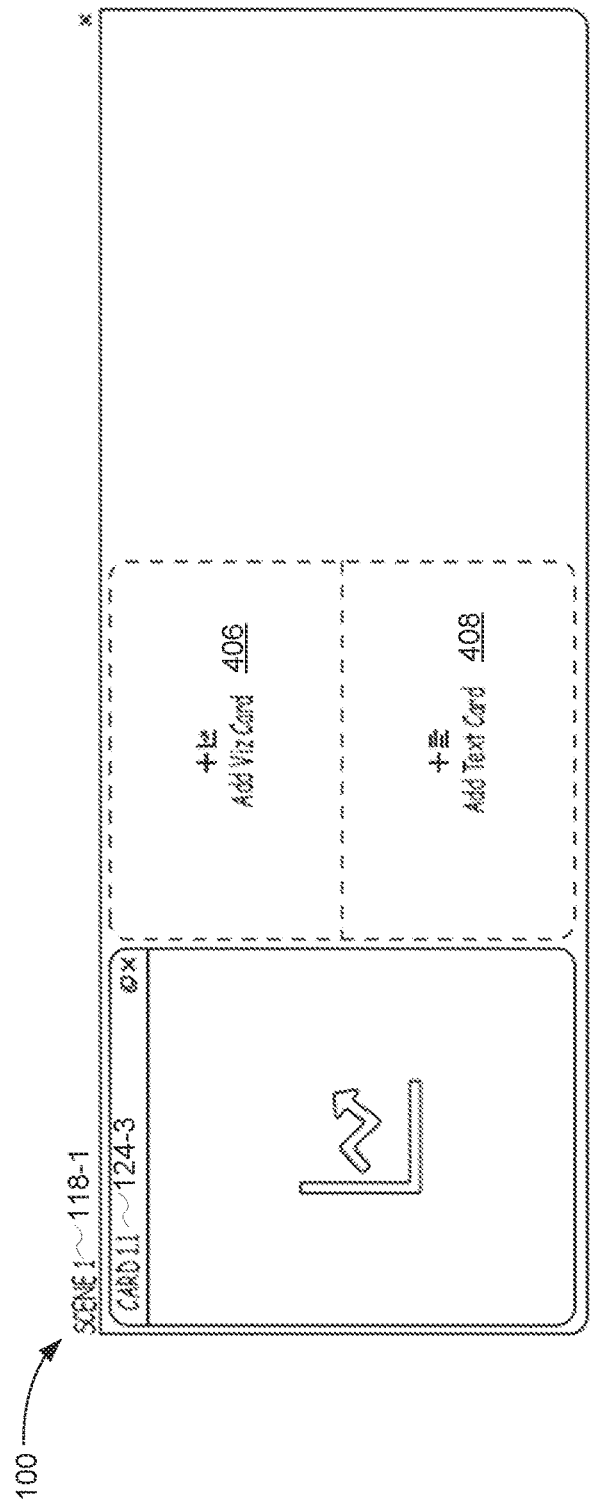

FIGS. 5A to 5D illustrate adding cards according to some implementations. FIG. 5A illustrates a partial view of the graphical user interface 100, which includes a first scene 118-1. FIG. 5A illustrates user selection (422) of the first option 406 to add a viz card. FIG. 5B illustrates that, in response to the user selection, the graphical user interface 100 displays a visualization card 124-3 in the first scene 118-1. In this example, the visualization card 124-3 is a blank (e.g., empty) card (it does not have any content).

Figure 5C:
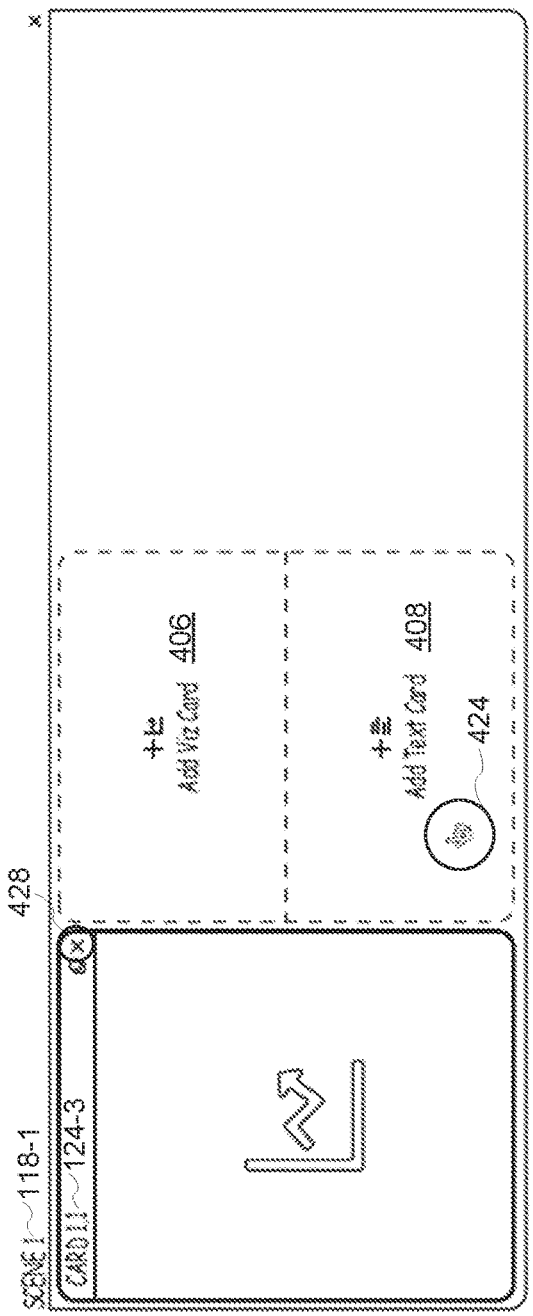
Figure 5D:
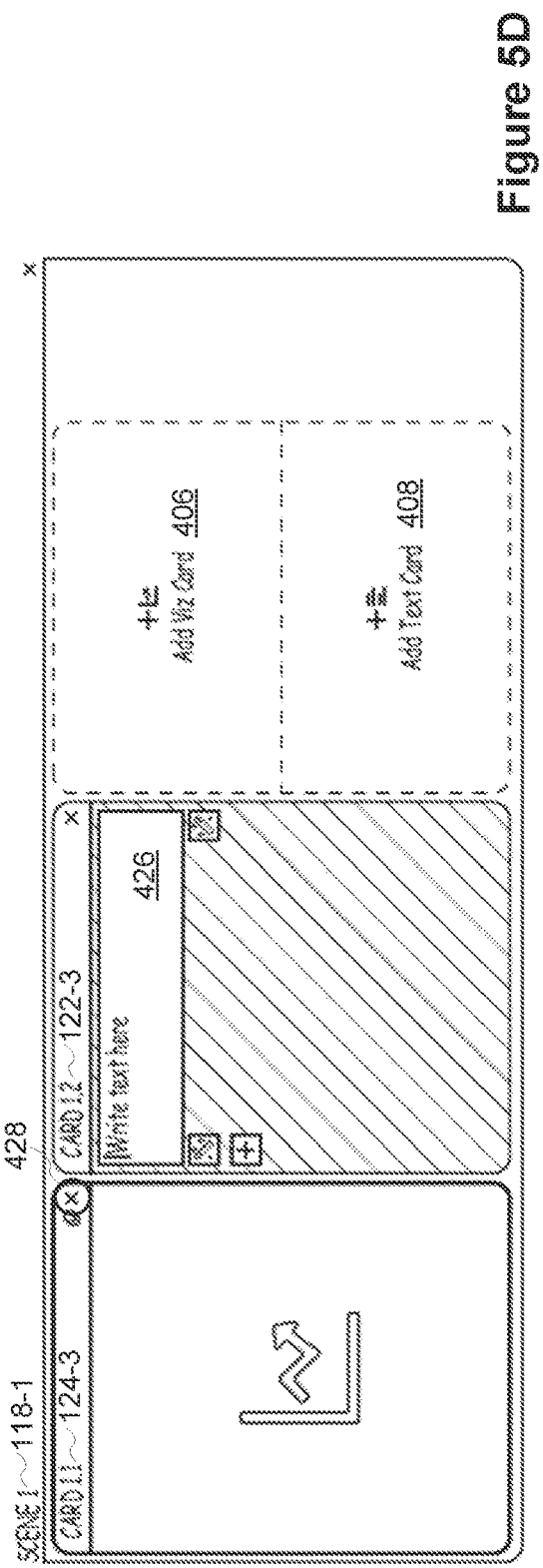

FIG. 5C illustrates user selection (424) of the second option 408 to add a text card. FIG. 5D illustrates that in response to the user selection, the graphical user interface 100 displays a text card 122-3 in the first scene 118-1. In accordance with some implementations, a text card 122 includes one or more text input elements 426, which enables a user to input text commentary statements. In some instances, a statement includes one or more date/time references. FIG. 5D illustrates in some implementations, a text card 122 and/or a viz card 124 includes an "x" icon 428 (e.g., a button or a user-selectable interface element located on the top right corner of the card). When selected by a user, the "x" icon removes the card from the scene.

Figure 5E:
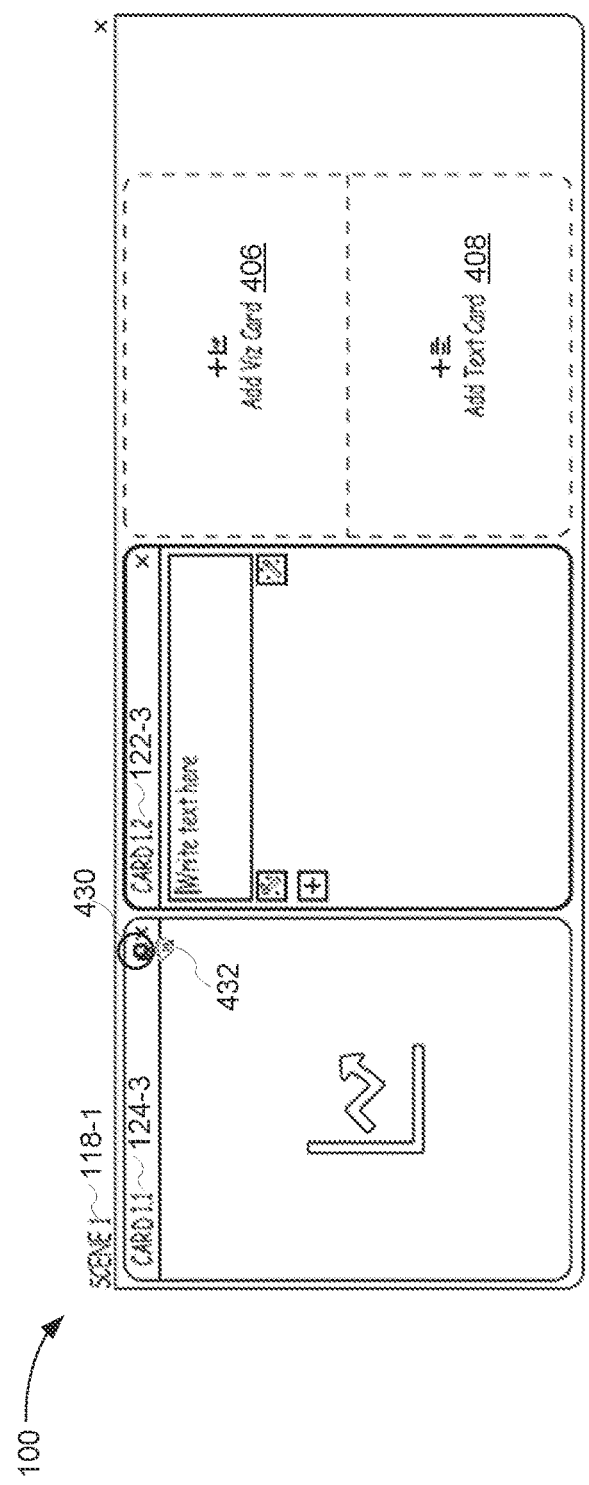
Figure 5F:
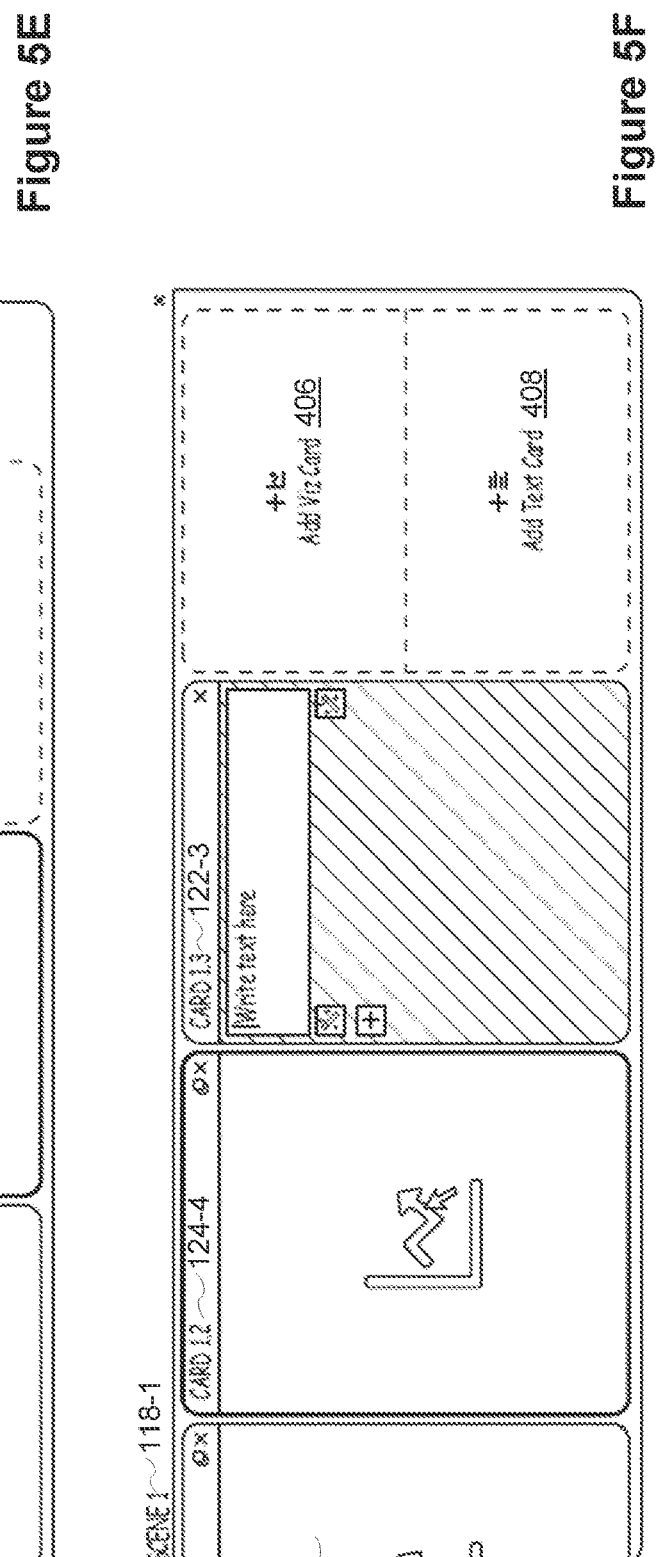

FIGS. 5E and 5F illustrate duplicating a visualization card according to some implementations. In some implementations, as illustrated in FIG. 5E, a visualization card 124 includes a copy icon 430 (e.g., a button or a user-selectable interface element) (e.g., located on the top right corner of the card). When selected by a user, the copy icon causes the interface to duplicate the visualization card (and the data visualization on the card, if there is one) as a distinct card. FIG. 5E illustrates user selection (432) of the copy icon 430. FIG. 5F illustrates that, in response to the user selection, the graphical user interface 100 displays the visualization card 124-3 and displays, adjacent to it (e.g., on its right), a second visualization card 124-4, which is a duplicate of the original visualization card 124-3. FIG. 5F also illustrates that because there is now an additional visualization card 124-4 before the text card 122-3, the graphical user interface 100 (e.g., application 230) re-numbers the cards in the first scene 118-1 so that the visualization card 124-4 is "Card 1.2" and the text card 122-3 is "Card 1.3".

Figure 5G:
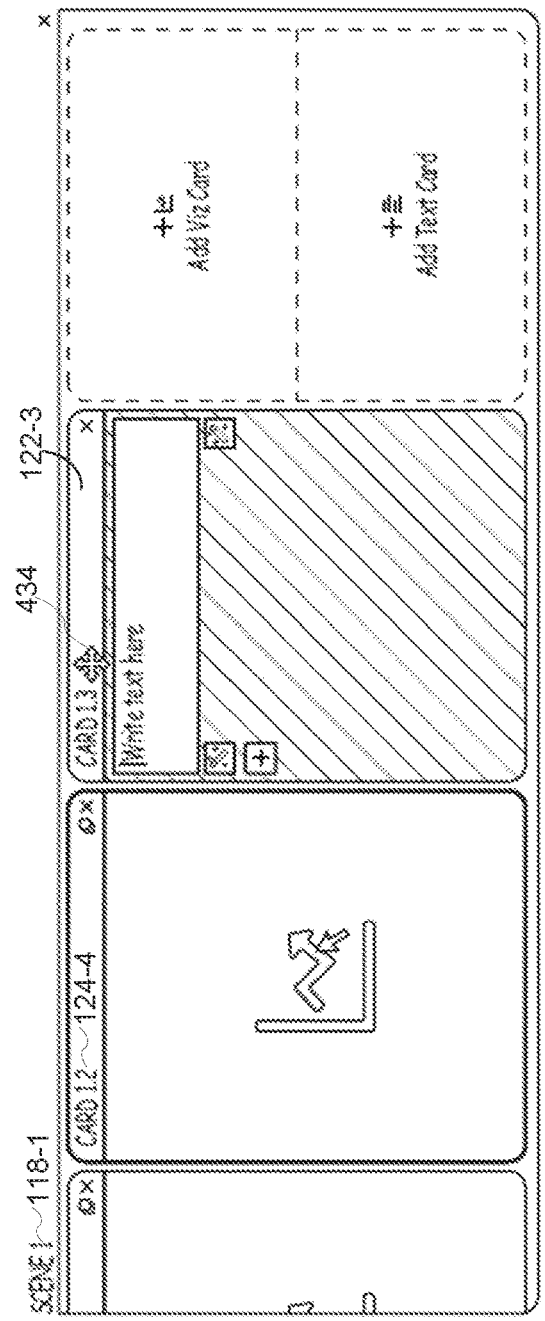
Figure 5H:
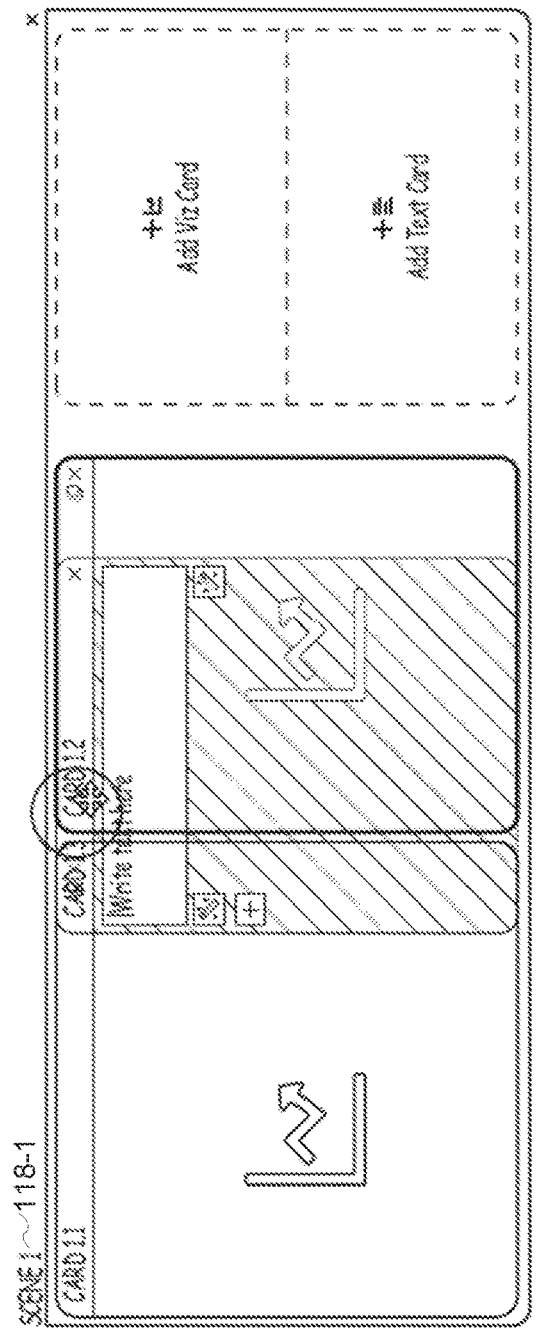
Figure 5I:
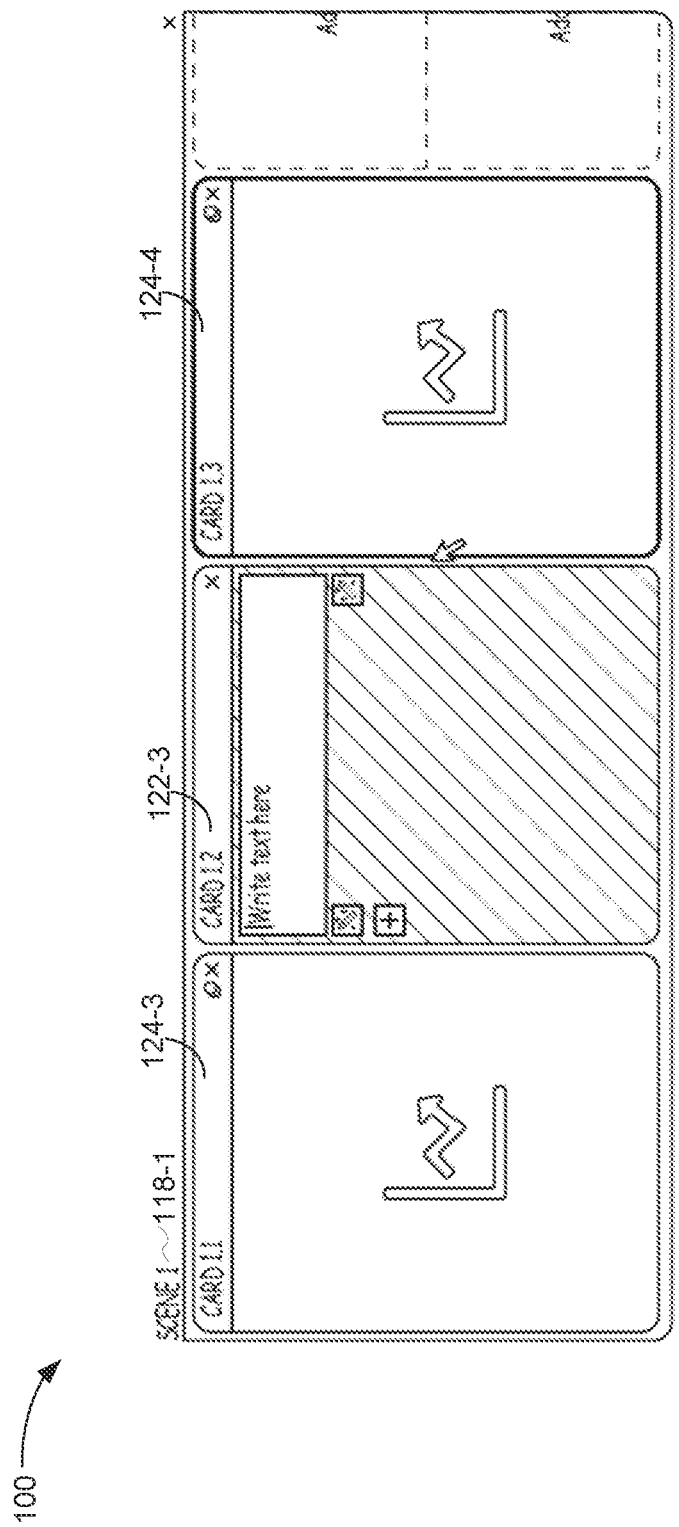

FIGS. 5G to 5I illustrate reordering cards according to some implementations. In some implementations, a user interacts with a card (e.g., a visualization card or a text card) by hovering a mouse pointer over the header or title (e.g., over "Card 1.1") of the card. For example, FIG. 5G illustrates that, in response to a mouse hover over the header "Card 1.3," the graphical user interface 100 displays a move icon 434 (e.g., a button, an indication, or a user-selectable element) at or near the header. FIG. 5H illustrates a user holding the mouse pointer (e.g., at the icon 434) and dragging the card 122-3 to the left, over the card 124-4. FIG. 5I illustrates that, after the reordering, the text card 122-3 is displayed between the first visualization card 124-3 and the second visualization card 124-4. The method improves the process of arranging cards within a scene via a drag and drop interaction.

C. Manual Specification of Visualization Cards

FIGS. 6A to 6F provide a series of screen shots for selecting metrics (e.g., manual selection) to populate a visualization card, in accordance with some implementations.

Figure 6A:
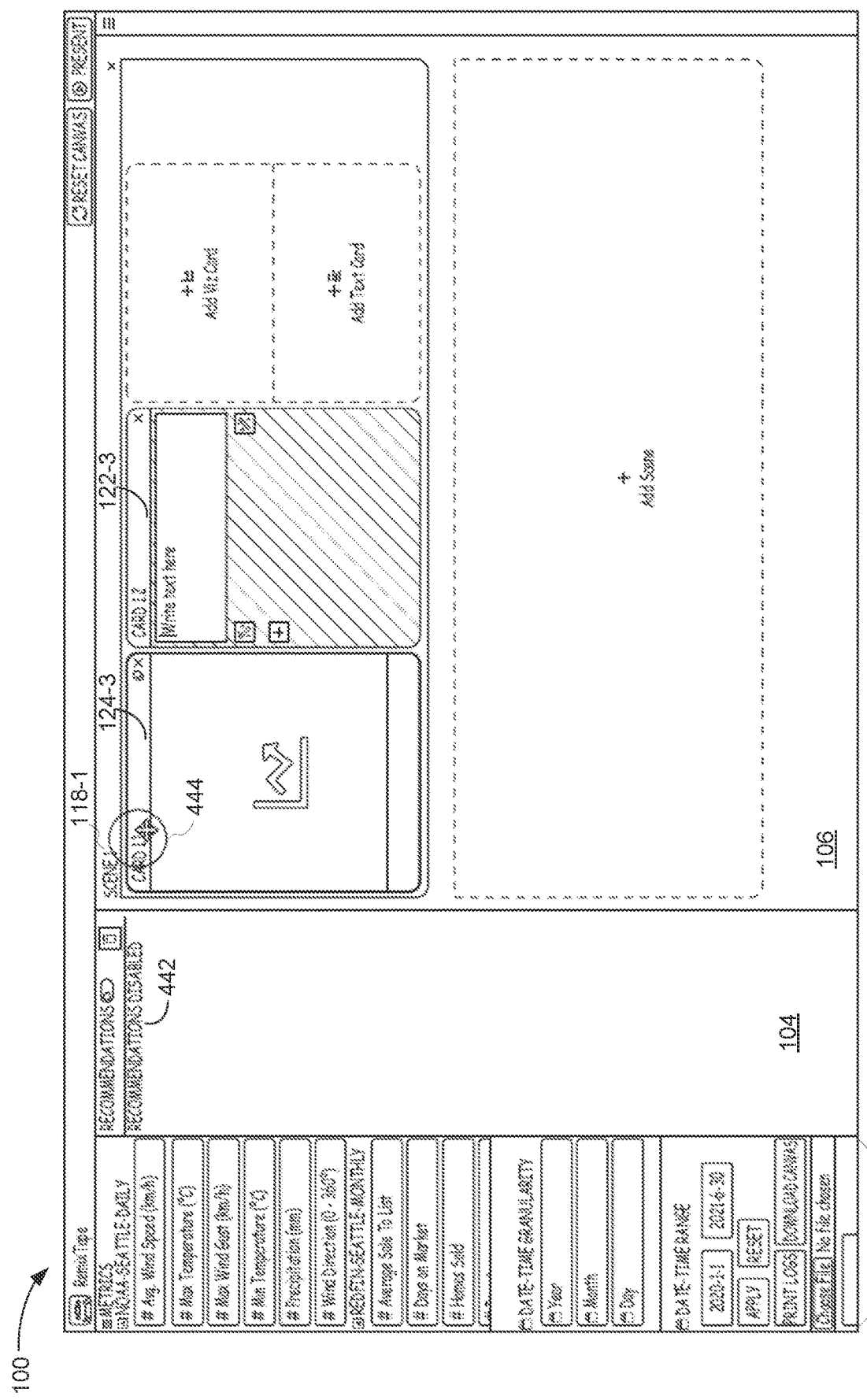
FIGS. 6A to 6F provide a series of screen shots for selecting metrics to populate a visualization card, in accordance with some implementations.

In the example of FIG. 6A, the graphical user interface 100 displays an indication (442) recommendation region 104 that the visualization recommendation has been disabled. FIG. 6A illustrates user selection (444) of a visualization card 124-3. In this example, the visualization card 124-3 is a blank visualization card (e.g., it does not contain any data visualization). In some implementations, the user selection (444) of visualization card 124-3 indicates (e.g., identifies) to the application 230 that a data visualization is to be added to the visualization card 124-3.

Figure 6B:
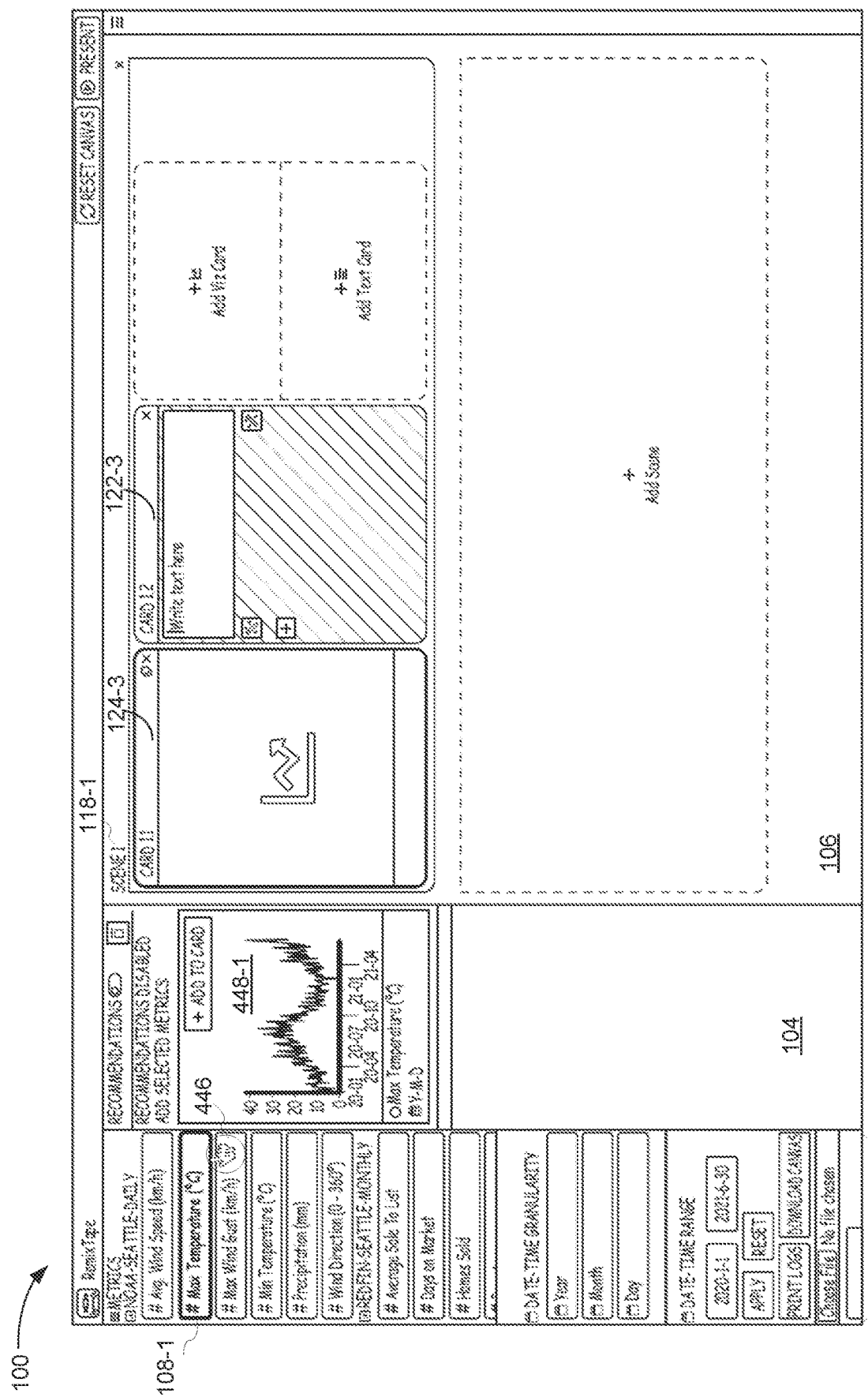

FIG. 6B illustrates user selection (446) of a first identifier 108-1, corresponding to a first metric (e.g., "Maximum Temperature."). For example, the user selection can comprise a mouse click (e.g., one click, a single click, or a double click) at the first identifier 108-1. FIG. 6B illustrates that, in response to the user selection, the graphical user interface 100 displays a data visualization 448-1 (e.g., a data visualization recommendation) corresponding to the selected metric (e.g., "Maximum Temperature") in the recommendation region 104. In this example, the data visualization 448-1 is a line chart showing variations in the maximum temperature from January 2020 to June 2021.

Figure 6C:
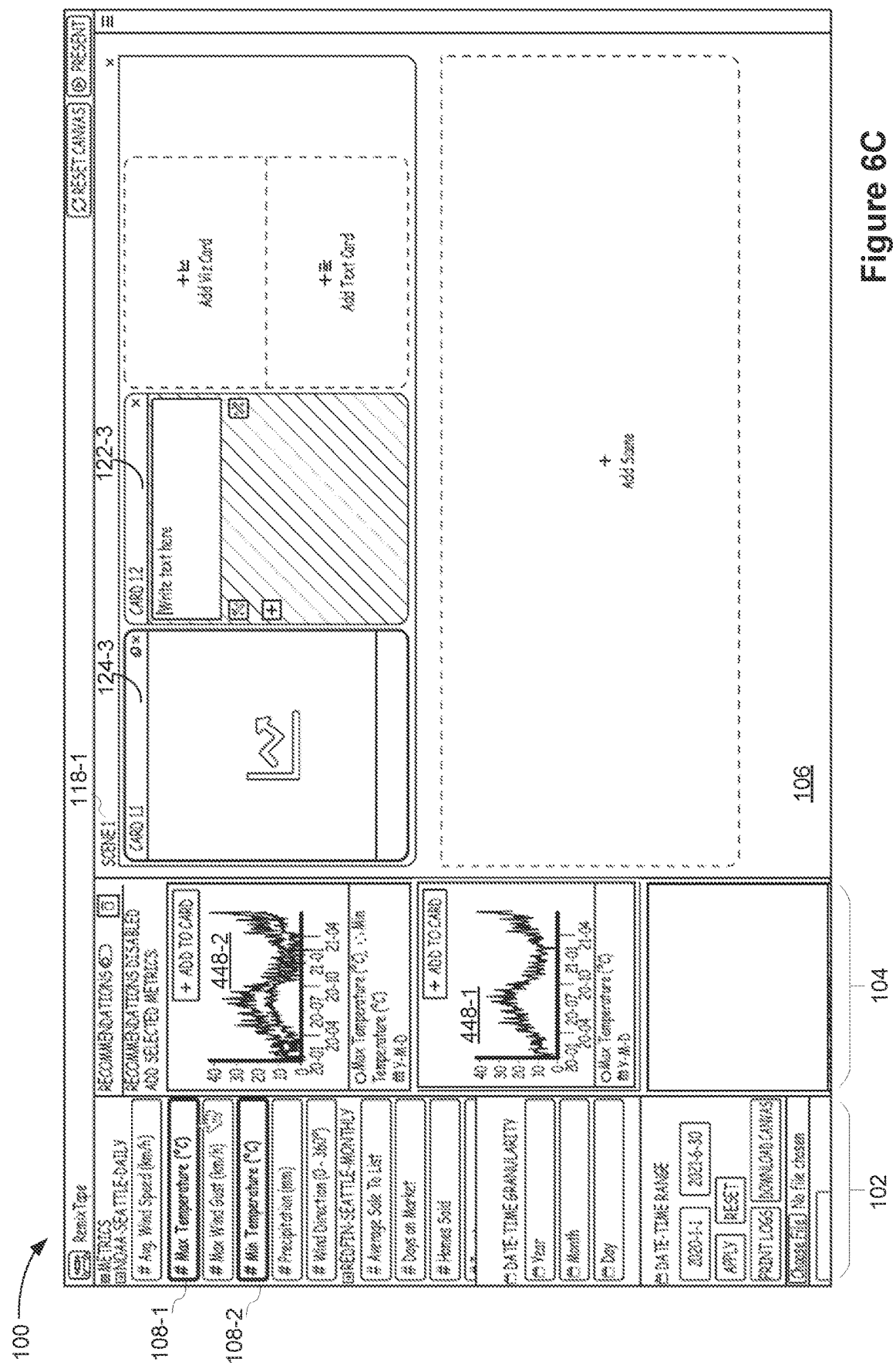

FIG. 6C illustrates user selection of multiple metrics according to some implementations. In this example, the user selects (e.g., by holding down the "Shift Key" and clicking) a first identifier 108-1 corresponding to a first metric 120-1 (e.g., "Maximum Temperature") and a second identifier 108-2 corresponding to a second metric 120-2 (e.g., "Minimum Temperature"). FIG. 6C illustrates that, in response to the user selection, the graphical user interface 100 displays a data visualization recommendation 448-2 that includes two lines, one corresponding to variations in the maximum temperature over time and the other corresponding to variations in the minimum temperature over time. The visual recommendation assists the user in the process of building a coherent narrative using the metrics and reduces the number of inputs and/or reduces the user mistakes of selecting unsuitable metrics.

Figure 6D:
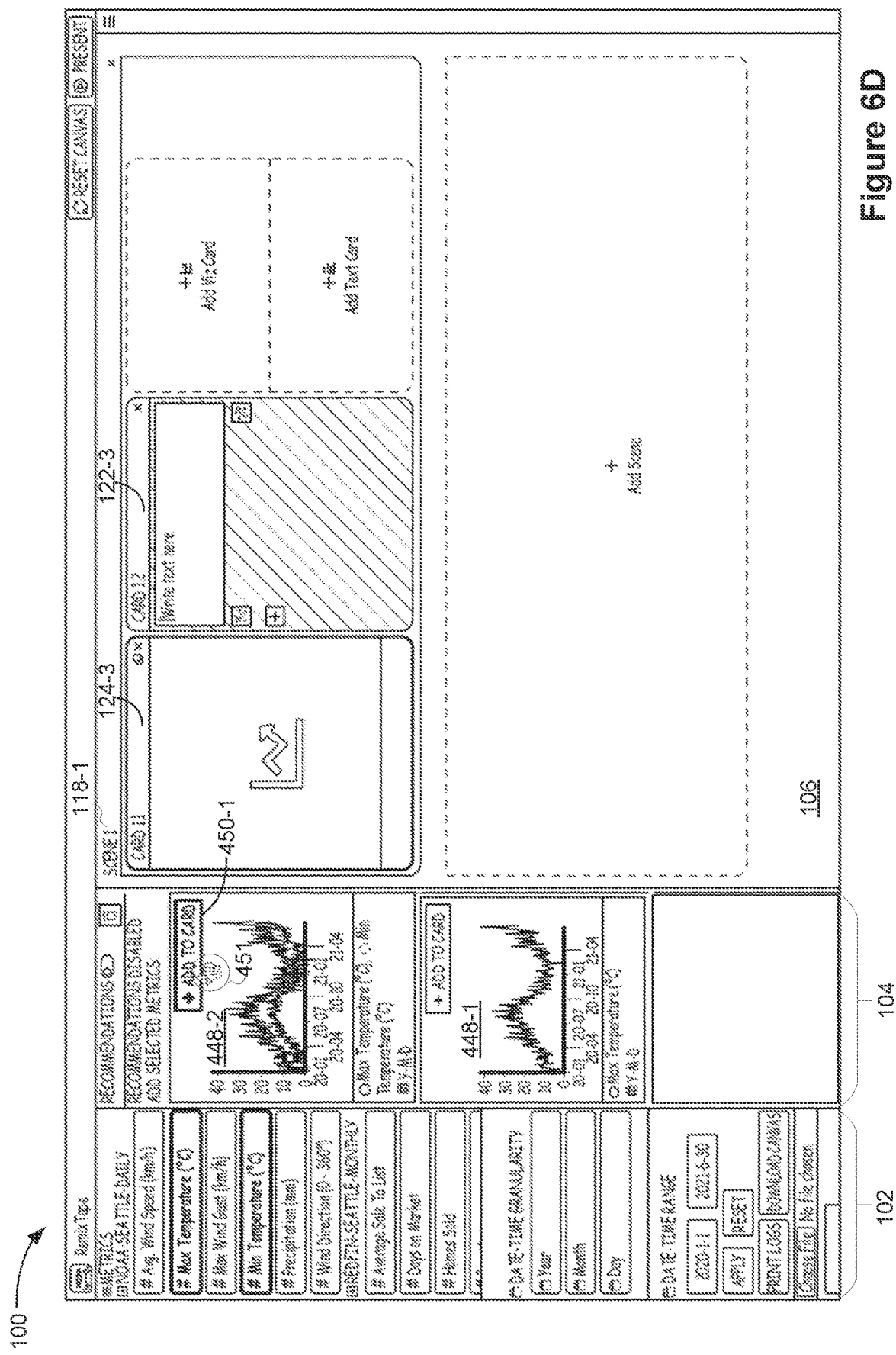
Figure 6E:
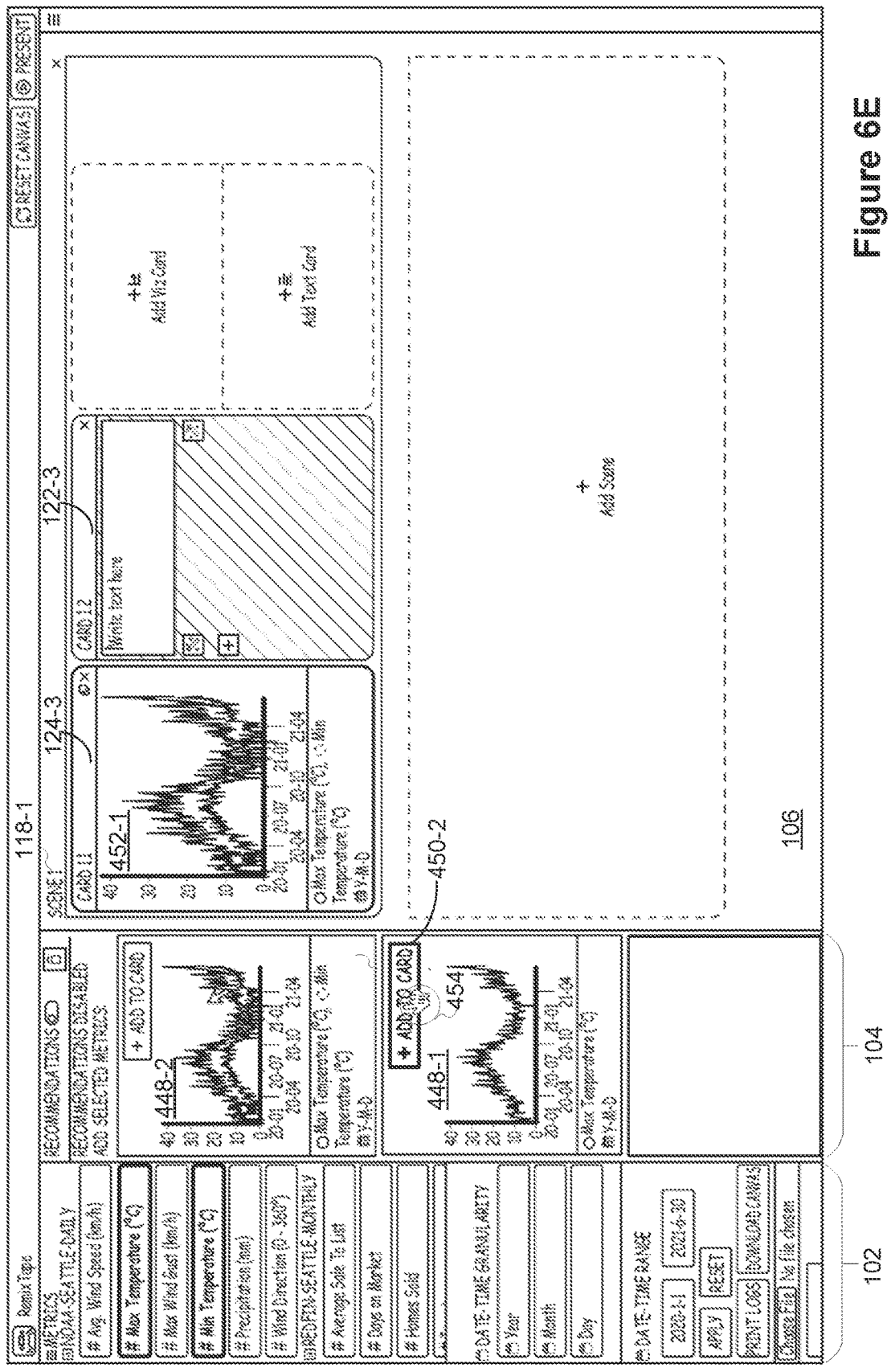

FIG. 6D illustrates user selection (451) of an add icon 450-1 (e.g., a button or a user-selectable interface element) to add the visualization recommendation 448-2 to the visualization card 124-3. FIG. 6E illustrates that, in response to the user selection, the graphical user interface 100 displays an updated visualization card 124-3, which includes a data visualization 452-1, corresponding to the visualization recommendation 448-2. The visual recommendation assists the user in the process of building a coherent narrative using the metrics and reduces the number of inputs and/or reduces the user mistakes of selecting unsuitable metrics.

Figure 6F:
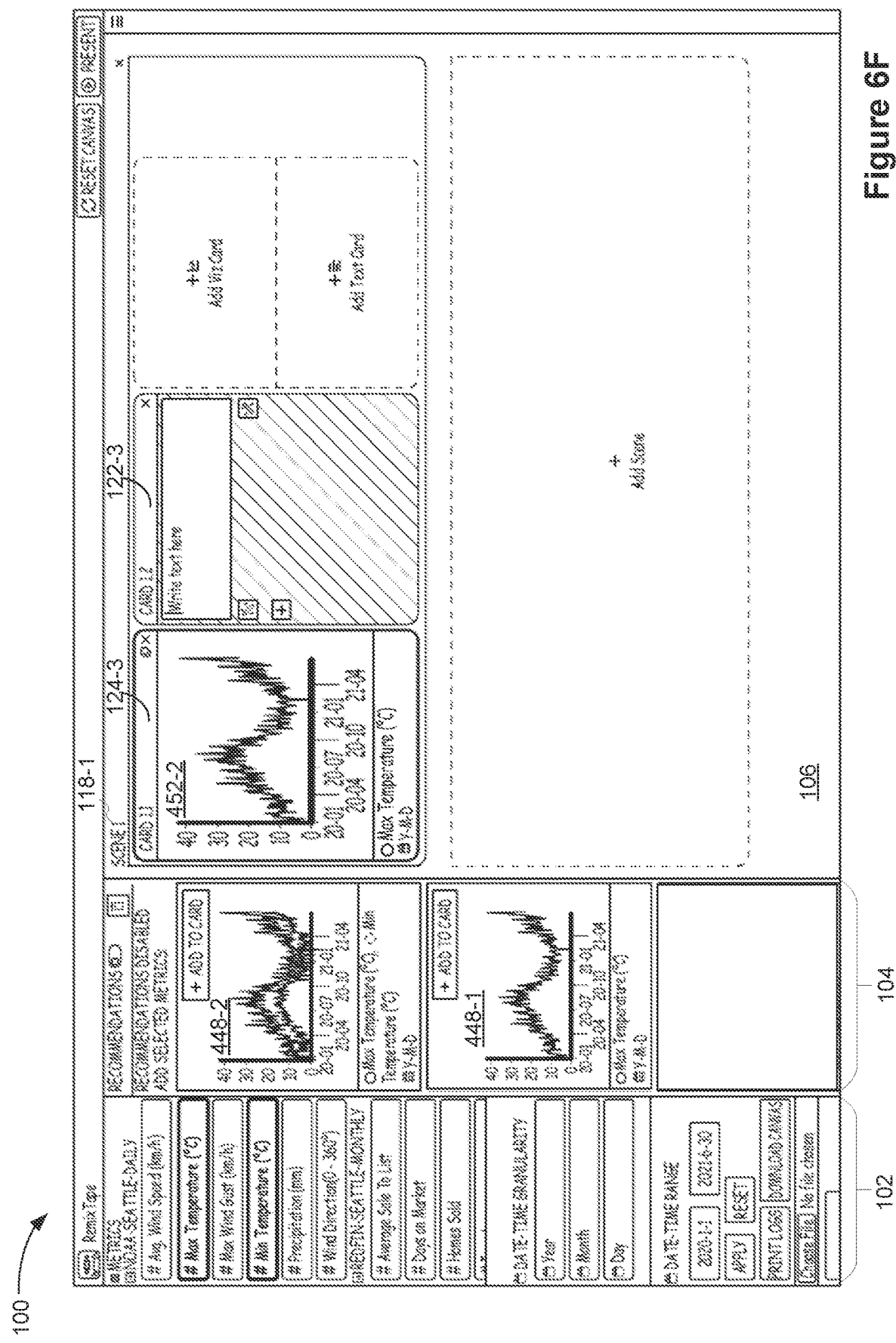

FIG. 6E also illustrates user selection (454) of a second move icon 450-2 (e.g., a button or a user-selectable interface element) to add the lower visualization recommendation 448-1 to a card. In this example, because the user has selected the viz card 124-3 (e.g., the user has not selected another visualization card), the computing device 200 (e.g., the application 230) replaces the data visualization 452-1 that is displayed on the viz card 124-3 with a data visualization 452-2 corresponding to the visualization recommendation 448-1. This is illustrated in FIG. 6F.

FIGS. 7A to 7D provide a series of screen shots for interactions with a graphical user interface 100 to specify a date/time granularity, in accordance with some implementations.

According to some implementations of the present disclosure, a user can specify a desired temporal granularity (e.g., day, month, or year). In some implementations, the user specification is received via the data schema and filter panel 102.

Figure 7A:
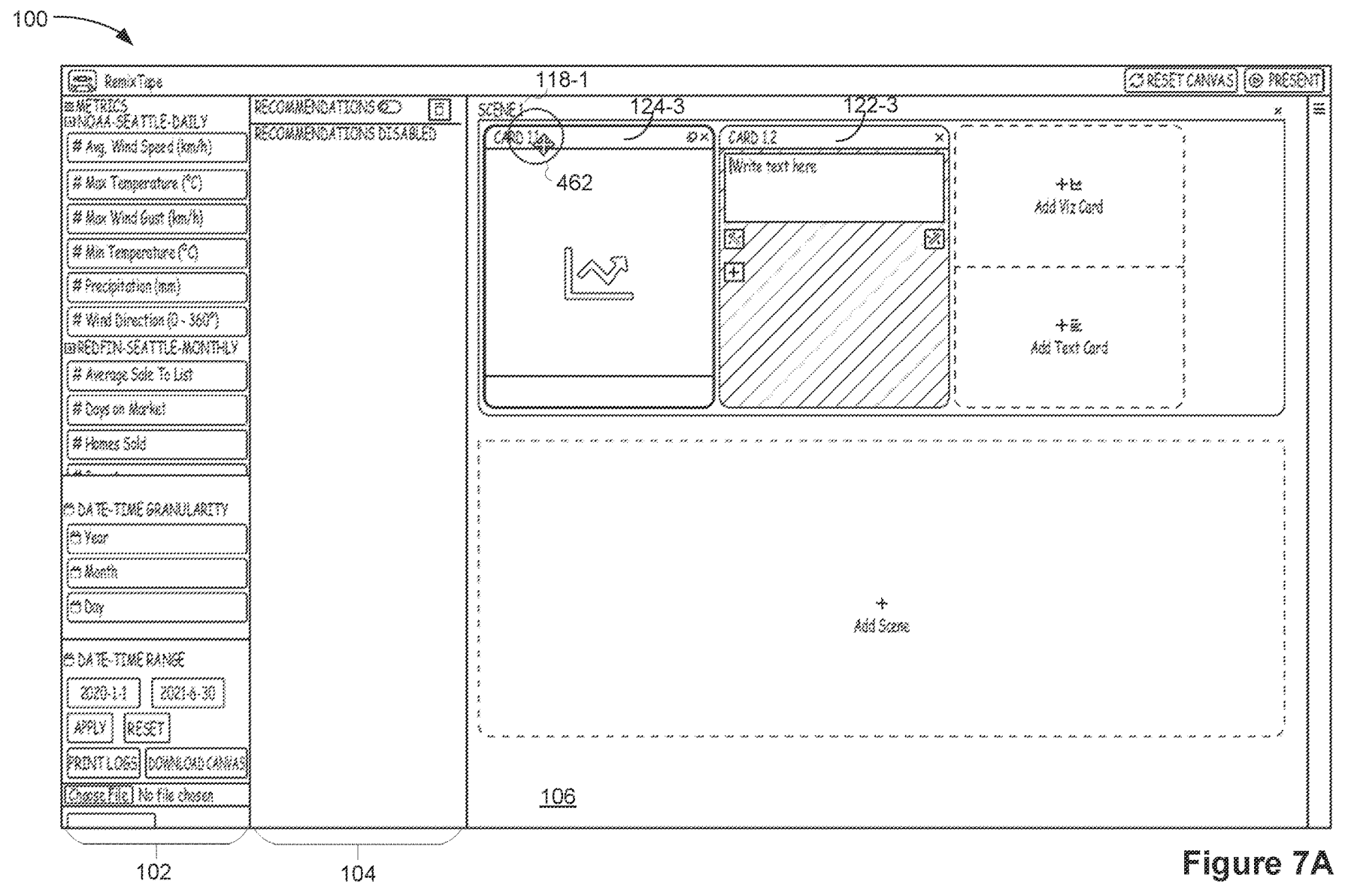
Figure 7B:
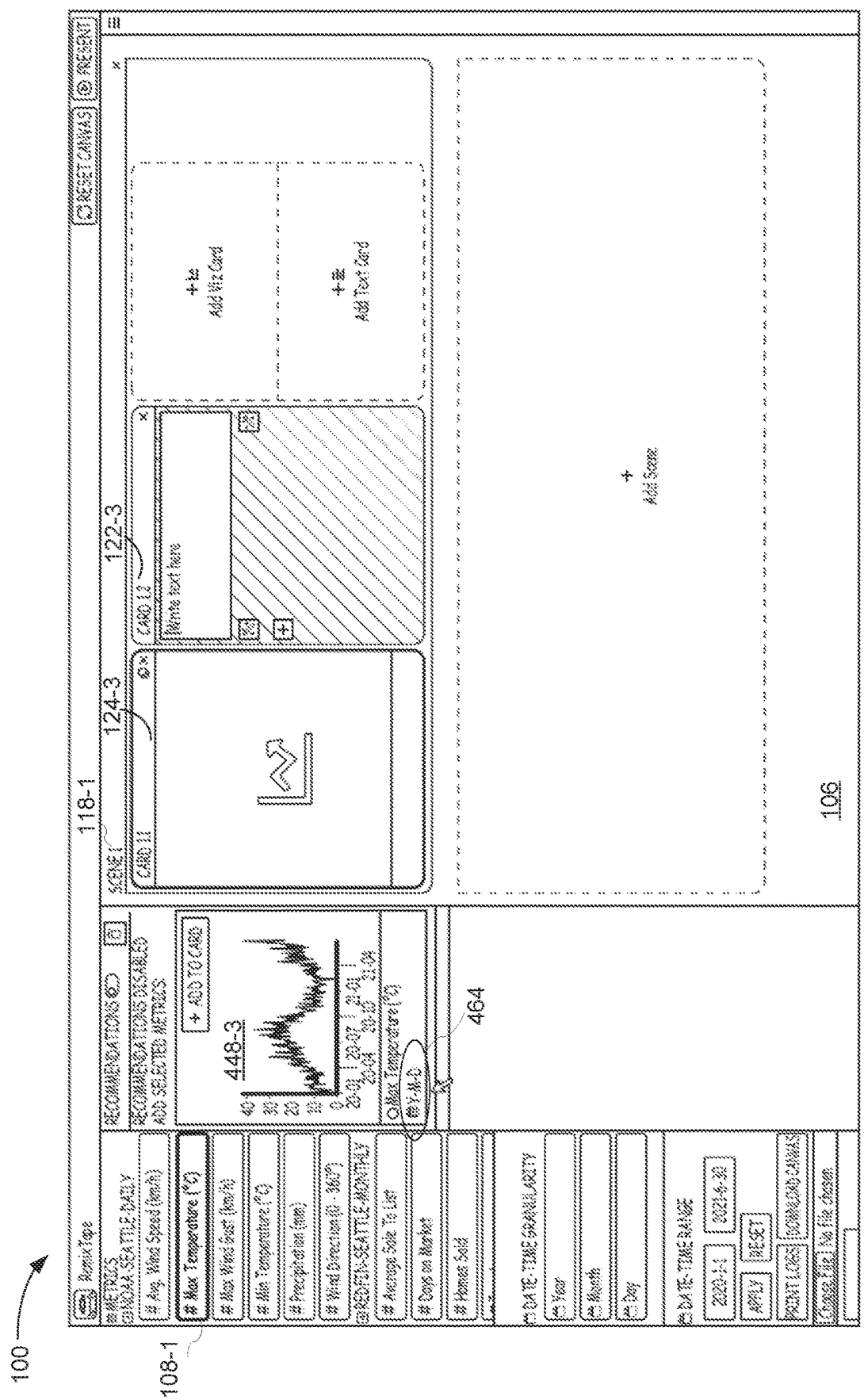

FIG. 7A illustrates user selection (462) of a visualization card 124-3. FIG. 7B illustrates user selection of an identifier 108-1, corresponding to a metric (e.g., "Maximum Temperature."). In response to user selection of the identifier 108-1, the graphical user interface 100 displays, in the recommendation region 104, a data visualization recommendation 448-3 corresponding to the selected metric (e.g., "Maximum Temperature"). The data visualization recommendation 448-3 has a date/time granularity corresponding to the year-month-day granularity 464 (e.g., Y-M-D granularity). As used herein, a date/time granularity refers to the frequency (e.g., year, month, or day) at which metric values are provided. In the example of FIG. 7B, each data mark in the data visualization recommendation 448-3 represents a day (e.g., date).

Figure 7C:
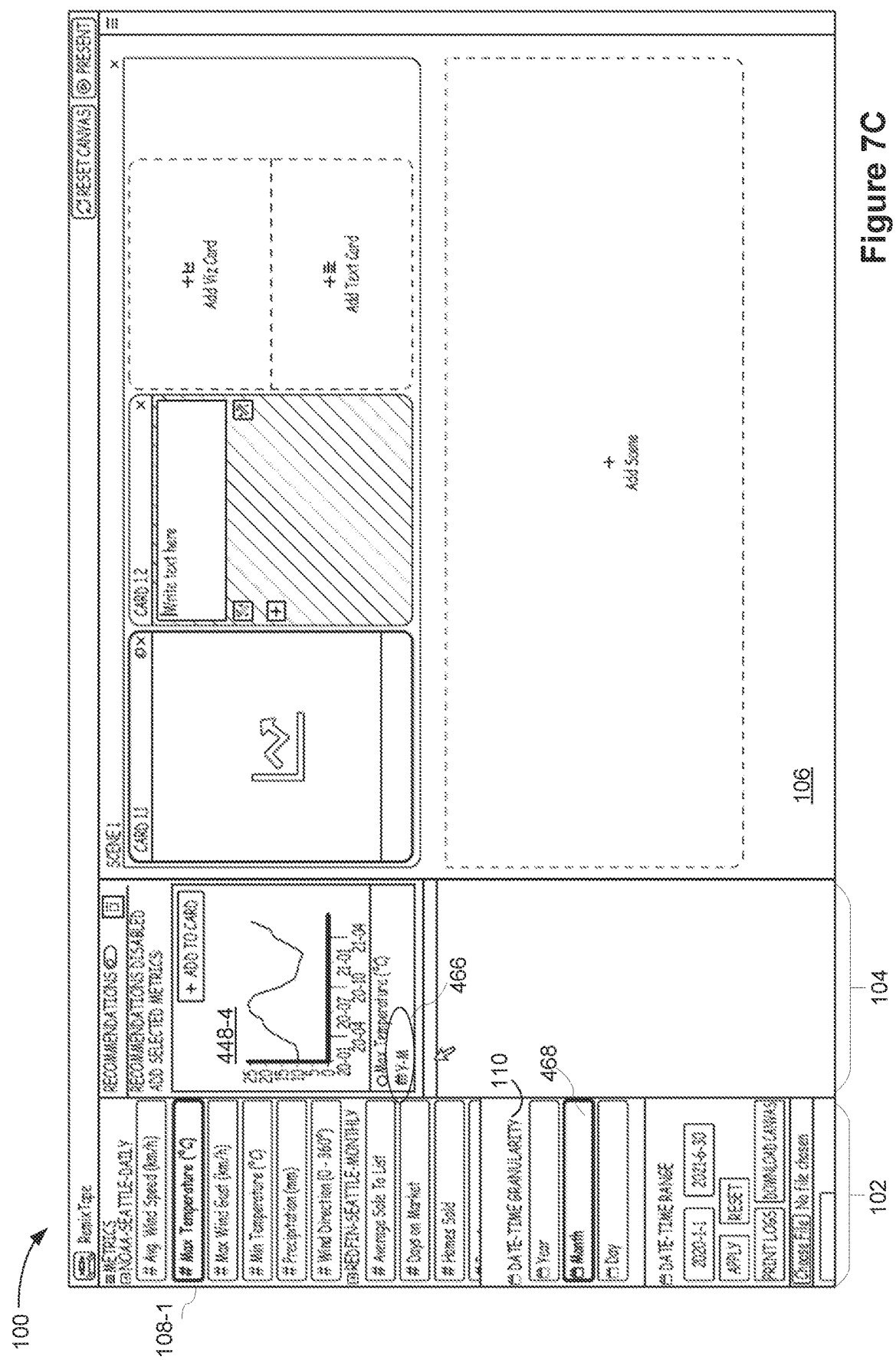

FIG. 7C illustrates user selection (468) of a date/time granularity via the granularity filter 110. In this example, the user specifies the date-time granularity as "month" (or year-month). FIG. 7C also illustrates that, in response to the user selection, the graphical user interface 100 displays, in the recommendation region 104, an updated data visualization recommendation 448-4 corresponding to the selected metric (e.g., "Maximum temperature"), and having a year-month granularity 466 (e.g., Y-M granularity). Each data mark in the data visualization recommendation 448-4 represents a month. In some implementations, the computing device 200 (e.g., application 230) generates the data visualization recommendation 448-4 by aggregating the values of the metrics (e.g., "Maximum Temperature") to a monthly granularity. Compared to the first data visualization recommendation 448-3, the second data visualization recommendation 448-4 appears smoother (e.g., has fewer details) because there are fewer data marks in the second data visualization recommendation 448-4 than in the first data visualization recommendation 448-3.

Figure 7D:
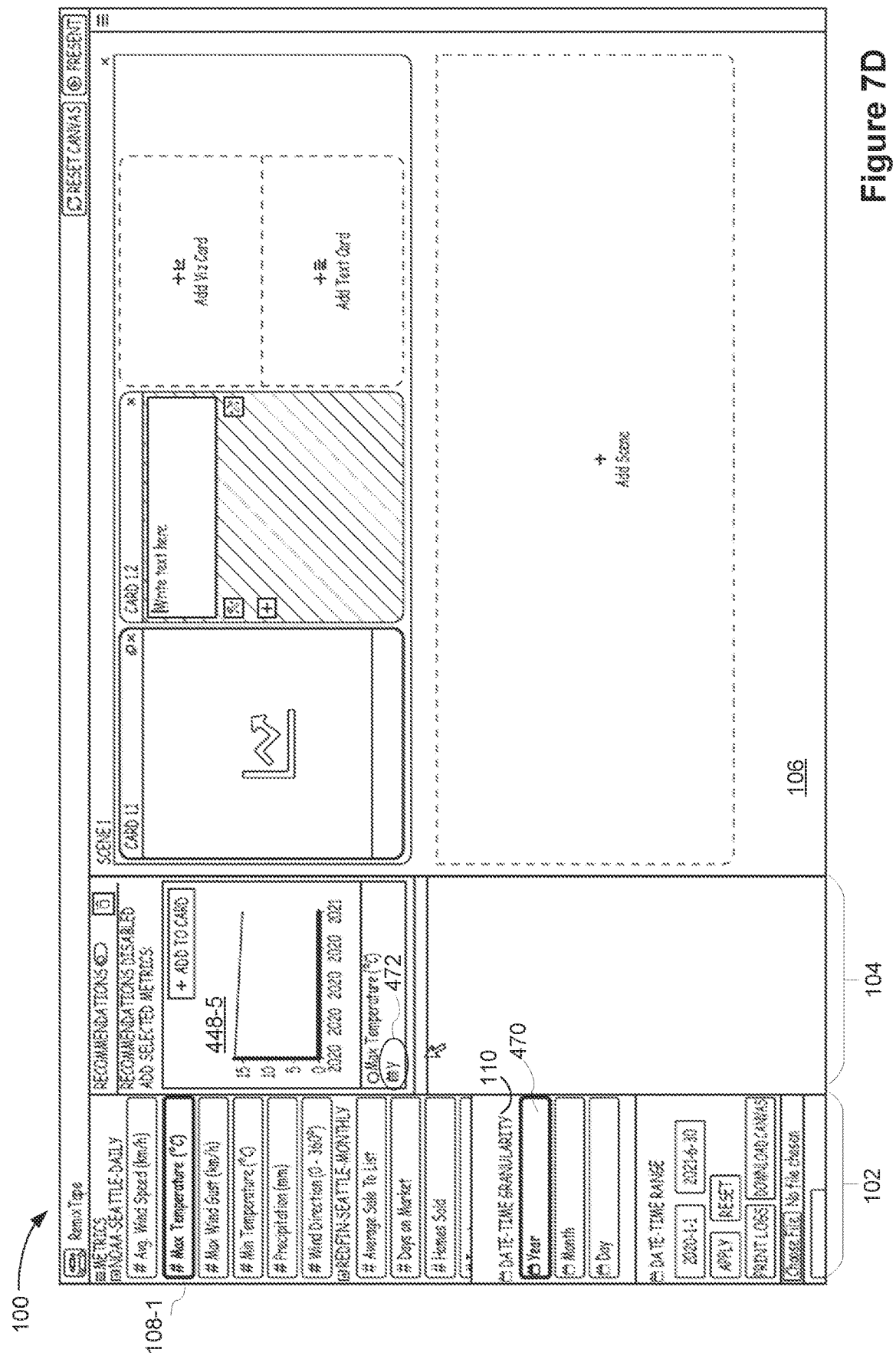

FIG. 7D illustrates user selection (470) of the "year" granularity via the granularity filter 110. FIG. 7D also illustrates that, in response to the user selection, the graphical user interface 100 displays, in the recommendation region 104, an updated data visualization recommendation 448-5 corresponding to the selected metric (e.g., "Maximum Temperature") and having a year granularity 472 (e.g., Y granularity). Each data mark in the third data visualization recommendation 448-5 represents a year. In some implementations, the computing device 200 (e.g., application 230) generates the data visualization recommendation 448-5 by aggregating the values of the metrics (e.g., "Maximum Temperature") for entire years.

FIGS. 8A to 8D provide a series of screen shots for interactions with a graphical user interface 100 to specify a date/time range, in accordance with some implementations.

According to some implementations of the present disclosure, a user can constrain a selected metric's values to a specific time range. In some implementations, the user specification is received via the data schema and filter panel 102.

Figure 8A:
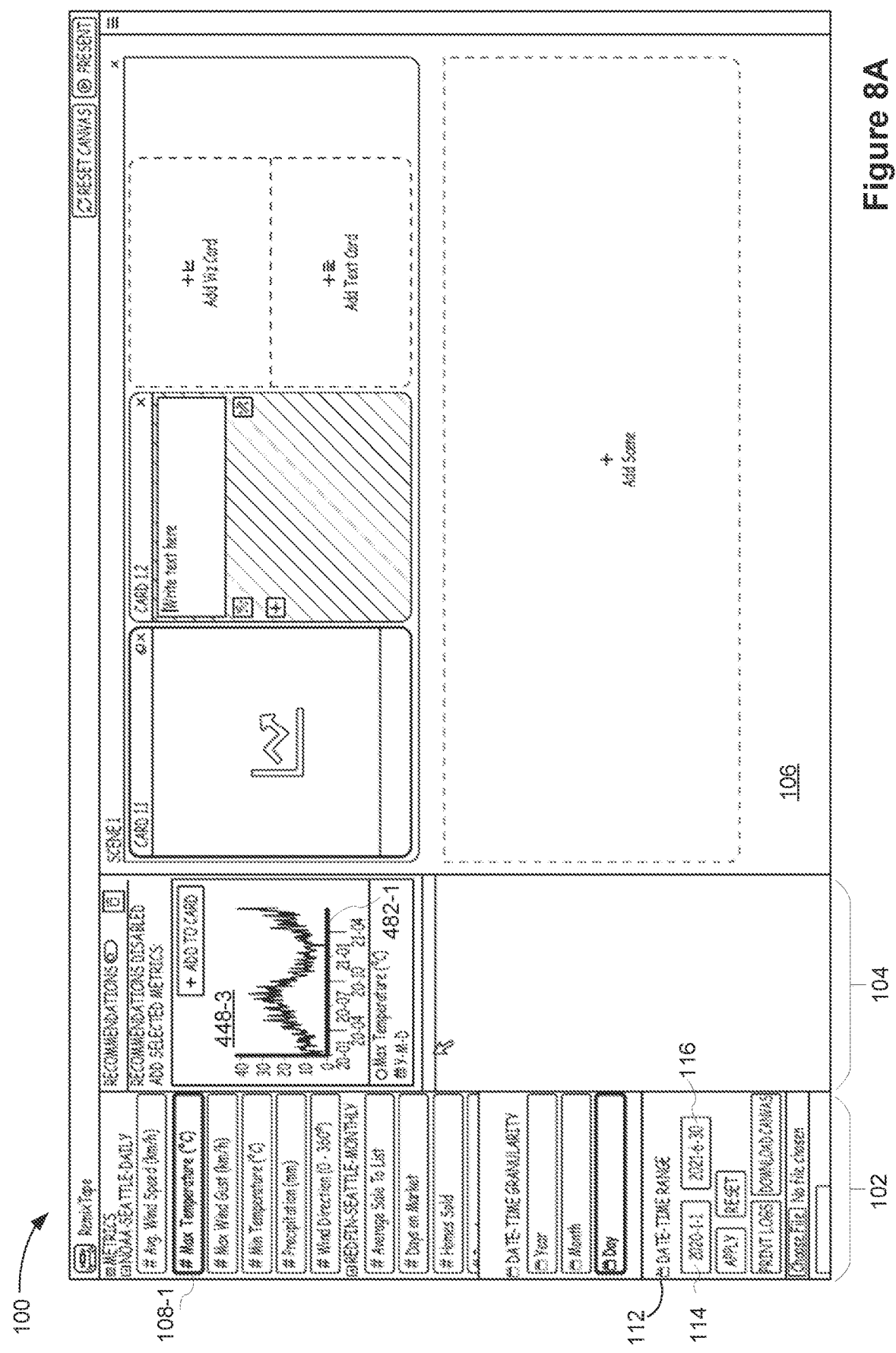
FIGS. 8A to 8D provide a series of screen shots for interactions with a graphical user interface to specify a date/time range, in accordance with some implementations.

FIG. 8A illustrates user selection of a first identifier 108-1, corresponding to a first metric "Maximum Temperature." In response to the user selection, the graphical user interface 100 displays, in the recommendation region 104, a data visualization recommendation 448-3 corresponding to the selected metric "Maximum Temperature."

In some implementations, the graphical user interface 100 displays, in the data schema and filter panel 102, a date/time range filter 112, which allows a user to specify (e.g., adjust, edit, or modify) the date/time range of the data visualization. For example, FIG. 8A shows that the metrics 120 have a start date 114 of Jan. 1, 2020 and an end date 116 of Jun. 30, 2021. FIG. 8A also shows the data visualization recommendation 448-3 includes a temporal axis 482-1 (e.g., time axis or an x-axis) whose domain ranges from Jan. 1, 2020 (i.e., 2020-

1-1) to Jun. 30, 2021 (i.e., 2021-6-6), consistent with the start date 114 and the end date 116 specified in the date-time range filter 112.

Figure 8B:
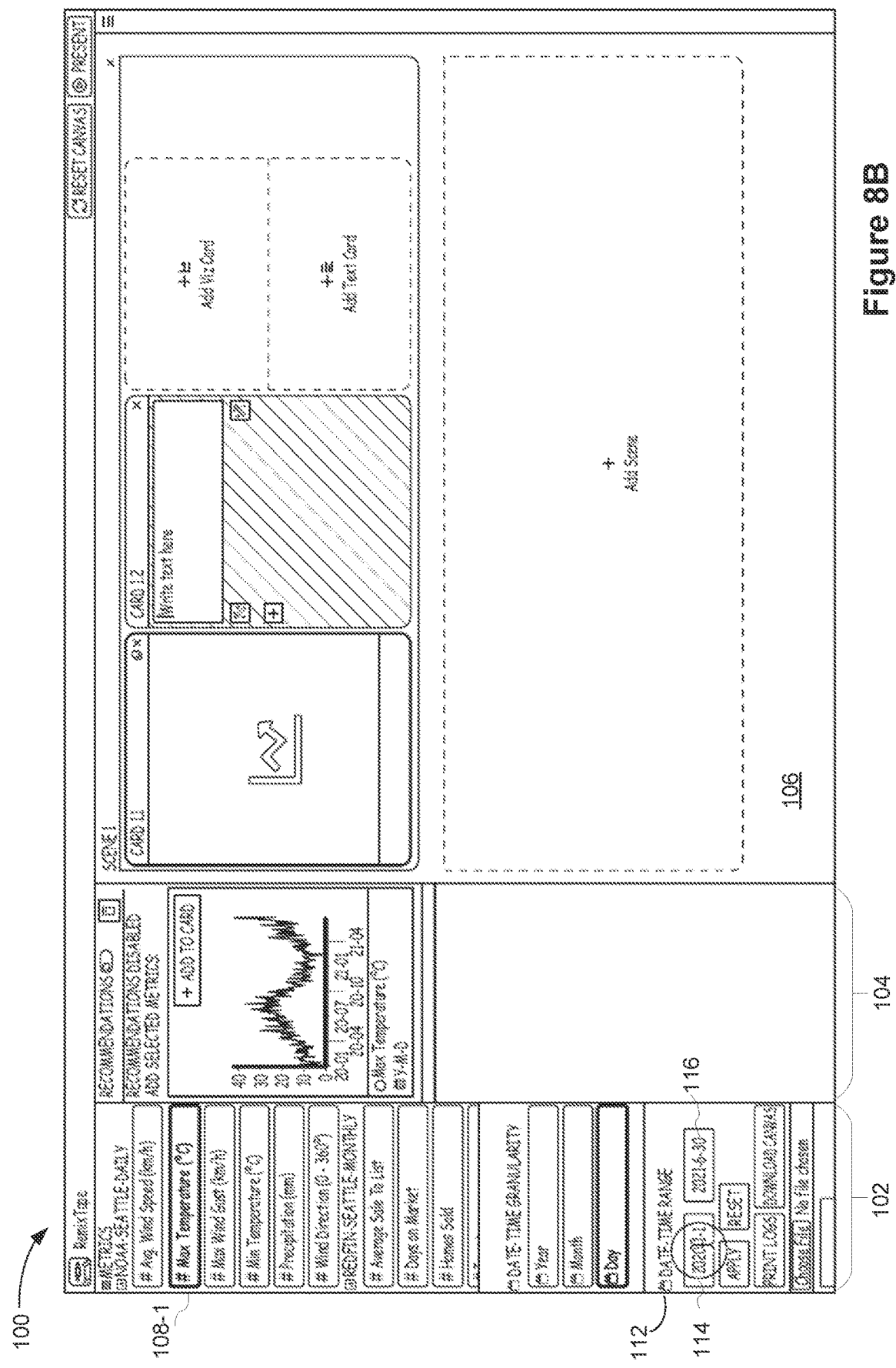
Figure 8C:
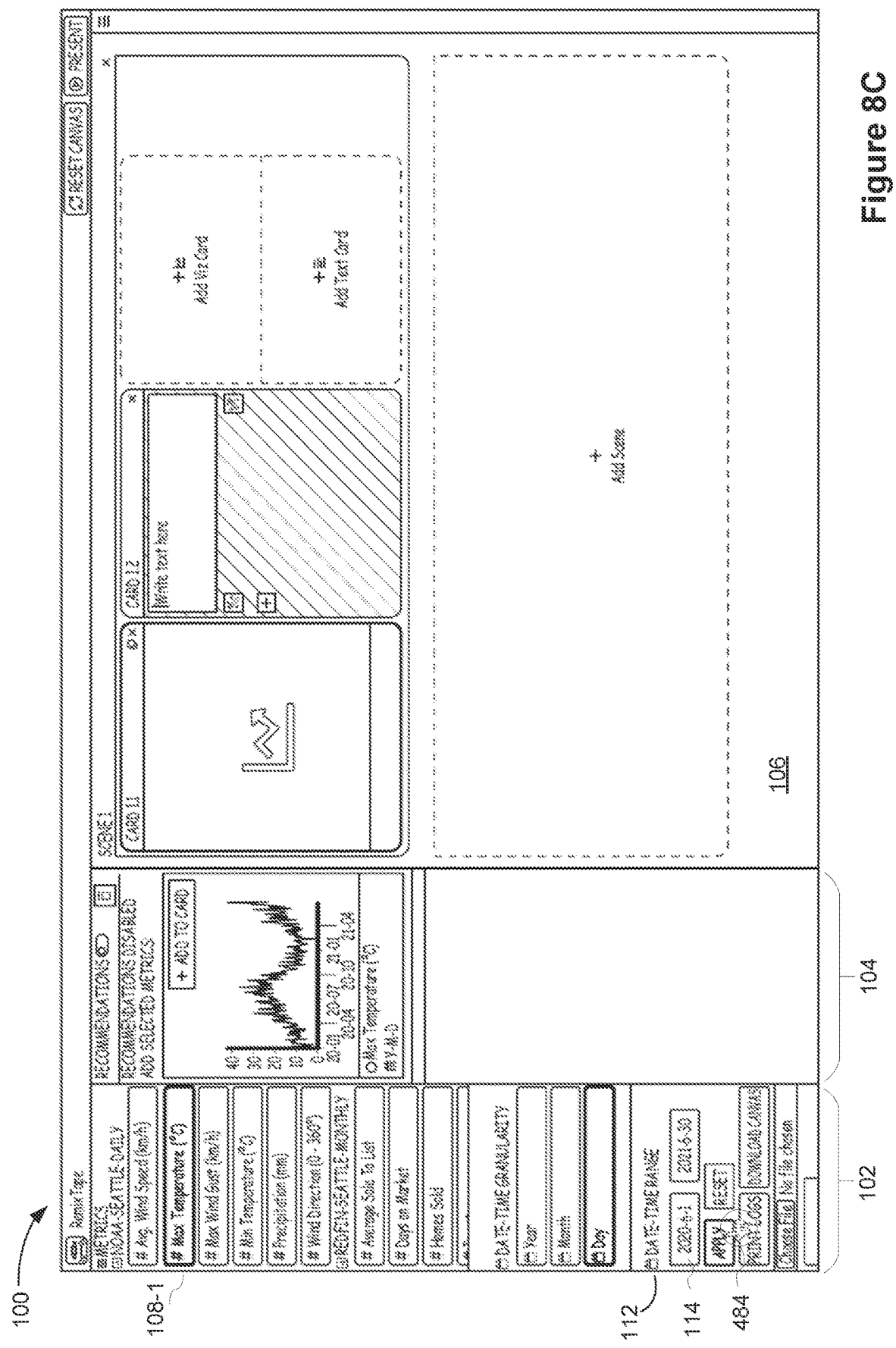
Figure 8D:
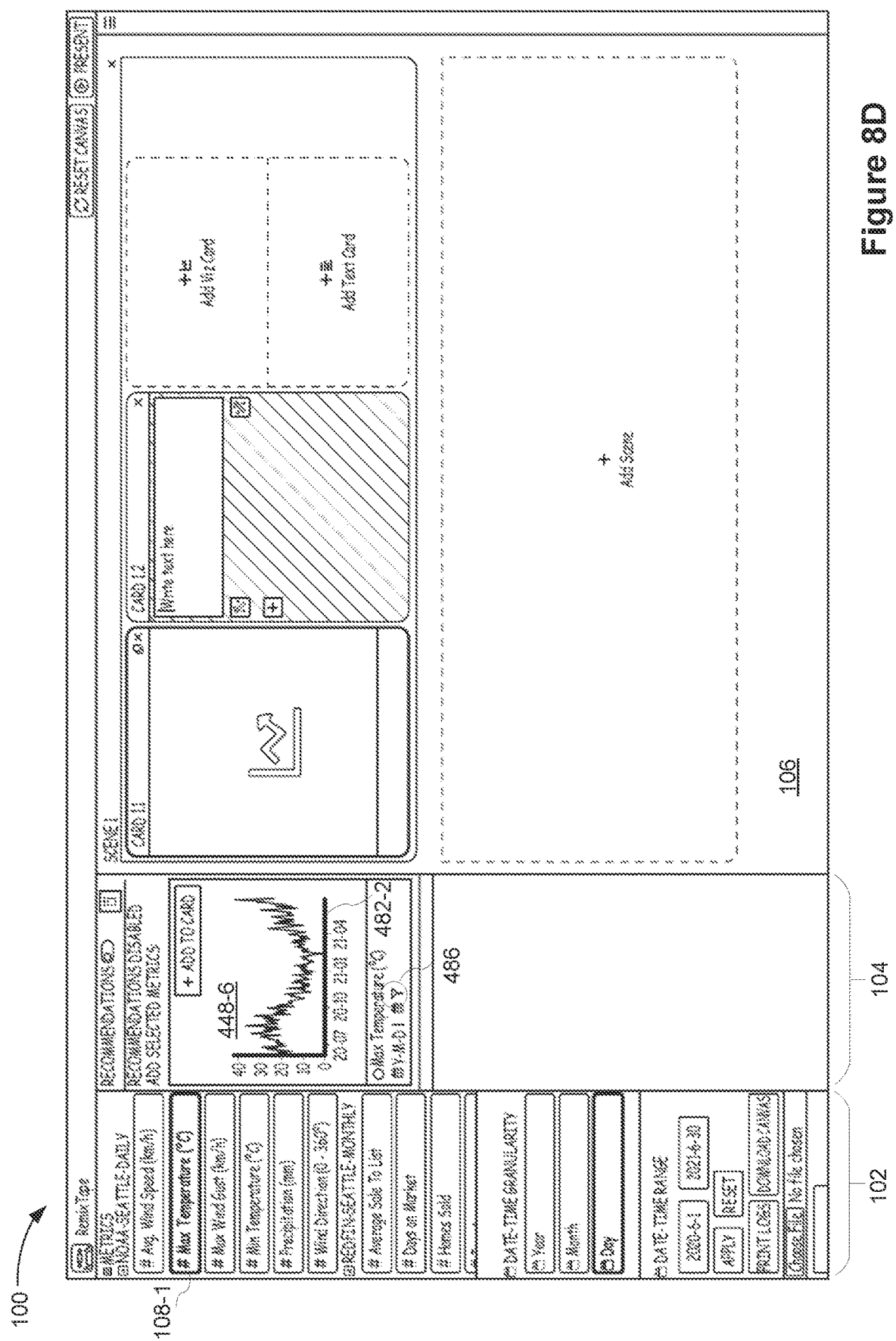

FIGS. 8B and 8C illustrate user modification of the start date 114 from Jan. 1, 2020 to Jun. 1, 2020. FIG. 8C illustrates user selection (484) of an "Apply" icon (e.g., button) to confirm the change. FIG. 8D illustrates that, in response to the user selection, the graphical user interface 100 displays an updated data visualization recommendation 448-6 corresponding to the selected metric (e.g., "Maximum Temperature"), with a temporal axis 482-2 having values ranging from Jun. 1, 2020 to Jun. 30, 2021. The data visualization recommendation 448-6 also includes a filter icon 486 (e.g., an indicator) indicating that the temporal axis is displaying a filtered range of date/time values.

According to some implementations of the present disclosure, when date/time filtering occurs, the computing device 200 retains the filtered data (e.g., filtered metric values) but re-renders the chart without the filtered date/time span. Stated another way, filtering adjusts the temporal domain of the displayed data visualization (e.g., the line chart). The filtered data is retained and not included in the displayed data visualization.

In some implementations, when date/time filtering occurs, the computing device 200 removes the filtered metric values and generates a data visualization that excludes the filtered data.

D. Visualization Recommendations

According to some implementations of the present disclosure, RemixTape augments the presentation authoring experience through contextual chart recommendations.

In some implementations of the present disclosure, visualization recommendations in RemixTape are geared towards guiding users and helping them identify "next steps." Recommendations in RemixTape fundamentally differ from prior systems in that they focus on promoting a narrative sequence during presentation authoring (as opposed to promoting data coverage or analytic tasks/intents during open-ended data exploration). More specifically, RemixTape considers the active state of a presentation and recommends visualizations that allow authors/presenters to drill-down into metrics they have previously discussed, or zoom out to give an overview when appropriate, or switch their presentation context by focusing on related metrics.

FIG. 9 provides an algorithm that summarizes RemixTape's recommendation logic according to some implementations.

In some implementations, at a high-level, RemixTape provides two types of chart recommendations: new metric recommendations and sequential recommendations.

1. New Metric Recommendations

When working with a new or large dataset, it can be challenging to discover potentially interesting metrics to include in a presentation. The disclosed implementations improves the user experience by assisting users in identifying new metrics to introduce in their presentations. To assist authors in such scenarios, RemixTape recommends metrics to start a new scene (FIG. 9, lines 6-8) and for introducing new metrics amidst a scene (FIG. 9, lines 15-16 and 21-22).

a. Recommending Cards for an Empty Scene.

When recommending a card for a scene in an empty canvas, RemixTape iterates through all available metrics and suggests metrics that exhibit potentially interesting data trends over time. In some implementations, metrics exhibiting a strong variation in trends over time are recommended as cards to start a scene. In some implementations, to identify metrics, RemixTape computes a parameter that measures the variability of values of a respective metric. In some implementations, the parameter includes a dispersion parameter or a statistical dispersion such as the mean (average) of the values, the range of the values, the variance of the values, the deviation (e.g., standard deviation, mean deviation, or quartile deviation) of the values, or a coefficient of variation (e.g., the coefficient of variance).

In some implementations, RemixTape computes the coefficient of variation (e.g., coefficient of variance or a relative standard deviation) for the metrics' values. The coefficient of variation is a ratio of the standard deviation to the mean, thus normalizing the metrics.

In some implementations, based on the computed parameters, RemixTape recommends metrics with high variability.

In some implementations, if other scenes are already present on the canvas, RemixTape takes the existing content into account and deprioritizes metrics that are covered in prior scenes (e.g., the recommendations focus on unused metrics with the most variable temporal trends).

b. Recommending Cards for a Pre Populated Scene.

According to some implementations of the present disclosure, in cases where a new visualization card is added to a pre-populated scene, RemixTape recommends new metrics that the author might consider switching the focus to. To generate these recommendations, RemixTape iterates through all metrics that are not previously used in the scene and identifies ones with a trend most similar to the preceding visualization card. In some implementations, to detect similarity, RemixTape computes the Pearson's correlation coefficient (r) between a metric's values and the data displayed in the preceding visualization card, and recommends metrics with the highest |r| (e.g., most strongly or inversely correlated metrics).

2. Sequential Recommendations

According to some implementations of the present disclosure, besides helping authors identify new metrics to introduce in their presentations, RemixTape also recommends charts (e.g., data visualizations, line graphs, or line charts) that can help authors incrementally talk about a metric using a sequence of cards. More specifically, when a viz card is added to a non-empty scene, RemixTape inspects the scene's content to generate two types of recommendations including: drill-down recommendations and overview recommendations.

a. Drill Down Recommendations.

To help authors focus on potentially interesting time periods within their data, RemixTape recommends temporal filters that can be applied to metrics in the preceding visualization card to drill down into prominent peaks and valleys in the data.

In some implementations, to identify the peaks and valleys, RemixTape employs a robust peak detection algorithm that uses a moving average to detect peaks/valleys, and described in "Robust peak detection algorithm using z-scores," available at https://stackoverflow.com/questions/22583391/peak-signaldetection-in-realtime-timeseries-data/22640362#22640362, 2014, which is incorporated by reference herein in its entirety. Specifically, the algorithm uses three input parameters: (1) lag that controls the size of the moving window; (2) threshold (k), which determines the number of standard deviations (i.e., z-score); and 3) influence, which controls how much influence new data points will have on the moving average and standard deviation. At each time step t, a moving average $\mu_t$ and standard deviation at are calculated using data within the moving window. A data point is considered a peak if its value is $>\mu_t+\lambda*\sigma_t$. A data point is considered a valley if its value is $<\mu_t-\lambda*\sigma_t$.

In cases where an input data source contains one or more categorical attributes, the system also recommends breaking down a metric by categories (e.g., transitioning from a single line chart to a multi-series line chart).

b. Overview Recommendations.

The recommendations discussed above suggest authors drill down into a particular metric (following the classic overview detail narration pattern). However, in the flow of creating a presentation authors may create a scene with charts that only showcase a subset of the time period covered in the dataset. To make authors aware of potential lack of context in their presentation (e.g., suggest a detail overview transition), RemixTape also recommends an overview chart spanning the entire time period of the dataset.

While making sequential recommendations, the system checks all existing cards in a scene to avoid duplication and ensure that a recommended card was not already present in the scene.

3. Screenshots

FIGS. 10A to 10L provide a series of screen shots for interactions with a graphical user interface to specify recommendation actions, according to some implementations.

Figure 10A:
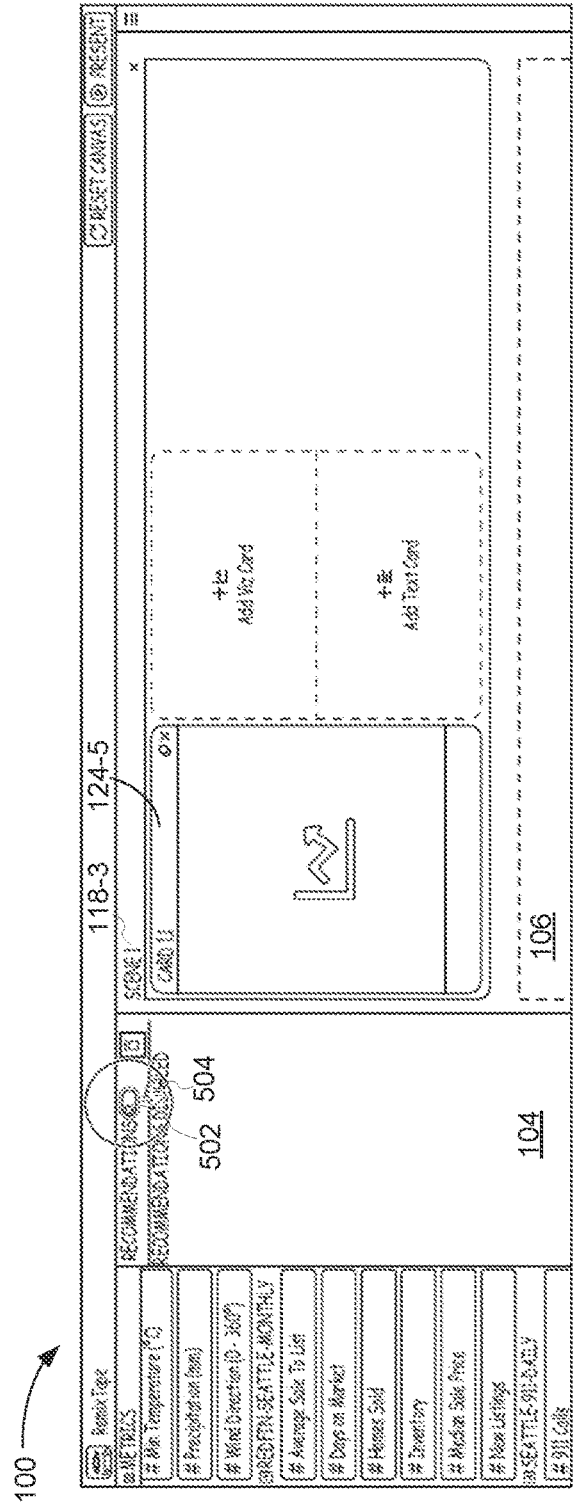
FIGS. 10A to 10K provide a series of screen shots for interactions with a graphical user interface to specify recommendation actions, according to some implementations.
Figure 10B:
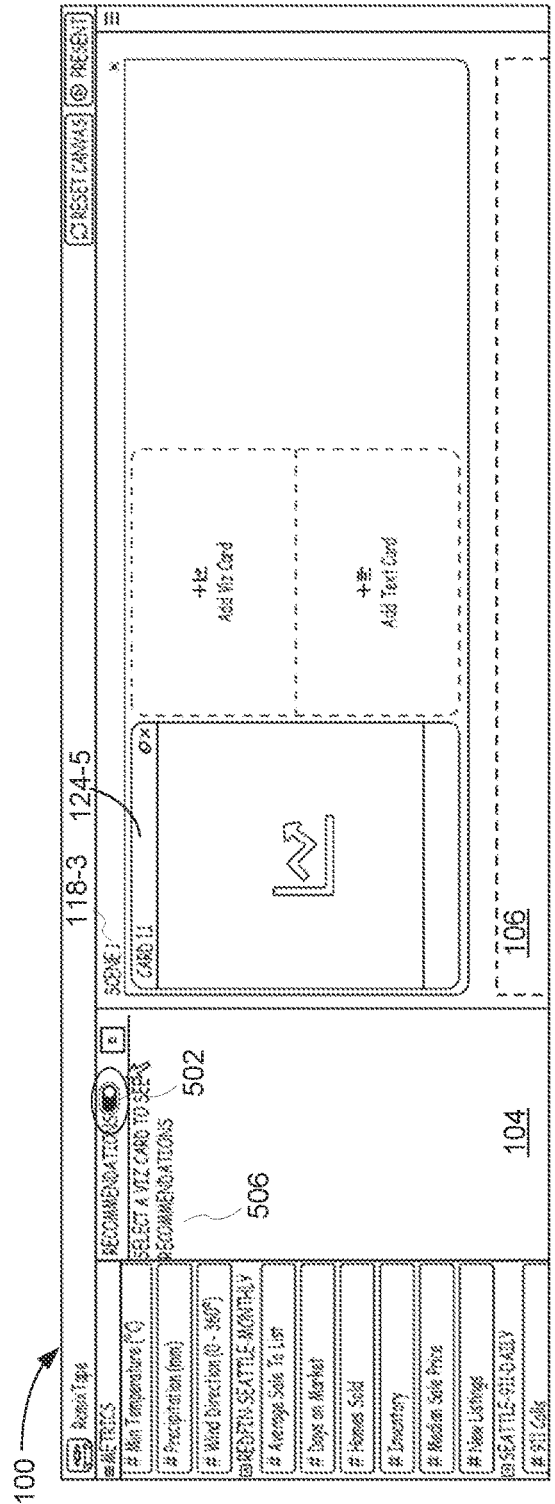

FIGS. 10A and 10B illustrate a partial view of a graphical user interface 100 according to some implementations. The graphical user interface 100 displays, in the recommendation region 104, a recommendation button 502 (e.g., a toggle button, an icon, a user-selectable interface element). The graphical user interface 100 displays, in the canvas region 106, an empty scene 118-3 having a blank visualization card 124-5.

FIG. 10A illustrates the recommendation button 502 is deactivated (e.g., toggled off), meaning that the recommendation feature is disabled. Accordingly, the application 230 does not provide visualization (or metric) recommendations. In some implementations, when the recommendations feature is disabled, only manually specified visualization cards can be added to the canvas region 106 (e.g., using the steps described in FIGS. 6A to 6F).

The transition between FIG. 10A and FIG. 10B illustrates user activation (504) of the recommendation button 502. The visual difference in the recommendation button 502 in the activated or deactivated state provides visual feedback to the user, enhances the operability of the device, and makes the user-device interface more efficient (e.g., by helping the user to achieve an intended result by providing feedback indicative of an input that will cause the device to generate the intended result and reducing user mistakes when operating/interacting with the device).

FIG. 10B also illustrates the graphical user interface 100 displays a prompt 506 to select a visualization card to see recommendations.

In some implementations, the recommendations are context-based, meaning that they have varying levels of scope. For example, a recommendation for a partially completed scene will be different from a recommendation for an empty canvas, or from those for a new scene after several completed scenes. In some implementations, the recommendations become increasingly specific as a user/author adds more content to the canvas. In some implementations, manual selection of a metric overrides the recommendations.

Figure 10C:
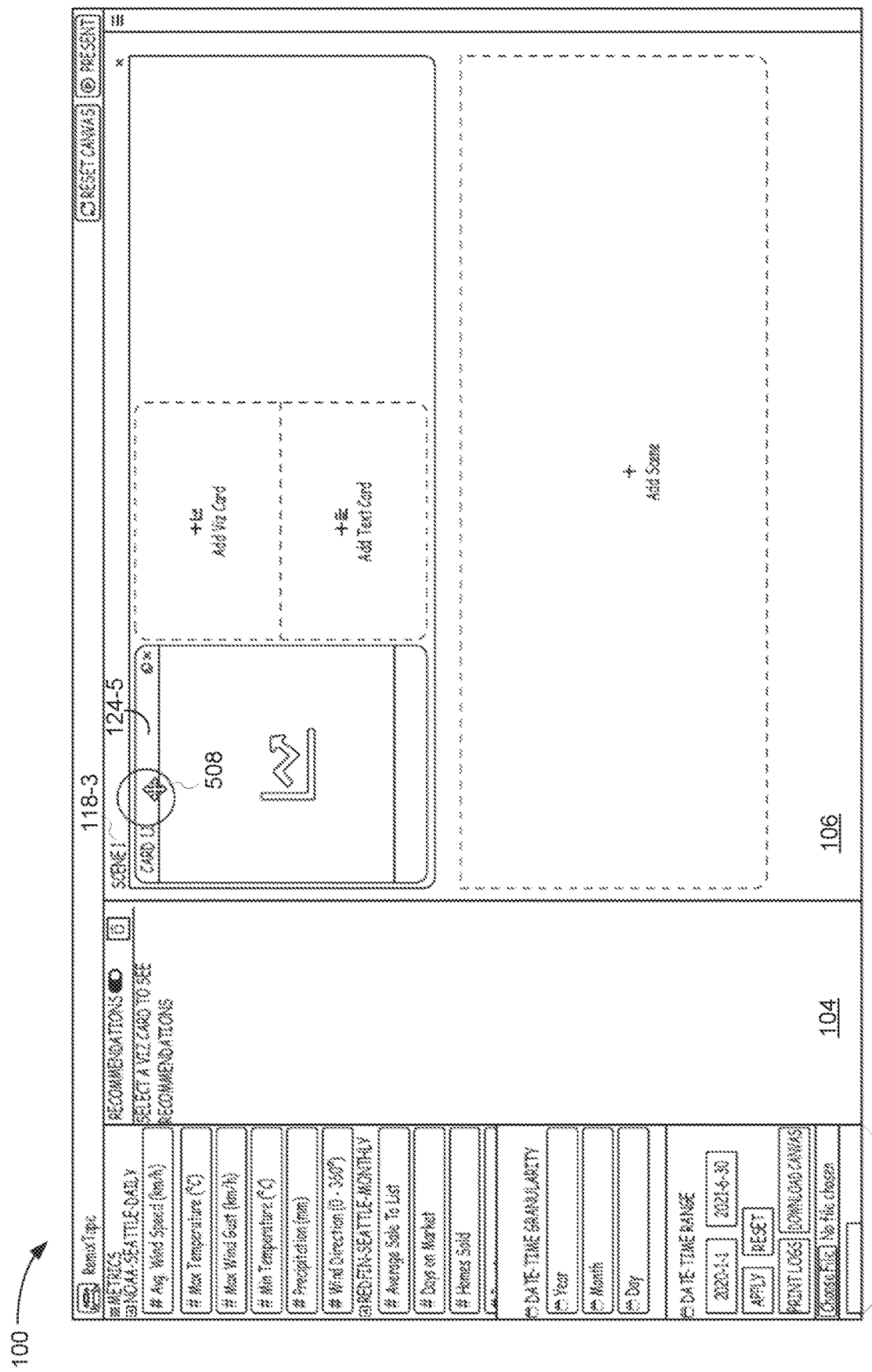

FIG. 10C illustrates user selection (508) of the blank visualization card.

Figure 10D:
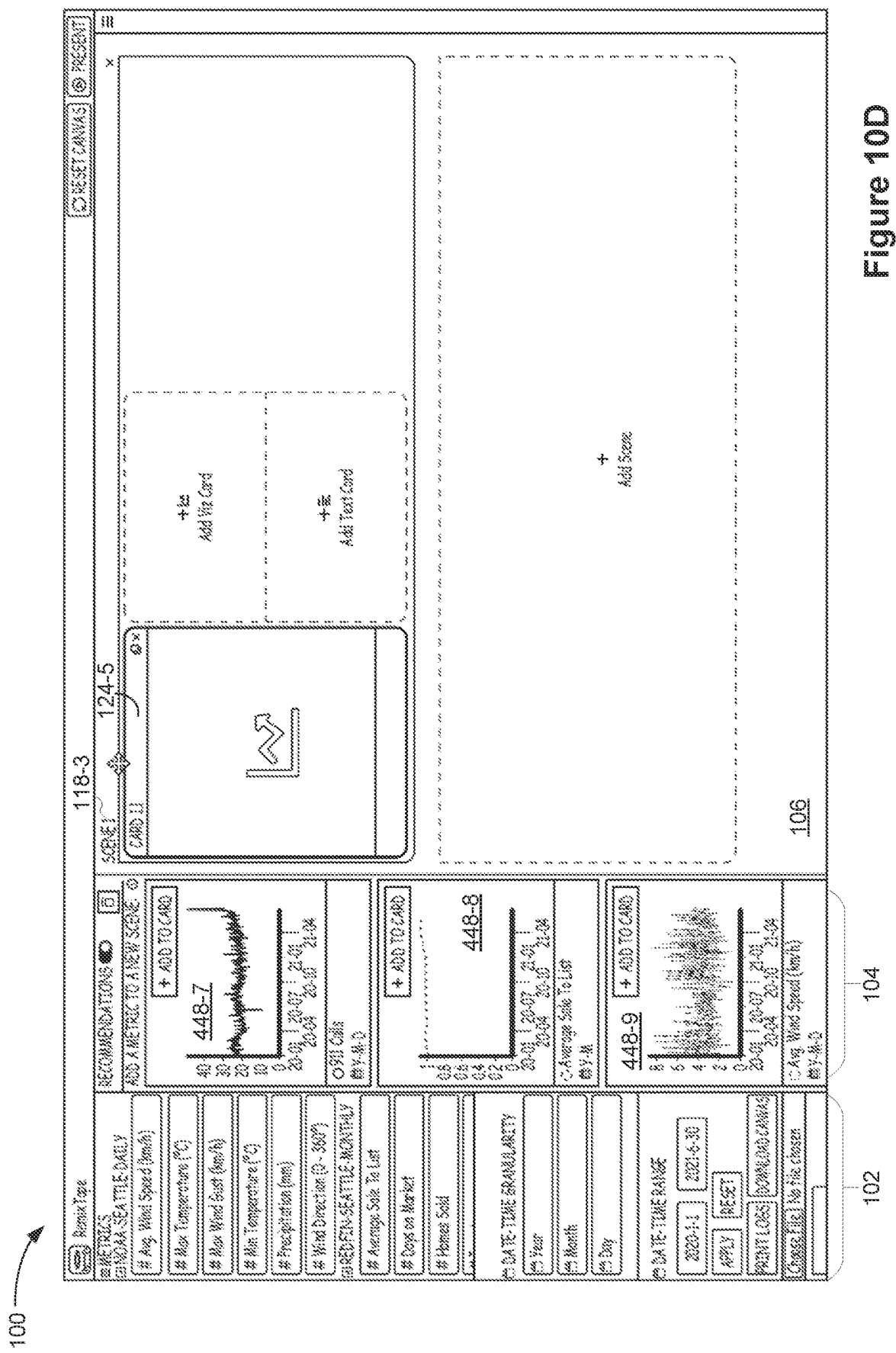

FIG. 10D illustrates that, in response to the user selection, the graphical user interface 100 displays (e.g., automatically and without user intervention), in the recommendation region 104, data visualization recommendations 448-7, 448-8, and 448-9. Each of the visualization recommendations corresponds to a respective metric. For example, the first visualization recommendation 448-7 corresponds to the metric "911 Calls." The second visualization recommendation 448-8 corresponds to the metric "Average Sale to List," and the third visualization recommendation 448-9 corresponds to the metric "Average Wind Speed." In this example, because the canvas is empty, and the card 124-5 is the first visualization card to be added to an initial scene 118-3, the computing device 200 (e.g., application 230) may suggest these metrics because they have higher variability compared to other metrics in the data source(s).

Figure 10E:
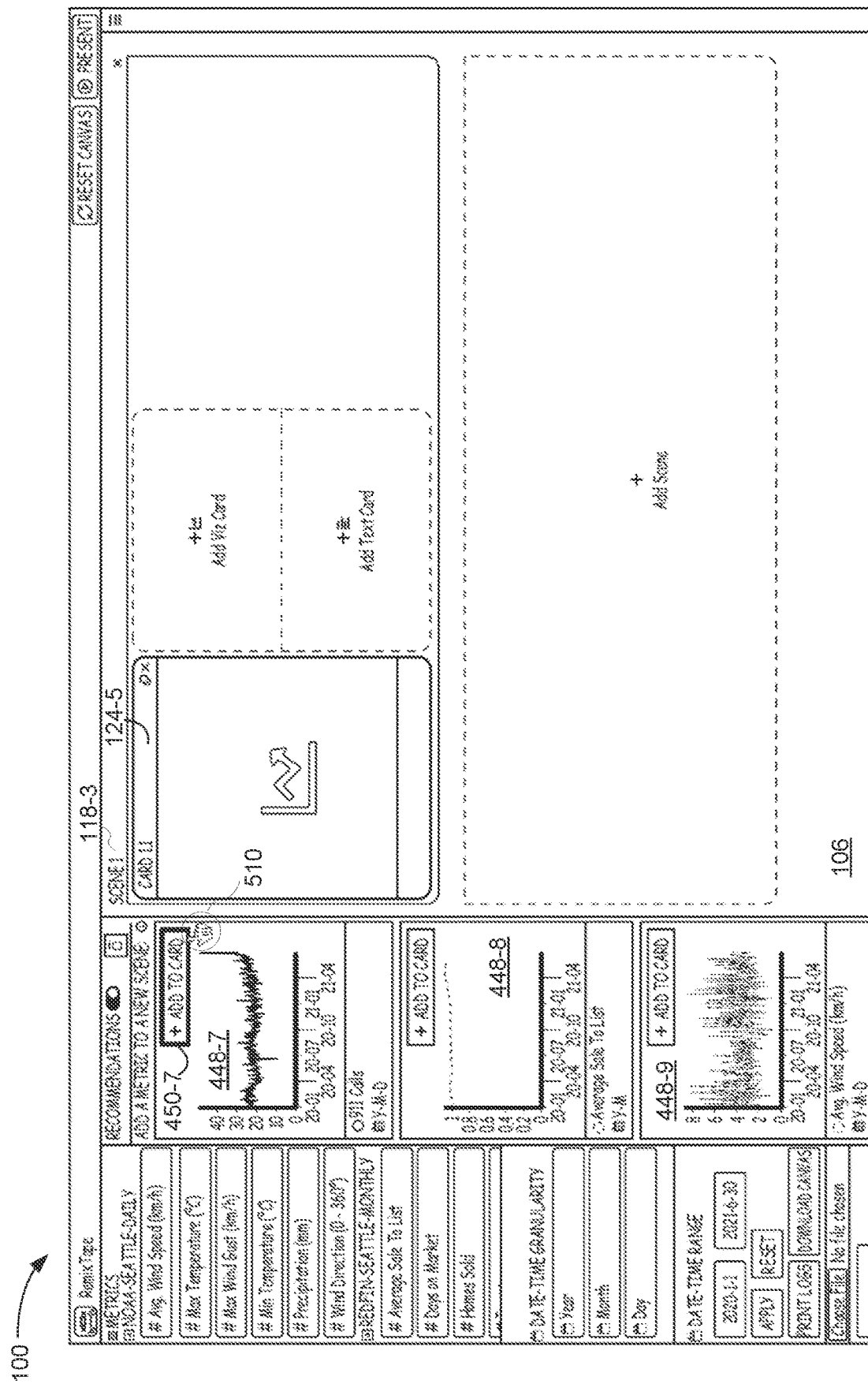
Figure 10F:
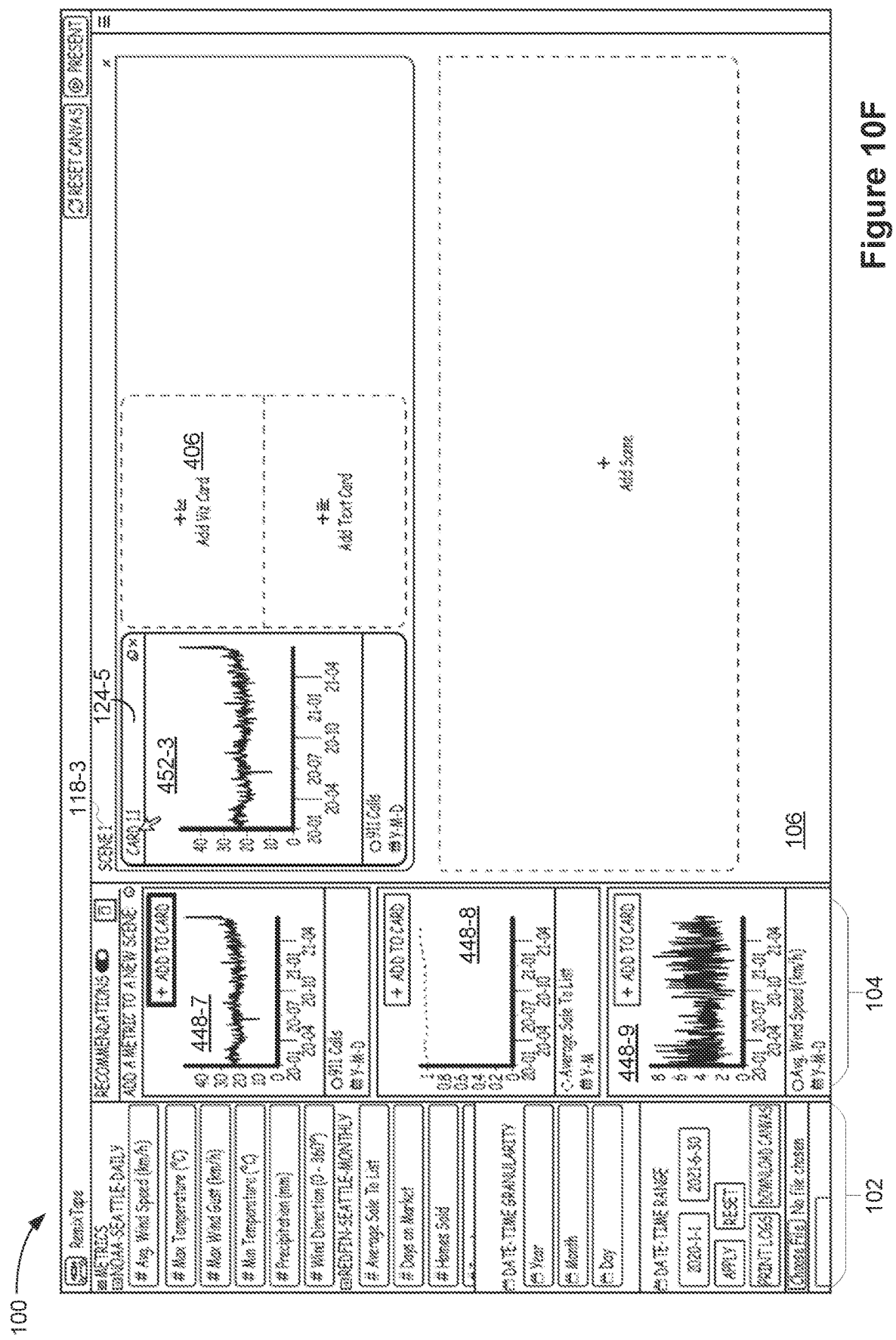

FIG. 10E illustrates user selection (510) of an add icon 450-7 (e.g., a button or a user-selectable interface element) to add the first visualization recommendation 448-7 to the visualization card 124-5. FIG. 10F illustrates that, in response to the user selection, the computing device 200 updates display of the visualization card 124-5 to include a data visualization 452-3, corresponding to the first visualization recommendation 448-7.

Figure 10G:
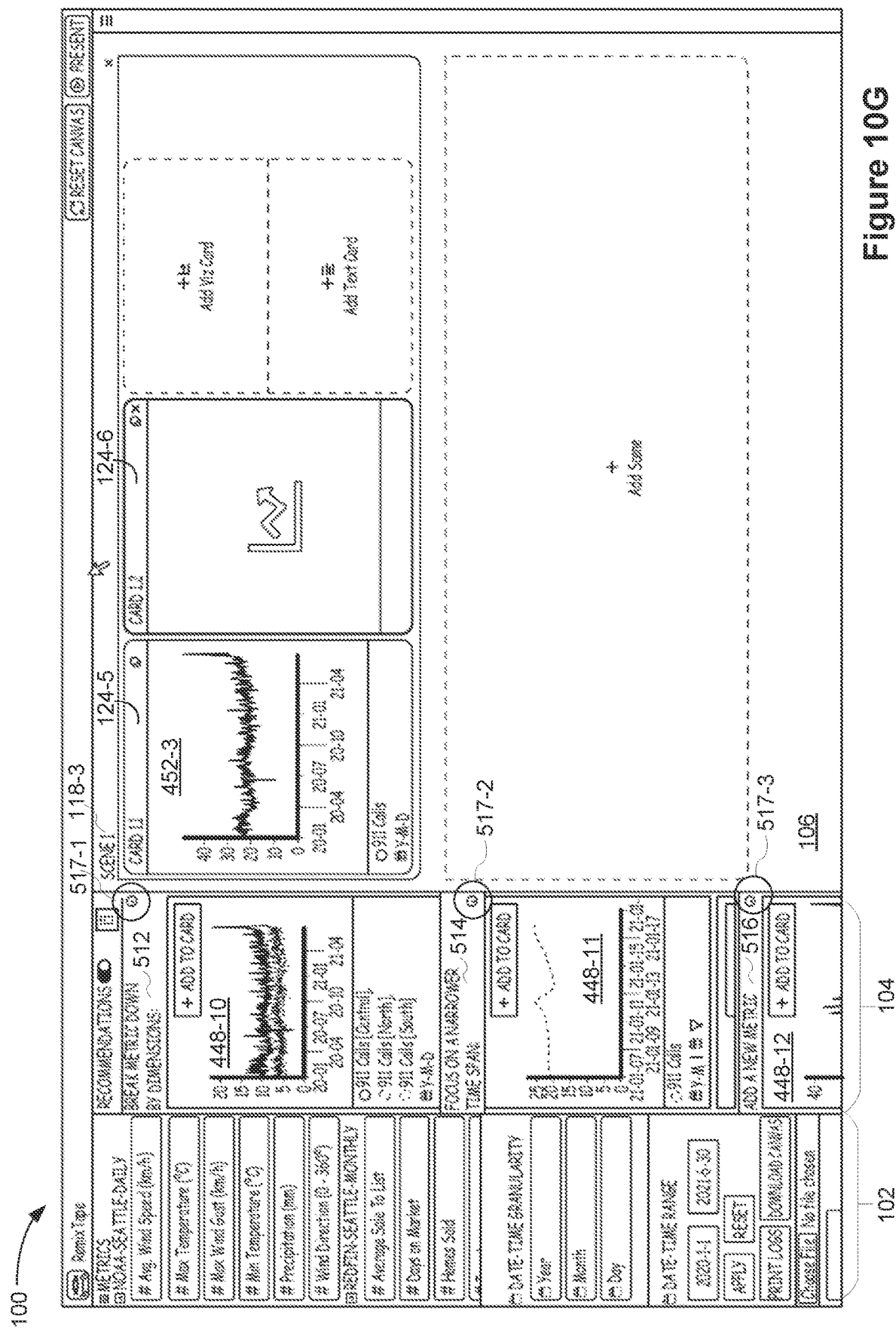

FIG. 10G illustrates that the graphical user interface 100 displays a second visualization card 124-6 (e.g., a blank card) adjacent to the visualization card 124-5. For example, in some implementations, the visualization card 124-6 is displayed in response to user selection of a the first option 406 (e.g., in FIG. 10E) to add a visualization card.

FIG. 10G illustrates that, in response to (e.g., concurrently with or simultaneously with) displaying the second visualization card 124-6, the graphical user interface 100 displays updated visualization recommendations (e.g., the visualization recommendations 448-10, 448-11, and 448-12) in the recommendation region 104.

In some implementations, as illustrated in FIG. 10G, the visualization recommendations are grouped into one or more categories, including a first category 512 (e.g., "Break metric down by dimensions"). In the example of FIG. 10G, the computing device 200 determines that the metric (e.g., "911 Calls") corresponding to the prior visualization card card 124-5 in the scene 118-3 corresponds to a categorical data field (e.g., a dimension data field). In some implementations, in accordance with this determination, the computing device 200 recommends breaking down the metric (e.g., "911 Calls") by data values (e.g., "Central," "North," and "South") of the categorical data field. Consequently, the computing device 200 provides a data visualization recommendation 448-10 that includes multiple lines, each of the lines corresponding to a respective data value of the categorical data field "911 Calls."

In some implementations, as illustrated in FIG. 10G, the visualization recommendations are grouped into one or more categories, including a second category 514 (e.g., "Focus on a narrower time span"). In the example of FIG. 10G, the first data visualization 452-3 has a temporal span from Jan. 1, 2020 to Jun. 30, 2021. The computing device 200 determines (e.g., using the peak detection algorithm described above) that the data visualization 452-3 has a peak around Jan. 13, 2021, and generates a visualization recommendation 448-11 with a narrower time span from Jan. 7, 2021 to Jan. 19, 2021 in accordance with the determination.

In some implementations, as illustrated in FIG. 10G, the visualization recommendations are grouped into one or more categories, including a third category 516 (e.g., "Add a new metric"). For example, in FIG. 10G, the computing device 200 determines that the first data visualization 452-3 in the prior visualization card 124-5 corresponds to the metric "911

Calls," and provides a visualization recommendation 448-12, corresponding to a different metric "Maximum Temperature."

In some implementations, as illustrated in FIG. 10G, each recommendation category includes an information icon 517 (e.g., an "i" icon or an information icon) that, when hovered over (e.g., via a mouse hover action), explains how the corresponding category of recommendations is generated.

Figure 10H:
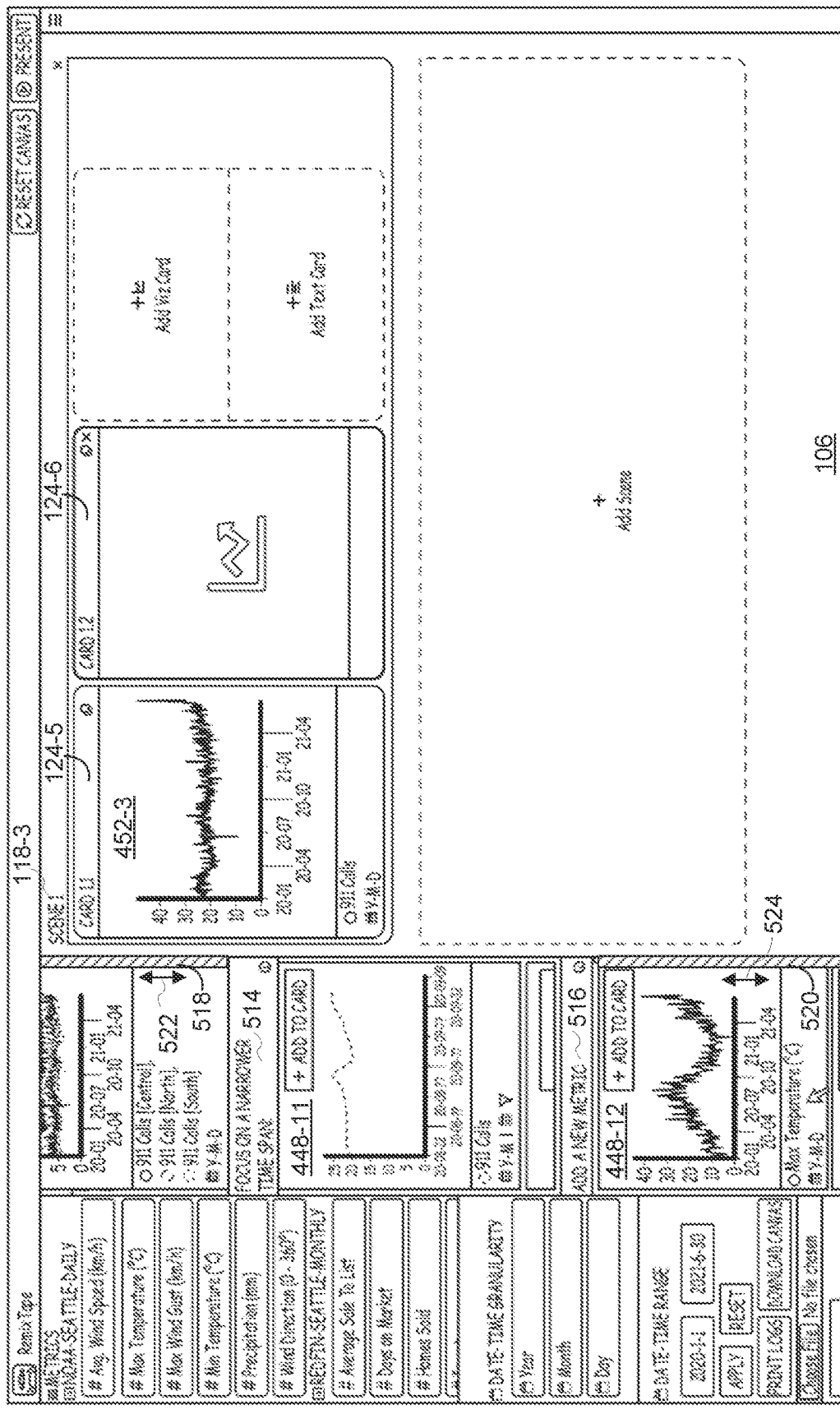
Figure 10I:
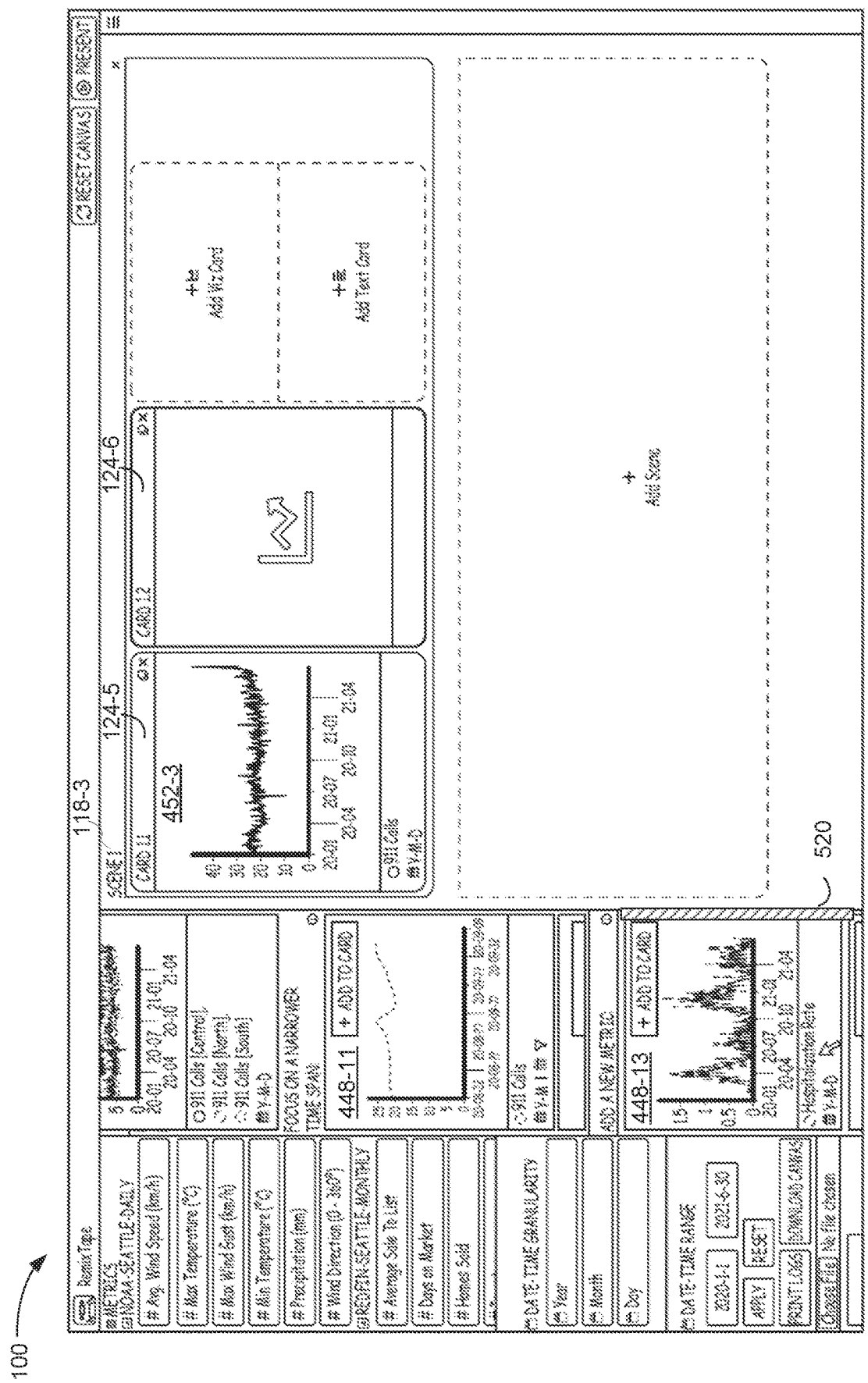

In some implementations, a respective category of the categories 512, 514, and 516 includes more than one visualization recommendation. In some implementations, the visualization recommendations are displayed as a scrollable list. FIG. 10H illustrates a user interaction with a first scroll bar 518 (e.g., a vertical scroll bar) to scroll the visualization recommendations in the first category 512 in an upward/downward direction 522. FIG. 10H illustrates another user interaction with a second scroll bar 520 (e.g., a vertical scroll bar), for scrolling visualization recommendations in the third category 516 in an upward/downward direction 524. FIG. 10I illustrates the graphical user interface 100 display another visualization recommendation 448-13, corresponding to the metric "Hospitalization Rate," in response to the interaction with the scroll bar 520.

Figure 10J:
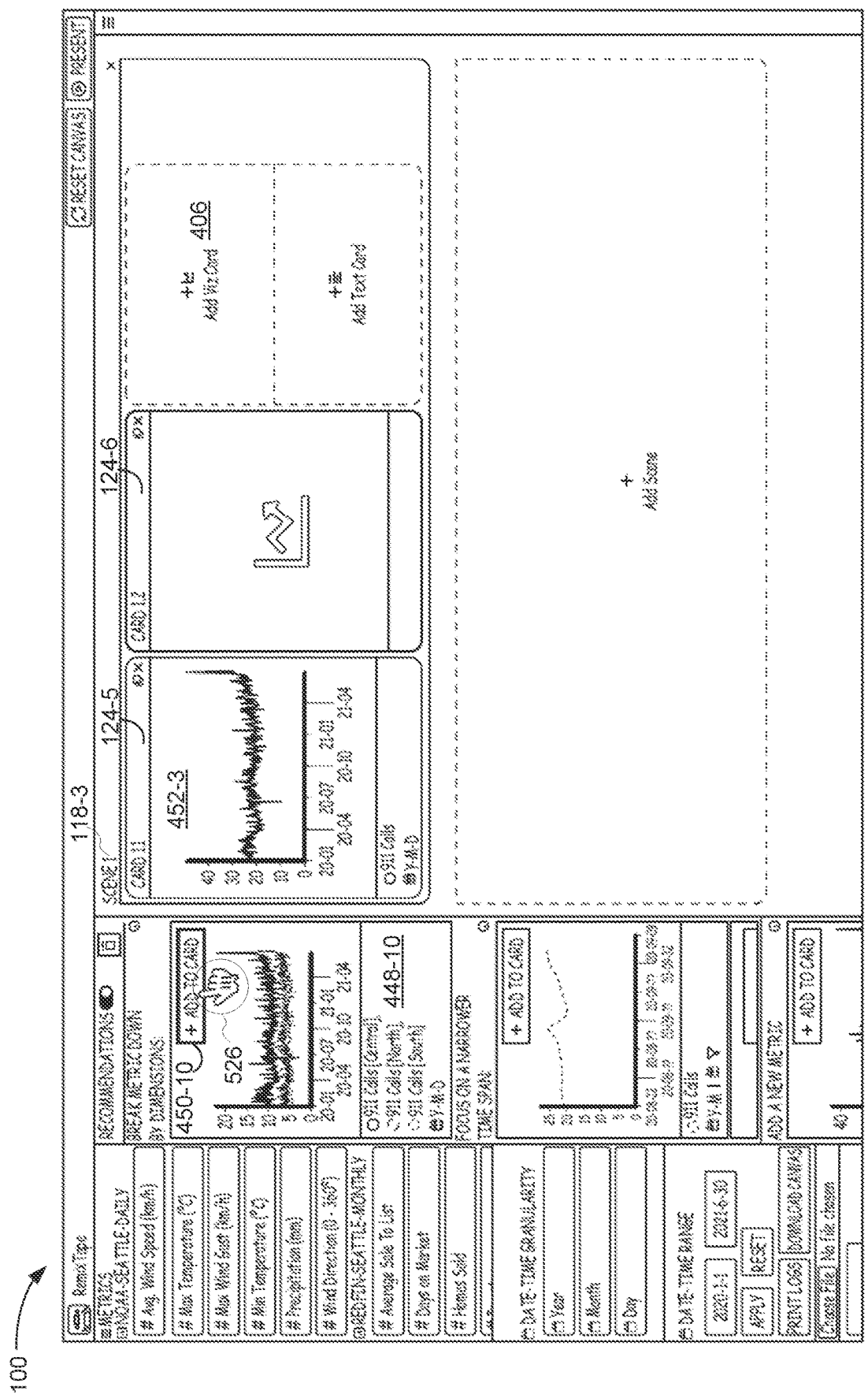

FIG. 10J illustrates user selection (526) of an add icon 450-10 (e.g., a button or a user-selectable interface element) to add the visualization recommendation 448-10 to the second visualization card 124-6.

Figure 10K:
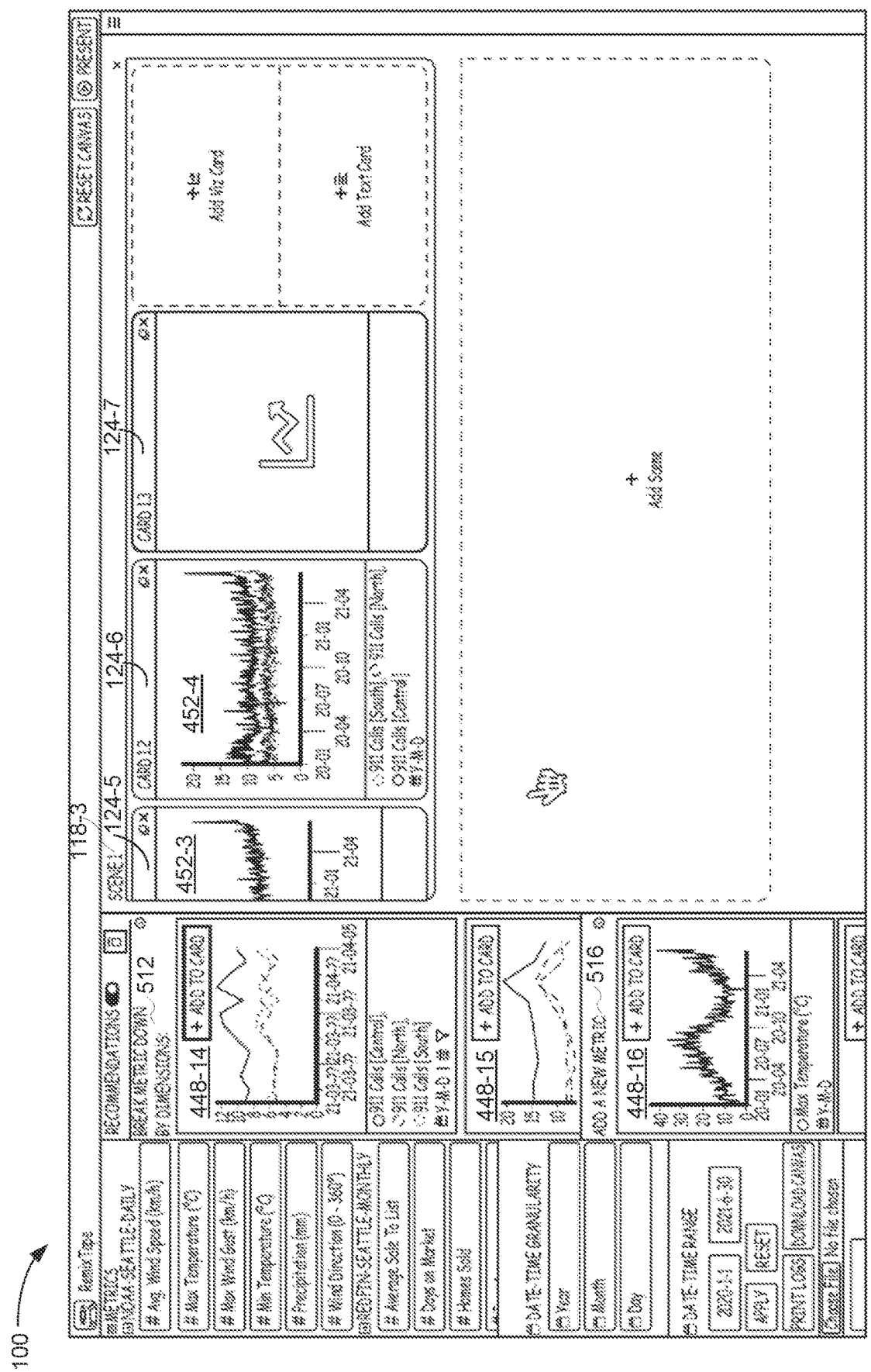

FIG. 10K illustrates that, in response to the user selection, the computing device 200 updates display of the second visualization card 124-6 to include a data visualization 452-4, corresponding to the visualization recommendation 448-10. FIG. 10K illustrates that the graphical user interface 100 displays a third visualization card 124-7 (e.g., a blank card) adjacent to the visualization card 124-6. For example, in some implementations, the visualization card 124-7 is displayed in response to user selection of a first option 406 (e.g., in FIG. 10J) to add a visualization card.

FIG. 10K also illustrates that, in response to displaying the blank visualization card 124-7, and in accordance with content (e.g., data visualizations 452-3 and 452-4) that is already in the scene 118-3 (and in the canvas region 106), the computing device 200 generates and displays updated visualization recommendations 448-14, 448-15, and 448-16 in the recommendation region 104.

E. Configuring Visualization Cards

RemixTape provides several ways for users to configure a data visualization after it has been added to a visualization card 124. These include: (1) transforming the x- or y-axis of the data visualization, (2) filtering the date/time range of the data visualization, (3) merging and superimposing adjacent visualization cards, and (4) annotating and/or obfuscating a visualization card. These are discussed in further detail below.

1. Axis Transformations

According to some implementations of the present disclosure, clicking on either axis within a visualization card 124 reveals controls for truncating and relativizing the value domains of the chart. The domain of the vertical axis can be toggled between the minimum and maximum values within the card or between zero and the maximum value. The vertical axis can also be indexed to a percentage scale relative to the first value appearing in the card. A relative transformation can also be applied to the horizontal axis, from absolute chronological dates to relative dates beginning from the first date appearing in the card.

FIGS. 11A to 11J provide a series of screen shots for interactions with a visualization card 124 that includes a data visualization 530, in accordance with some implementations. The visualization card 124 is included in a scene 118 in the graphical user interface 100.

Figure 11A:
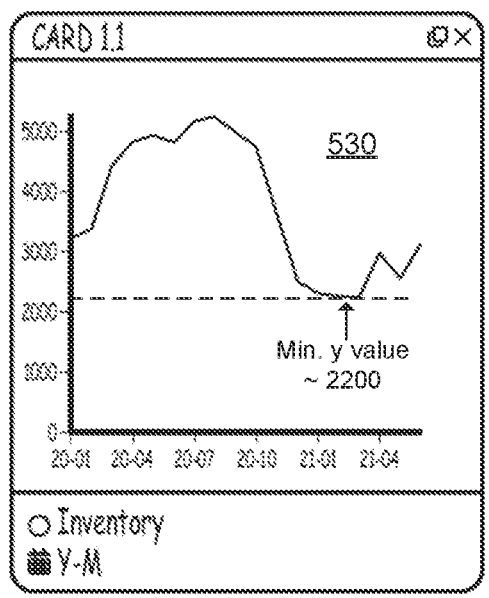
FIGS. 11A to 11J provide a series of screen shots for interactions with a visualization card, in accordance with some implementations.
Figure 11B:
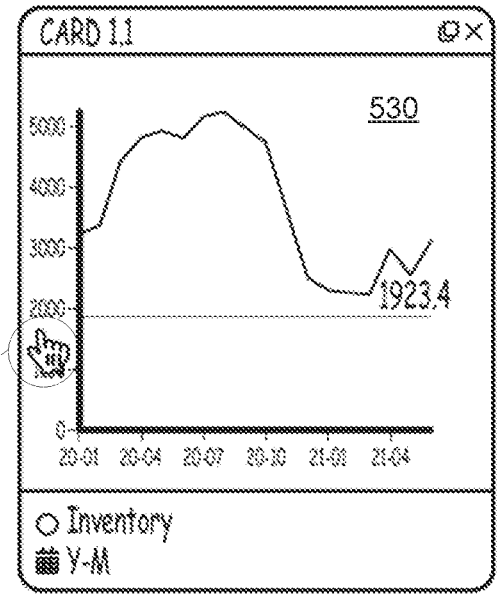

FIG. 11A illustrates that the visualization card 124 displays a data visualization 530. In this example, the data visualization 530 is a line chart depicting the monthly change in inventory from January 2020 to June 2021. FIG. 11B illustrates a user interaction (532) (e.g., mouse click) on the y-axis (i.e., the vertical axis) of the data visualization 530. According to some implementations, user selection of a viz card (e.g., by clicking on the data visualization's x-axis or y-axis) triggers axis actions.

Figure 11C:
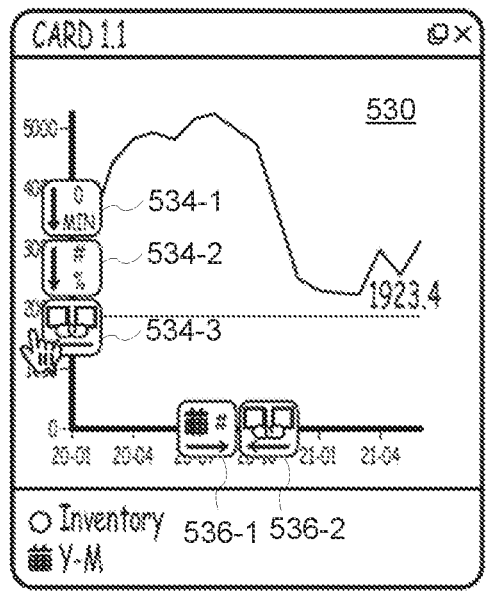

FIG. 11C illustrates that, in response to the user interaction, the visualization card 124 displays a y-axis group of icons 534 (e.g., buttons or user-selectable interface elements) on the y-axis (e.g., to transform the vertical scale). In some implementations, the y-axis group of icons 534 includes a first y-axis icon 534-1, which, when selected, toggles between a y scale (e.g., vertical scale) starting at zero and one starting at the minimum value. In some implementations, the y-axis group of icons 534 includes a second y-axis icon 534-2, which, when selected, toggles between an absolute y scale (e.g., a vertical scale having absolute values) and a relative y scale, relative to the earliest y value (e.g., first y value). In some implementations, the y-axis group of icons 534 includes a third y-axis icon 534-3 (e.g., a synchronization icon), which, when selected, synchronizes the vertical scale of the data visualization 530 with that of another data visualization that is displayed adjacent to (e.g., to the immediate left of, or to the immediate right of) the visualization card 124.

Presenting the user with the group of icons 534 assists the user in the process of transforming the value domains of a data visualization. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

FIG. 11C also illustrates that, in response to the user interaction, the visualization card 124 displays a group of icons 536 (e.g., buttons or user-selectable interface elements) on the x-axis (e.g., horizontal axis or temporal axis).

In some implementations, the group of icons 536 includes a left icon 536-1, which, when selected, toggles between an absolute time scale (e.g., having absolute dates) and a relative time scale where the x-axis values are in days (such as Day 1, Day 2, . . . ), months (e.g., Month 1, Month 2, . . . ), or Year (e.g., Year 1, Year 2, . . . ). In some implementations, the group of icons 536 includes a right icon 536-2 (e.g., a synchronization icon) that, when selected, synchronizes the horizontal scale (e.g., temporal scale or axis) of the data visualization 530 with that of another data visualization that is displayed adjacent to (e.g., to the immediate left of, or to the immediate right of) the visualization card 124.

Presenting the user with a group of icons (e.g., icons 536) assists the user in the process of transforming the value domains of a data visualization. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

In some implementations, the group of icons 534 for the y-axis and the group of icons 536 for the x-axis are simultaneously displayed in response to user selection of an axis (e.g., x-axis or y-axis). In some implementations, the group of icons 536 for the x-axis is displayed in response to user selection of the x-axis, and the y-axis group 534 is not displayed. In some implementations, the group of icons 534 for the y-axis is displayed in response to user selection of the y-axis, and the x-axis group 536 is not displayed.

Figure 11D:
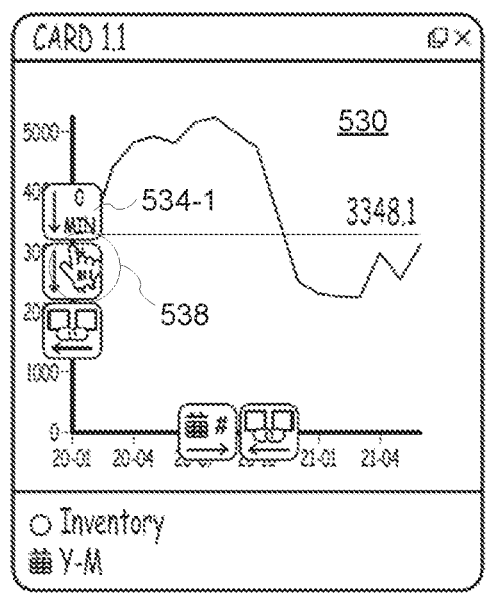
Figure 11E:
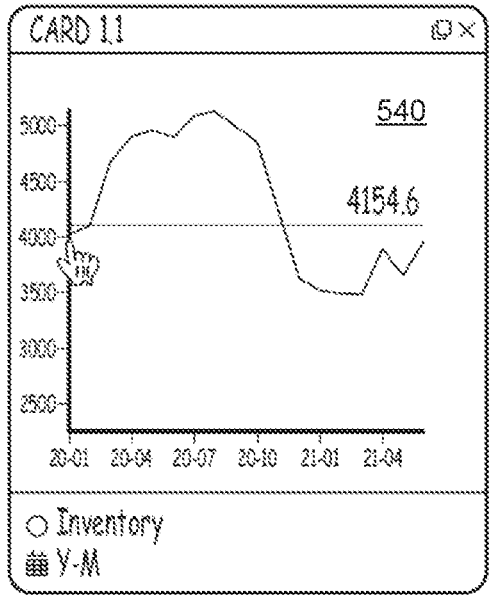

FIG. 11D illustrates user selection (538) of the first icon 534-1 in the y-axis group. FIG. 11E illustrates that, in response to the user selection, the graphical user interface 100 displays, in the visualization card 124, an updated data visualization 540 with a y-axis that starts at the minimum y value of ~2200 (contrast with FIG. 11A).

In some implementations, user selection of the x-axis or the y-axis of the updated data visualization 540 causes the y-axis group of icons 534 and/or the x-axis group of icons 536 to be displayed. A user can select the first icon 534-1 in the y-axis group to revert to the data visualization 530 (e.g., with a vertical scale starting at zero).

Figure 11F:
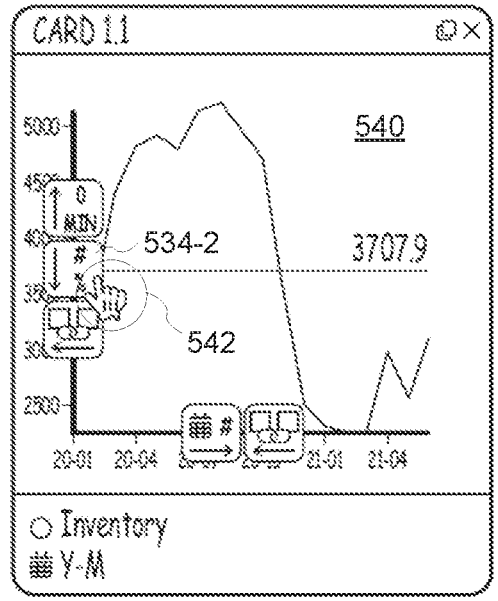
Figure 11G:
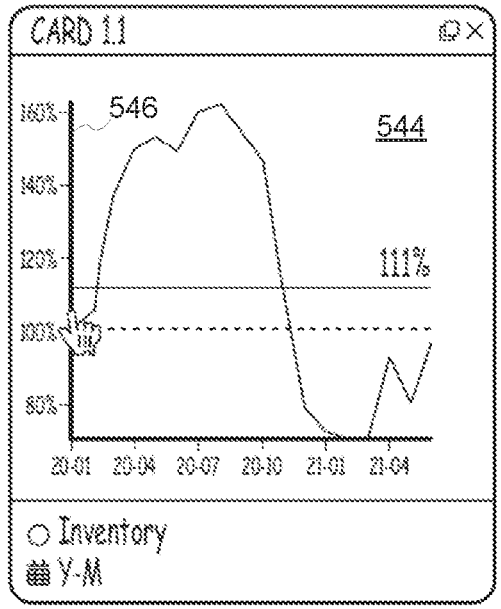

FIG. 11F illustrates user selection (542) of the second icon 534-2 in the by-axis group. FIG. 11G illustrates that, in response to the user selection, the graphical user interface 100 displays, in the visualization card 124, an updated data visualization 544 with a relative y scale (546) relative to the earliest y value (e.g., first y value). For example, the original data visualization 530 in FIG. 11A shows that the earliest y value (e.g., first y value) is ~3200. In the relativized scale, this earliest y value becomes 100% (or 1.0), and other y values in the data visualization 530 are relativized relative to the first of value of ~3200 (e.g., a value of ~6400 becomes 200% or 2.0, whereas a value of ~1600 becomes 50% or 0.5).

In some implementations, in response to user selection of the third y-axis icon 534-3, the computing device 200 synchronizes the y-axis of the first visualization card (e.g., the right viz card or Card 1.2) with the y-axis of the second visualization card (e.g., the left viz card or Card 1.1). Using consistent value domains across charts can enhance sequential narration and aid comprehension.

In some implementations, in response to user selection of the third y-axis icon 534-3, the computing device 200 synchronizes the y-axis of the first visualization card (e.g., the left viz card, or Card 1.1) with the y-axis of the second visualization card (e.g., the right viz card or Card 1.2). Using consistent value domains across charts can enhance sequential narration and aid comprehension.

In some implementations, when the y-axis of a first visualization card is synchronized with the y-axis of a second visualization card, the axes domains are equivalent in absolute units (e.g., not relative units).

Figure 11H:
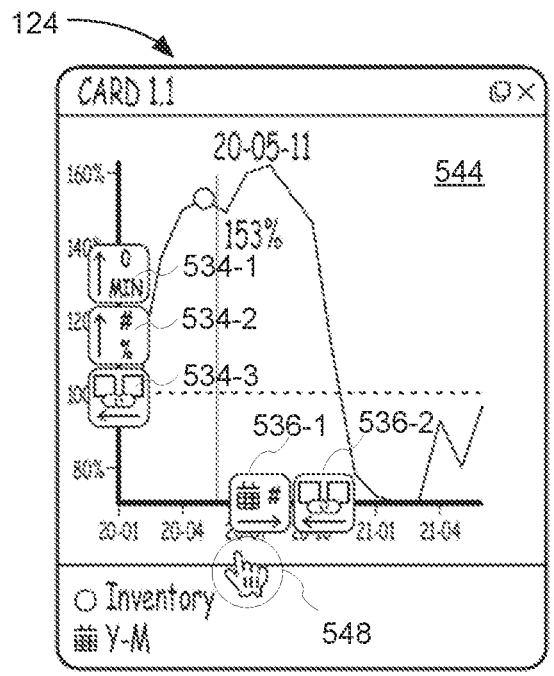
Figure 11I:
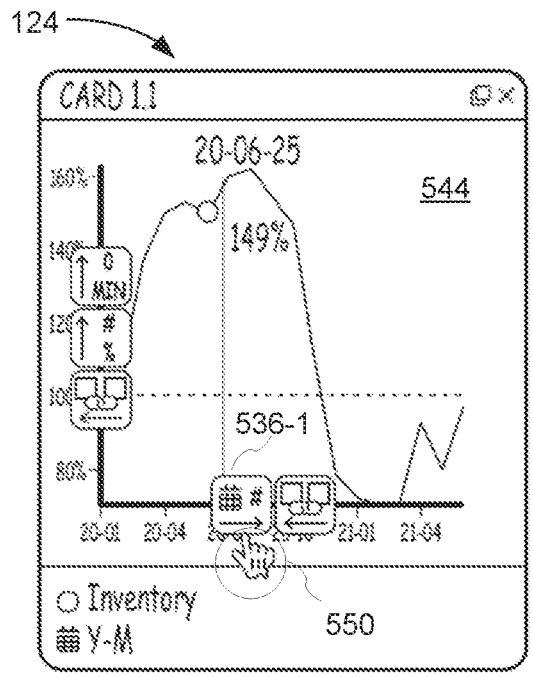
Figure 11J:
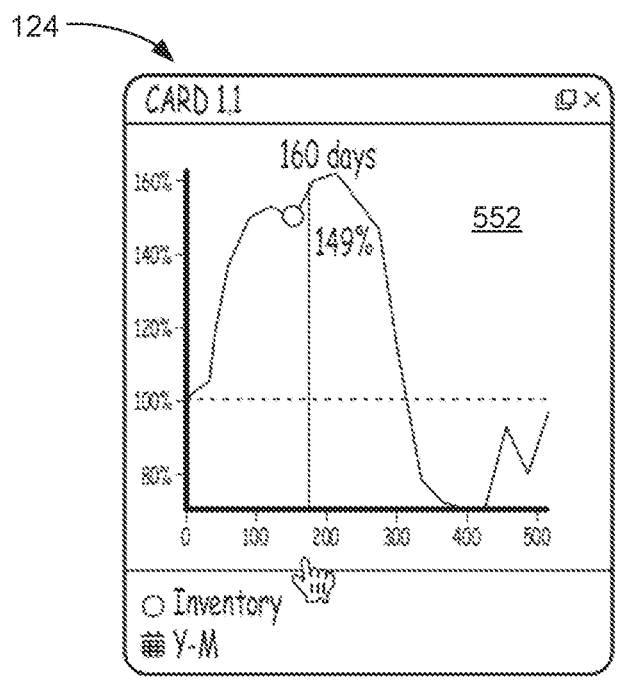

With continued reference to FIG. 11H, FIG. 11H illustrates user selection (548) of an axis (e.g., the x-axis) of the data visualization 544. FIG. 11H illustrates that, in response to the user selection, the computing device 200 displays the y-axis group of icons 534 adjacent to the vertical axis. The computing device 200 displays the x-axis group of icons 536 adjacent to the horizontal axis. FIG. 11I illustrates user selection (550) of the first icon 536-1 in the x-axis group. FIG. 11J illustrates that in response to the user selection, the graphical user interface 100 displays an updated data visualization 552 having an x-axis that is on a relative time scale. For example, the first x value (e.g., Jan. 1, 2020) that is shown in the data visualization 544 corresponds to Day 0 in the data visualization 552, and the date of Jan. 31, 2020 in the data visualization 544 corresponds to Day 30 in the data visualization 552.

In some implementations, in response to user selection of the second x-axis icon 536-2, the computing device 200 synchronizes the x-axis of a first visualization card (e.g., the right viz card or Card 1.2) with the x-axis of a second visualization card (e.g., the left viz card or Card 1.1) that immediately precedes the first visualization card. Using consistent value domains across charts can enhance sequential narration and aid comprehension.

In some implementations, in response to user selection of the second x-axis icon 536-2, the computing device 200 synchronizes the x-axis of the first visualization card (e.g., the left viz card or Card 1.1) with the x-axis of the second visualization card (e.g., the right viz card or Card 1.2) that immediately follows the first visualization card. Using consistent value domains across charts can enhance sequential narration and aid comprehension.

In some implementations, when the x-axis of a first visualization card is synchronized with the x-axis of a second visualization card, the axes domains are equivalent in absolute units (e.g., not relative units).

2. Filtering the Date-Time Range of a Visualization Card (e.g., Retain and Split)

In accordance with some implementations of the present disclosure, while the date/time range filter 112 in the data schema and filter panel 102 allows a user to constrain the temporal span of metrics before adding them to a visualization card, it is also possible at any time to change this date/time span after a visualization card has been populated with one or more metrics. Thus, the disclosed implementations provide a user with more flexibility for building presentations using data visualizations of variable date/time spans.

For example, in some implementations, clicking in the top margin of a visualization card reveals controls for splitting the temporal domain of a chart, including retaining data points either before or after the split point, or moving data points after the split point to a new visualization card. Similarly, dragging horizontally within the plane of the chart reveals controls to retain only the selected time span, or to exclude the selected span and retain the spans preceding and following it in two visualization cards.

In some implementations, after changing the temporal domain of a visualization card (e.g., as described above), the modified visualization card is annotated with one or more icons to indicate that temporal filtering has taken place. In some implementations, a filtered visualization card (e.g., a filtered data visualization) can be restored to the state it was in when it was first added to the canvas.

FIGS. 12A to 12J provide a series of screen shots for interactions with a visualization card according to some implementations.

Figure 12A:
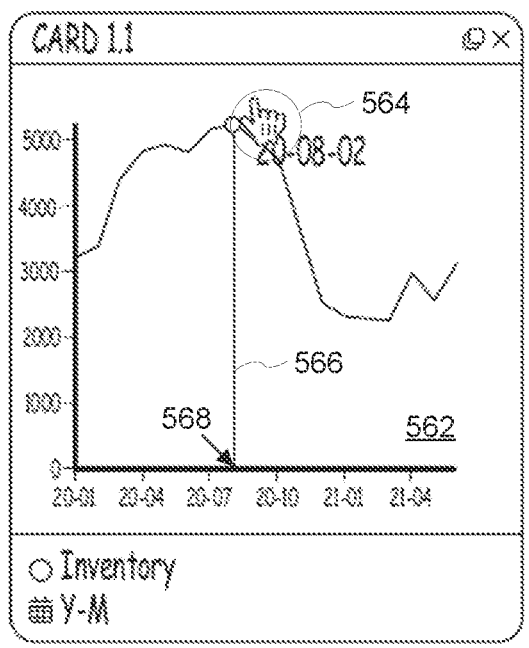
FIGS. 12A to 12K provide a series of screen shots for interactions with a visualization card according to some implementations.

FIG. 12A illustrates a visualization card 124 that is displayed on a graphical user interface 100, as part of a scene 118. FIG. 12A shows that the visualization card 124 includes (e.g., displays) a data visualization 562 (e.g., a line chart). FIG. 12A illustrates a user interaction (564) with a portion of the visualization card 124 (e.g., chart or data visualization 562). In this example, the user clicks on a top portion (e.g., region or margin) of the data visualization 562. FIG. 12A shows that, in some implementations, in response to the user interaction, the computing device 200 generates and displays a split line (e.g., a vertical line) 566 that extends vertically from the point of the mouse click to the x-axis (e.g., temporal axis or time axis). In the example of FIG. 12A, the split line 566 intersects the x-axis of the data visualization 562 at point 568.

Figure 12B:
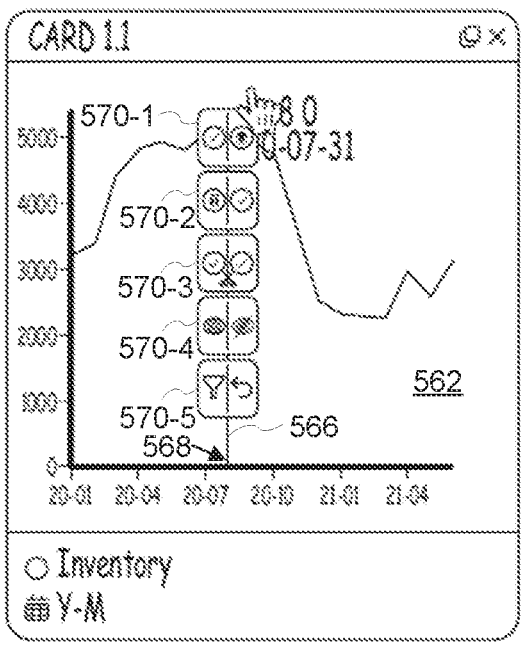

FIG. 12B illustrates that, in response to the user interaction, the computing device 200 displays (e.g., simultaneously or concurrently) a group of action icons 570 (e.g., buttons or user-selectable interface elements) on the visualization card 124, adjacent to the point of the mouse click. In some implementations, the group of action icons 570 includes a first action icon 570-1, which, when selected, retains data points of the data visualization 562 (e.g., on the visualization card 124) before (e.g., to the left of) the split point 568 (or split line 566). In some implementations, the group of action icons 570 includes a second action icon 570-2, which, when selected, retains data points of the data visualization 562 (e.g., on the visualization card 124) after (e.g., to the right of) the split point 568 (or split line 566). In some implementations, the group of icons 570 includes a third action icon 570-3, which, when selected, (i) retains data points of the data visualization 562 before the split point 568 on the same visualization card and (ii) displays data points of the data visualization 562 after the split point 568 on another visualization card (e.g., distinct from the visualization card 124). In some implementations, the group of action icons 570 includes a fourth action icon 570-4 (e.g., an open eye to the left of the dividing line and a crossed-out eye to the right), which, when selected, partially obfuscates a data visualization (e.g., it blurs out everything to the right of the cursor's vertical dividing line in the viz card). In some implementations, the group of action icons 570 includes a fifth action icon 570-5, which, when selected, restores a filtered visualization card to the state that it was in when it was first added to the canvas.

Presenting the user with a group of icons 570 assists the user in the process of retaining or splitting a data visualization on a visualization card. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

Figure 12C:
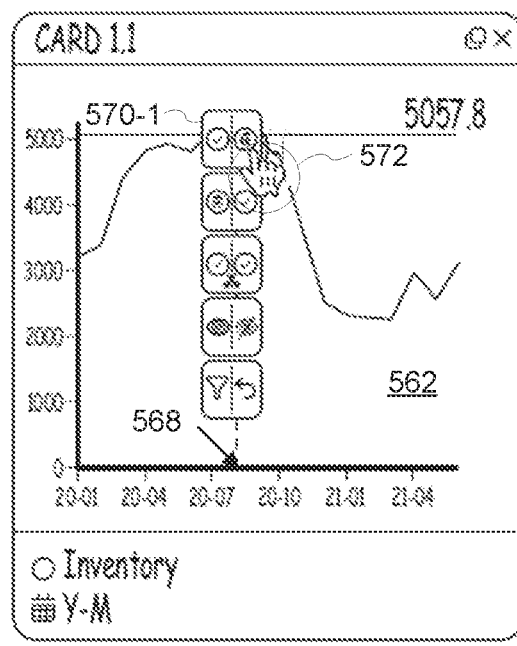
Figure 12D:
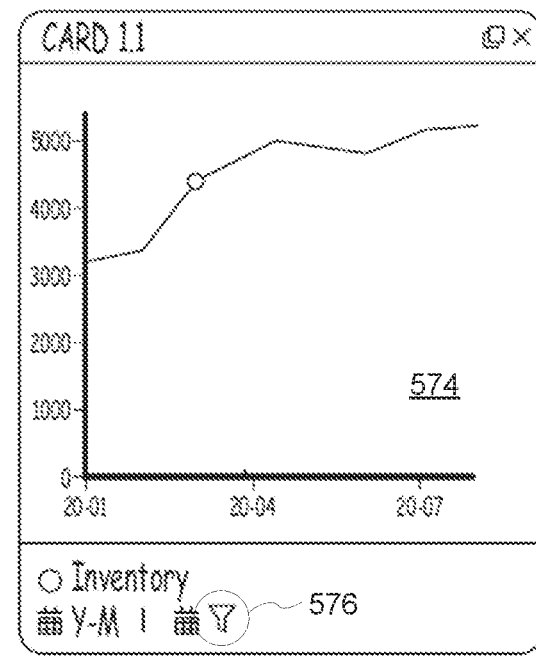

FIG. 12C illustrates user selection (572) of the first action icon 570-1. FIG. 12D illustrates that, in response to the user selection, the graphical user interface 100 displays, in the visualization card 124, an updated visualization 574 (e.g., a filtered visualization) with an x-axis domain corresponding to before the split point 568 (e.g., before August 2020). FIG. 12D also illustrates the visualization card 124 displays a filter icon 576 to indicate that temporal filtering has taken place.

Figure 12E:
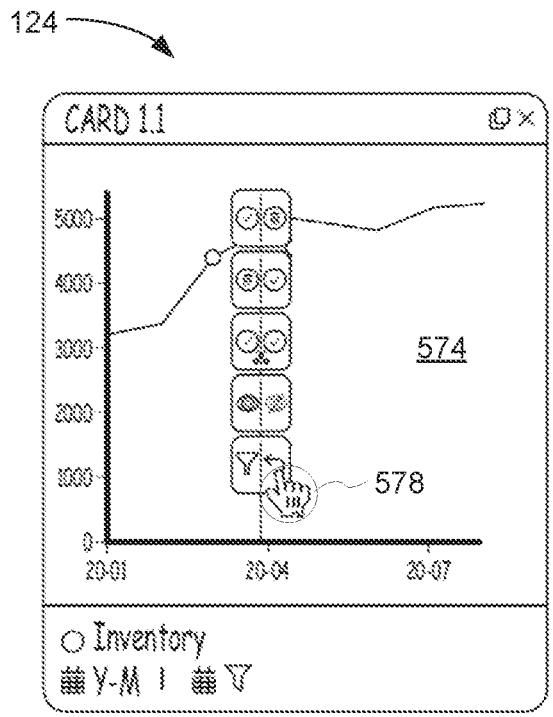
Figure 12F:
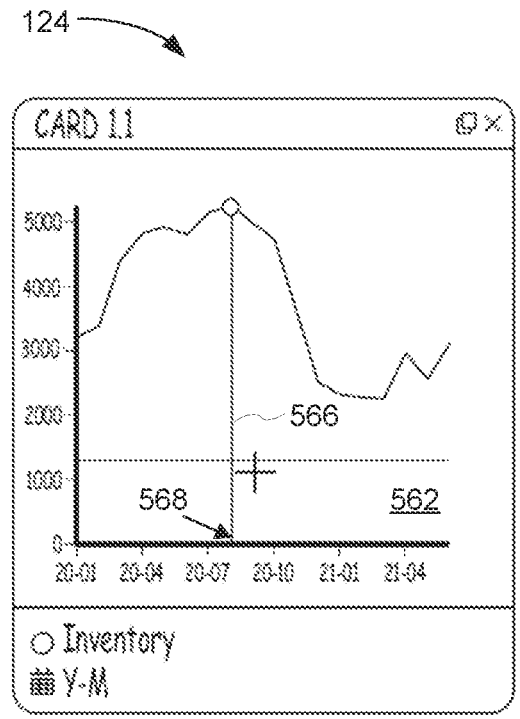

FIG. 12E illustrates user selection (578) of the fifth action icon 570-5. FIG. 12F illustrates that, in response to the user selection, the computing device 200 restores the filtered visualization 574 in FIG. 12F to the original visualization 562, which was the original state of the visualization when it was first added to the visualization card 124.

Figure 12G:
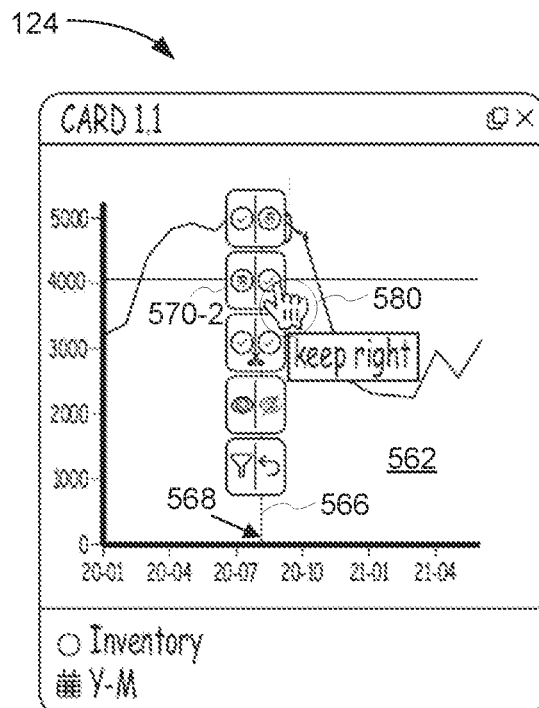
Figure 12H:
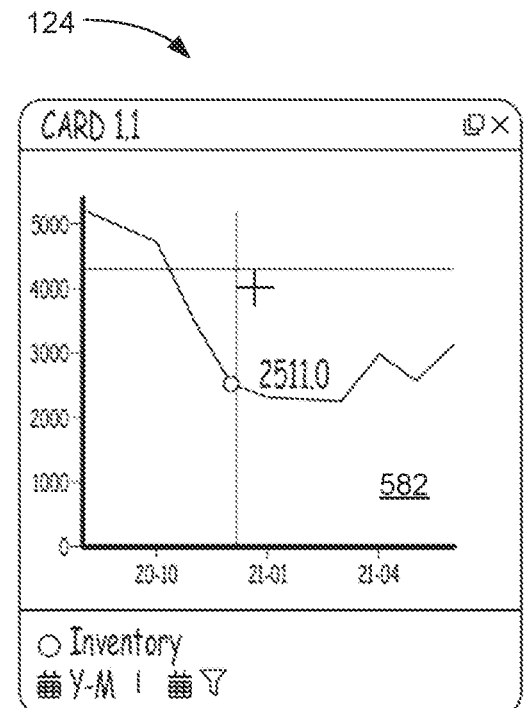

FIG. 12G illustrates another user interaction with the visualization 562. In this example, the user selects (580) the second action icon 570-2. FIG. 12H illustrates that, in response to the user selection, the graphical user interface 100 displays, in the visualization card 124, an updated visualization 582 (e.g., a filtered visualization) corresponding to the portion of the visualization 562 that is after the split point 568 (e.g., to the right of the split point 568 or the split line 566).

Figure 12I:
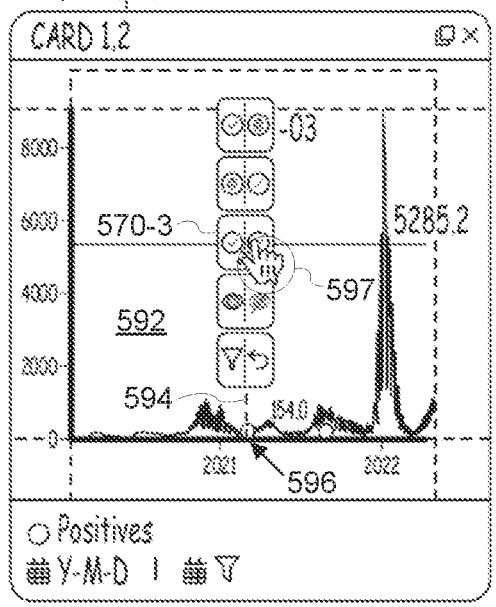
Figure 12J:
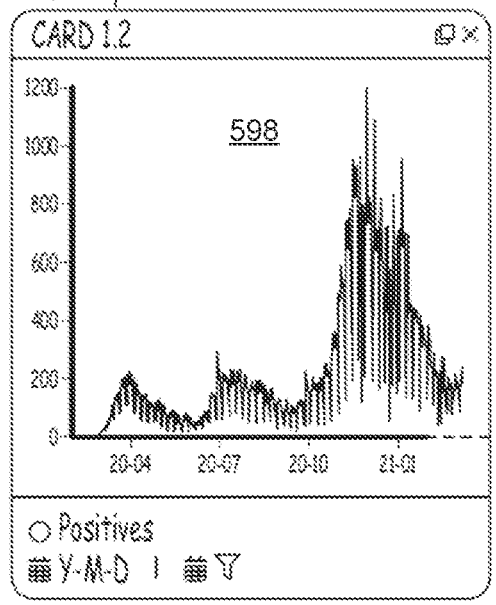
Figure 12K:
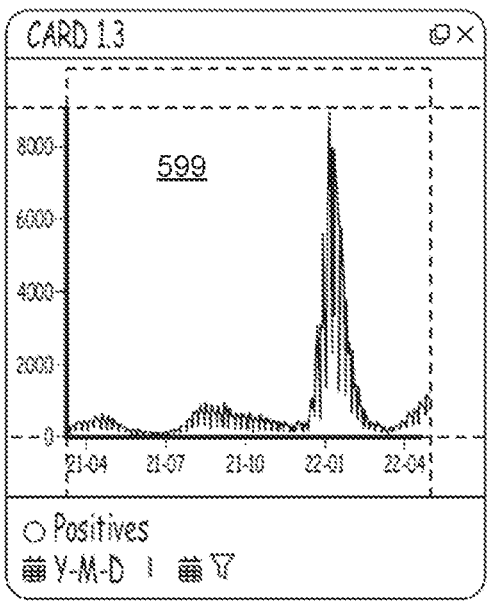

FIGS. 12I, 12J, and 12K illustrate user interaction with the third action icon 570-3. FIG. 12I shows a visualization card 124-1 that includes a data visualization 592. The data visualization 592 has a split line 594 and a split point 596. FIG. 12I illustrates user selection (597) of the third action icon 570-3. FIG. 12J illustrates that, in response to the user selection, the graphical user interface 100 displays, in the visualization card 124-1, an updated visualization 598 corresponding to the portion of the visualization 592 before the split point 596 (or the split line 594). FIG. 12K illustrates, in response to the user selection, the graphical user interface 100 displays (e.g., simultaneously with displaying the updated data visualization 598) an updated data visualization on another visualization card 124-2, adjacent to (e.g., to the right of) the visualization card 124-1. Stated another way, the computing device 200 splits the visualization 592 that was initially on the viz card 124-1 into two visualizations 598 and 599 on two adjacent cards 124-1 and 124-2.

FIGS. 13A to 13H provide a series of screen shots for interactions with a visualization card according to some implementations.

Figure 13A:
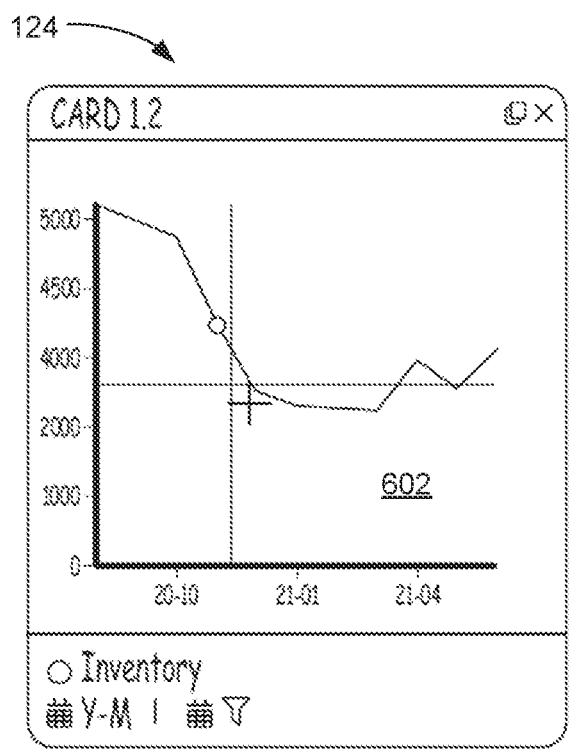
FIGS. 13A to 13H provide a series of screen shots for interactions with a visualization card according to some implementations.
Figure 13B:
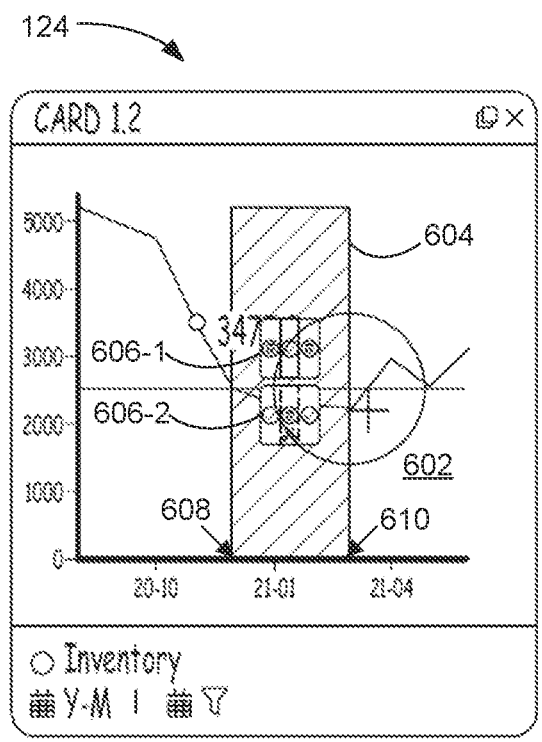

FIG. 13A illustrates a visualization card 124 that is displayed on a graphical user interface 100 as part of a scene 118. FIG. 13B illustrates a user interaction with the data visualization 602 from FIG. 13A. In this example, the user brushes the data visualization 602 by holding and dragging (e.g., horizontally) a mouse over the data visualization 602. FIG. 13B illustrates a brushed area 604 (e.g., a region or an area) is specified (e.g., highlighted or selected) in accordance with the user interaction. The brushed area 604 specifies (e.g., includes) a first date/time value 608 (e.g., defined by an intersection of the brushed area 604 with the x-axis of the data visualization 602) and specifies (e.g., includes) a second date/time value 610 (e.g., defined by an intersection of the brushed area 604 with the x-axis of the data visualization 602).

FIG. 13B illustrates that, in some implementations, in response to the user interaction, the computing device 200 displays a group of brushing icons 606 (e.g., buttons or user-selectable interface elements) on the visualization card 124. In some implementations, the group of brushing icons 606 includes a first brushing icon 606-1, which, when selected, retains (e.g., keeps) a portion of the data visualization 602 within the brushed area. In some implementations, the group of brushing icons 606 includes a second brushing icon 606-2, which, when selected, retains (e.g., keeps) portions of the data visualization 602 that are outside the brushed area 602.

Presenting the user with a group of brushing icons 606 assists the user in the process of retaining or splitting a data visualization on a visualization card. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

Figure 13C:
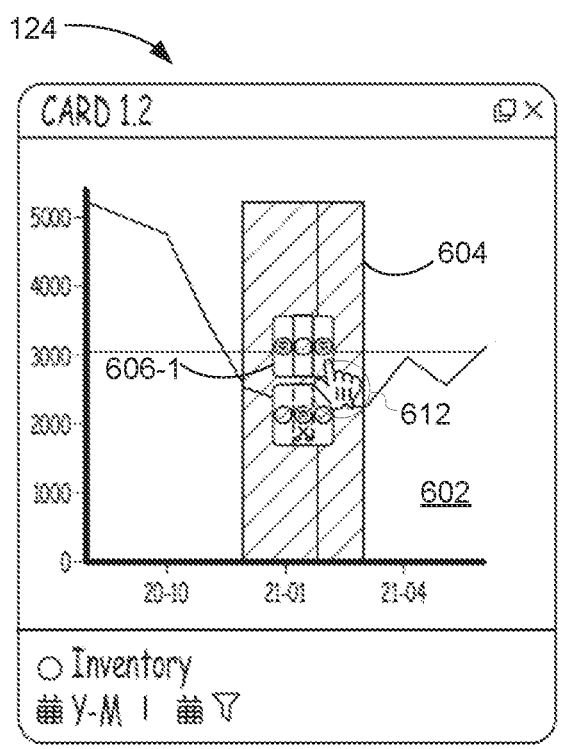
Figure 13D:
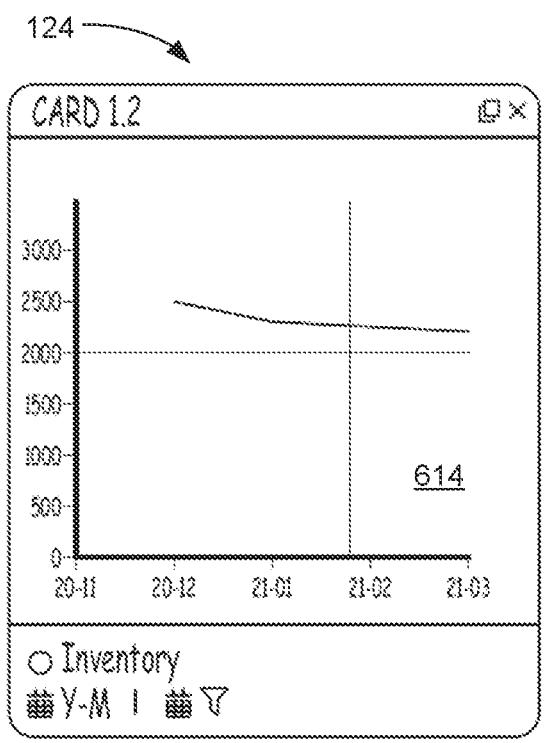

FIG. 13C illustrates user selection (612) of the first brushing icon 606-1. FIG. 13D illustrates that, in response to the user selection, the graphical user interface 100 updates the display of the visualization card 124 to include an updated (e.g., filtered) data visualization 614, corresponding to the portion of the data visualization 604 within the brushed area 604.

Figure 13E:
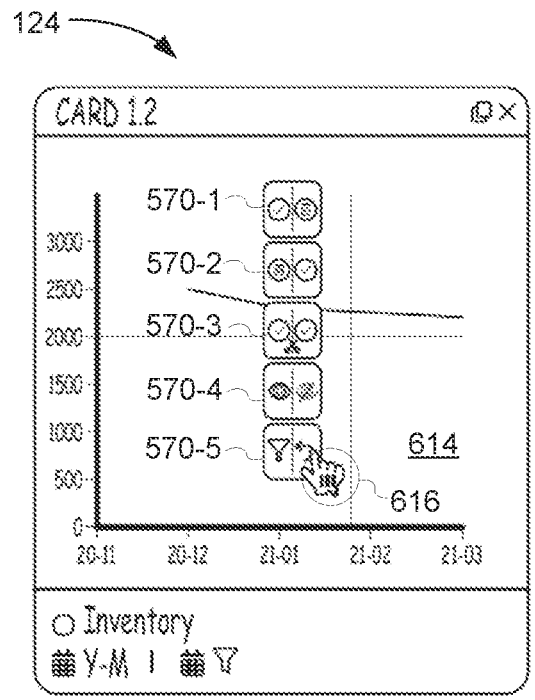
Figure 13F:
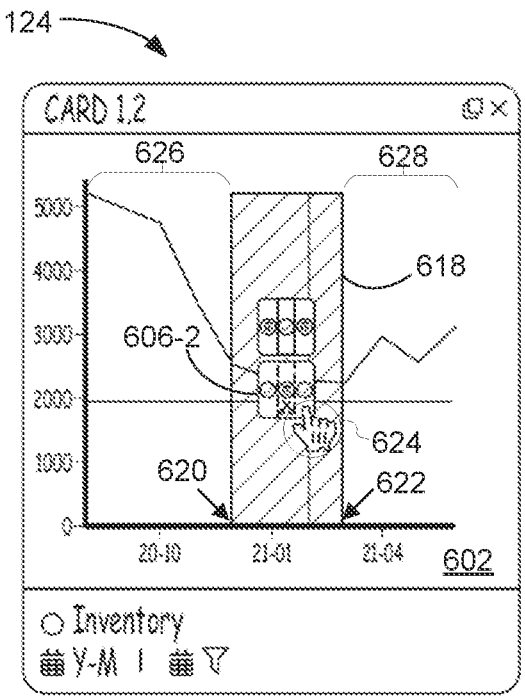

FIG. 13E illustrates another user interaction with the visualization card 124. In this example, the user clicks on a portion of the data visualization 614. FIG. 13E illustrates that, in response to the user interaction, the graphical user interface 100 displays a group of action icons 570 (e.g., icons 570-1, 570-2, 570-3, 570-4, and 570-5), which has been previously described in FIG. 12B and will not be repeated for the sake of brevity. FIG. 13E illustrates user selection (616) of the fifth action icon 570-5. FIG. 13F illustrates that, in response to the user selection, the data visualization that is displayed in the visualization card 124 returns (e.g., restores) to the initial data visualization 602.

FIG. 13F also illustrates user interaction (624) with the data visualization 602. In this example, the user brushes the data visualization 602 by holding and dragging (e.g., horizontally) a mouse over the data visualization 602. FIG. 13F shows a brushed area 618 that is specified in accordance with the user interaction. The brushed area 618 intersects the x-axis of the data visualization 602 at a first date/time value 620 and a second date/time value 622. FIG. 13F also illustrates user selection of the icon 606-2.

Figure 13G:
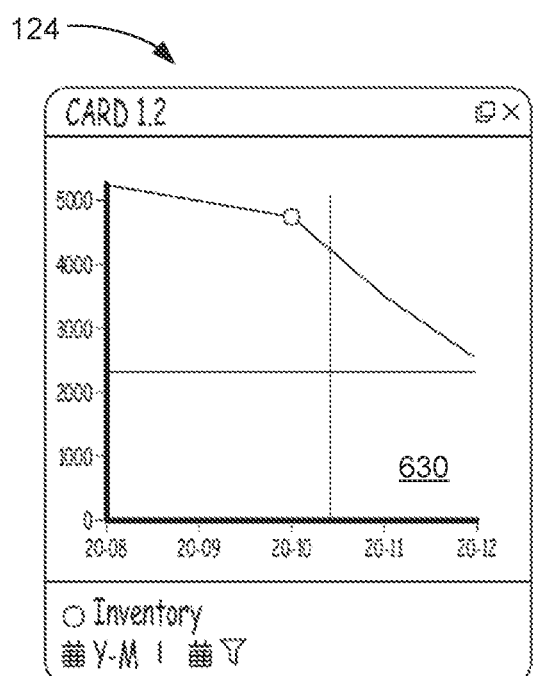
Figure 13H:
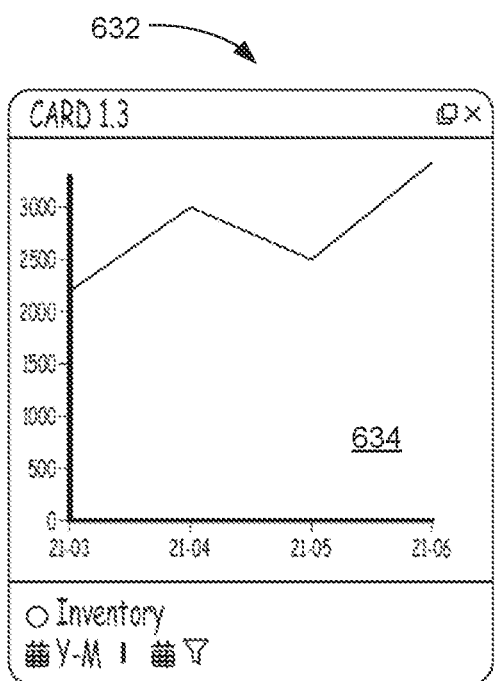

FIGS. 13G and 13H illustrate that in response to the user selection, the graphical user interface 100 updates display of the visualization card 124 to include an updated (e.g., filtered) data visualization 630, corresponding to the left outer portion 626 of the data visualization 602 as shown in FIG. 13F. The graphical user interface 100 displays an additional visualization card 632 adjacent to the visualization card 124. The graphical user interface 100 displays, in this additional visualization card 632, a data visualization 634 corresponding to the right outer portion 628 of the data visualization 602 as shown in FIG. 13F.

3. Merging and Superimposing Adjacent Visualization Cards

According to some implementations of the present disclosure, RemixTape provides an option to superimpose (e.g., merge) a pair of adjacent visualization cards when compatible.

While juxtaposing viz cards (e.g., displaying them side-by-side) is one approach to comparing metrics, a second approach is to combine multiple metrics into a multi-series line chart within a single viz card. Drawing upon the idea of semantic snapping, when two chart cards are juxtaposed, RemixTape presents an option to merge them if the charts share a comparable value domain and time range.

FIGS. 14A to 14H provide a series of screen shots for interactions with a visualization card according to some implementations.

FIG. 14A illustrates a partial view of a graphical user interface 100 that includes a scene 118-1. The scene 118-1 includes a first visualization card 124-1 having a first data visualization 642. In this example, the first data visualization 642 is a graph of maximum temperature over time. The first data visualization 642 has x values (e.g., time values) ranging from January 2020 to ~June 2021. The first data visualization 642 has y values (e.g., vertical values or maximum temperature values) ranging from ~0° C. to ~40° C. The scene 118-1 includes a second visualization card 124-2, adjacent to the first visualization. The second visualization card 124-2 includes a second data visualization 644 showing precipitation over time. The data visualization 644 has x values ranging from January 2020 to ~June 2021. The data visualization 644 has y values ranging from ~0 mm to ~50 mm.

In the example of FIG. 14A, the first data visualization 642 has an x domain that substantially overlaps with that of the second data visualization 644. The first data visualization 642 has y values (e.g., maximum temperatures) that substantially overlaps with those of the second data visualization 644. In some implementations, in accordance with a determination that two adjacent viz cards have an overlapping x domain, and/or an overlapping y domain, and/or a y-domain that spans the same order of magnitude, the graphical user interface 100 displays a merge icon 646 (e.g., a button, an affordance, or a selectable interface element) that, when selected by a user, superimposes (e.g., merges or combines) data visualizations that are on adjacent viz cards onto one visualization card.

FIG. 14A illustrates user selection (648) of the merge icon 646. FIG. 14B illustrates that, in response to the user selection, the graphical user interface 100 displays, in the visualization card 124-1, a data visualization 648 that includes two lines, corresponding to maximum temperature over time and precipitation over time. The visualization card 124-1 displays a legend 650 that defines features in the data visualization 648. In some implementations the two graphics are distinguished by color or other visual characteristics.

FIGS. 14C to 14H illustrate user interactions with data visualizations whose y values do not overlap. According to some implementations of the present disclosure, when one or more series of values exhibit a different value domain or unit of measure relative to what is already displayed in the chart, RemixTape prevents authors from creating graphs of dual y-axes. Instead, it opts for the creation of indexed line charts. The rationale is that dual-axis charts can elicit erroneous value judgments.

Figure 14C:
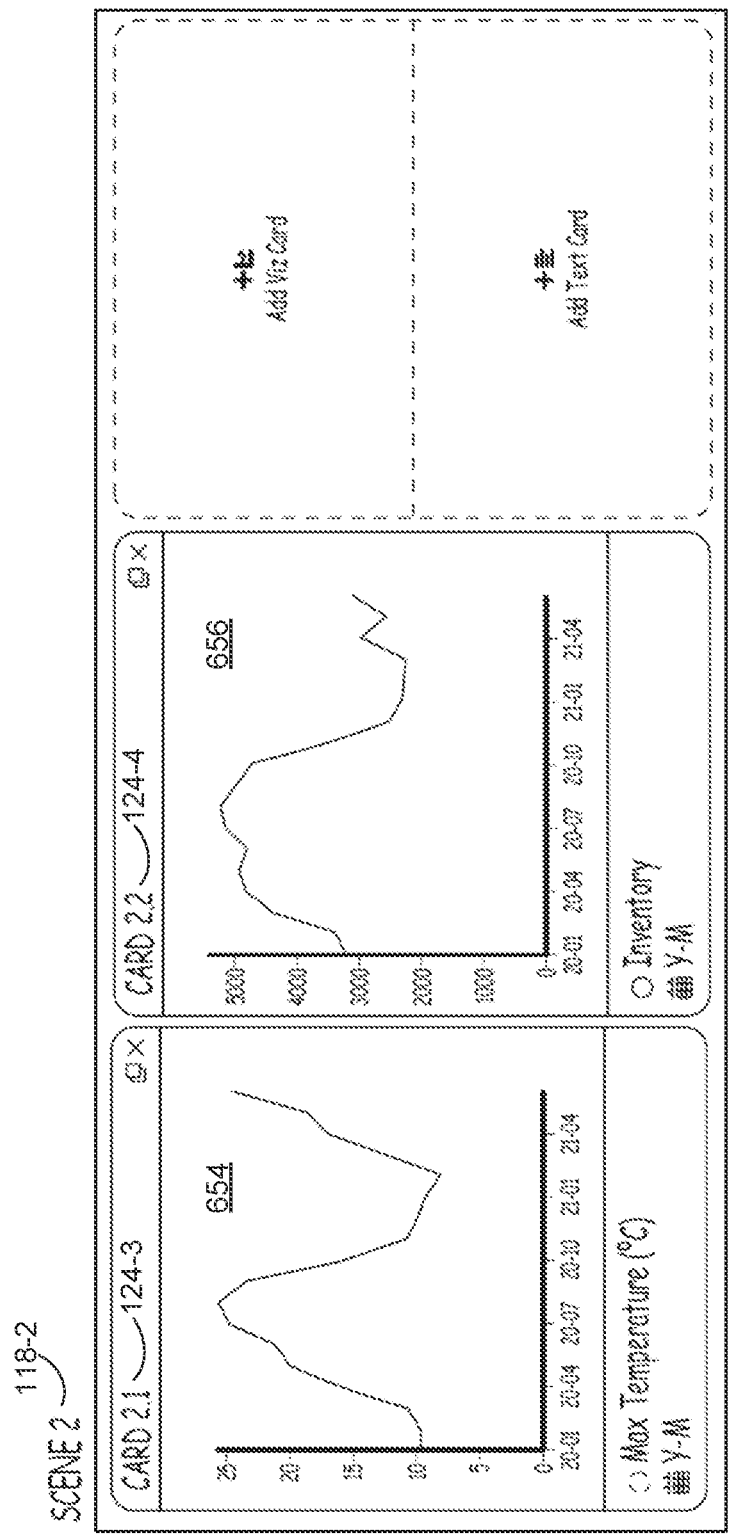

FIG. 14C illustrates a partial view of a graphical user interface 100 that includes a scene 118-2. The scene 118-2 includes a first visualization card 124-3 having a first data visualization 654. The scene 118-2 includes a second visualization card 124-4, adjacent to the visualization card 124-4. The second visualization card 124-4 includes a second data visualization 656.

In the example of FIG. 14C, the data visualization 654 is a graph of maximum temperature over time, with y values (maximum temperatures) ranging from ~5° C. to ~25° C. The data visualization 656 is a graph of inventory over time, with y values (maximum temperatures) ranging from ~2000 to 5000 units. The y values of the first data visualization 654 do not overlap with the y values of the second data visualization 656.

Figure 14D:
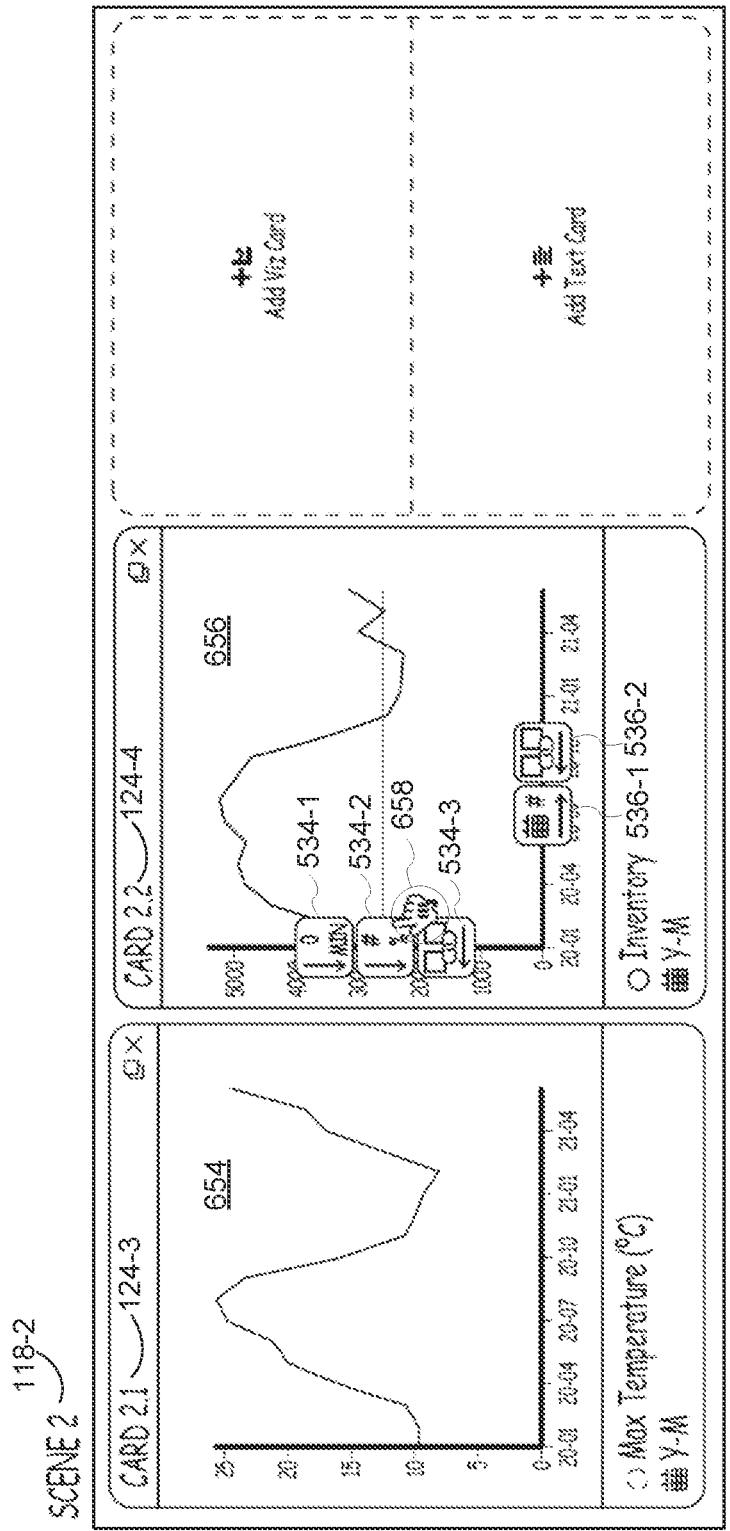
Figure 14E:
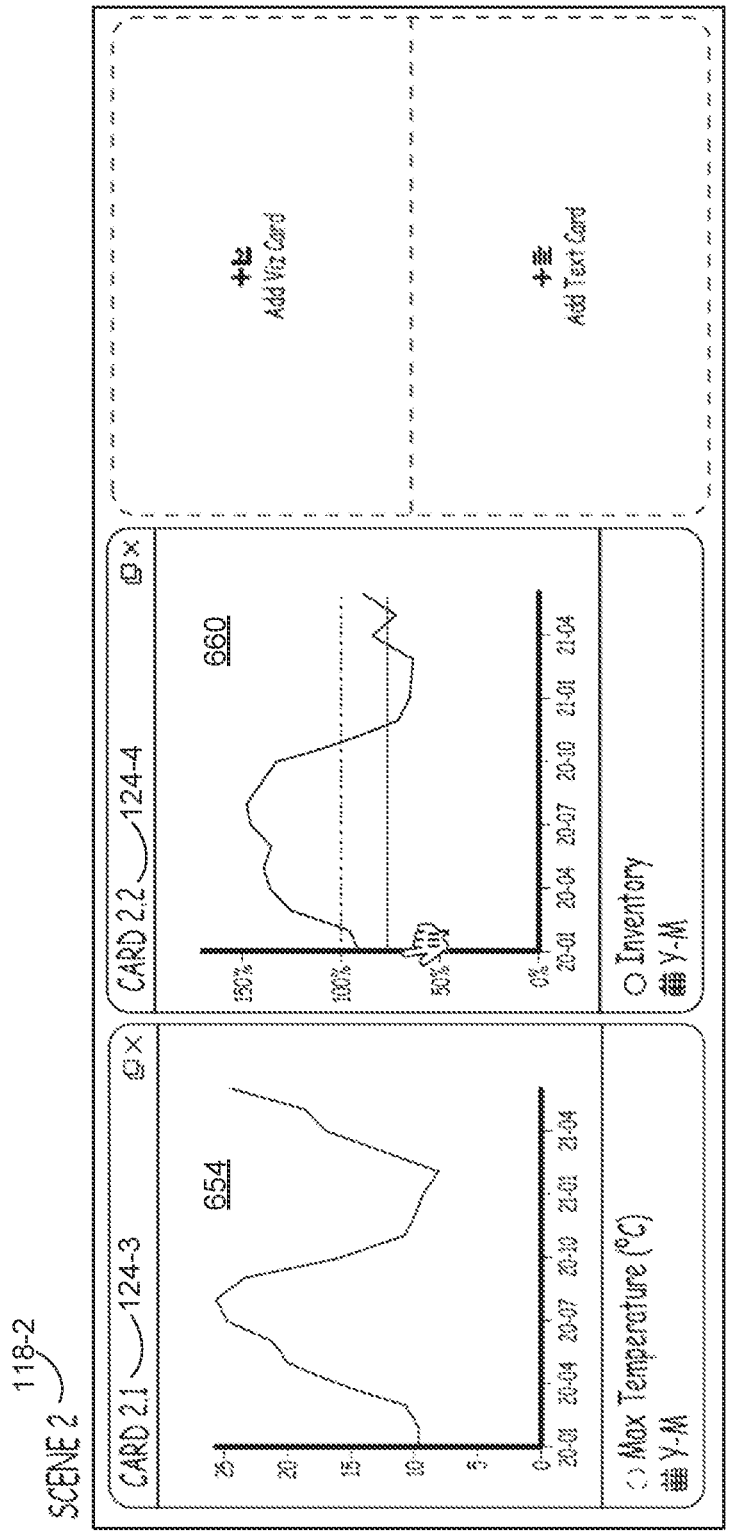
Figure 14F:
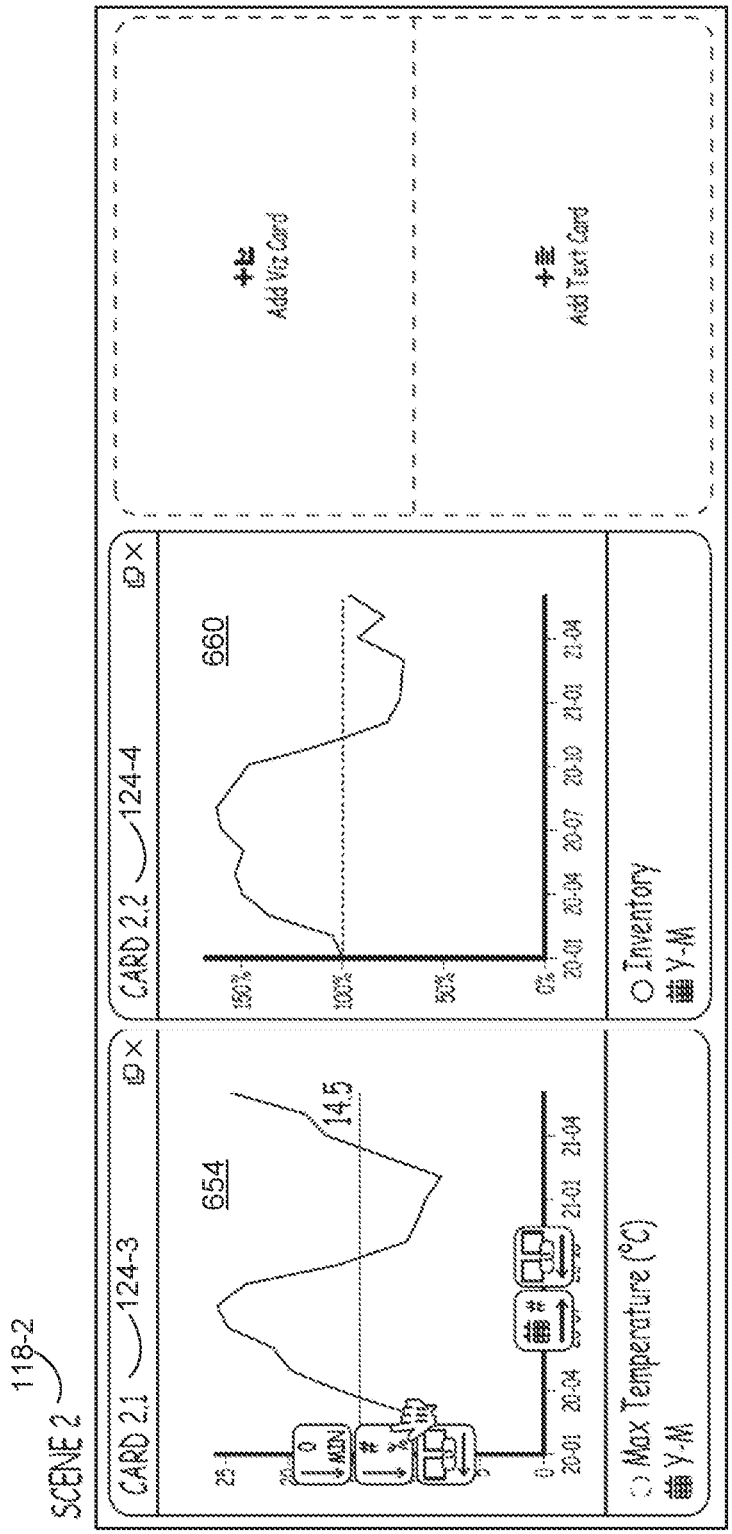
Figure 14G:
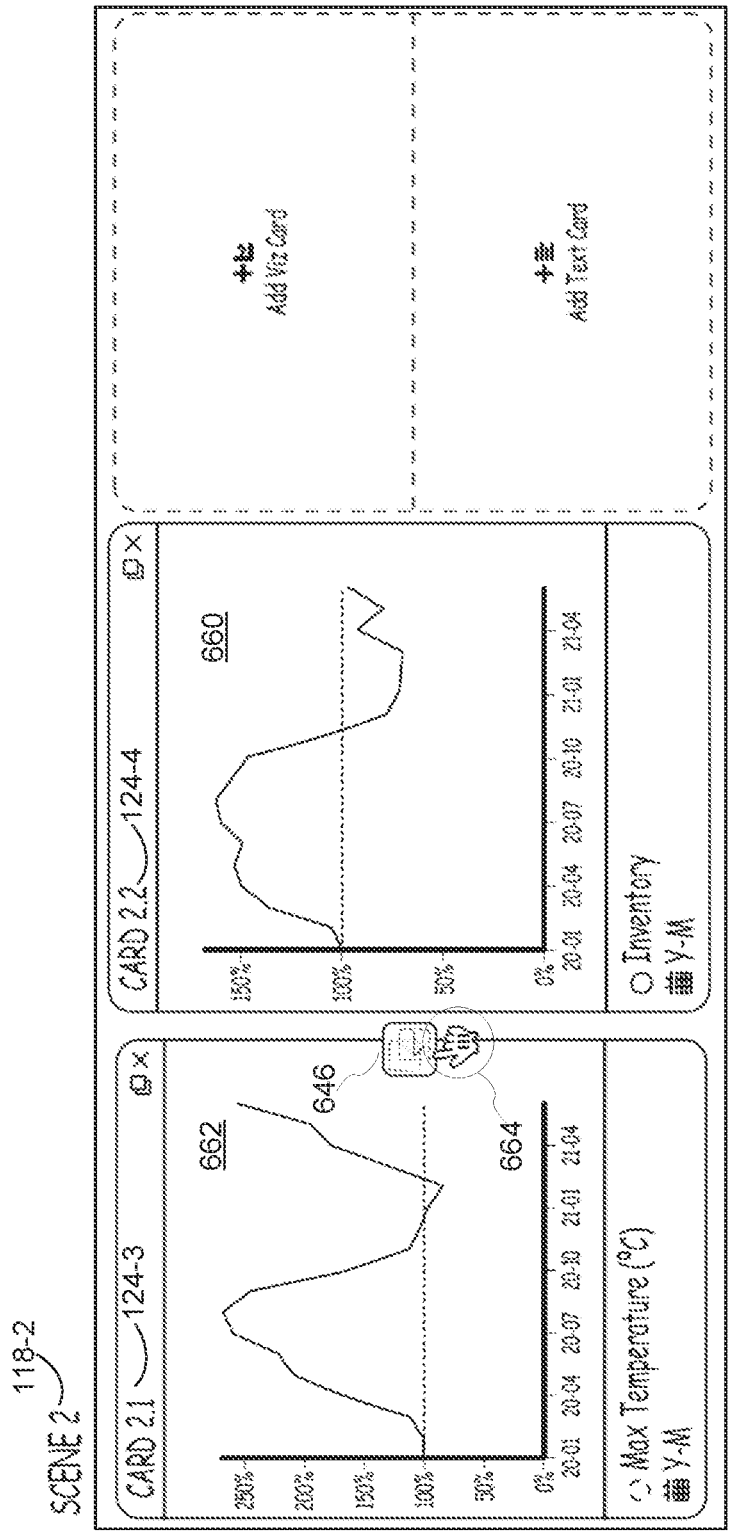
Figure 14H:
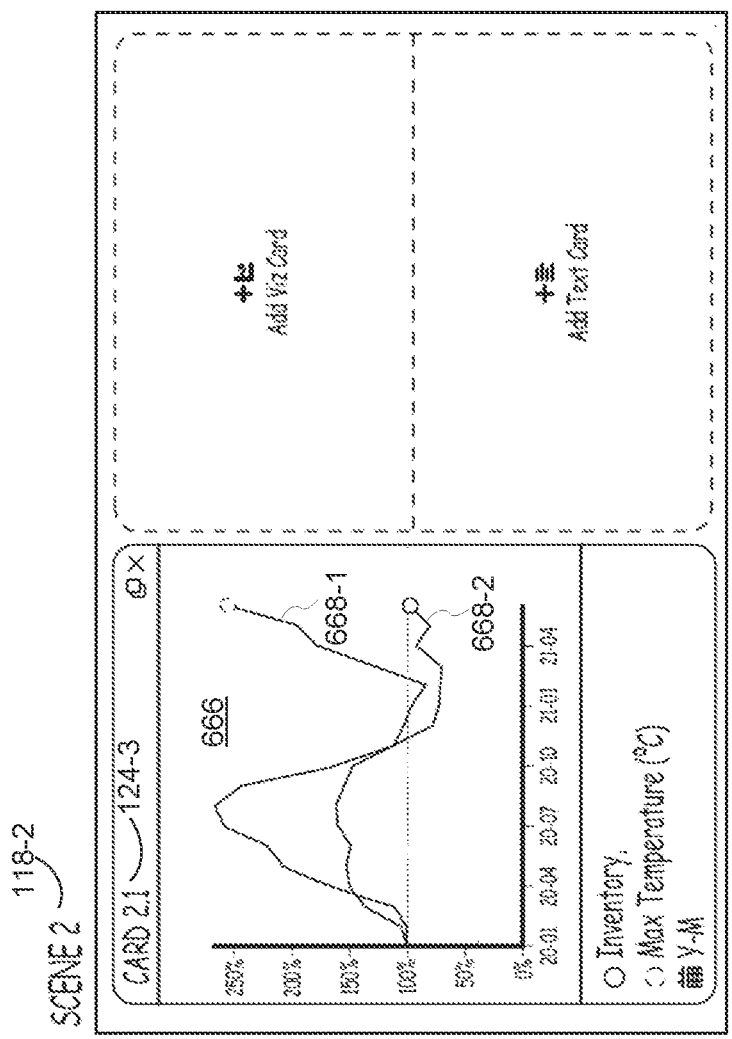

FIG. 14D illustrates user interaction with the y-axis of the second data visualization 656. For example, the user interaction can be a mouse click near the y-axis (e.g., vertical axis). In some implementations, in response to the user interaction, the computing device 200 displays a group of y-axis icons 534 and/or a group of x-axis icons 536 on the visualization card 124-4. The y-axis icons 534 and x-axis 536 are described previously with respect to FIG. 11C and will not be repeated for the sake of brevity. FIG. 14D illustrates user selection (658) of the second y-axis icon 534-2. FIG. 14E illustrates that, in response to the user selection, the graphical user interface 100 displays an updated data visualization 660 with a relative y scale that is relative to the earliest y value (e.g., first y value in the temporal sequence) of the second data visualization 656. FIG. 14F shows the relativization step repeated for the first data visualization 654, to produce an updated data visualization 662, as shown in FIG. 14G. FIG. 14G illustrates user selection (664) of the merge icon 646. FIG. 14H illustrates that, in response to the user selection, the graphical user interface 100 displays, in the first visualization card 124-3, a merged data visualization 666, which includes two lines 668-1 and 668-2, corresponding to inventory over time and maximum temperature over time. By converting the y-axes to relative scales, the graphics are compatible, so they can be merged.

4. Annotating and/or Obfuscating a Visualization Card.

According to some implementations of the present disclosure, RemixTape supports visual card annotations. The annotation of a viz card can be either ephemeral or pinned in place. Ephemeral annotations are bound to the cursor position when mousing over a visualization, revealing horizontal and vertical reference lines and corresponding date and metric value text annotations. A horizontal reference line and value annotation can also be pinned in place by clicking on a margin (e.g., the right margin) of a viz card, while clicking again will clear pinned annotations. In some implementations, RemixTape also provides for dramatic subtractive reveals. For example, a user can add a semi-opaque mask to obfuscate part of a chart (e.g., analogous to a fogged glass filter applied to obscure part of an image or a video. As with pinned annotations, clicking in the card's margin removes this obfuscatory mask, revealing the values beneath.

FIGS. 15A to 15H provide a series of screen shots for interactions with a visualization card, in accordance with some implementations.

Figures 15A, 15B:
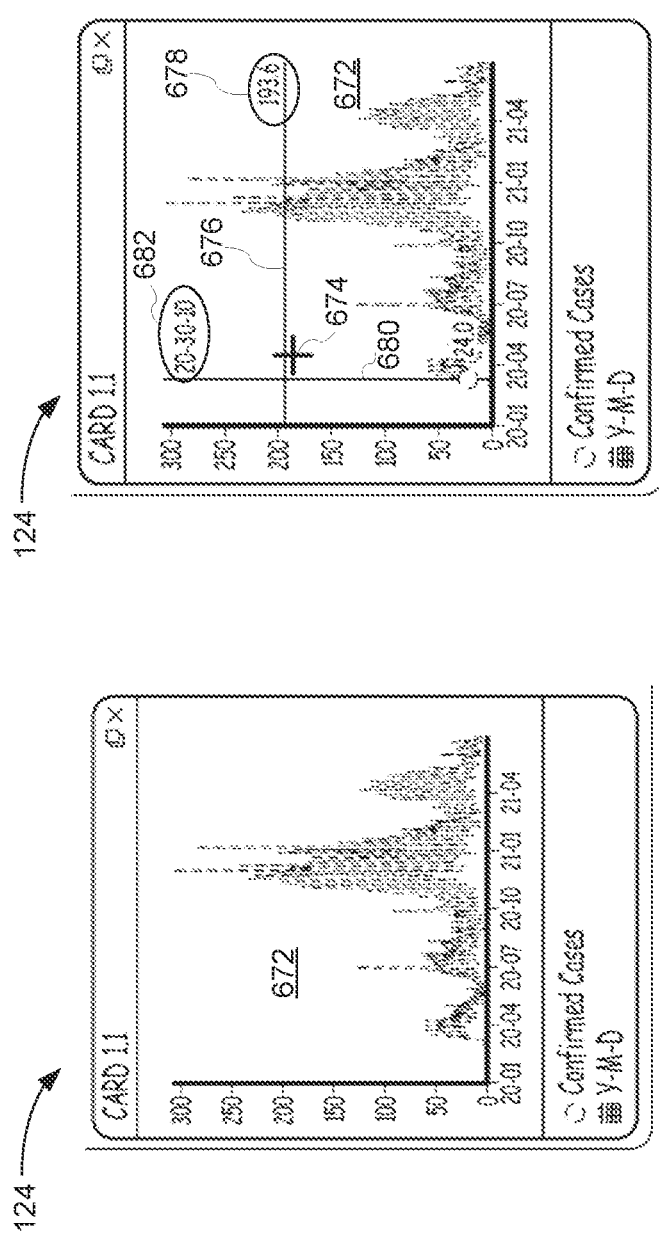

FIG. 15A illustrates a visualization card 124 that includes a data visualization 672 (e.g., a line graph).

FIG. 15B illustrates in some implementations, in response to a user interaction (674) (e.g., a mouse hover over action) with (e.g., within) the visualization card 124, the computing device 200 annotates the visualization card 124 (e.g., ephemerally). For example, FIG. 15B shows that, in response to the user interaction, the computing device 200 displays (e.g., reveals) a horizontal reference line 676 and/or a value 678 (e.g., a y value) corresponding to the horizontal reference line 676. In some implementations, in response to the user interaction, the graphical user interface 100 displays a vertical reference line 680 and/or a value 682 (e.g., an x value or a date/time value) corresponding to the vertical reference line 680.

Figure 15E:
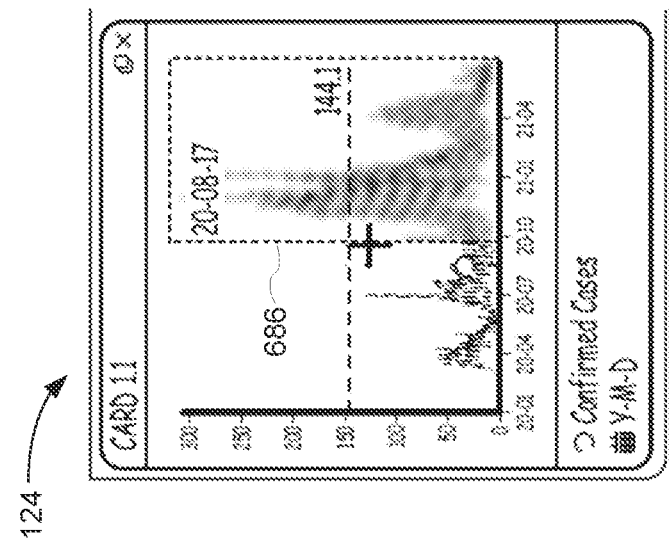
Figure 15D:
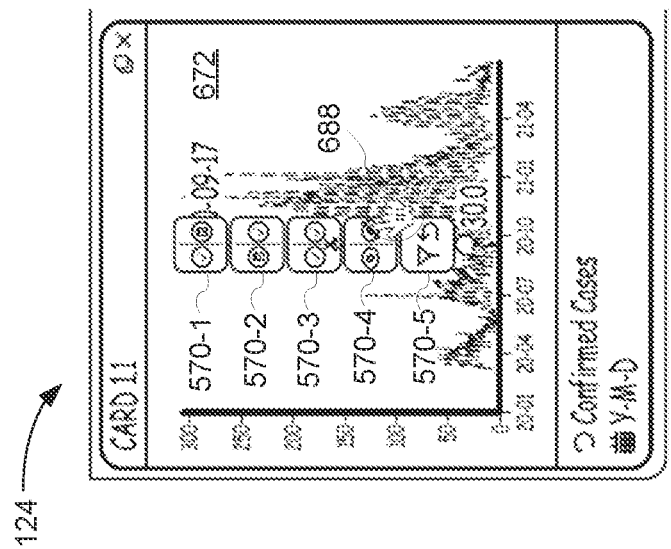
Figure 15C:
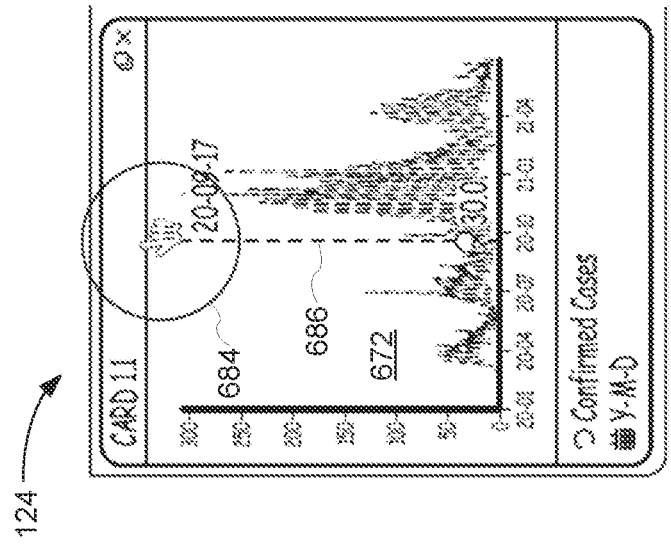

FIG. 15C illustrates another user interaction (684) with the visualization card 124. In this example the user selects (e.g., via a mouse click) a top region (e.g., an area or margin) of the data visualization 672. FIG. 15C shows that, in response to the user interaction, the graphical user interface 100 displays a split line 686 (e.g., a partition line or a dividing line), which extends vertically from the point of the mouse click to the x-axis (e.g., temporal axis or time axis) of the data visualization 672.

FIG. 15D illustrates that, in some implementations, in response to the user interaction, the graphical user interface displays a group of action icons 570, which are described for FIG. 12B. FIG. 15D illustrates user interaction (688) with the fourth action icon 570-4. FIG. 15E illustrates that, in response to the user selection, the computing device 200 updates the display of the data visualization 672 by obfuscating (e.g., blurring out, masking with an overlay, or applying a "fogged glass" overlay) the portion of the data visualization 672 to the right of the split line 686.

FIGS. 15F to 15H illustrate persistent annotation of a visualization card according to some implementations. For example, FIG. 15F shows that a user can interact (690) with (e.g., via a mouse click or a right click) a region (e.g., an area or a margin) of the data visualization 672 to "pin" (e.g., persistently annotate) a horizontal reference line (e.g., the upper reference line 692 or the lower reference line 694) and corresponding values 696 and 698. FIGS. 15G and 15H illustrate that, in some implementations, a user can select (700) (e.g., click on) a corner of the data visualization to remove persistent annotations.

F. Coordinating Adjacent Visualization and Text Cards

RemixTape regards visualization and text commentary as deserving of similar levels of salience in a narrative grounded in data. Accordingly, when arranged in a sequence, RemixTape provides opportunities to coordinate text cards with visualization cards that precede or follow it.

According to some implementations of the present disclosure, after commentary is added to a text card, each paragraph can be linked (e.g., explicitly) to an adjacent visualization card that is to the left or to the right of the text card. In some implementations, when a link is enabled, the computing device 200 invokes a library (e.g., the SUTime library) for recognizing and normalizing time expressions in the paragraph. Should a time expression intersect with the temporal domain of the linked visualization card, subsequent mouse hover events on that paragraph will ephemerally emphasize the time span mentioned in the paragraph. For instance, if a text card contains the paragraph "Between May and July 2021, company profits increased then retreated," line segments in the adjacent viz card corresponding to periods falling outside of this three-month span are de-emphasized until the mouse cursor departs from the paragraph block.

Figure 16A:
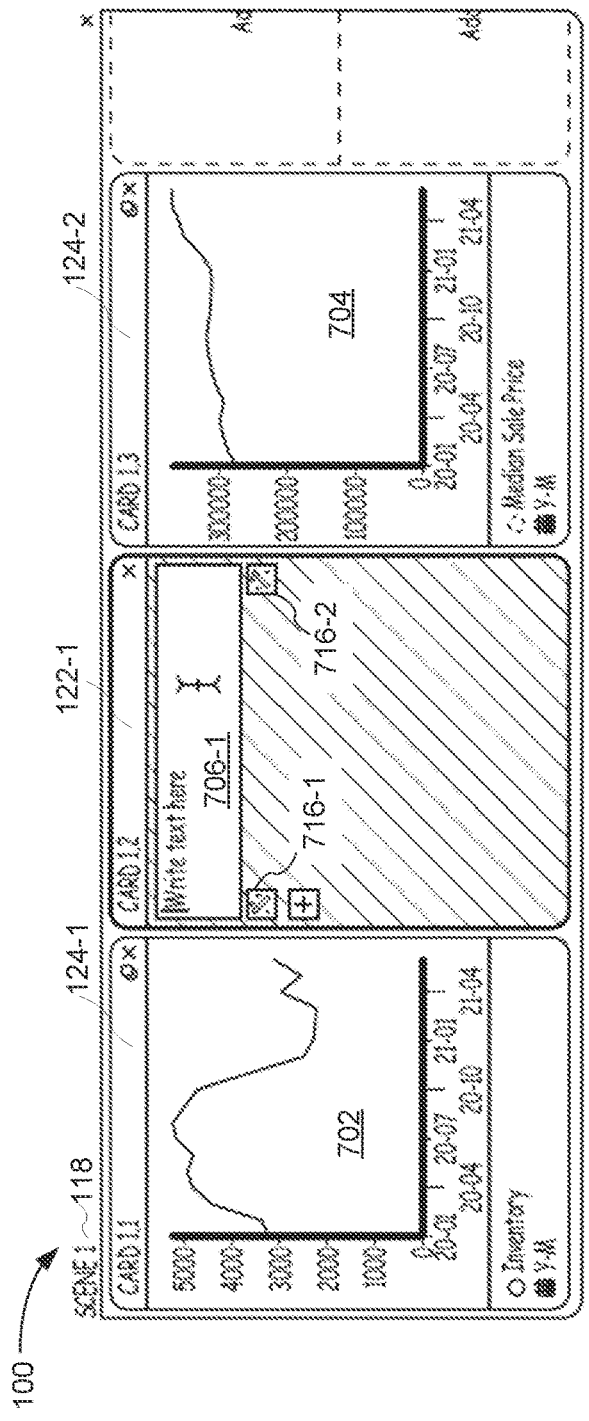
FIGS. 16A to 16N provide a series of screen shots for interactions with a graphical user interface according to some implementations.
Figure 16B:
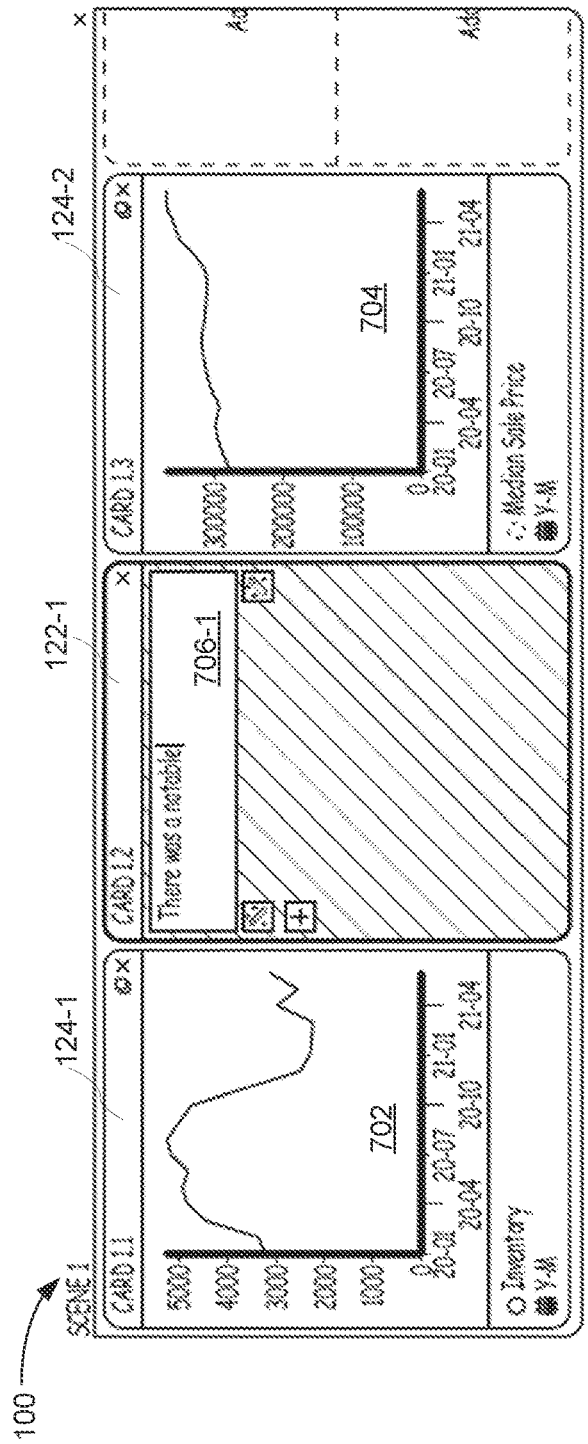
Figure 16C:
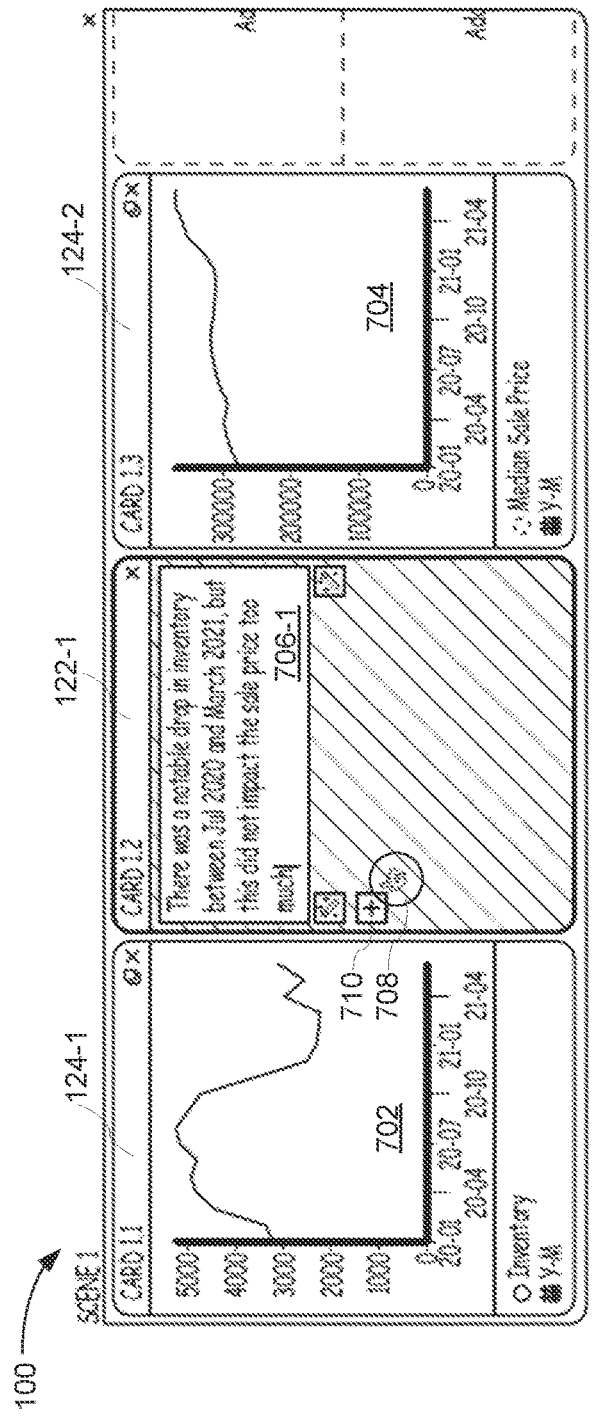
Figure 16D:
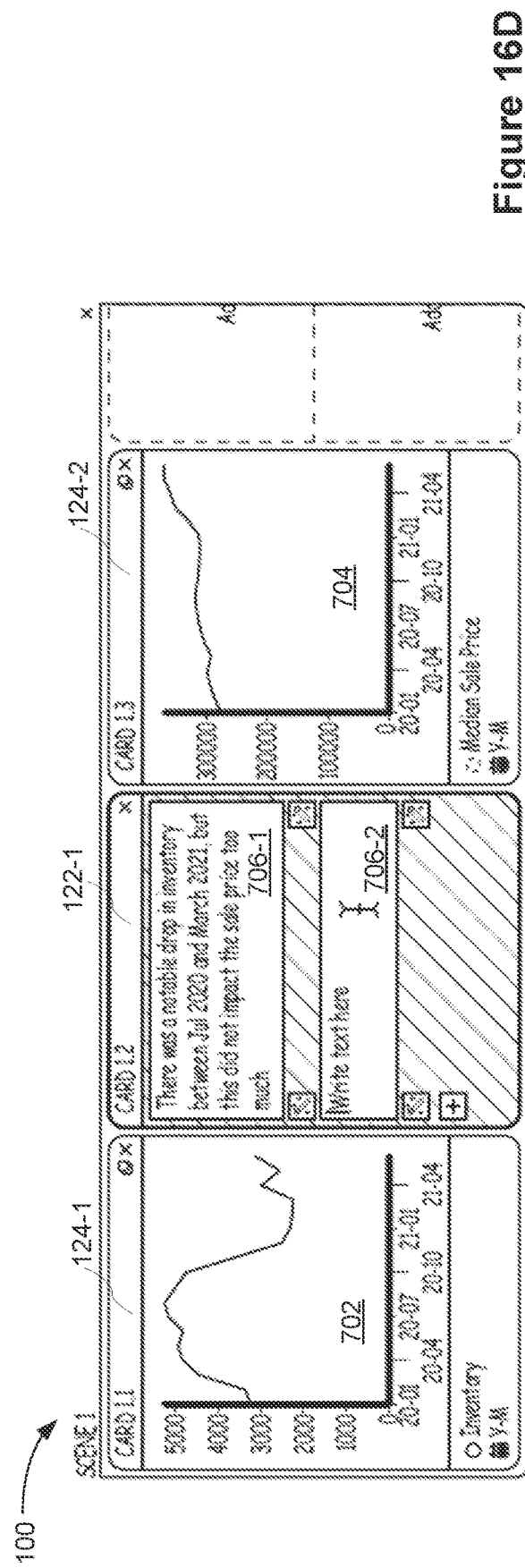
Figure 16G:
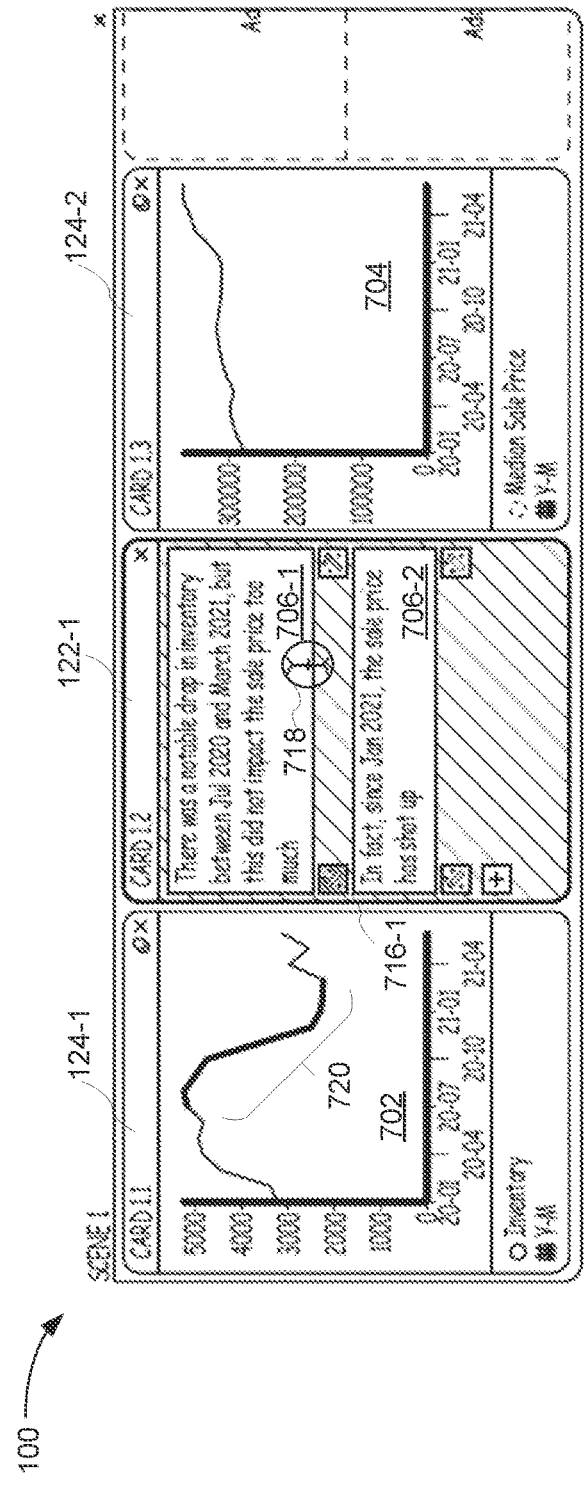
Figure 16H:
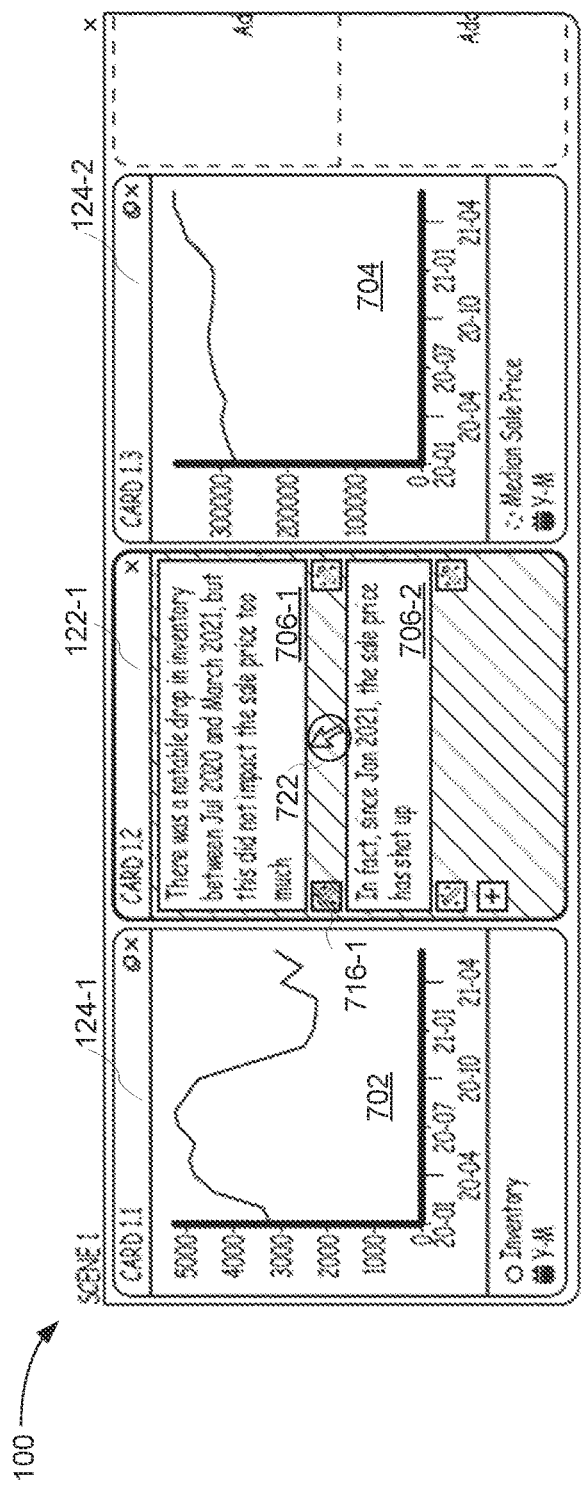
Figure 16I:
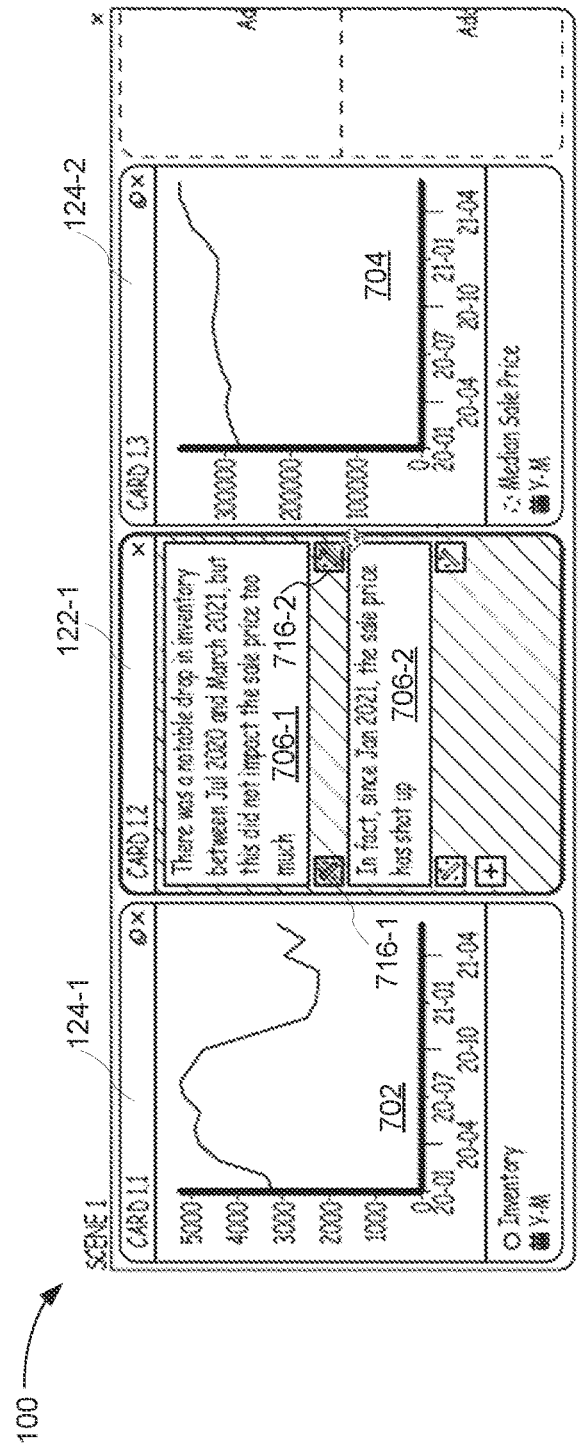
Figure 16J:
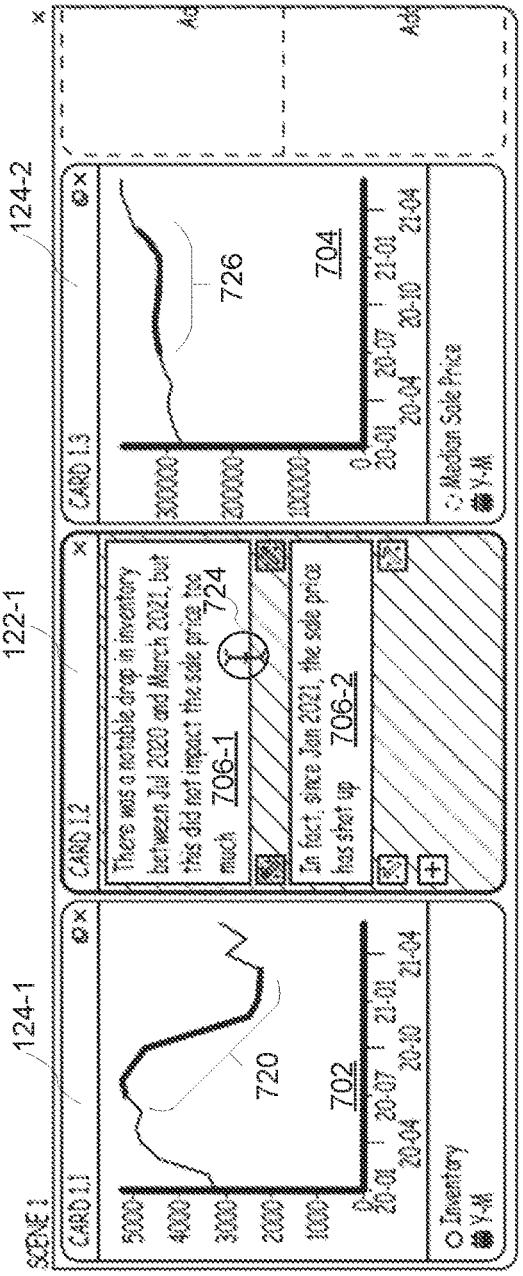
Figure 16K:
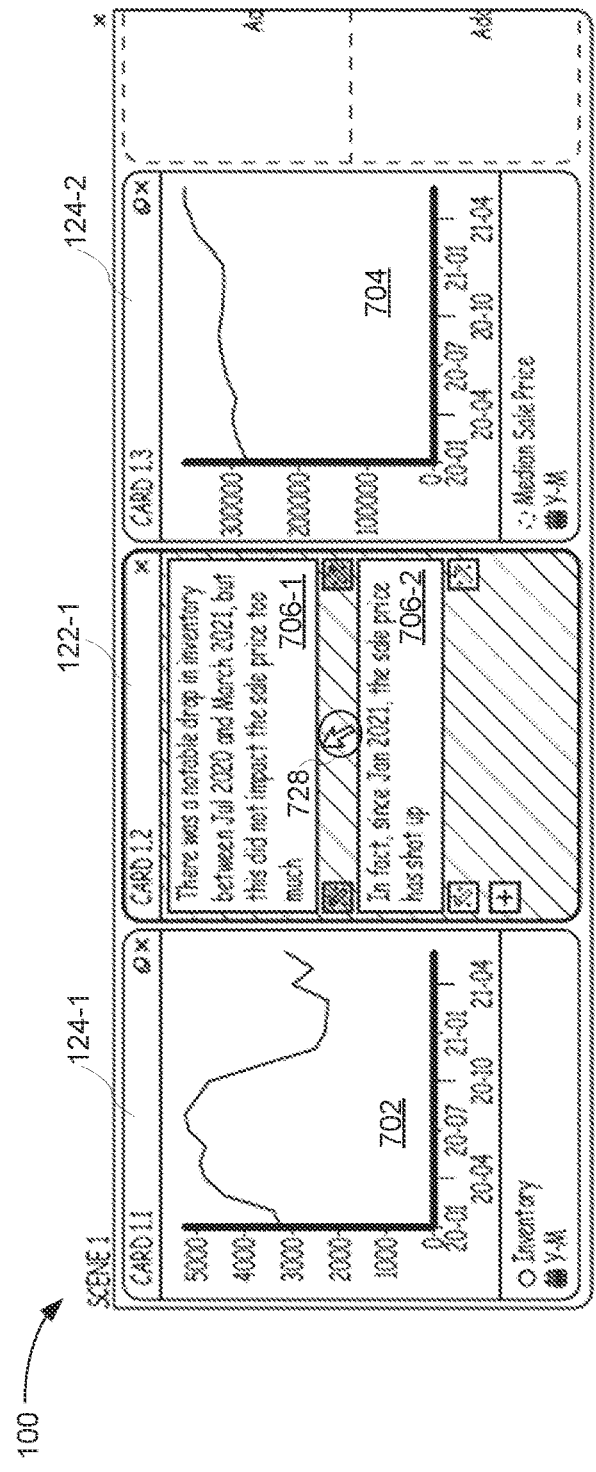
Figure 16L:
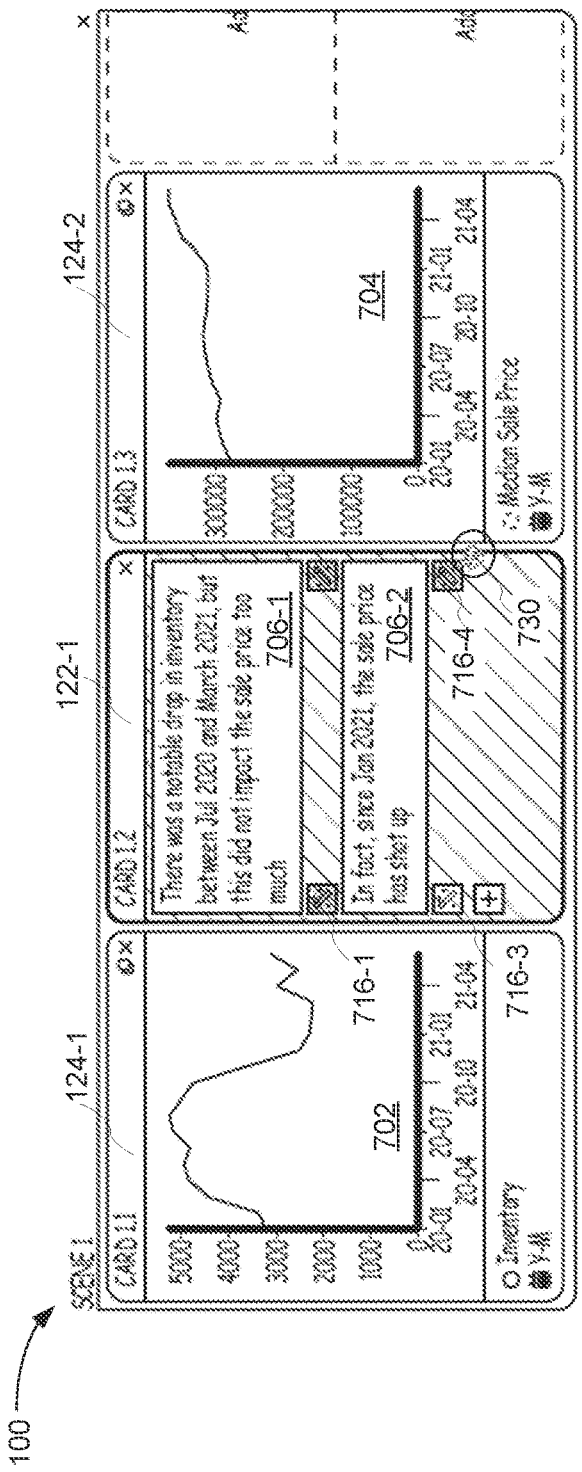
Figure 16M:
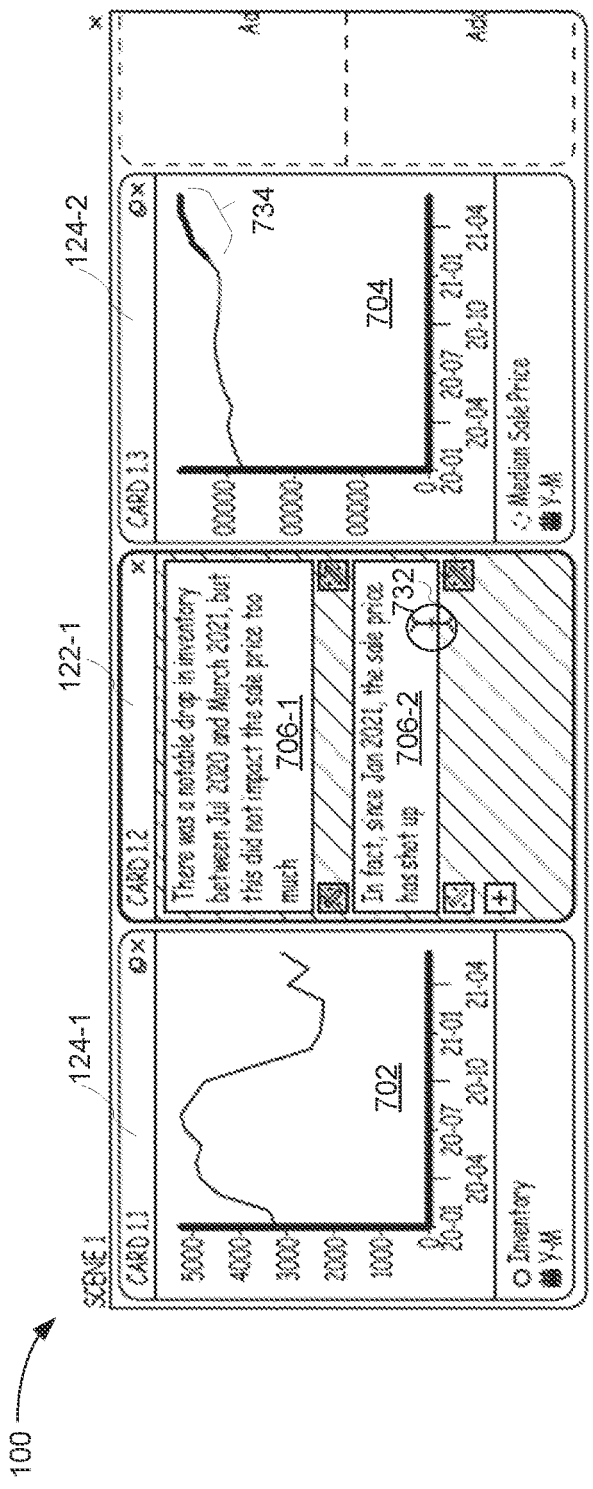
Figure 16N:
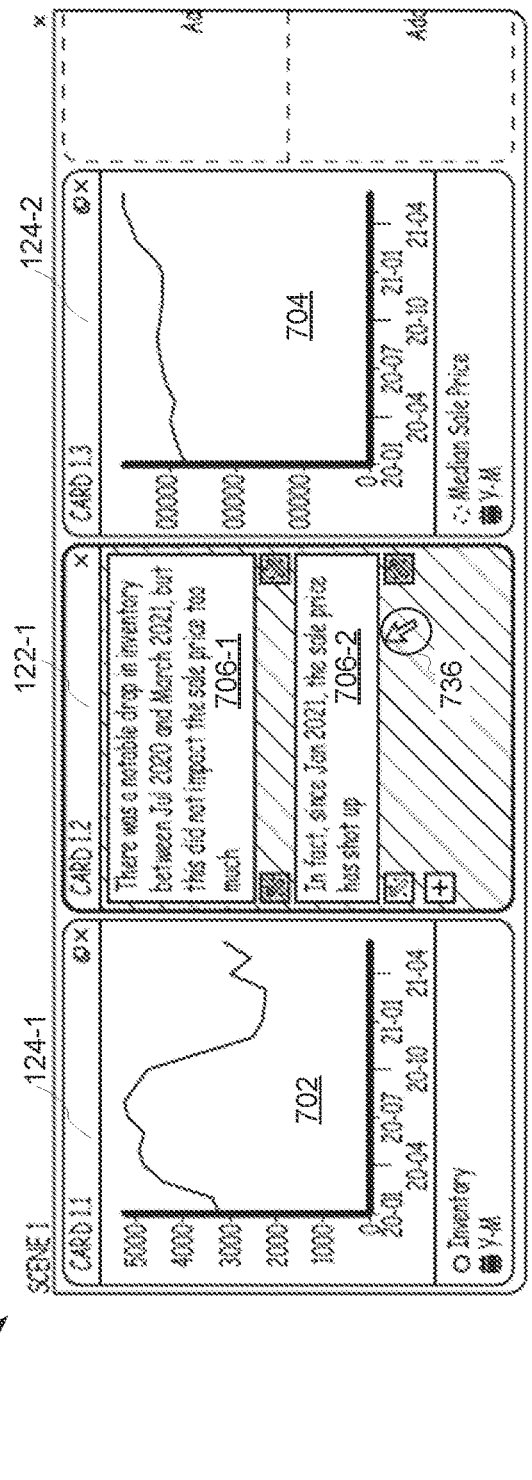

FIGS. 16A to 16N provide a series of screen shots for interactions with a graphical user interface 100 according to some implementations.

FIG. 16A illustrates a scene 118 that is displayed in the graphical user interface in accordance with some implementations. FIG. 16A depicts that the scene 118 includes a first visualization card 124-1 having a first data visualization 702. The scene 118 includes a second visualization card 124-2 having a second data visualization 704. The scene includes a text card 122-1 positioned between the visualization card 124-1 and visualization card 124-2. The text card 122-1 includes a text input element 706-1 (e.g., a text box, a text input box, or a freeform text box) for receiving user text input (e.g., text input to add context to a scene).

In some implementations, a text card can contain any number of statements.

In some implementations, a text card can be scrolled vertically when the amount of text exceeds the dimensions of the text card.

FIG. 16A illustrates that, in some implementations, the text card 122-1 includes one or more link icons 716 (e.g., link icons 716-1 and 716-2) (e.g., a button, an affordance, a user-selectable interface element, or a link), which, when selected, links (i) a text input element that is adjacent to (e.g., above) the icon 716 with (ii) a data visualization that is adjacent to the icon 716. As shown below, in some implementations, user selection of the left link icon 716-1 causes the text input element 706-1 to be linked to the first data visualization 702. User selection of the right link icon 716-2 causes the text input element 706-1 to be linked to the second data visualization 704.

FIG. 16B illustrates that the graphical user interface 100 receives text input from a user via the text input element 706-1.

FIG. 16C illustrates user selection (708) of an icon 710 to add a text input element to the text card 122-1. FIG. 16D illustrates that, in response to the user selection, a second text input element 706-2 is added to the text card 122-1.

FIG. 16E illustrates that the graphical user interface 100 receives text input from a user via the second text input element 706-2.

FIG. 16F illustrates user selection (712) of the upper left link icon 716-1. In some implementations, a link icon 716 that is active (e.g., activated, recommended, selected, or enabled) is displayed in a manner that is visually distinctive from another link icon 716 that is not active. For example, a link icon 716 that is active can have a different color, or a different shade, or a different visual emphasis compared to another link icon 716 that is not active. For example, in FIG. 16F the upper left link icon 716-1 has a different color (or shading) compared to the upper right link icon 716-2.

In some implementations, when a link icon 716 is active, the computing device 200 invokes a library (e.g., SUTime library) that recognizes and normalizes time expressions in the corresponding text input element 706. Should a time expression intersect with the temporal domain of the linked visualization card (e.g., the data visualization 702), subsequent user interactions (e.g., mouse hover events) with the text input element 706 causes the computing device 200 to ephemerally emphasize the portion of the data visualization corresponding to the time span that is mentioned in the text input element 706.

FIG. 16G illustrates user interaction with the first text input element 706-1. In this example, a user hovers (718) the mouse cursor over the first text input element 706-1. FIG. 16G illustrates that, in response to the user interaction, a middle region 720 of the data visualization 702 in the first visualization card 124-1 (e.g., a portion of a line graph), corresponding to the time span (e.g., "between July 2020 and March 2021") that is mentioned in the first text input element 706-1, is visually emphasized.

FIG. 16H illustrates the user moving (722) the cursor out of first the text input element 706-1. In response to the user interaction, the data visualization 702 restores to its initial state. Note that the left upper link icon 716-1 is still selected, as indicated by the shading.

FIG. 16I illustrates user activation of the right upper link icon 716-2 (in the example of FIG. 16I, both the left upper link icon 716-1 and the right upper link icon 716-2 are activated). In some implementations, when a link icon 716 is active, the computing device 200 invokes a library, which determines whether the corresponding text input element 706 includes a time expression that intersects with a temporal domain of the linked data visualization.

FIG. 16J illustrates a mouse hover action (724) (e.g., by a user) over the first text input element 706-1. FIG. 16J illustrates that, in response to the user interaction, the computing device 200 visually emphasizes the middle region 720 of the first data visualization 702, corresponding to the time span "between July 2020 and March 2021" that is mentioned in the first text input element 706-1. The computing device 200 also visually emphasizes a middle region 726 of the second data visualization 704, corresponding to the time span "between July 2020 and March 2021" that is mentioned in the text input element 706-1.

FIG. 16K illustrates that, in response to movement (728) of the cursor to a position outside the first text input element 706-1, the first data visualization 702 and the second data visualization return to their initial states.

FIG. 16L illustrates user selection (730) of the lower right link icon 716-4. In this example, the selection of the lower right link icon 716-4 causes the second text input element 706-2 (i.e, the text input element that is adjacent to (e.g., above) the lower right link icon 716-4) to be linked to the second data visualization 704 (i.e., the data visualization that is adjacent to the lower right link icon 716-4). Note that the lower left link icon 716-3 is not selected.

FIG. 16M illustrates a mouse hover action (732) over the second text input element 706-2. FIG. 16M illustrates in response to the interaction, the computing device 200 visually emphasizes the rightmost region 734 of the second data visualization 704, which corresponds to the time span "since January 2021" that is mentioned in the text input element 706-2. Because the lower left link icon 716-3 is not selected, no portion of the first data visualization 702 is emphasized.

FIG. 16N illustrates that, in response to movement (736) of the cursor to a position that is outside of the second text input element 706-2, the second data visualization 704 returns to its initial state.

G. Toggling Between Design Mode and Presentation Mode

FIGS. 17A to 17D provide a series of screen shots for interactions with a graphical user interface 100 according to some implementations.

In accordance with some implementations, RemixTape (e.g., the graphical user interface 100) is operable in a design mode (e.g., canvas) mode and a presentation mode.

Figure 17A:
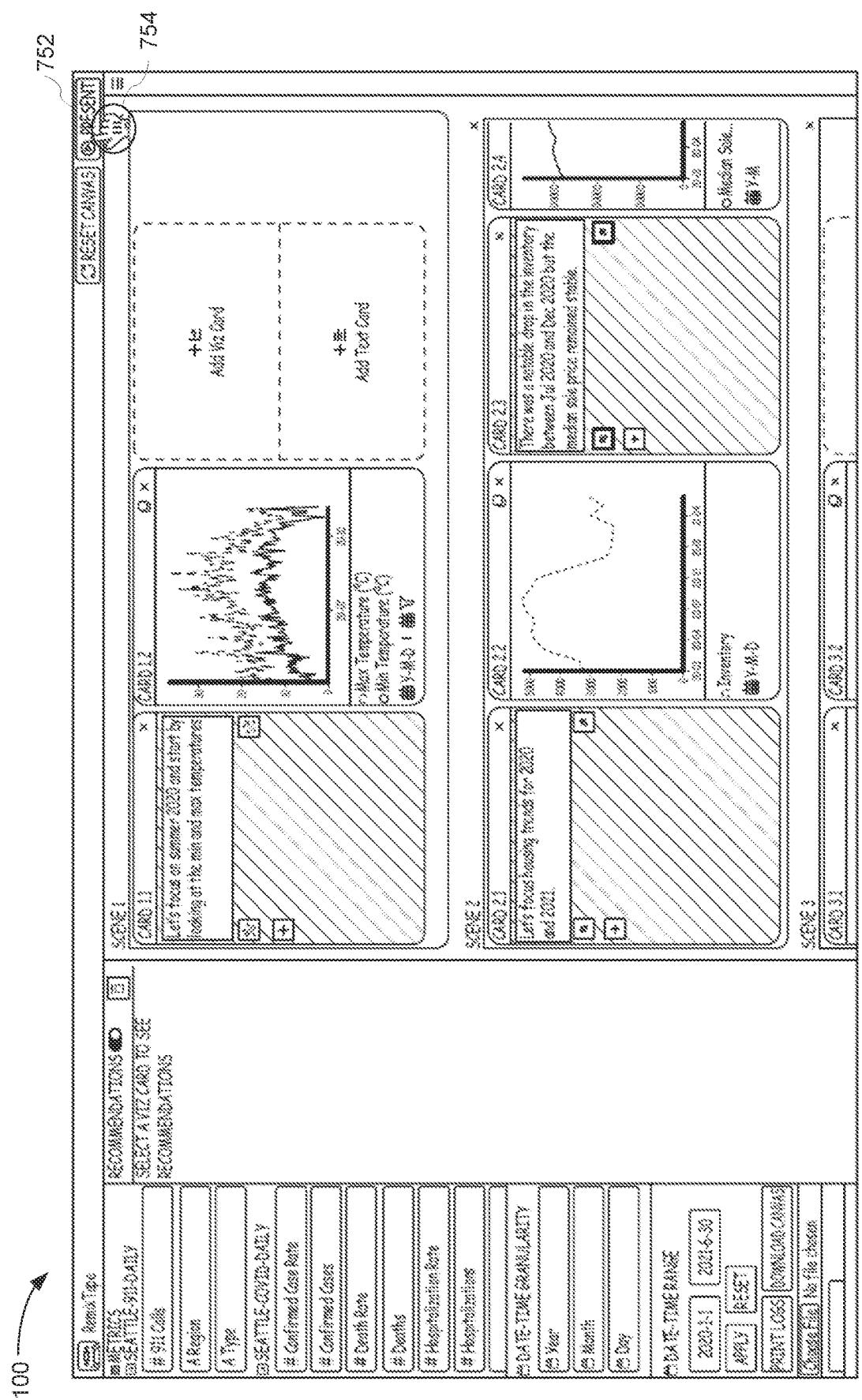
FIGS. 17A to 17D provide a series of screen shots for interactions with a graphical user interface according to some implementations.

FIG. 17A illustrates the graphical user interface 100 when RemixTape is in the design mode, according to some implementations. In some implementations, the operations shown in FIGS. 1 and 4 to 16 are performed when RemixTape is in the design mode. FIG. 17A illustrates a mode icon 752 that, when selected, causes RemixTape to switch (e.g., toggle) to the presentation mode (e.g., "present" mode). FIG. 17A illustrates user selection (754) of the mode icon 752.

Figure 17B:
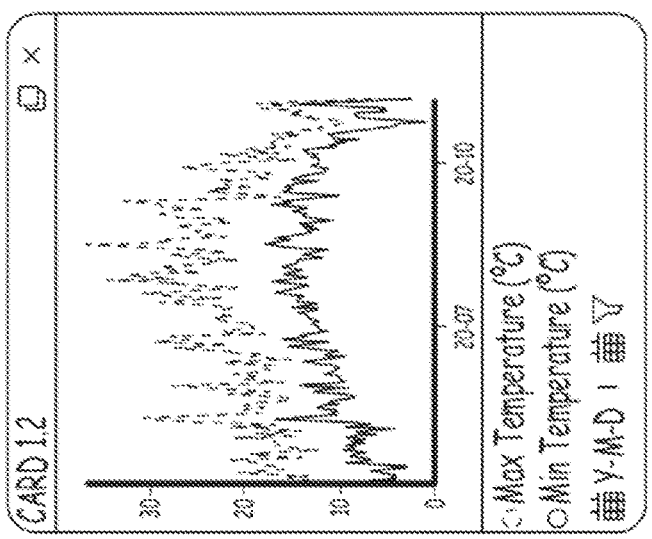
Figure 17C:
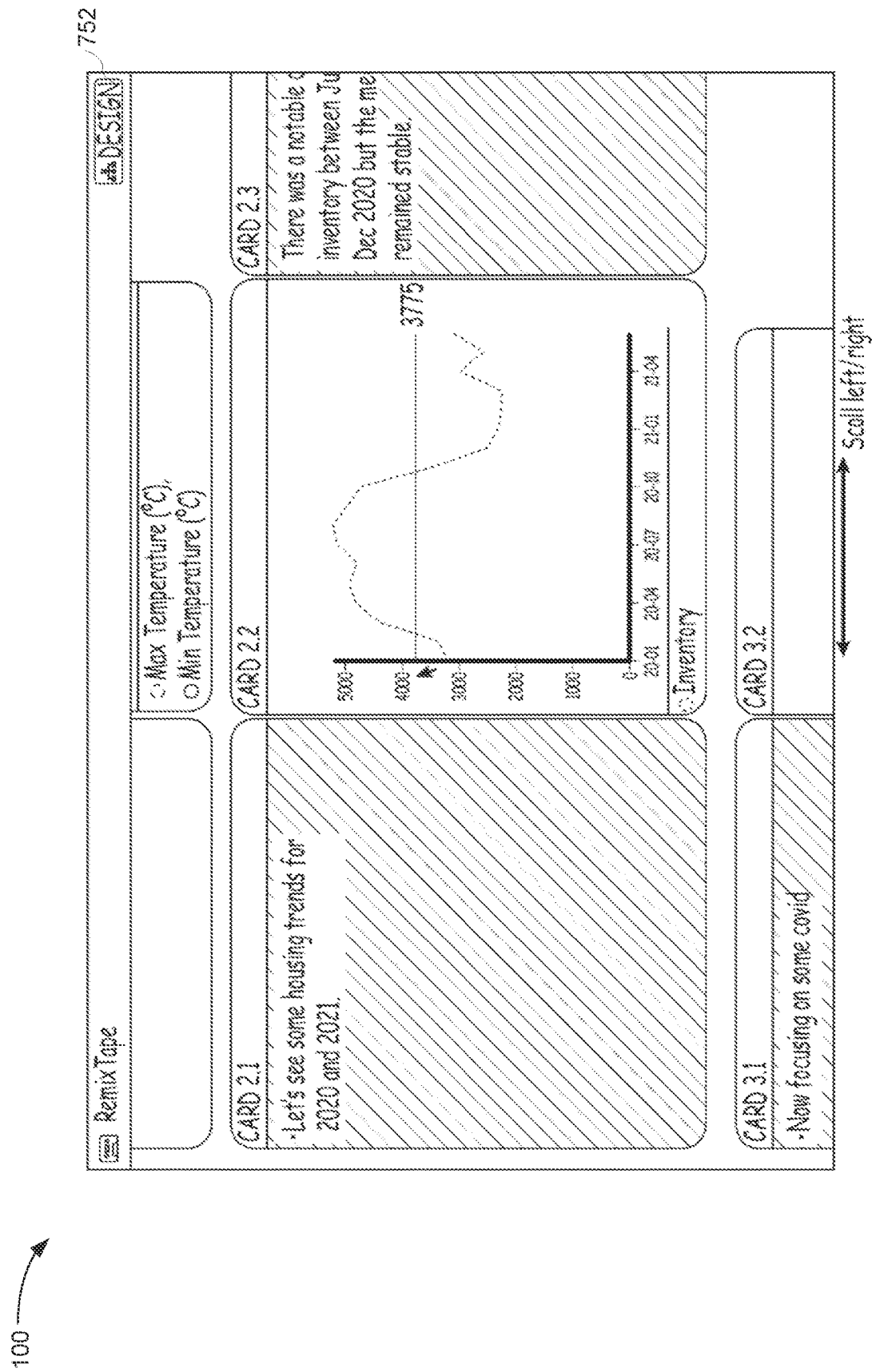
Figure 17D:
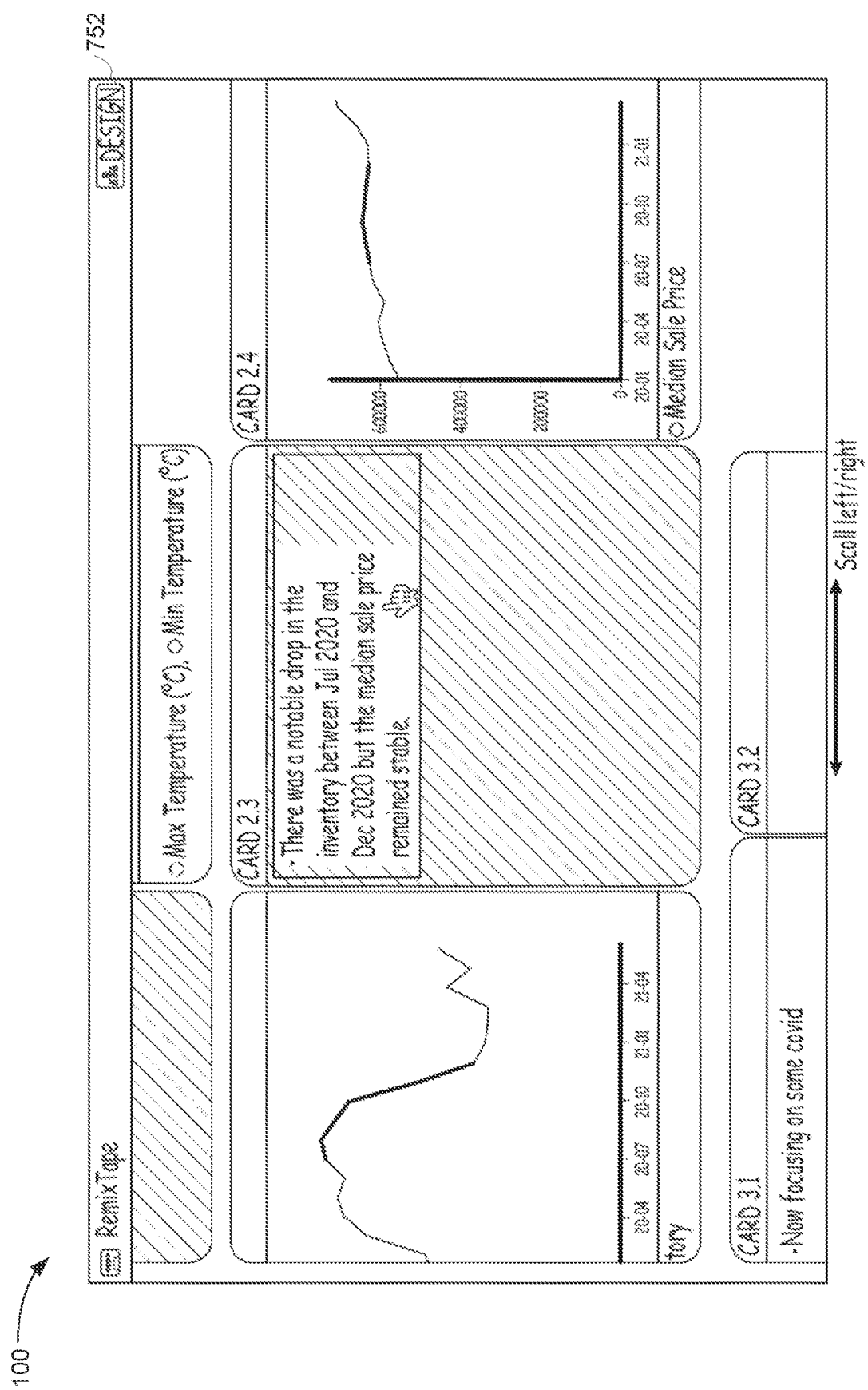
Figure 18A:
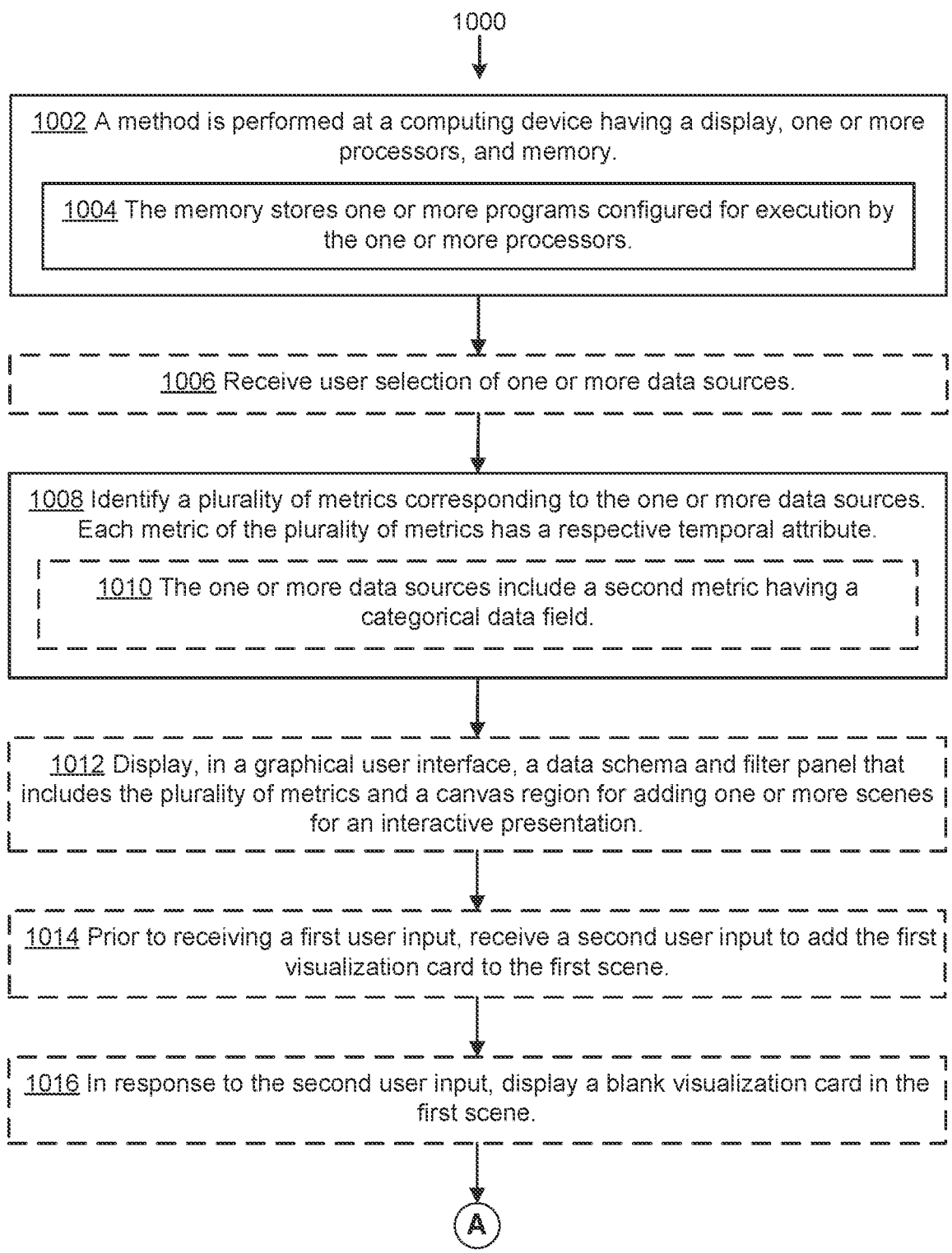
Figure 18B:
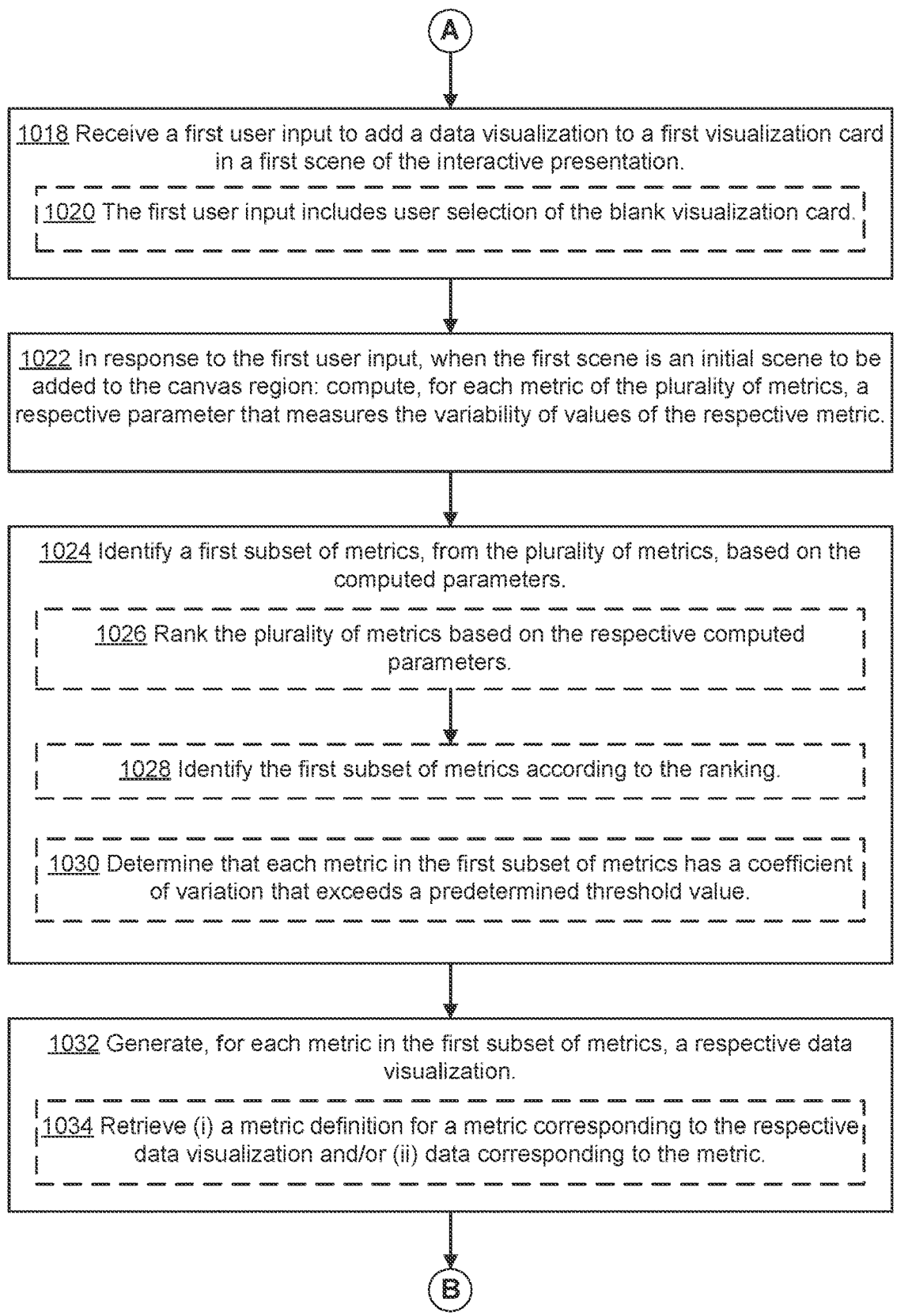
Figure 18C:
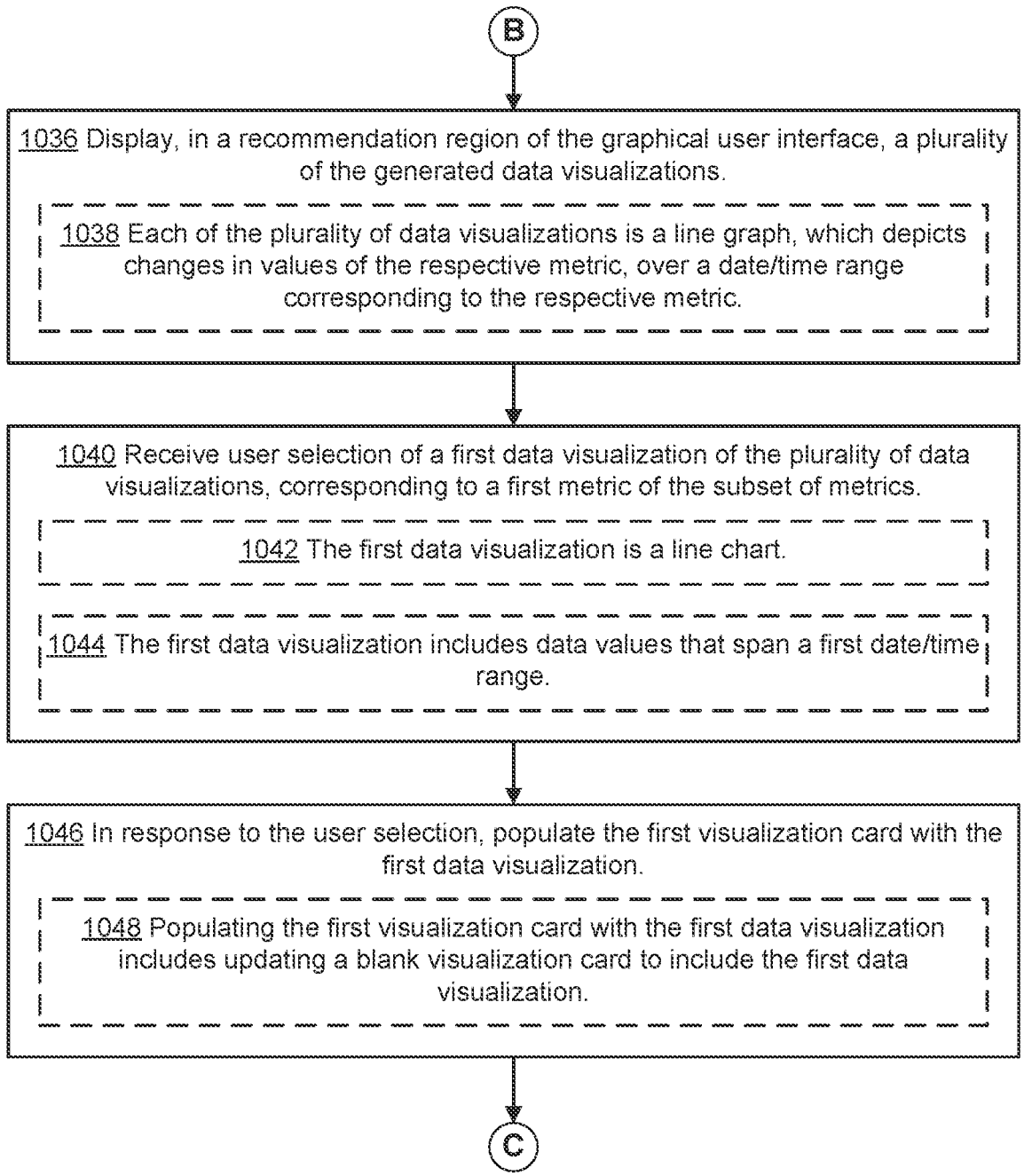
Figure 18D:
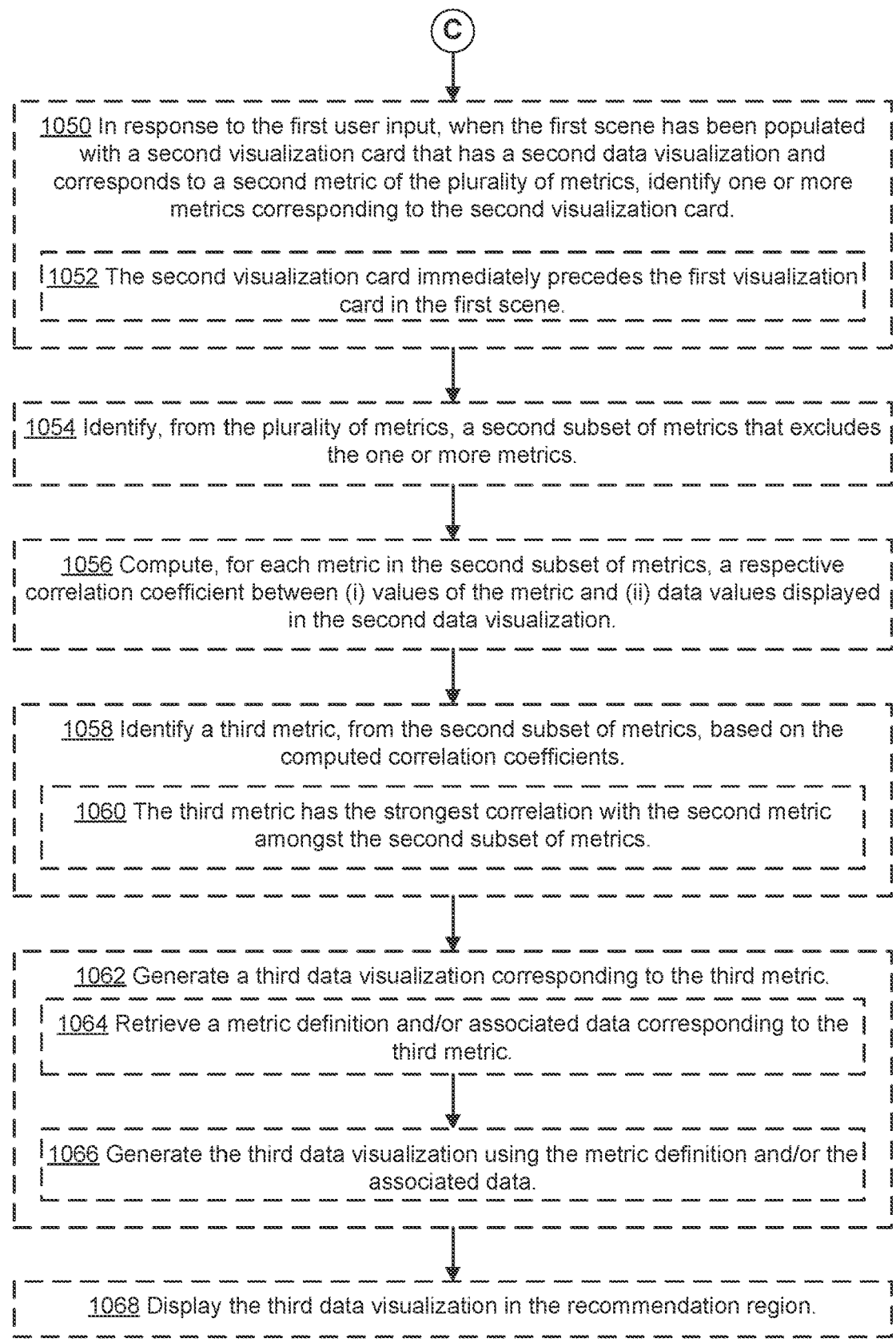
Figure 19A:
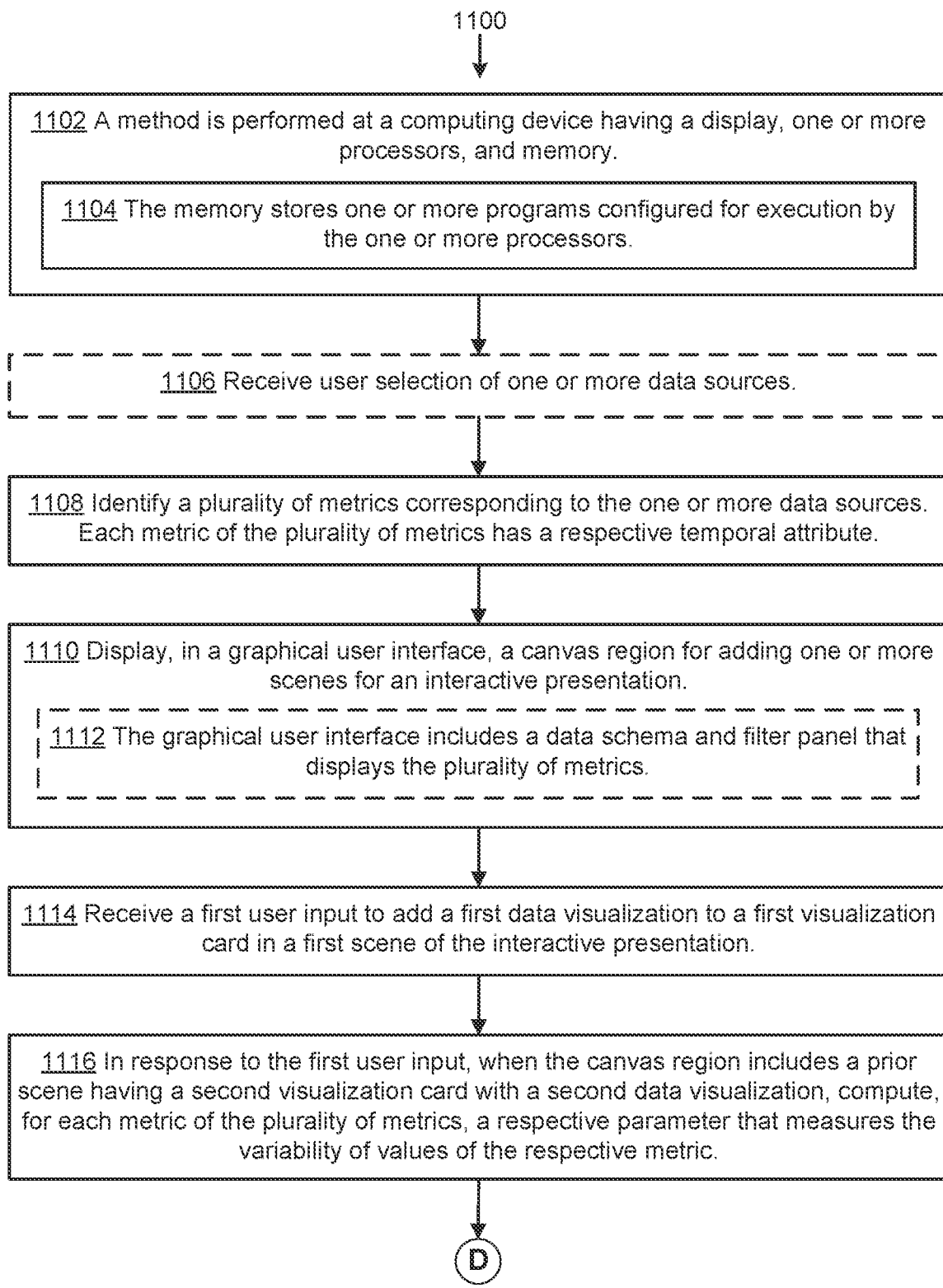
Figure 19B:
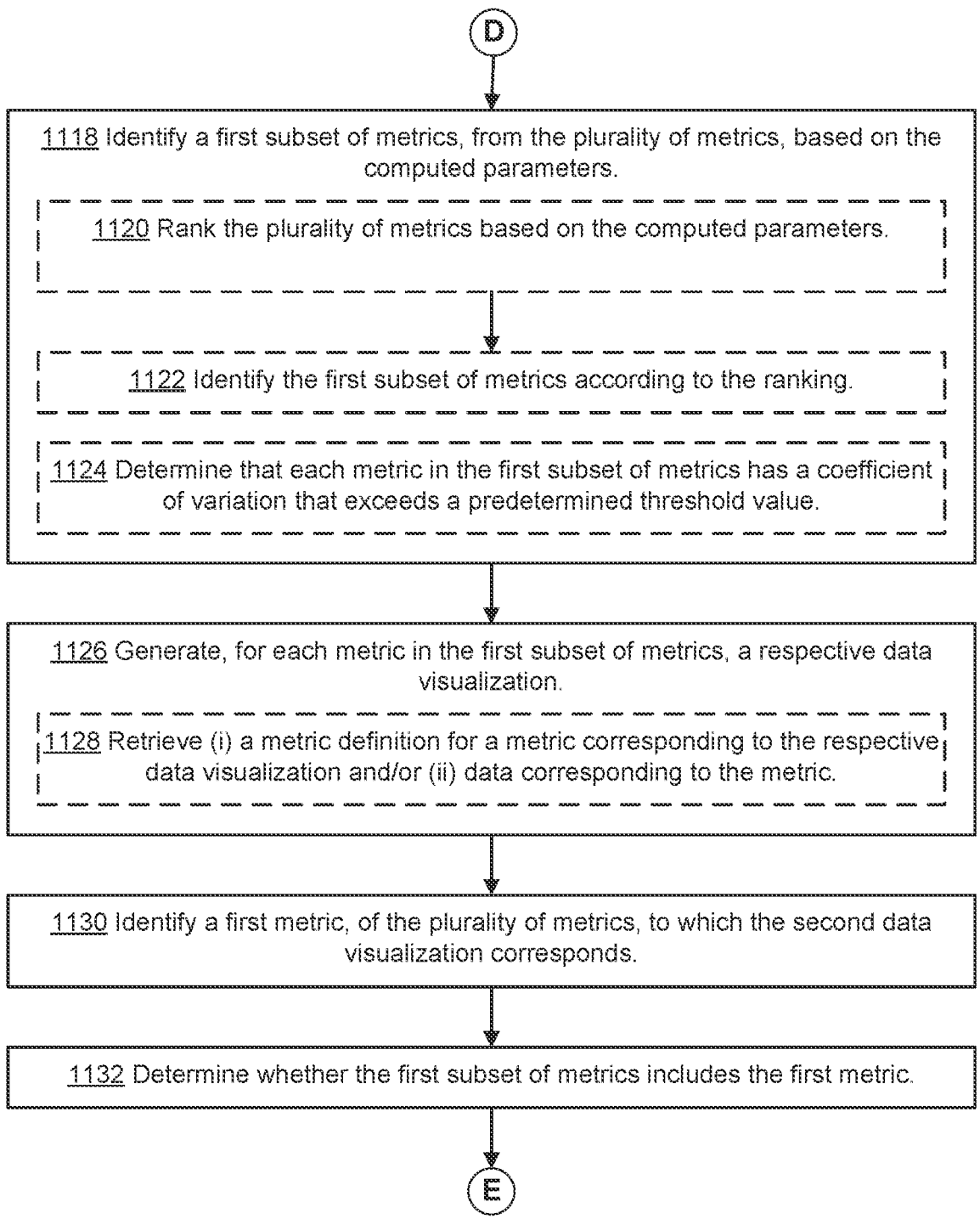
Figure 19D:
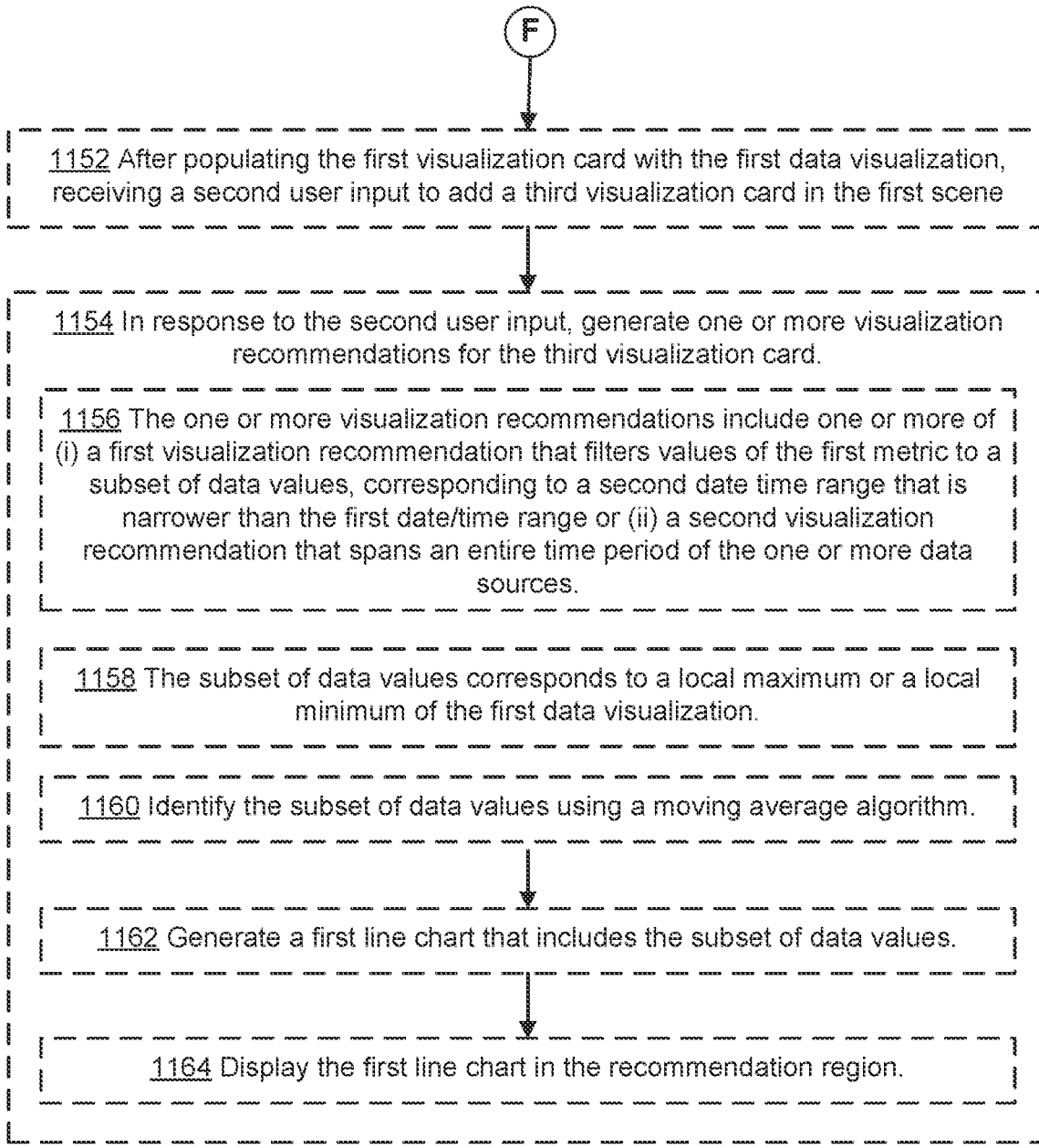
Figure 20A:
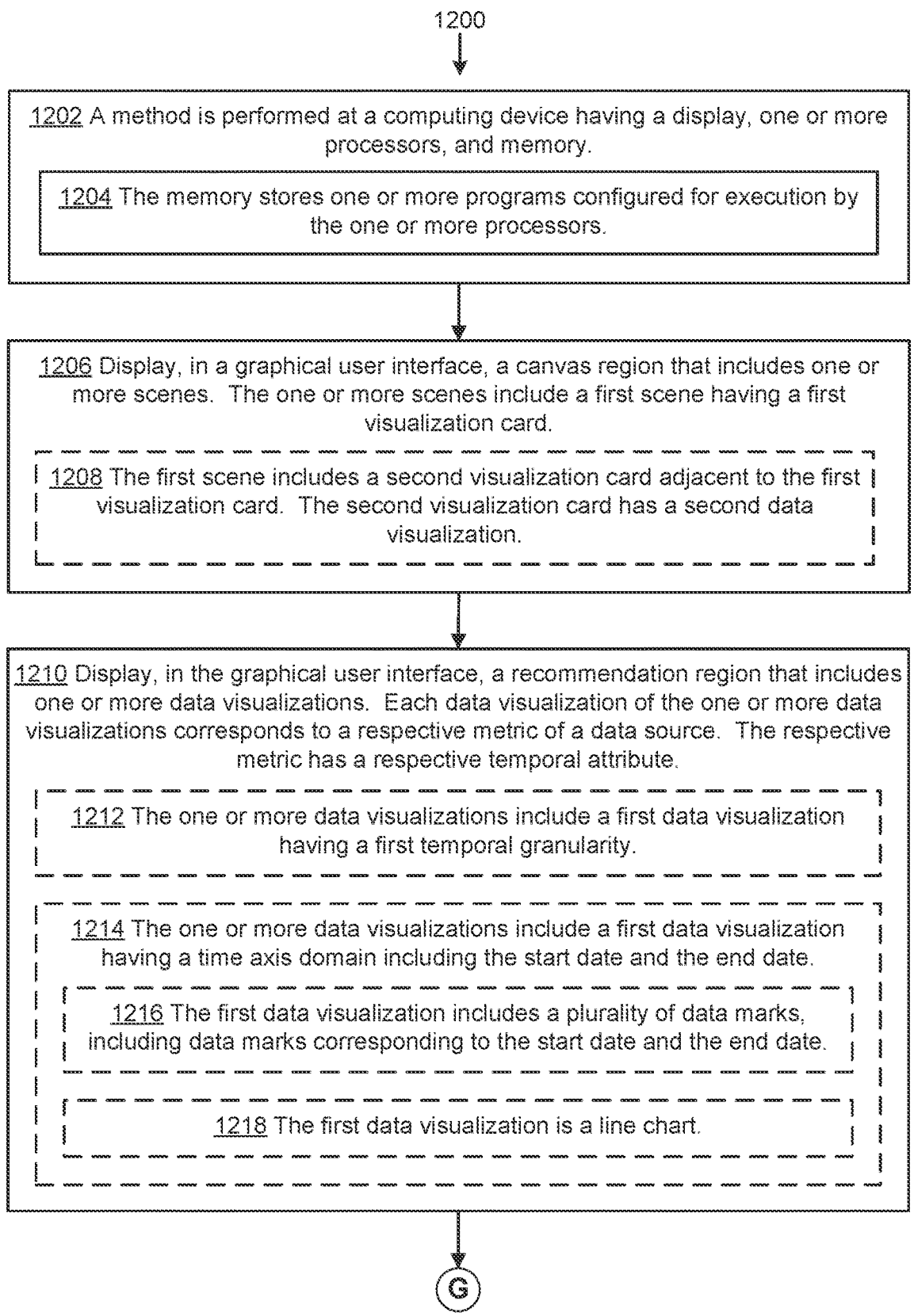
FIGS. 20A to 20E provide a flowchart of a method for presenting time series metrics according to some implementations.
Figure 20B:
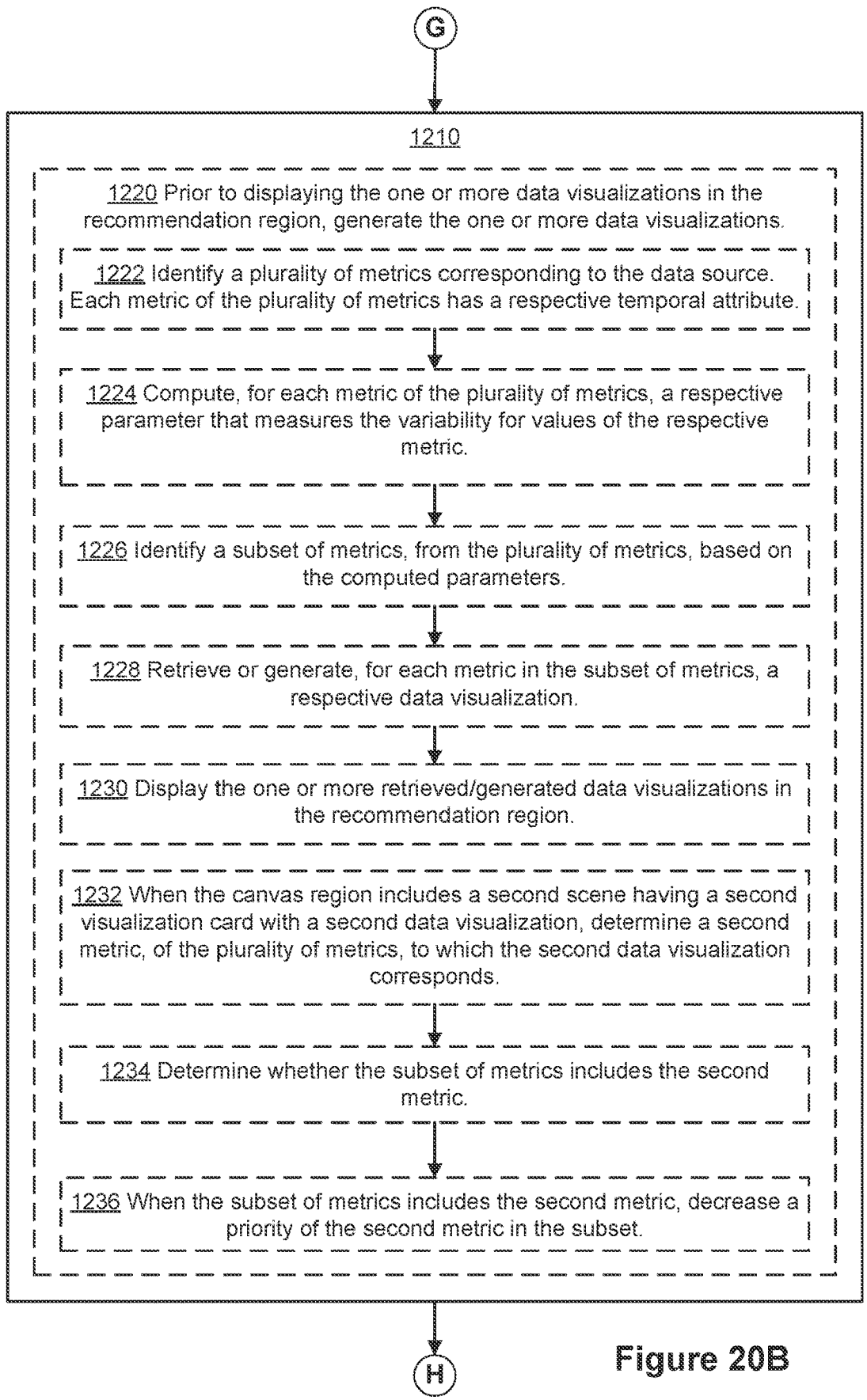
Figure 20C:
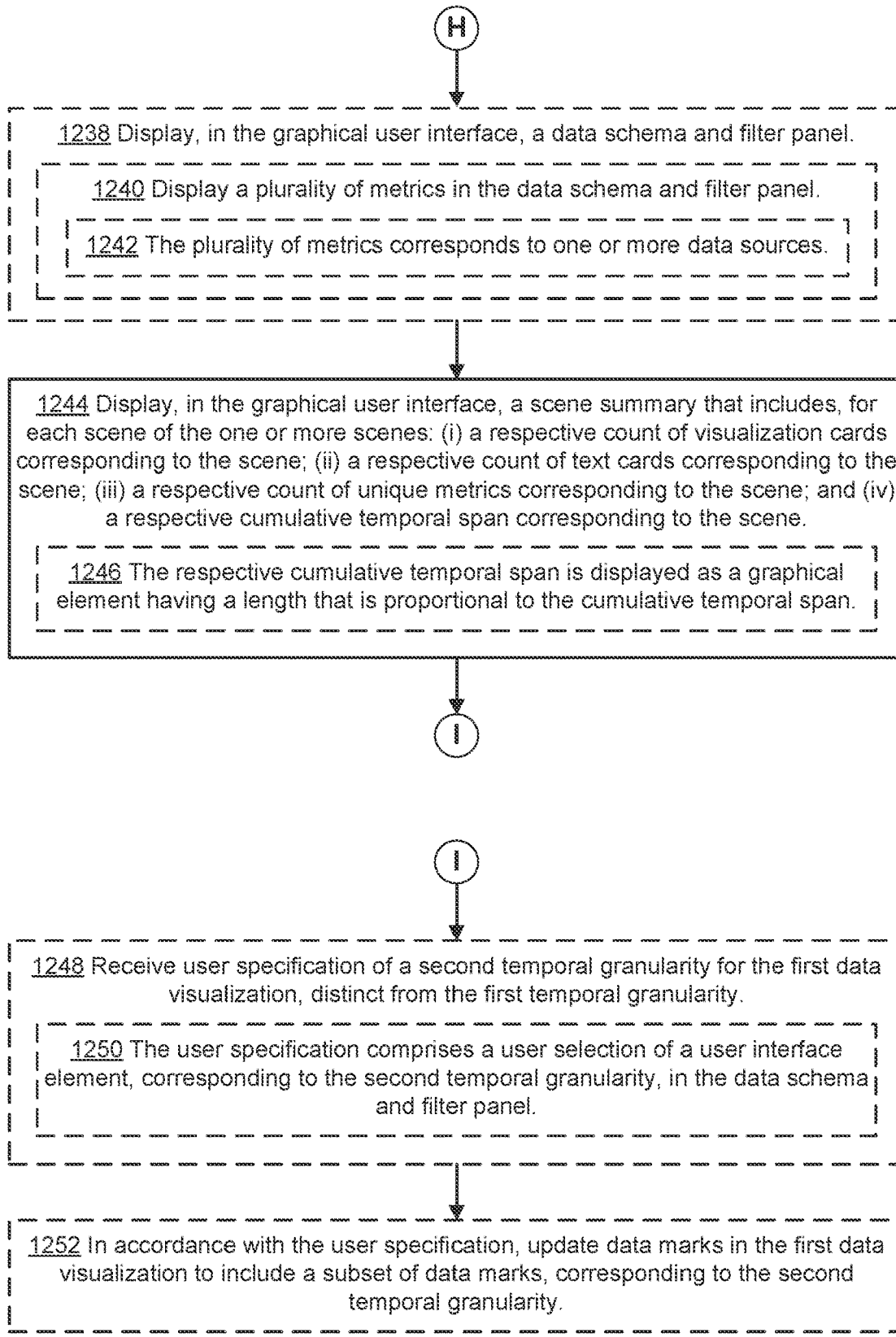
Figure 20D:
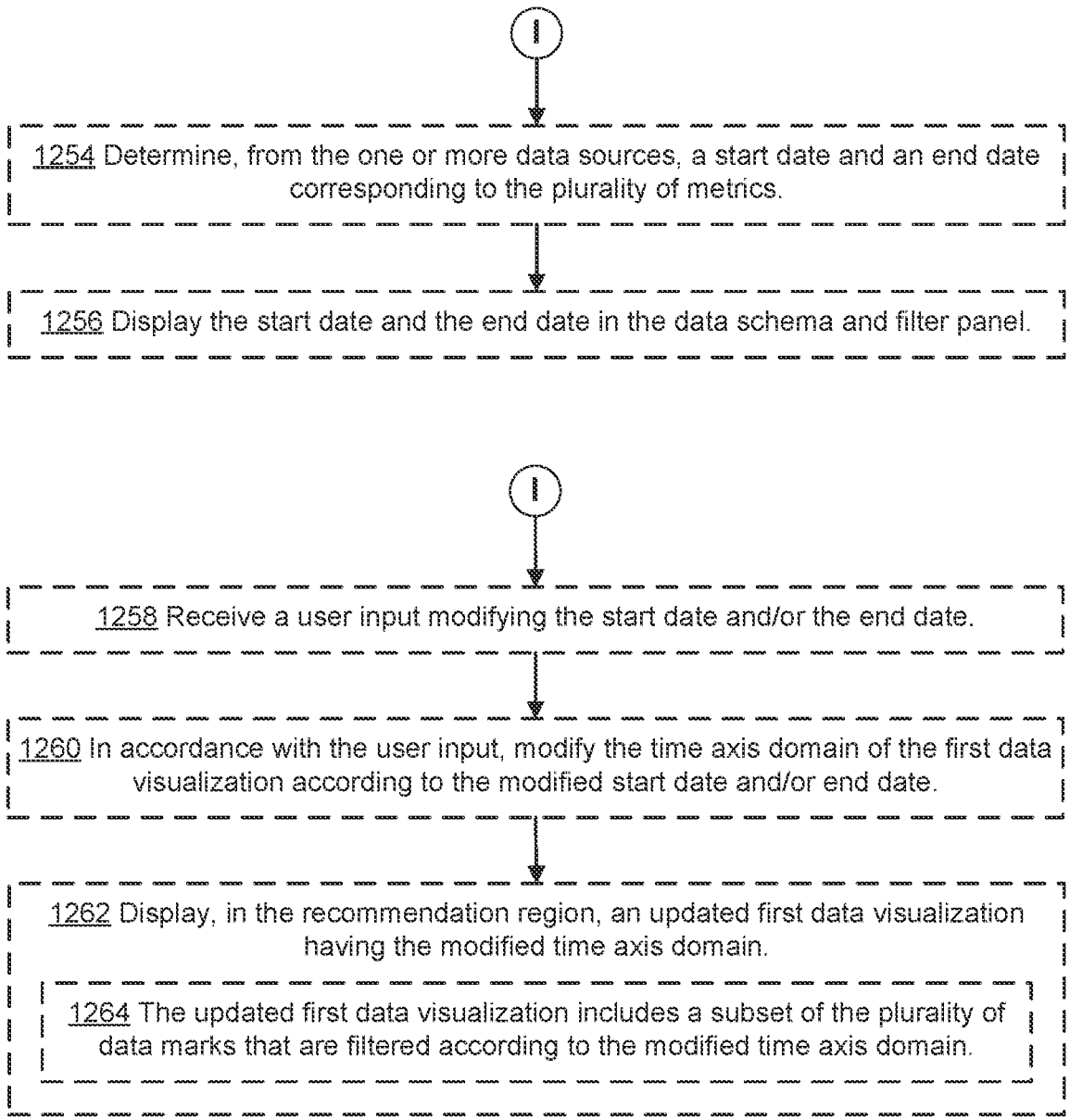
Figure 20E:
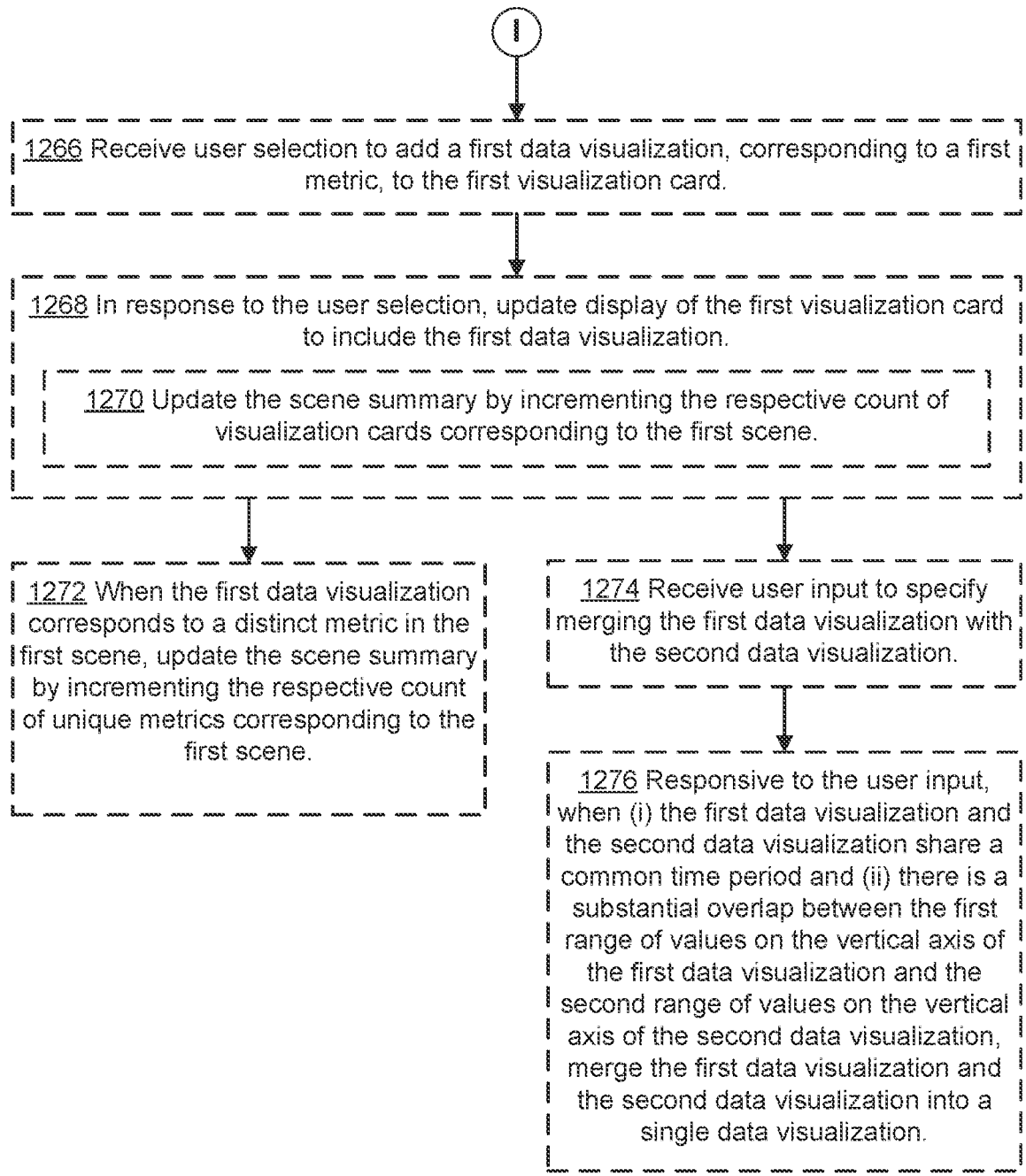

FIGS. 17B to 17D illustrate views of the graphical user interface 100 when the application is in the presentation mode (e.g., in response to user selection of the mode icon 752). In the presentation mode, scenes and cards are enlarged, and all editing operations are disabled/hidden. Annotations (e.g., horizontal markers or faded out portions of a chart) and interactive links between text and charts are preserved to facilitate dynamic narration. Annotations (e.g., as shown in FIG. 15) and links between text cards and visualization cards (e.g., as shown in FIG. 16) that were added in the Design mode persist in the presentation mode. In the presentation mode, the mode icon 752 indicates the option to switch back to the design mode. Accordingly, the disclosed graphical user interface improves over existing interfaces by enabling a user to build a semantically aligned presentation that is grounded on data and present the data in a manner that facilitates dynamic narration.

In some implementations, the RemixTape presentation can be displayed as a carousel of cards embedded within a conversation channel in a collaboration platform such as Slack.

H. Flowcharts

FIGS. 18A to 18F provide a flowchart of a method 1000 for recommending visualizations for interactive presentations of time-series metrics according to some implementations. The method improves user experience by assisting users in identifying new metrics to introduce in their presentations. The method 1000 is also called a process.

The method 1000 is performed (1002) at a computing device 200 that has a display 208, one or more processors 202, and memory 206. The memory 206 stores (1004) one or more programs configured for execution by the one or more processors 202. In some implementations, the operations shown in FIGS. 1A, 1B, 4A-4H, 5A-5I, 6A-6F, 7A-7D, 8A-8D, 9, 10A-10K, 11A-11J, 12A-12K, 13A-13H, 14A-14H, 15A-15H, 16A-16N, and 17A-17D correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1000 may be combined and/or the order of some operations may be changed.

In some implementations, the computing device 200 receives (1006) user selection of one or more data sources 240, workbooks 244, and/or sheets 246.

The computing device 200 identifies (1008) a plurality of metrics (e.g., time series metrics) corresponding to the one or more data sources. Each metric of the plurality of metrics has a respective temporal (e.g., time) attribute. For example, in some instances, all the metrics are from one data source (or one workbook or one sheet). In some instances, the metrics are from two or more data sources (or two or more workbooks, or two or more sheets, or one data source and one workbook). In some instances, the metrics are associated with heterogeneous data sources, time periods, and/or temporal granularities. In some instances, a metric has a fixed time interval/time range (e.g., from Nov. 16, 2020 to Apr. 13, 2022).

As used herein, a metric is a univariate quantitative value that varies over time. In some instances, a metric 120 is a calculated data field (e.g., a calculation that is performed on one or more data fields) whose values change over time. In some instances, a metric is a calculation based on a measure data field (e.g., a quantitative data field). In some implementations, a metric is referred to as time-oriented data.

In some instances, the one or more data sources include (1010) a second metric having a categorical data field (e.g., a dimension data field). An example of a metric having a categorical data field is "aggregate sales over time," where the aggregate sales are further broken down into sales by region, such as a north region, a south region, an east region, and a west region.

In some implementations, the computing device 200 displays (1012), in a graphical user interface 100, a data schema and filter panel 102, which includes the plurality of metrics and a canvas region (e.g., canvas region 106) for adding one or more scenes for an interactive presentation.

In some instances, a scene includes one or more visualization cards 124 or text cards 122.

In some instances, prior to receiving a first user input to add a data visualization to a first visualization card in a first scene of the interactive presentation, the computing device 200 receives (1014) a second user input to add the first visualization card to the first scene. In response to the second user input, the computing device 200 displays (1016) (e.g., generates and displays) a blank card (e.g., an empty visualization card in the first scene. The blank visualization card is a card that does not include a data visualization.

The computing device 200 receives (1018) a first user input to add a data visualization to a first visualization card in a first scene of the interactive presentation. In some instances, the first user input includes (1020) user selection of the blank visualization card in the canvas region 106 (e.g., as illustrated in FIG. 7A and FIG. 10C). In some instances, the first user input includes user activation of a toggle button (e.g., the recommendation button 502 shown in FIGS. 10A and 10B), to activate the "recommendations" in the graphical user interface 100.

In response to the first user input, when the first scene is an initial scene (e.g., an opening scene) to be added to the canvas region (e.g., the first visualization card is the first card to be added to the first scene or the canvas region), the computing device 200 computes (1022), for each metric of the plurality of metrics, a respective parameter that measures the variability (e.g., a variation or a difference) of values of the respective metric.

In some implementations, the respective parameter includes a dispersion parameter, such as a statistical dispersion parameter (e.g., a mean, a variance, a deviation, or a range). For example, in some implementations, the computing device 200 computes, for each metric of the plurality of metrics, the mean value, the range of values, or the deviation of values (e.g., standard deviation, mean deviation, or quartile deviation) of the respective metric.

In some implementations, the respective parameter is a coefficient of variation (e.g., coefficient of variance)

The computing device 200 identifies (1024) (e.g., determines) a first subset of metrics, from the plurality of metrics, based on the computed parameters. For example, in some implementations, the first subset of metrics includes metrics having the most variable temporal trends (e.g., in accordance with the calculation). Accordingly, the method improves user experience by assisting users in identifying new metrics to introduce in their presentations.

In some implementations, identifying the first subset of metrics includes ranking (1026) the plurality of metrics (e.g., in an ascending or descending order) based on the computed parameters and identifying (1028) the first subset of metrics according to the ranking.

In some implementations, identifying the first subset of metrics includes determining (1030) that each metric in the first subset of metrics has a coefficient of variation that exceeds a predetermined threshold value.

The computing device 200 generates (1032), for each metric in the first subset of metrics, a respective data visualization.

In some implementations, generating the respective data visualization includes retrieving (1034) (i) a metric definition for a metric corresponding to the respective data visualization and/or (ii) data corresponding to the metric.

In some implementations, the metric definition includes information (e.g., instructions) that the computing device 200 can use to construct a visualization for the metric. In other words, rather than retrieving a static, previously saved, stale version of a data visualization itself, the computing device 200 constructs a data visualization using the metric definition and/or the data corresponding to the metric that is up-to-date. Accordingly, this approach is advantageous compared to existing methods (and systems) that rely on "static" charts with data that is "frozen-in-time" at the time of creation of the charts.

In some implementations, the metric definition and/or its associated data is retrieved from a data source, a metric definition depository (e.g., a common metrics layer that allows users to specify metrics directly from data fields, or a common metrics layer API), a visualization worksheet, and/or a visualization workbook.

In some implementations, the metric definition can be specified on-the-fly. In some implementations, the metric definition (which is obtained from a visualization worksheet) appears as a sibling to the workbook within the same folder on the server (e.g., Tableau Cloud).

In some implementations, the metric definition specifies how the metric will be visually represented (e.g., as a text indicator and line chart, or as a text indicator alone). In some implementations, a metric can be added as a "favorite" or to an ad-hoc collection by users having appropriate permissions.

In some implementations, the respective data visualization is a pre-existing data visualization that is generated by (e.g., retrieved by) the computing device.

The computing device 200 displays (1036), in a recommendation region 104 of the graphical user interface, a plurality of the generated data visualizations (see, e.g., FIG. 10D), as recommendations for the first visualization card. Generating and displaying two or more independent visualization recommendations in the same recommendation region provides visual feedback to the user, assists the user in building a coherent narrative using the metrics, reduces the number of inputs, and/or reduces the user mistakes of selecting unsuitable metrics.

In some implementations, each of the plurality of data visualizations is (1038) a line graph (e.g., a line chart, a line plot, or a time series line graph), which depicts changes in values (or aggregated data values) of the respective metric, over a date/time range corresponding to the respective metric.

The computing device 200 receives (1040) user selection of a first data visualization of the plurality of data visualizations, corresponding to a first metric of the subset of metrics. For example, FIG. 10E illustrates user selection of an "Add to Card" icon 450-7, corresponding to a visualization recommendation 448-7, to add the visualization recommendation (e.g., data visualization) to a visualization card 124-5.

In some instances, the first data visualization is (1042) a line chart.

In some instances, the first data visualization includes (1044) data values that span a first date/time range. For example, in FIG. 10E, the first visualization recommendation 448-7 has a date/time range from Jan. 1, 2020 to Jun. 30, 2021.

In response to the user selection, the computing device 200 populates (1046) the first visualization card with the first data visualization. For example, the computing device 200 displays (or causes display of) the first data visualization in the first visualization card.

In some instances, populating the first visualization card with the first data visualization includes updating (1048) a blank visualization card to include the first data visualization. For example, the transition from FIG. 10E to FIG. 10F shows that the blank visualization card 124-5 is populated with a data visualization 452-3.

In some implementations, in response to the first user input, when the first scene has been populated with a second visualization card that has a second data visualization and corresponds to a second metric of the plurality of metrics (e.g., the first scene already includes the second visualization card), the computing device 200 determines (1050) (e.g., identifies) one or more metrics corresponding to the second visualization card.

In some instances, the second visualization card immediately precedes (1052) the first visualization card in the first scene.

In some implementations, the computing device 200 identifies (1054), from the plurality of metrics, a second subset of metrics that excludes the one or more metrics. For example, in some implementations, the second subset of metrics includes all metrics that are not previously used in the first scene.

In some implementations, the computing device 200 computes (1056), for each metric in the second subset of metrics, a respective correlation coefficient (e.g., a Pearson's correlation coefficient) between (i) values of the metric and (ii) data values displayed in the second data visualization.

For example, in some implementations, the respective correlation coefficient is the Pearson's correlation coefficient, r, which is a measure of linear correlation between two sets of data. It is the ratio between the covariance of two variables and the product of their standard deviations. Therefore, it is essentially a normalized measurement of the covariance, such that the result has a value between −1 and 1.

In some implementations, the computing device 200 (1058) identifies a third metric, from the second subset of metrics, based on the computed correlation coefficients.

In some instances, the third metric has (1060) the strongest correlation (e.g., directly or indirectly, or has the highest value) with the second metric amongst the second sub set of metrics.

In some implementations, the computing device 200 generates (1062) a third data visualization corresponding to the third metric.

In some implementations, generating the third data visualization corresponding to the third metric includes retrieving (1064) a metric definition and associated data corresponding to the third metric and generating (1066) the third data visualization using the metric definition and the associated data.

In some implementations, the computing device 200 displays (1068) the third data visualization in the recommendation region.

In some instances, the first data visualization includes data values that span a first date/time range. After populating the first visualization card with the first data visualization, the computing device 200 receives (1070) a second user input to add a second visualization card in the first scene.

For example, in some instances, the second visualization card immediately follows the first visualization card (or the first data visualization card immediately precedes the second visualization card) in the first scene. In some instances, the second visualization card follows a text card that is inserted after the first visualization card.

In some implementations, in response to the second user input, the computing device 200 generates (1072) one or more visualization recommendations for the second visualization card. The one or more visualization recommendations include (1074) one or more of: (i) a first visualization recommendation, which filters (e.g., focuses on or drills down on) values of the first metric to a subset of data values, corresponding to a second date time range that is narrower than the first date/time range, or (ii) a second visualization recommendation, which spans an entire time period of the one or more data sources.

In some instances, the subset of data values corresponds (1076) to a local maximum or a local minimum of the first data visualization (e.g., the subset of data values forms a peak or a valley of the first data visualization).

In some implementations, the method 1000 further includes identifying (1078) the subset of data values using a moving average algorithm, generating (1080) a first line chart that includes the subset of data values, and displaying (1082) the first line chart in the recommendation region.

In some implementations, the moving average algorithm uses three input parameters: (1) a lag, which controls the size of the moving window; (2) a threshold (k), which determines the number of standard deviations (i.e., z-score); and (3) an influence, which controls how much influence new data points will have on the moving average and standard deviation. At each time step t, a moving average $\mu_t$ and standard deviation $\sigma_t$ are calculated using data within the moving window. A data point is considered a peak if its value is $>\mu_r+\lambda^*\sigma_r$. A data point is considered a valley if its value is $<\mu_r-\lambda^*\sigma_r$.

In some implementations, the one or more visualization recommendations include (1084) a third visualization recommendation, corresponding to a second metric that is distinct from the first metric.

In some instances, the one or more data sources include a second metric having a categorical data field (e.g., a dimension data field). An example of a metric having a categorical data field is the metric "911 Calls" in FIG. 10G, in which the metric (e.g., 911 calls) can be further broken down into calls by region, such as the central region, the north region, and the south region (see, e.g., the first visualization recommendation 448-10 in FIG. 10G). In some implementations, the computing device 200 generates (1086) (e.g., automatically, without user intervention) a third visualization recommendation that comprises a second line chart with a plurality of lines (e.g., a multi-series line chart). Each of the lines corresponds to a distinct data value (e.g., a respective categorical data value, such as "central," "north," or south") of the categorical data field (e.g., each line in the line chart corresponds to a respective categorical data value). The computing device 200 displays (1088) the third visualization recommendation in the recommendation region.

In some instances, the one or more data sources include a second metric having a categorical data field. The computing device 200 generates (1090) (e.g., automatically, without user intervention) a second data visualization with a plurality of lines (e.g., a line chart or a multi-series line chart). Each of the lines corresponds to a distinct data value of the categorical data field (e.g., each line in the chart corresponds to a respective categorical data value). The computing device 200 displays (1091) the second data visualization in the recommendation region.

In some implementations, the first data visualization and the second data visualization are simultaneously (e.g., concurrently) displayed (1092) in the recommendation region.

In some instances, the computing device 200 receives (1093) user selection (e.g., manual user selection) of a second metric of the plurality of metrics in the data schema and filter panel. In response to the user selection, the computing device 200 displays (1094) a second data visualization, corresponding to the second metric, in the recommendation region. This is illustrated in FIG. 8A.

In some implementations, displaying the second visualization includes replacing the plurality of data visualizations that are displayed in the recommendation region with the second data visualization. In some implementations, displaying the second visualization includes displaying the second visualization in addition to the plurality of data visualizations that are displayed in the recommendation region.

In some instances, the computing device 200 receives (1095) user selection of a second metric and a third metric (e.g., concurrently) of the plurality of metrics in the data schema and filter panel (e.g., a user selects the second metric and the third metric simultaneously or concurrently, such as in FIG. 6C). In response to the user selection, the computing device 200 generates (1096) a second data visualization, which includes two lines, corresponding to the second metric and the third metric, respectively. The computing device 200 displays (1097) the second data visualization in the recommendation region.

FIGS. 19A to 19E provide a flowchart of a method 1100 for recommending visualizations for interactive presentations of time-series metrics according to some implementations. The method 1100 is also called a process.

The method 1100 is performed (1102) at a computing device 200 that has a display 208, one or more processors 202, and memory 206. The memory 206 stores (1104) one or more programs configured for execution by the one or more processors 202. In some implementations, the operations shown in FIGS. 1A, 1B, 4A-4H, 5A-5I, 6A-6F, 7A-7D, 8A-8D, 9, 10A-10K, 11A-11J, 12A-12K, 13A-13H, 14A-14H, 15A-15H, 16A-16N, and 17A-17D correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1100 may be combined and/or the order of some operations may be changed.

In some implementations, the computing device 200 receives (1106) user selection of one or more data sources.

The computing device 200 identifies (1108) a plurality of metrics corresponding to the one or more data sources. Each metric of the plurality of metrics has a respective temporal attribute.

The computing device 200 displays (1100), in a graphical user interface 100, a canvas region 106 for adding one or more scenes 118 for an interactive presentation.

In some implementations, the graphical user interface includes (1112) a data schema and filter panel 102 for displaying the plurality of metrics.

The computing device 200 receives (1114) a first user input to add a first data visualization to a first visualization card in a first scene of the interactive presentation. For example, in some implementations, the user input includes user selection of the first visualization card in the canvas region. In some implementations, the first user input includes user activation of a toggle button (e.g., a recommendation button 502), to activate the "recommendations" feature on the graphical user interface.

In response to the first user input, when the canvas region includes a prior scene having a second visualization card with a second data visualization (e.g., the second visualization card already exists in the prior scene, prior to the first user input), the computing device 200 computes (1116), for each metric of the plurality of metrics, a respective parameter that measures the variability of values (e.g., a statistical dispersion parameter, such as an average, a variance, a deviation, or a range) of the respective metric.

The computing device 200 identifies (1118) a first subset of metrics, from the plurality of metrics, based on the computed parameters. For example, in some implementations, the first subset of metrics comprises metrics having the most variable temporal trends. The method improves user experience by assisting users in identifying new or interesting metrics to introduce in their presentations.

In some implementations, identifying the first subset of metrics includes ranking (1120) the plurality of metrics (e.g., in an ascending or descending order) based on the computed parameters, and identifying (1122) the first subset of metrics according to the ranking. The method improves user experience by assisting users in identifying new or interesting metrics to introduce in their presentations.

In some implementations, identifying the first subset of metrics includes determining (1124) that each metric in the first subset of metrics has a coefficient of variation that exceeds a predetermined threshold value.

The computing device 200 generates (1126) (e.g., automatically, without user intervention), for each metric in the first subset of metrics, a respective data visualization.

In some implementations, generating the respective data visualization includes retrieving (1128) (e.g., automatically, without user intervention) (i) a metric definition for a metric corresponding to the respective data visualization and/or (ii) data corresponding to the metric.

The computing device 200 identifies (1130) a first metric, of the plurality of metrics, to which the second data visualization corresponds.

The computing device 200 determines (1132) whether the first subset of metrics includes the first metric.

The computing device 200 displays (1134), in a recommendation region 104 of the graphical user interface, a plurality of the generated data visualizations, in accordance with the determination for the first visualization card. Generating and displaying two or more independent visualization recommendations in the same recommendation region provides visual feedback to the user, assists the user in building a coherent narrative using the metrics, and reduces the number of inputs and/or reduces the user mistakes of selecting unsuitable metrics.

In some implementations, each of the plurality of data visualizations is (1136) a line graph, which depicts changes in values of the respective metric, over a date/time range corresponding to the respective metric.

In some implementations, the plurality of data visualizations is displayed (1138) as a list (e.g., a scrollable list or a list with a dropdown menu) in the recommendation region. For example, in some implementations, the list is ordered according to the degree of variability of the respective parameters. In some implementations, the metric with the highest variability (e.g., largest range of values, largest standard deviation, or largest variation) is displayed first on the list. In some implementations, the metric with the highest variability is displayed last on the list.

In some implementations, displaying the plurality of the generated data visualizations in accordance with the determination includes, when the first subset of metrics includes (e.g., contains) the second metric, decreasing (1140) the priority of (e.g., deprioritizing) the second metric in the first subset.

For example, in some implementations, if other scenes are already present in the canvas, the computing device takes the existing content into account and deprioritizes metrics that are already covered (e.g., described) in the other scenes. In some implementations, the recommendations focus on unused metrics having the most variable temporal trends.

The method improves user experience by assisting users in identifying metrics that have yet to be discussed, to include in their presentations.

In some implementations, decreasing the priority of the second metric includes changing (1142) the order (e.g., reorder or change a position on the list) in which the second data visualization is displayed in the list. For example, when the first subset of metrics includes the second metric, the computing device (e.g., the application 230) can move the second data visualization to a lower position on the list.

In some implementations, decreasing the priority of the second metric includes excluding (1144) the second visualization from the displayed plurality of data visualizations. For example, the computing device generates and displays an updated plurality of data visualizations that excludes the second visualization.

In some instances, the computing device 200 receives (1146) user selection of a first data visualization of the plurality of data visualizations, corresponding to a second metric of the subset of metrics.

In some instances, the first data visualization includes (1148) data values that span a first date/time range.

In some implementations, in response to the user selection, the computing device 200 populates (1150) the first visualization card with the first data visualization. For example, the computing device displays (or causes display of) the first data visualization on the first visualization card.

In some instances, the first data visualization includes data values that span a first date/time range. After populating the first visualization card with the first data visualization, the computing device 200 receives (1152) a second user input to add a third visualization card in the first scene.

In response to the second user input, the computing device 200 generates (1154) one or more visualization recommendations for the third visualization card.

In some implementations, the one or more visualization recommendations include (1156) one or more of: (i) a first visualization recommendation that filters (e.g., focuses on or drills down on) values of the first metric to a subset of data values, corresponding to a second date/time range that is narrower than the first date/time range, or (iii) a second visualization recommendation that spans an entire time period of the one or more data sources. This method improves user experience by recommending charts that can help authors incrementally talk about a metric using a sequence of cards.

In some implementations, the subset of data values corresponds (1158) to a local maximum (e.g., a peak) or a local minimum (e.g., a valley) of the first data visualization.

In some implementations, the method 1100 includes identifying the subset of data values using (1160) a moving average algorithm, generating (1162) a first line chart that includes the subset of data values, and displaying (1164) the first line chart in the recommendation region.

In some implementations, the algorithm uses three input parameters: (1) a lag, which controls the size of a moving window; (2) a threshold (k), which determines the number of standard deviations (i.e., z-score); and (3) an influence, which controls how much influence new data points have on the moving average and standard deviation. At each time step t, a moving average $\mu_t$ and a standard deviation at are calculated using data within the moving window. A data point is considered a peak if its value is greater than $\mu_t+\lambda*\sigma_t$ or a valley if its value is less than $\mu_t-\lambda*\sigma_t$.

In some instances, the one or more data sources include (1166) a second metric having a categorical data field. The method 1100 further includes generating (1168) (e.g., automatically, without user intervention) a line chart having a plurality of lines (e.g., a multi-series line chart). Each of the lines corresponds to a distinct data value of the categorical data field. The method 1100 further includes displaying (1170) the line chart in the recommendation region.

In some instances, the computing device 200 receives (1172) user selection (e.g., manual selection) of a second metric of the plurality of metrics in the data schema and filter panel. In response to the user selection, the computing device 200 displays (1174) (e.g., generates and displays) a second data visualization, corresponding to the second metric, in the recommendation region.

In some instances, the computing device 200 receives (1176) user selection (e.g., manual user selection) of a second metric and a third metric of the plurality of metrics in the data schema and filter panel. The second metric and the third metric are selected by the user concurrently (see, e.g., FIG. 6C).

In some implementations, in response to the user selection, the computing device 200 retrieves metric definitions and associated data corresponding to the second metric and the third metric. The computing device 200 generates (1178) a second data visualization, which includes two lines (e.g., a multi-series line chart), corresponding to the second metric and the third metric, respectively. The computing device 200 displays (1180) the second data visualization in the recommendation region.

FIGS. 20A to 20E provide a flowchart of a method 1200 for presenting time series metrics according to some implementations. The method 1200 is also called a process.

The method 1200 is performed (1202) at a computing device 200 that has a display 208, one or more processors 202, and memory 206. The memory 206 stores (1204) one or more programs configured for execution by the one or more processors 202. In some implementations, the operations shown in FIGS. 1A, 1B, 4A-4H, 5A-5I, 6A-6F, 7A-7D, 8A-8D, 9, 10A-10K, 11A-11J, 12A-12K, 13A-13H, 14A-14H, 15A-15H, 16A-16N, and 17A-17D correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1200 may be combined and/or the order of some operations may be changed.

The computing device 200 displays (1206), in a graphical user interface, a canvas region 106, which includes one or more scenes 118. The one or more scenes include a first scene 118-1 having a first visualization card 124-1. In some implementations, the first visualization card is a blank visualization card that does not include any data visualization. In some implementations, the first visualization card includes (e.g., contains) a data visualization.

In some instances, the first scene includes (1208) a second visualization card adjacent to the first visualization card. The second visualization card has a second data visualization.

The computing device 200 displays (1210), in the graphical user interface, a recommendation region 104, which includes one or more data visualizations. Each data visualization of the one or more data visualizations corresponds to a respective metric of a data source. The respective metric has a respective temporal attribute. In some implementations, the metrics span different time periods and have different temporal granularities.

In some instances, the one or more data visualizations include (1212) a first data visualization having a first temporal granularity. For example, the first temporal granularity can be a "Year" (Y) granularity, a "Year-Month" (Y-M) granularity, or a "Year-Month-Day" (Y-M-D) granularity. This is illustrated in FIGS. 7B, 7C, and 7D.

In some instances, the one or more data visualizations include (1214) a first data visualization having a time axis domain including the start date and the end date.

In some instances, the first data visualization includes (1216) a plurality of data marks, including data marks corresponding to the start date and the end date.

In some instances, the first data visualization is (1218) a line chart (e.g., a line graph).

In some implementations, prior to displaying the one or more data visualizations in the recommendation region, the computing device 200 generates (1220) the one or more data visualizations. In some implementations, the generating includes identifying (1222) a plurality of metrics (e.g., time series metrics) corresponding to the data source. Each metric of the plurality of metrics has a respective temporal attribute. The generating includes computing (1224), for each metric of the plurality of metrics, a respective parameter that measures the variability of values of the respective metric, identifying (1226) a subset of metrics, from the plurality of metrics, based on the computed parameters, retrieving or generating (1228), for each metric in the subset of metrics, a respective data visualization, and displaying (1230) the one or more retrieved/generated data visualizations in the recommendation region. The method improves the user experience by assisting users in identifying new or interesting metrics to introduce into their presentations.

In some implementations, generating the one or more data visualizations includes: when the canvas region includes a second scene having a second visualization card with a second data visualization, determining (1232) a second metric, of the plurality of metrics, to which the second data visualization corresponds. The generating includes determining (1234) whether the subset of metrics includes the second metric. When the subset of metrics includes the second metric, the computing device 200 decreases (1236) a the priority of the second metric in the subset. The method improves the user experience by assisting users in identifying metrics that have yet to be discussed, to include in their presentations.

In some implementations, the computing device 200 displays (1238), in the graphical user interface, a data schema and filter panel 102.

In some implementations, the computing device 200 displays (1240) a plurality of metrics (e.g., identifiers corresponding to the plurality of metrics) in the data schema and filter panel 102.

In some implementations, the plurality of metrics corresponds (1242) to (e.g., is associated with) one or more data sources.

In some implementations, the computing device 200 displays (1244), in the graphical user interface, a scene summary (e.g., the scene summary 130 in FIG. 1B). In some implementations, the scene summary summarizes all scenes on the canvas. The scene summary includes, for each scene of the one or more scenes: (i) a respective count (e.g., number) of visualization cards corresponding to the scene; (ii) a respective count of text cards corresponding to the scene; (iii) a respective count of unique (e.g., distinct) metrics corresponding to the scene (e.g., the scene summary includes the number of unique metrics for each scene of the one or more scenes); and (iv) a respective cumulative temporal span corresponding to the scene. This is illustrated in FIG. 1B. This feature improves the user experience by providing a graphical summary of the canvas, indicating each scene's associated metrics and its chronological coverage.

In some implementations, the respective cumulative temporal span is displayed (1246) as a graphical element (e.g., a bar, a line, or a rectangle) having a length that is proportional to the cumulative temporal span.

In some instances, the computing device 200 receives (1248) user specification of a second temporal granularity for the first data visualization, distinct from the first temporal granularity. For example, the second temporal granularity can include a "Year" (Y) granularity, a "Year-Month" (Y-M) granularity, or a "Year-Month-Day" (Y-M-D) granularity.

In some implementations, the user specification comprises a user selection (1250) of a user interface element (e.g., an icon or a button), corresponding to the second temporal granularity, in the data schema and filter panel (e.g., via a granularity filter 110 as illustrated in FIGS. 7C and 7D).

In some implementations, in accordance with the user specification, the computing device 200 updates (1252) data marks in the first data visualization to include a subset of data marks, corresponding to the second temporal granularity.

In some implementations, the computing device 200 determines (1254), from the one or more data sources, a start date (e.g., a date, month, and/or year that is the earliest in time, or least recent in time) and an end date (e.g., a date, month, and/or year that is most recent in time) corresponding to the plurality of metrics. The computing device 200 displays (1256) the start date and the end date in the data schema and filter panel.

In some instances, the computing device 200 receives (1258) a user input modifying the start date and/or the end date. In accordance with the user input, the computing device 200 modifies (1260) the time axis domain of the first data visualization according to the modified start date and/or end date. The computing device 200 displays (1262), in the recommendation region, an updated first data visualization having the modified time axis domain.

In some instances, the updated first data visualization includes (1264) a subset of the plurality of data marks that are filtered according to the modified time axis domain.

In some instances, the computing device 200 receives (1266) user selection to add a first data visualization, corresponding to a first metric, to the first visualization card. In some implementations, the user selection comprises user selection of a "Add to Card" icon (e.g., the add icon 450-1 in FIG. 6D, or the add icon 450-10 in FIG. 10J).

In response to the user selection, the computing device 200 updates (1268) display of the first visualization card to include the first data visualization.

In some implementations, in response to the user selection, the computing device 200 updates (1272) the scene summary 130 by incrementing (e.g., by one) the respective count of visualization cards corresponding to the first scene.

In some implementations, when the first data visualization corresponds to a distinct metric in the first scene (e.g., the first data visualization corresponds to a metric that has yet to appear in the first scene), the computing device 200 updates (1272) the scene summary by incrementing (e.g., by one) the respective count of unique metrics corresponding to the first scene.

In some instances, the computing device 200 receives (1274) user input to specify merging the first data visualization with the second data visualization.

In some implementations, responsive to the user input, when (i) the first data visualization and the second data visualization share (e.g., include or have) a common time period and (ii) there is a substantial overlap between the first range of values on the vertical axis of the first data visualization and the second range of values on the vertical axis of the second data visualization, the computing device 200 merges (1276) the first data visualization and the second data visualization into a single (e.g., one) data visualization.

Figure 21A:
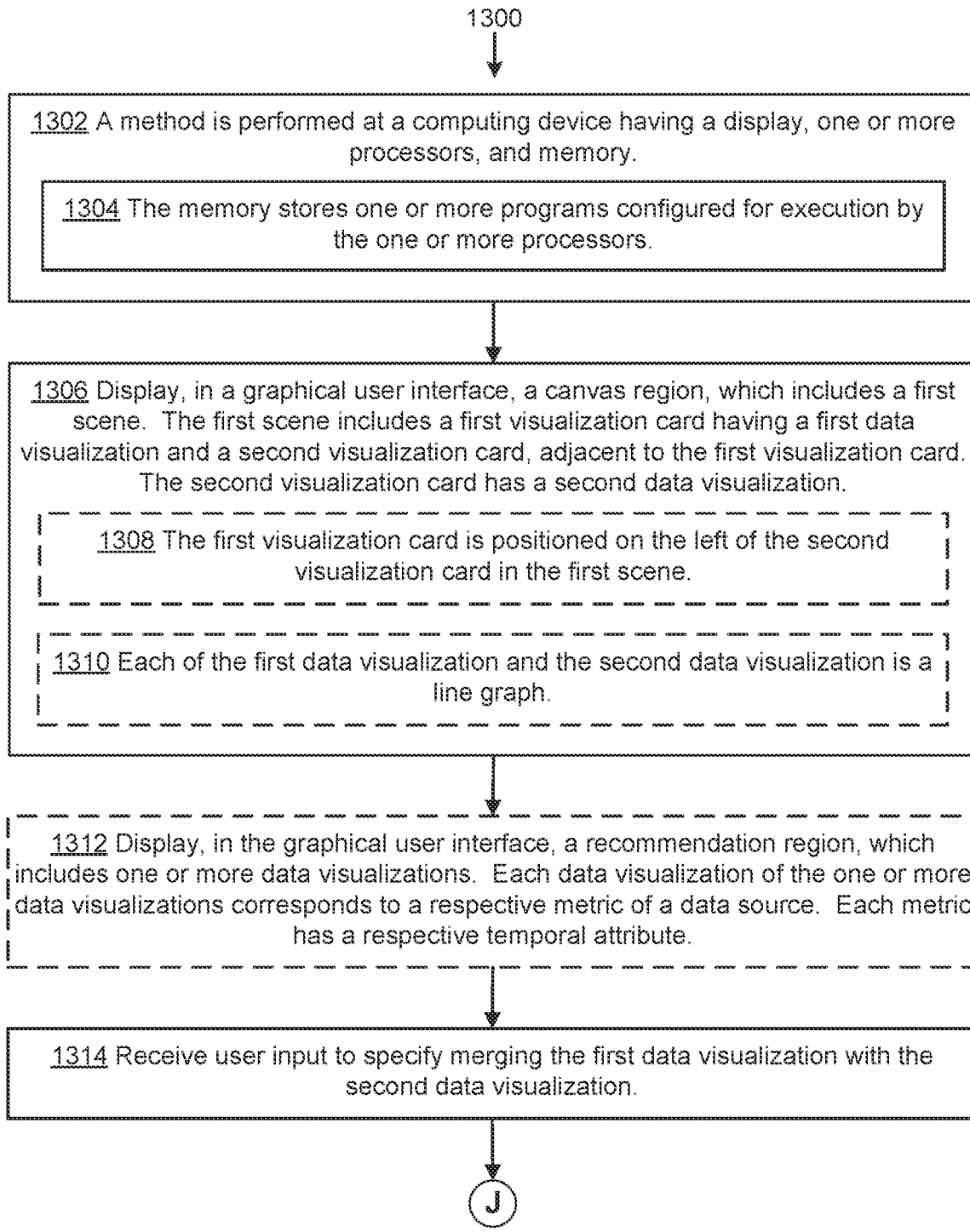

FIGS. 21A to 21C provide a flowchart of a method 1300 for combining data visualizations on visualization cards in a time series metric presentation according to some implementations. The method 1300 is also called a process.

The method 1300 is performed (1302) at a computing device 200 that has a display 208, one or more processors 202, and memory 206. The memory 206 stores (1304) one or more programs configured for execution by the one or more processors 202. In some implementations, the operations shown in FIGS. 1A, 1B, 4A-4H, 5A-5I, 6A-6F, 7A-7D, 8A-8D, 9, 10A-10K, 11A-11J, 12A-12K, 13A-13H, 14A-14H, 15A-15H, 16A-16N, and 17A-17D correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1300 may be combined and/or the order of some operations may be changed.

The computing device 200 displays (1306), in a graphical user interface 100, a canvas region 106, which includes a first scene 118. The first scene includes a first visualization card 124-1 having a first data visualization and a second visualization card 124-2, adjacent to the first visualization card. The second visualization card has a second data visualization.

In some implementations, the first visualization card is (1308) positioned on the left of (e.g., immediately on the left of, or immediately next to) the second visualization card in the first scene (e.g., there is no other text or visualization card between the first visualization card or the second visualization card). This is illustrated in FIG. 14A.

In some implementations, each of the first data visualization and the second data visualization is (1310) a line graph.

In some implementations, the computing device 200 displays (1312), in the graphical user interface, a recommendation region, which includes one or more data visualizations, each data visualization corresponding to a respective metric for a data source. Each metric has a respective temporal attribute. In some implementations, the metrics span different time periods and have different temporal granularities.

The computing device 200 receives (1314) user input to specify merging the first data visualization with the second data visualization. In some implementations, the user input includes user selection of a user-selectable interface element (e.g., a merge icon 646, as shown in FIG. 14A). In some implementations, the user-selectable interface element is positioned between the first and second visualization cards. In some implementations, the computing device displays the user-selectable interface element in accordance with a determination (e.g., detection) that two visualization cards are positioned next to each other.

In some implementations, responsive to the user input, the computing device 200 merges (1316) the first data visualization and the second data visualization into a single data visualization when (i) the first data visualization and the second data visualization share a common time period (e.g., the first data visualization spans a first time period on the x-axis, and the second data visualization spans a second time period on the x-axis, which overlaps by at least 50% with the first time period) and (ii) there is a substantial overlap between the first range of values (e.g., numerical values, absolute values, percentage values, or ratios) on the vertical axis of the first data visualization and the second range of values on the vertical axis of the second data visualization (e.g., the first and second data visualizations have comparable numerical values, or values of the same order of magnitude, in a vertical axis domain).

In some instances, the first range of values (e.g., the vertical axis of the first data visualization) has (1318) a first unit of measurement and the second range of values (e.g., the vertical axis of the second data visualization) has a second unit of measurement, distinct from the first unit of measurement. Stated another way, the option to merge two visualizations depends on the actual numerical values (e.g., y values) of the first data visualization and the second data visualization, whereas the units of measurement of the values do not matter.

In some implementations, the computing device 200 displays (1320), with the single data visualization, a legend that includes the first unit of measurement and the second unit of measurement.

In some implementations, the single data visualization includes (1322) a horizontal axis having the common time period and a single vertical axis having a range of values that is common to the first range of values and the second range of values.

In some implementations, the single data visualization is (1324) a line graph that consists of two lines (e.g., a multi-series line chart).

In some implementations, the first visualization card is a line graph with one line (e.g., representing one metric). The second visualization card is a line graph with one line (e.g., representing one metric). The merged data visualization is a line chart with two lines (e.g., two metrics).

In some implementations, the merged data visualization is a data visualization (e.g., a line chart) having multiple lines. The number of lines is equal to the sum of the number of lines in the first data visualization on the first visualization card and the number of lines in the second data visualization on the second visualization card.

In some instances, the computing device 200 displays (1326) the single data visualization on the first visualization card.

In some implementations, displaying the single data visualization on the first data visualization card includes removing (1328) (e.g., deleting or removing from display) the second visualization card from the first scene.

In some implementations, the method 1300 includes, responsive to (1330) the user input, when (i) the first data visualization includes a first range of values on the vertical axis and (ii) the second data visualization includes a second range of values on the vertical axis that is substantially distinct from the first range of values, do not permit merging (unless transformed). Responsive to a first user input selecting the vertical axis of the first data visualization, the computing device 200 displays (1332) a user-selectable interface element (e.g., an icon, a button, or an affordance), adjacent to the vertical axis of the first data visualization, for transforming (e.g., converting) values on the vertical axis (e.g., y-axis) from absolute values to relative values (e.g., percentages or ratios). The computing device 200 receives (1334) a first user selection of the user-selectable interface element. In response to the first user selection, the computing device 200 transforms (1336) (e.g., converts or indexes) the first range of values to a relative scale (e.g., a ratio or a percentage) relative to a first value appearing in the first data visualization. For example, suppose the first value on the vertical axis that appears in the first data visualization is about 10. That value becomes 100%. Other values in the vertical axis are relativized relative to the value 10 (e.g., a value of 15 becomes 150% or 1.5, a value of 8 becomes 80% or 0.8, etc.). This is illustrated in FIG. 14D.

In some implementations, the computing device 200 determines that the first range of values and the second range of values are substantially distinct when they do not have a comparable value domain. For example, as illustrated in FIG. 14C, the first data visualization 654 has a range of values from ~5 to 25 whereas the second data visualization 656 has a range of values from ~2000 to 5000. In some implementations, the computing device 200 determines that the first range of values and the second range of values are substantially distinct when they have different orders of magnitude. Using FIG. 14C as an example, the second range of values is two orders of magnitude larger than the first range of values. the computing device 200 determines that the first range of values and the second range of values are substantially distinct when there is no overlap between the first range of values and the second range of values.

The method improves the user experience by presenting a user with a group of icons that can assist the user in the process of transforming the value domains of a data visualization. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

In some implementations, responsive to (1338) a second user input selecting the vertical axis of the second data visualization, the computing device 200 displays the user-selectable interface element adjacent to the vertical axis of the second data visualization. The computing device 200 receives (1340) a second user selection of the user-selectable interface element. In response to the second user selection, the computing device 200 transforms (1342) the second range of values to a relative scale, relative to a first value appearing in the second data visualization. This is illustrated in FIG. 14F.

The method improves user experience by presenting a user with a group of icons that can assist the user in the process of transforming the value domains of a data visualization. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

In some implementations, the computing device 200 receives (1344) third user input to specify merging the first data visualization with the second data visualization. For example, the third user input comprises user selection of a merge option, icon, affordance, or button. In some implementations, in accordance with the third user input, the computing device 200 merges (1346) the first and second data visualizations into a single data visualization.

FIGS. 22A to 22D provide a flowchart of a method 1400 for linking text and visualizations in a time series metric presentation according to some implementations. The method 1400 is also called a process.

The method 1400 is performed (1402) at a computing device 200 having a display 208, one or more processors 202, and memory 206. The memory 206 stores (1404) one or more programs configured for execution by the one or more processors 202. In some implementations, the operations shown in FIGS. 1A, 1B, 4A-4H, 5A-5I, 6A-6F, 7A-7D, 8A-8D, 9, 10A-10K, 11A-11J, 12A-12K, 13A-13H, 14A-14H, 15A-15H, 16A-16N, and 17A-17D correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1400 may be combined and/or the order of some operations may be changed.

The computing device 200 displays (1406), in a graphical user interface, a canvas region that includes a first scene 118. The first scene includes a first visualization card 124-1 having a first data visualization and a first text card 122-1, adjacent to (e.g., to the left or right of) the first visualization card.

In some instances, the first data visualization is (1408) a line chart.

In some instances, the first scene includes (1410) a second visualization card 124-2) having a second data visualization.

In some implementations, the first text card is (1412) positioned between the first visualization card and the second visualization card. This is illustrated in FIG. 16A.

In some implementations, each of the first data visualization and the second data visualization is (1414) a line chart.

In some implementations, the first text card includes (1416) a plurality of text input elements (e.g., text input elements 706-1 and 706-2 in FIG. 16D). In some implementations, each of the text input elements can be linked to either the visualization card that is to the left of the text card, or to the visualization card that is to the right of the text card.

In some implementations, the plurality of text input elements includes (1418) a first text input element 706-1 and a second text input element 706-2.

In some implementations, the computing device 200 displays (1420), in the graphical user interface, a recommendation region 104, which includes one or more data visualizations. Each data visualization of the one or more data visualizations corresponds to a respective metric for a data source, and each metric has a respective temporal attribute. The metrics can span different time periods and can have different temporal granularities. Generating two or more independent visualization recommendations in the same recommendation region reduces the number of user inputs necessary to build presentations using composite data visualization and makes the interaction with the blocks user interface more efficient.

The computing device 200 receives (1422), via the first text card, (i) text input from a user and (ii) user selection of a first user interface element for linking the first text card to the first visualization card. For example, the text input includes commentary about the first data visualization.

In some implementations, the text input from the user is received (1424) via the plurality of text input elements.

In accordance with the receiving, the computing device 200 determines (1426) whether the text input includes a first expression having a first time span that intersects (e.g., at least partially overlaps) with a temporal domain of the first data visualization. In some implementations, the computing device invokes a library for recognizing and normalizing time expressions in the paragraph, to perform the determination.

In some implementations, the first expression is (1428) located in the first text input element.

In accordance with a determination that the text input includes the first expression, and in response to a first user interaction with a first region of the first text card that includes the first expression, the computing device 200 visually emphasizes (1430) a first portion of the first data visualization, corresponding to the first time span. The method improves the user experience and provides improved visual feedback to the user by coordinating text commentary in the text card with the adjacent visualization card.

In some implementations, the first user interaction includes a user hovering the mouse cursor over the text input). In some implementations, the first user interaction includes a mouse hover action over a text input element of the first text card.

In some implementations, the computing device 200 visually emphasizes the first portion of the first data visualization in real time, as (e.g., while or during) the user interacts with the first region of the first text card.

In some implementations, visually emphasizing the first portion of the first data visualization includes displaying the first portion of the first data visualization in boldface, with increased line thickness, using a different color, highlighting, or adding a frame around the first portion, which is visually distinctive from other portions of the first data visualization that do not map to the first time span.

In some implementations, concurrently with visually emphasizing the first portion of the first data visualization, the computing device 200 visually de-emphasizes (1432) other portions of the first data visualization that do not correspond to (e.g., map to) the first time span indicated in the first expression. The method improves the user experience and provides improved visual feedback to the user by visually de-emphasizing portions of the data visualization that are not related to text commentary in the adjacent text card.

In some implementations, visually de-emphasizing other portions of the first data visualization includes graying out the other portions or omitting the other portions from display in the first data visualization. In some implementations, visually de-emphasizing other portions of the first data visualization includes obfuscating the other portions in the display (e.g., by applying a filter (e.g., a fogged filter) or a mask that is at least semi-opaque to obfuscate the other portions of the first data visualization).

In some implementations, the first data visualization is a line chart (e.g., a line plot). Visually de-emphasizing other portions of the first data visualization includes decreasing the thickness of the portions of the line chart that do not correspond to the first time span.

In some implementations, visually emphasizing the first portion of the first data visualization includes displaying (1434) the portion (e.g., only the first portion, and no other portion) of the line chart corresponding to the first time span (e.g., and omitting from display other portions of the line chart that do not correspond to the first time span).

Figure 22A:
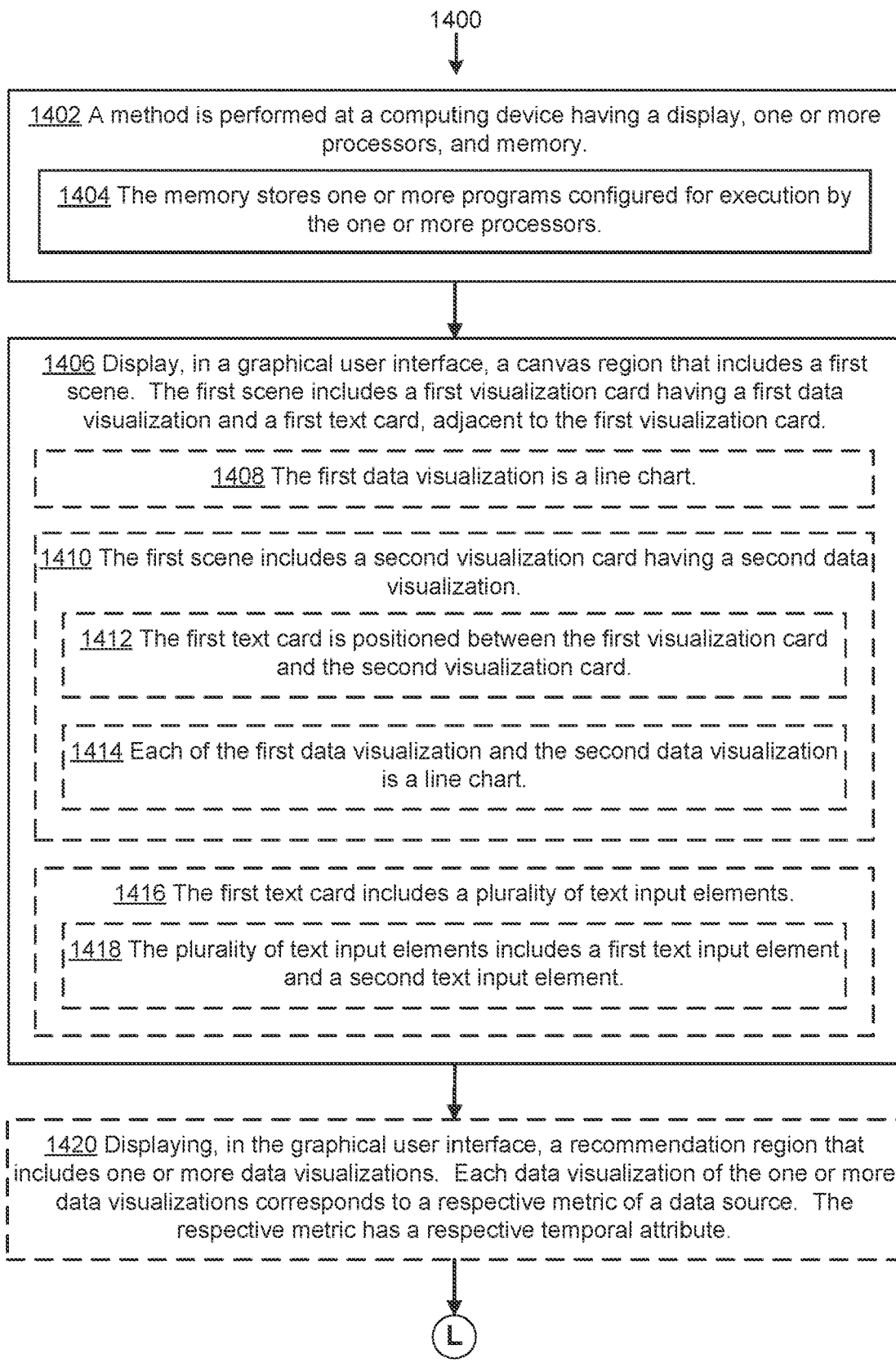
FIGS. 22A to 22D provide a flowchart of a method for linking text and visualizations in a time series metrics presentation according to some implementations.
Figure 22B:
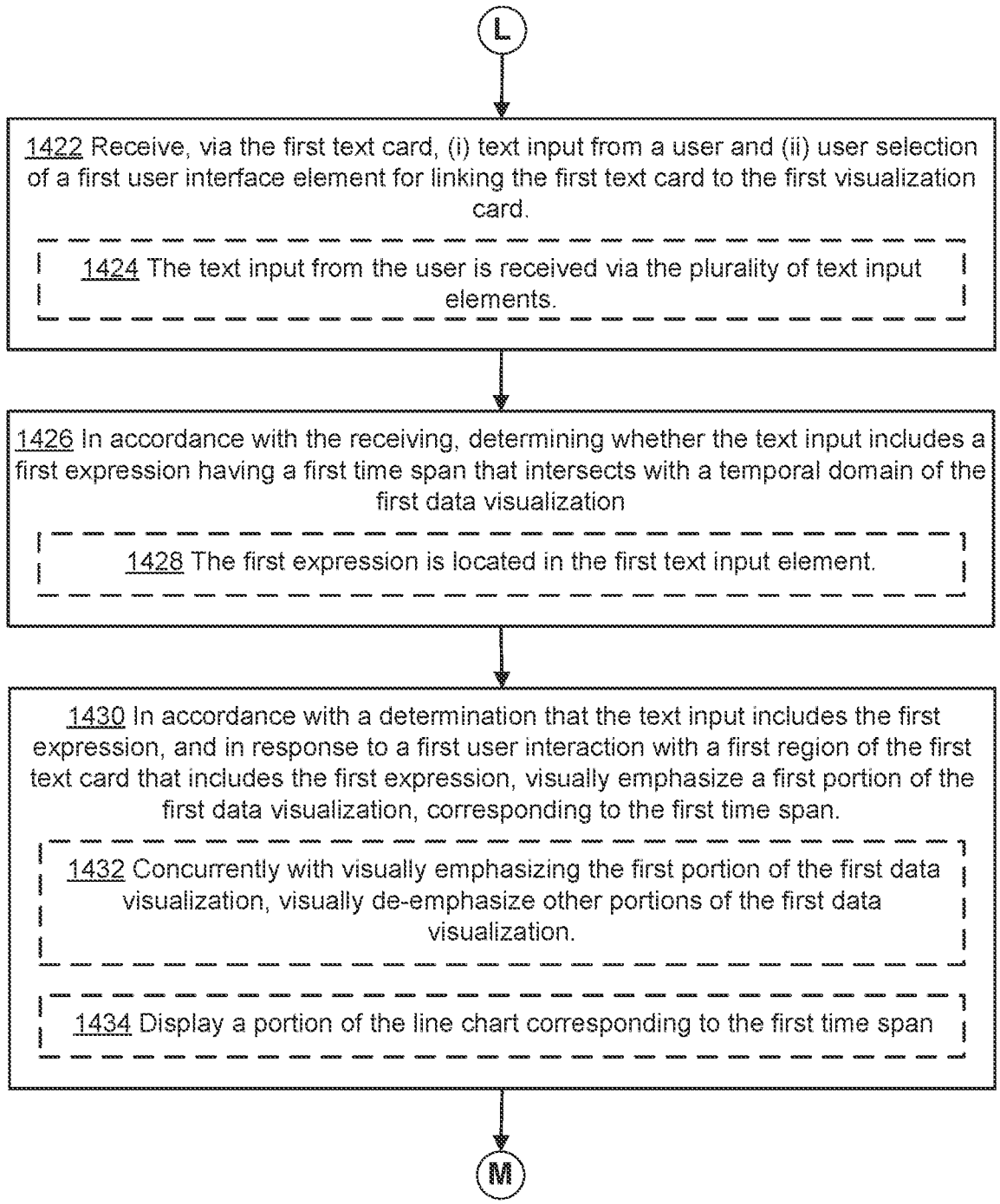
Figure 22C:
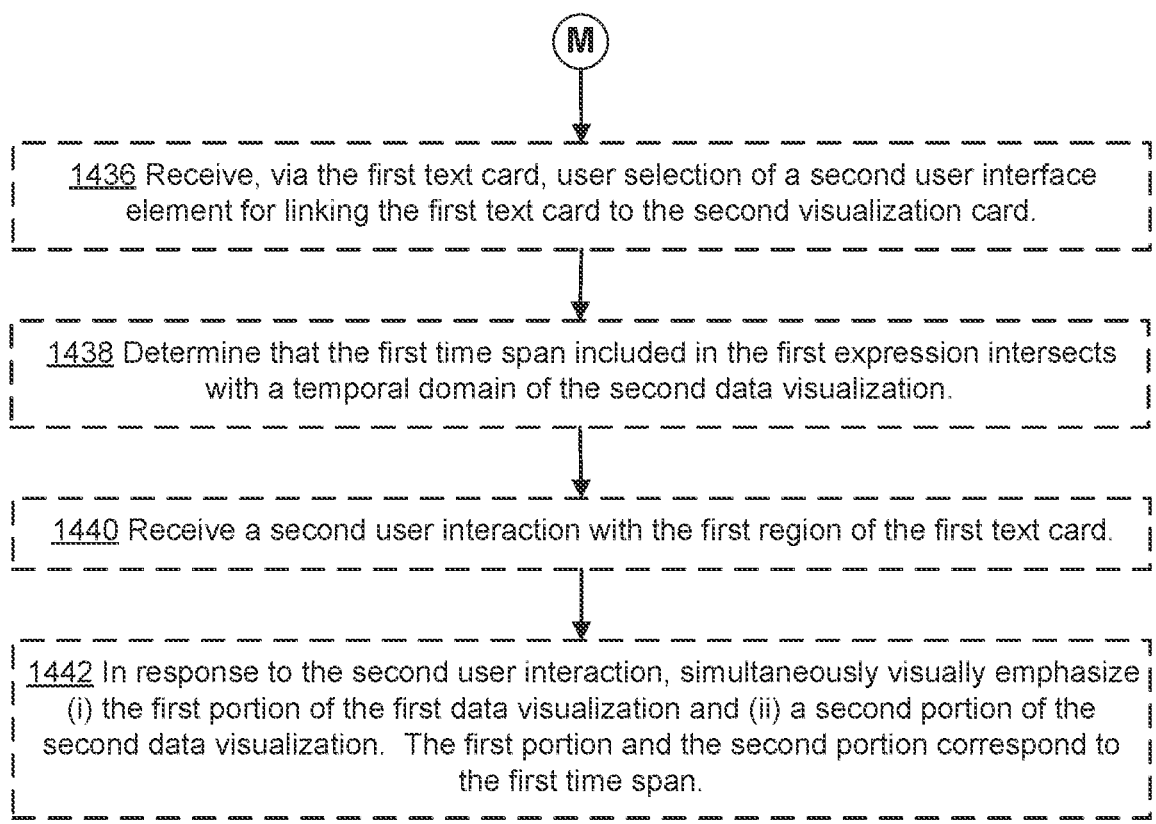

Referring to FIG. 22C, in some implementations, the computing device 200 receives (1436), via the first text card, user selection of a second user interface element for linking the first text card to the second visualization card. The computing device 200 determines (1438) that the first time span included in the first expression intersects with a temporal domain of the second data visualization (on the second visualization card). The computing device 200 receives (1440) a second user interaction (e.g., a mouse hover) with the first region of the first text card. In response to the second user interaction, the computing device 200 simultaneously visually emphasizes (1442) (i) the first portion of the first data visualization and (ii) a second portion of the second data visualization, where the first portion and the second portion correspond to the first time span.

Figure 22D:
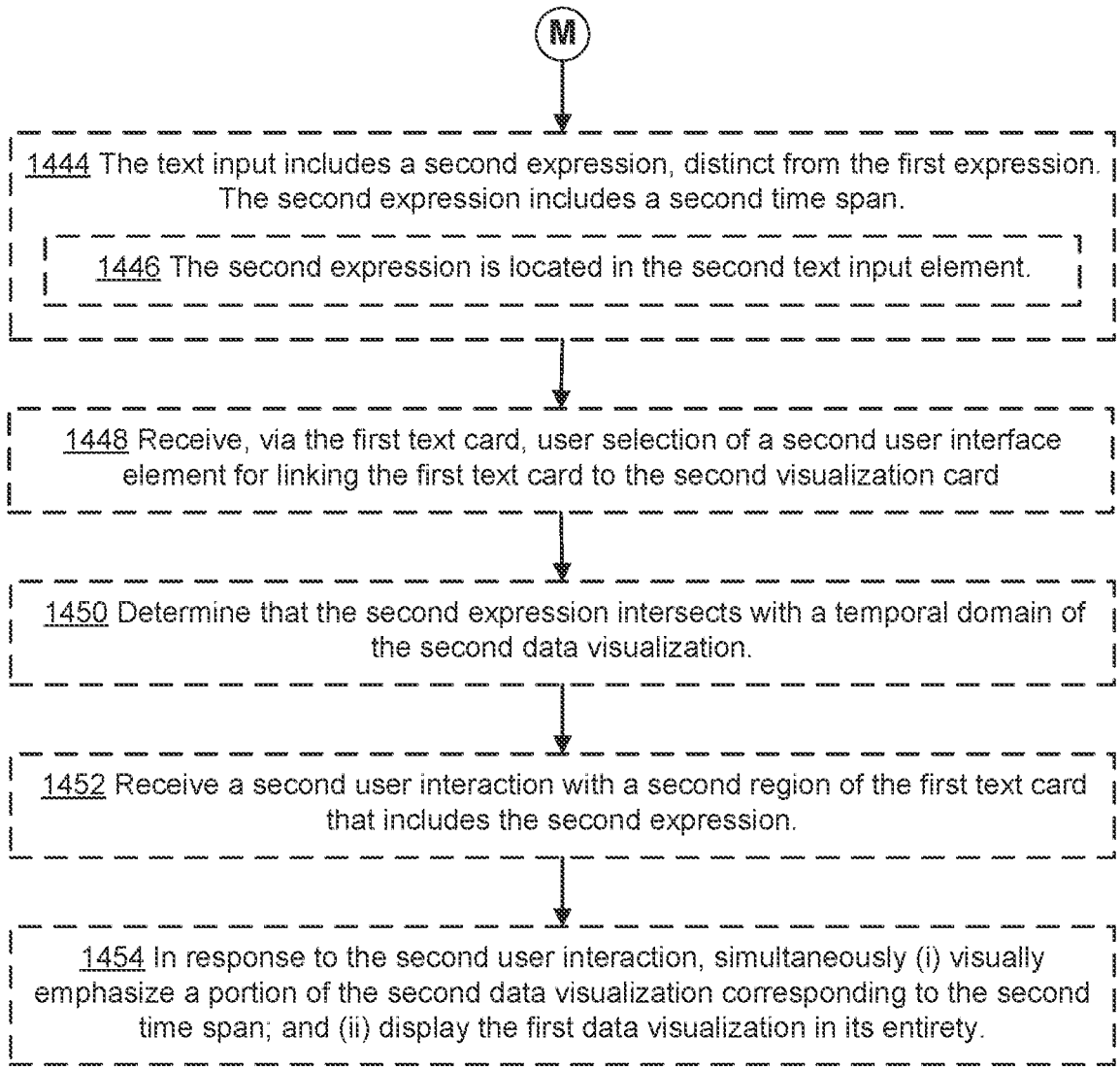
Figure 23A:
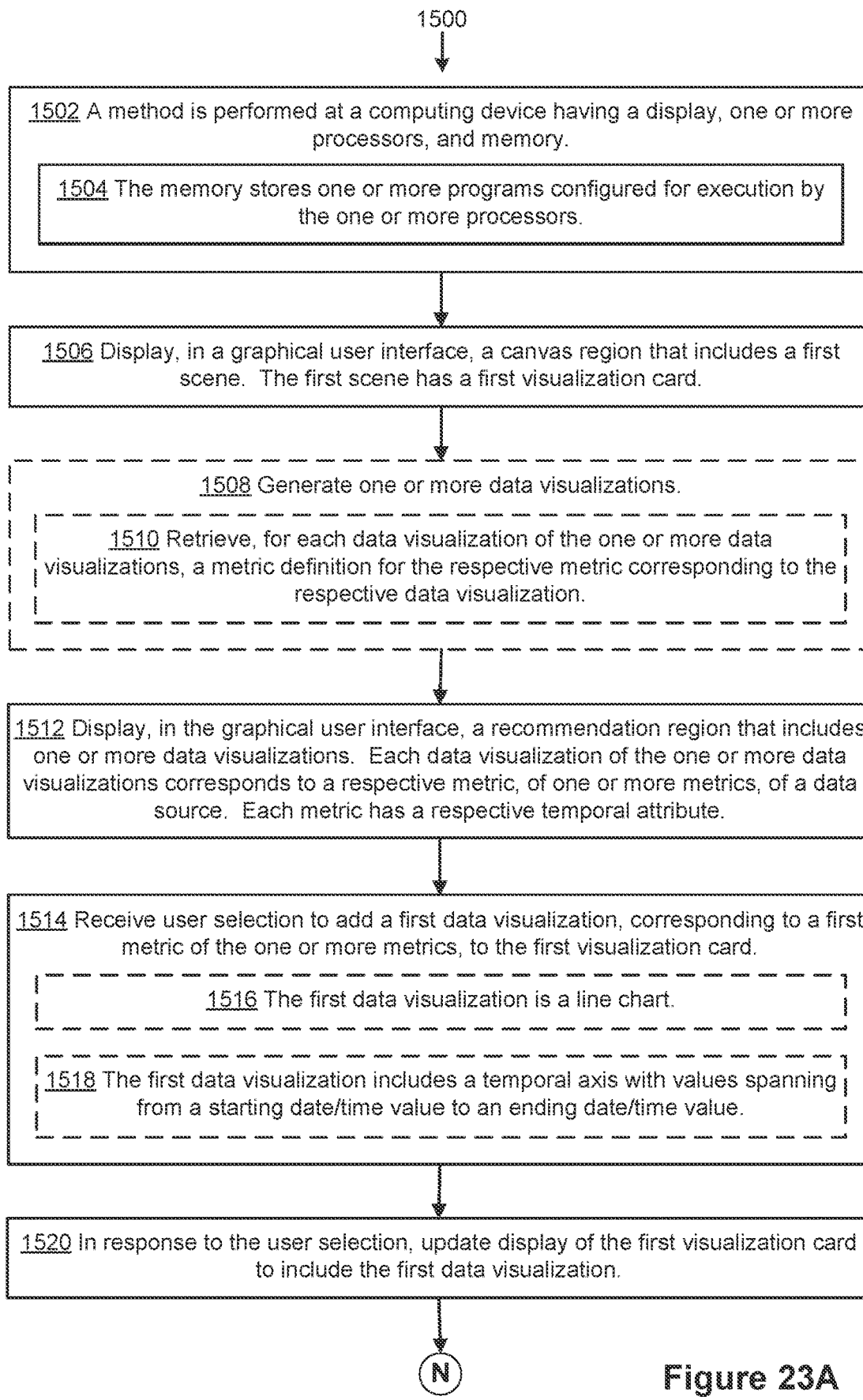
Figure 23B:
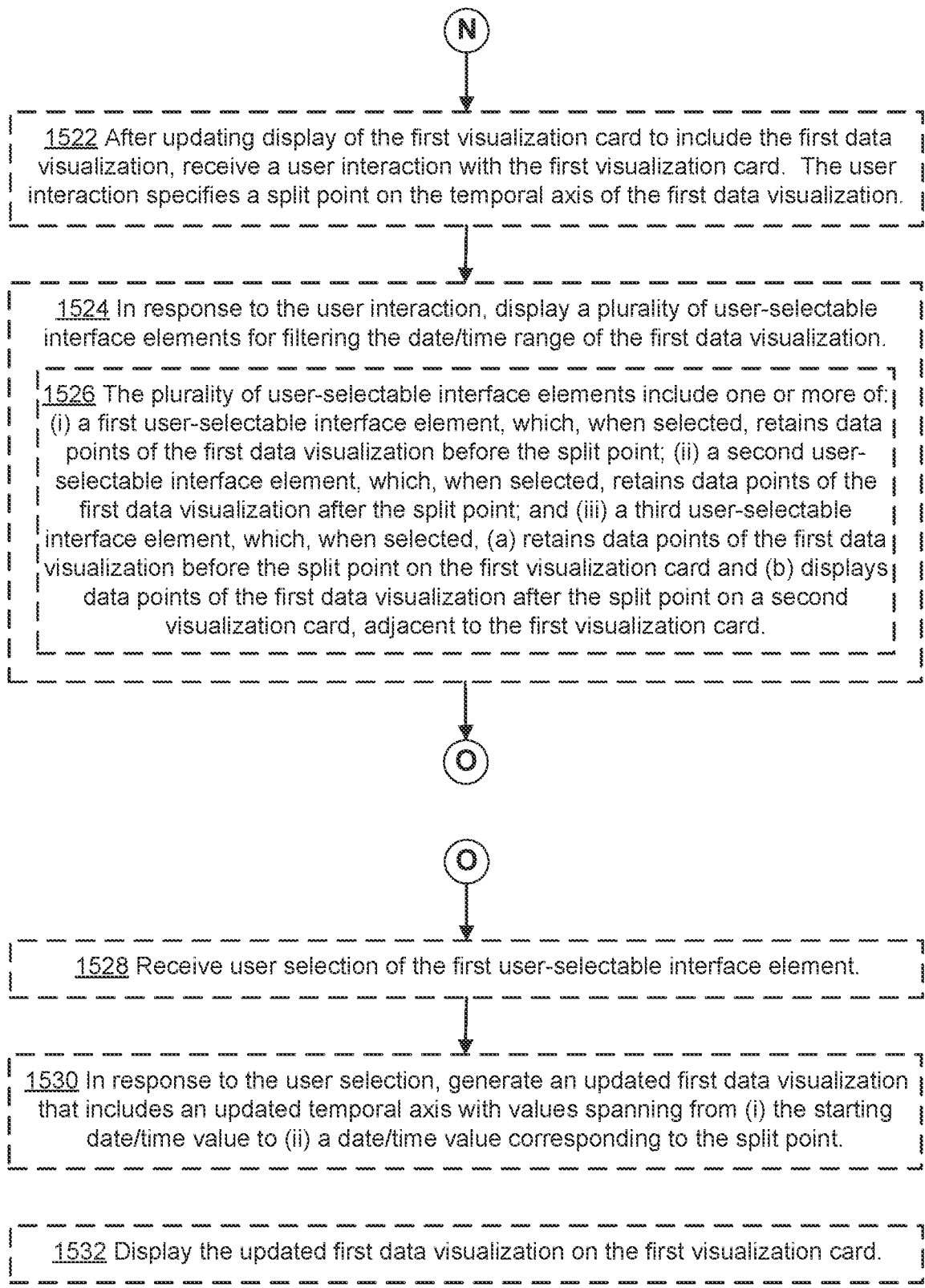
Figure 23C:
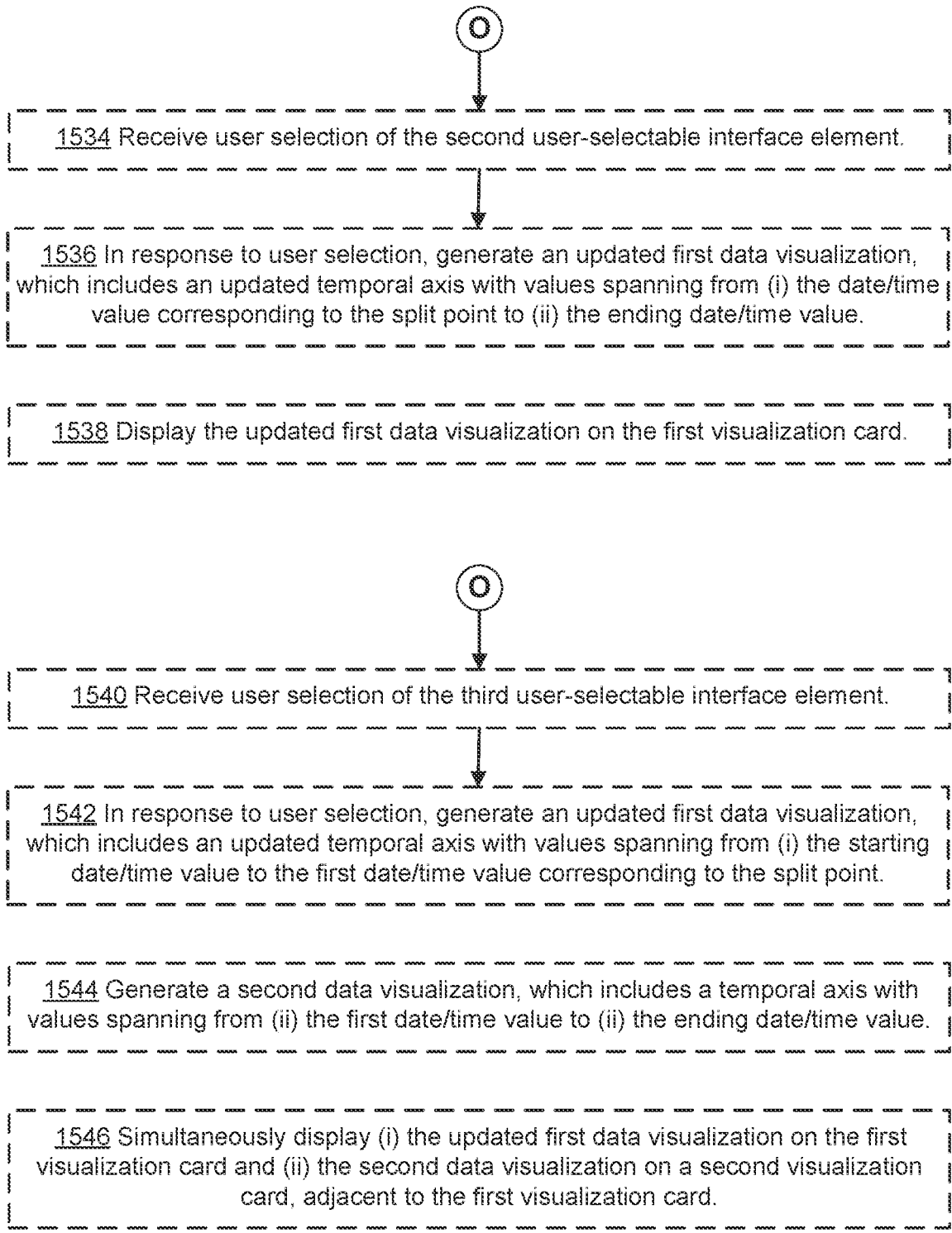
Figure 23D:
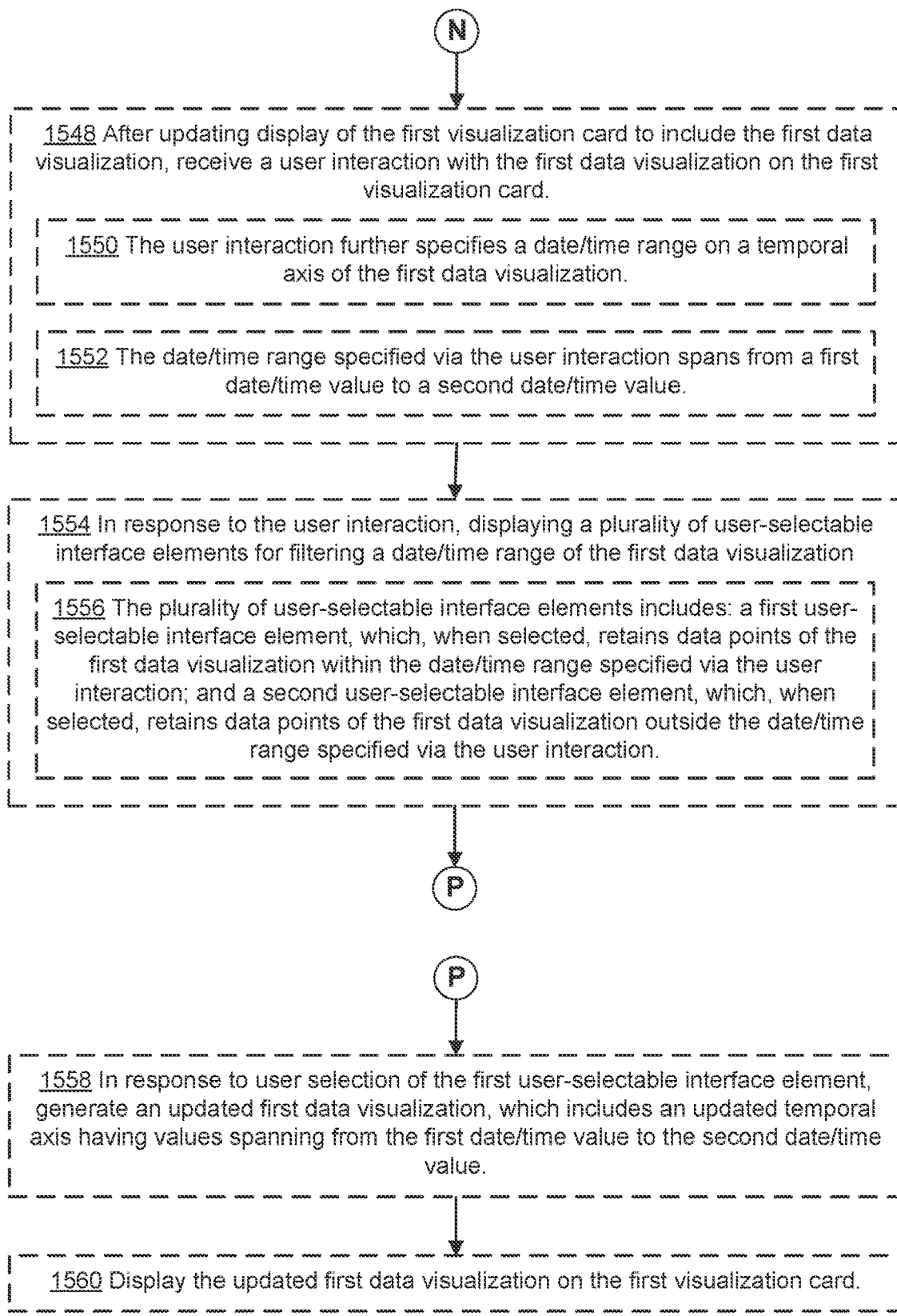
Figure 23E:
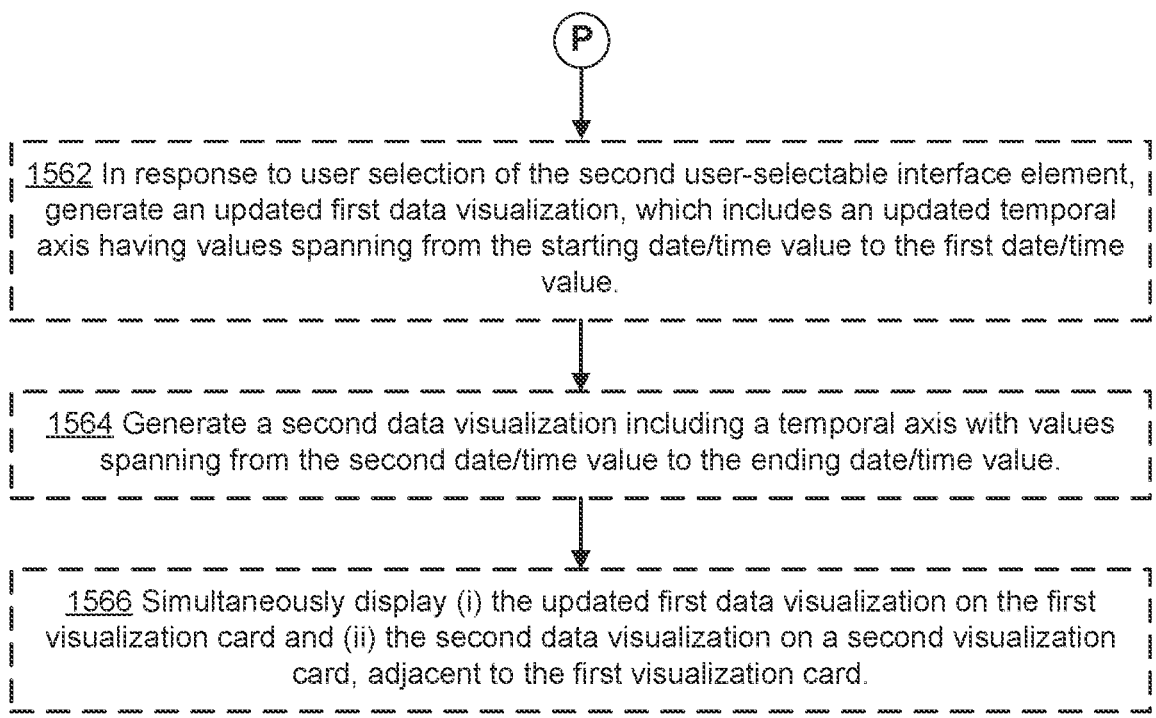
Figure 23G:
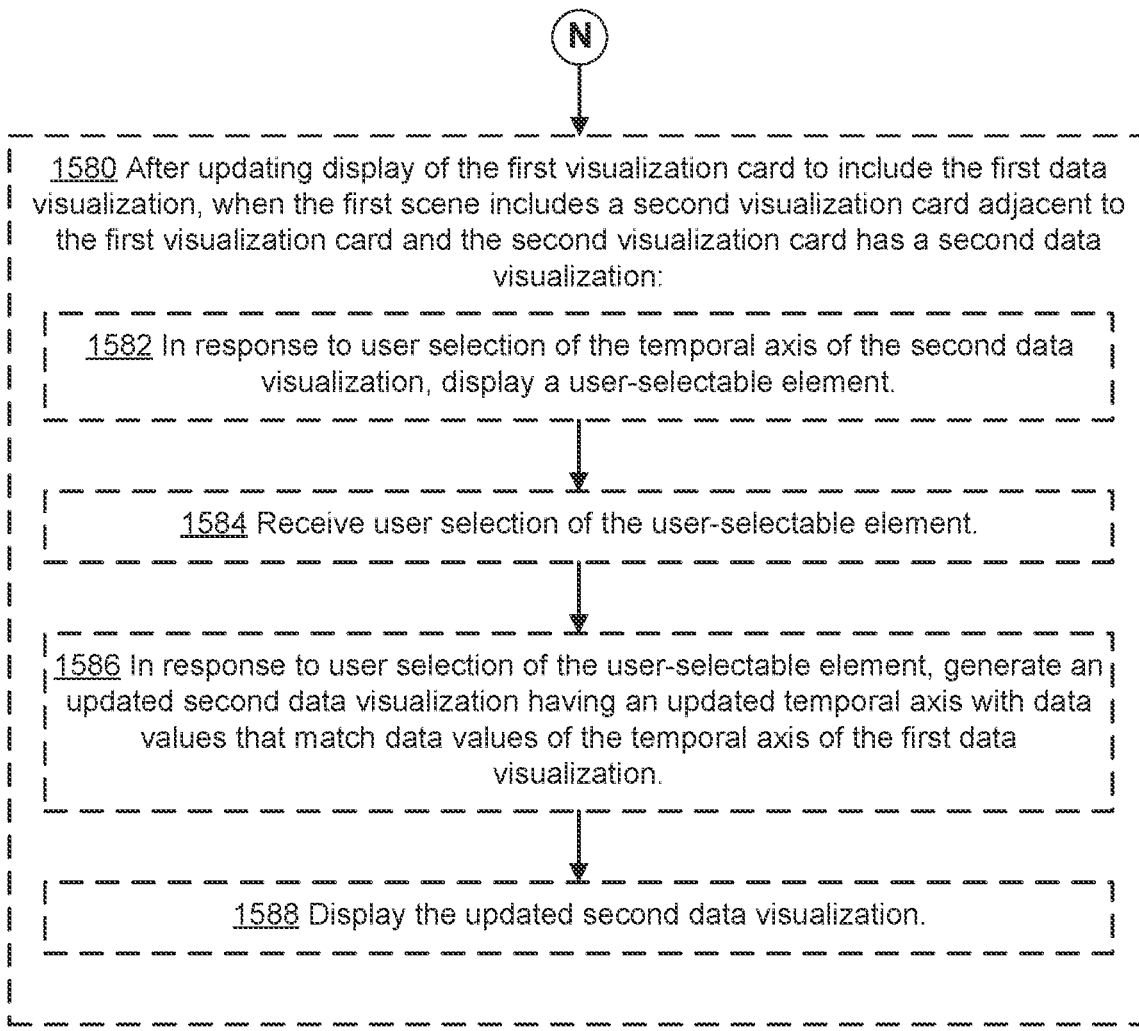
Figure 23H:
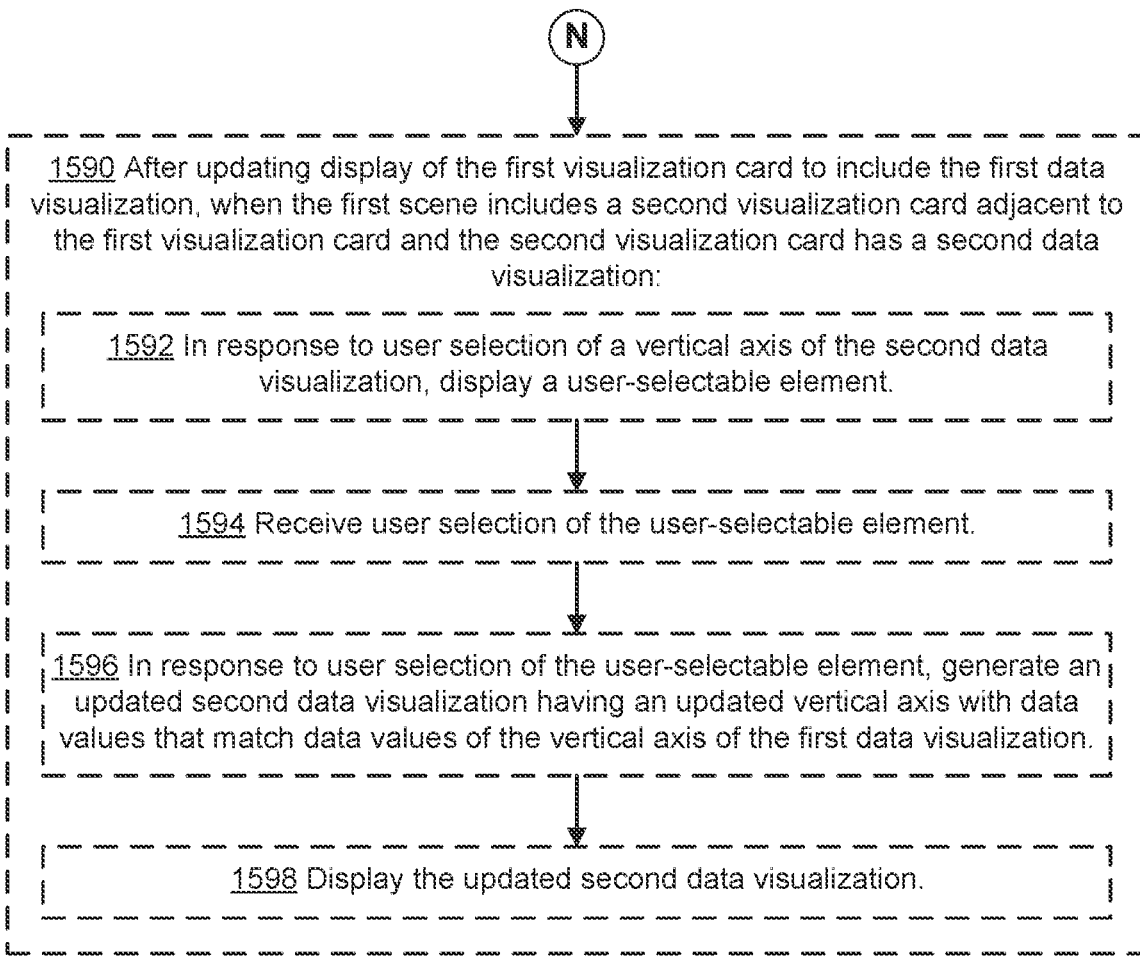

With continued reference to FIG. 22D, in some implementations, the text input includes (1444) a second expression (e.g., an expression that includes a time element, a phrase, or a partial sentence), distinct from the first expression. The second expression includes a second time span.

In some implementations, the second expression is (1446) located in the second text input element.

In some instances, the user input includes multiple expressions of time (e.g., time expressions), each of which is in a distinct text input element within a text card.

In some instances, the computing device 200 receives (1448), via the first text card, user selection of a second user interface element for linking the first text card to the second visualization card.

The computing device 200 determines (1450) that the second expression intersects with a temporal domain of the second data visualization. The computing device 200 receives (1452) a second user interaction with a second region of the first text card that includes the second expression (e.g., the second region does not include the first time span, or the user does not link the second region to the first visualization card). In response to the second user interaction, the computing device 200 simultaneously (1454) (i) visually emphasizes a portion of the second data visualization corresponding to the second time span and (ii) displays the first data visualization in its entirety.

FIGS. 23A to 23H provide a flowchart of a method 1500 for presenting time series metrics according to some implementations. The method 1500 is also called a process.

The method 1500 is performed (1502) at a computing device 200 having a display 208, one or more processors 202, and memory 206. The memory 206 stores (1504) one or more programs configured for execution by the one or more processors 202. In some implementations, the operations shown in FIGS. 1A, 1B, 4A-4H, 5A-5I, 6A-6F, 7A-7D, 8A-8D, 9, 10A-10K, 11A-11J, 12A-12K, 13A-13H, 14A-14H, 15A-15H, 16A-16N, and 17A-17D correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1500 may be combined and/or the order of some operations may be changed.

The computing device 200 displays (1506), in a graphical user interface, a canvas region that includes a first scene 118. The first scene has a first visualization card.

In some implementations, the first visualization card is a blank card that does not contain any data visualization. In some implementations, the first visualization card contains (e.g., displays or includes) a data visualization.

In some implementations, the computing device 200 generates (1508) one or more data visualizations. In some implementations, generating the one or more data visualizations includes retrieving (1610), for each data visualization of the one or more data visualizations, a metric definition for the respective metric corresponding to the respective data visualization. In some implementations, generating the one or more data visualizations includes retrieving, for each data visualization of the one or more data visualizations, data corresponding to the metric.

In some implementations, the metric definition includes information that the computing device 200 uses to construct a visualization for the metric. In other words, rather than retrieving a static, previously saved, stale version of a data visualization itself, the computing device 200 constructs a data visualization using the metric definition and/or the data corresponding to the metric that is up-to-date. Accordingly, this approach is advantageous compared to existing methods (and systems) that rely on "static" charts with data that is "frozen-in-time" at the time of creation of the charts.

The computing device 200 displays (1512), in the graphical user interface, a recommendation region 104, which includes one or more data visualizations. Each data visualization of the one or more data visualizations corresponds to a respective metric, of one or more metrics, for a data source. Each metric has a respective temporal attribute (e.g., time). In some implementations, the metrics span different time periods and have different temporal granularities.

The computing device 200 receives (1514) user selection to add a first data visualization, corresponding to a first metric of the one or more metrics, to the first visualization card. For example, in some implementations, the user selection comprises user selection of the "Add to Card" icon 450-1.

In some instances, the first data visualization is (1516) a line chart.

In some instances, the first data visualization includes (1518) a temporal axis with values spanning from a starting date/time value to an ending date/time value.

In some implementations, in response to the user selection, the computing device 200 updates (1520) display of the first visualization card to include (e.g., add) the first data visualization.

In some implementations, the first visualization card is initially a blank card that does not contain any data visualization. Updating the display of the first visualization card to include the first data visualization includes populating the blank visualization card with the first data visualization.

In some implementations, the first visualization card includes an existing data visualization. Updating the display of the first visualization card to include the first data visualization includes updating display of the first visualization card from the existing data visualization to the first data visualization (e.g., replacing the existing data visualization with the first data visualization).

In some instances, after updating display of the first visualization card to include the first data visualization, the computing device 200 receives (1522) a user interaction (e.g., a mouse click on a margin or a region of the visualization card, such as the top margin or top region) with the first visualization card. The user interaction specifies a split point (e.g., the split point 568 shown in FIG. 12A) on the temporal axis of the first data visualization. In response to the user interaction, the computing device 200 displays (1524) a plurality of user-selectable interface elements (e.g., the filter icons 570-1 to 570-5 shown in FIG. 12B) for filtering a date-time range of the first data visualization. The plurality of user-selectable interface elements includes (1526) one or more of: (i) a first user-selectable interface element that, when selected, retains data points of the first data visualization (e.g., on the first visualization card) before the split point (e.g., to the left of the split point); (ii) a second user-selectable interface element that, when selected, retains data points of the first data visualization after the split point (e.g., to the right of the split point); and (iii) a third user-selectable interface element that, when selected, (a) retains data points of the first data visualization before the split point on the first visualization card and (b) displays data points of the first data visualization after the split point on a second visualization card, adjacent to the first visualization card (e.g., the second visualization card is on the immediate right of the first visualization card).

The method improves the user experience by presenting a user with a group of icons that assist the user in the process of retaining or splitting a data visualization on a visualization card. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

In some instances, the computing device 200 receives (1528) user selection of the first user-selectable interface element (e.g., the first action icon 570-1 in FIG. 12B). In response to the user selection, the computing device 200 generates (1530) an updated first data visualization (e.g., modifies the first data visualization), which includes an updated temporal axis with values spanning from (i) the starting date/time value to (ii) a date/time value corresponding to the split point. In some implementations, the updated data visualization includes the starting date/time value and a date/time value corresponding to the split point. The computing device 200 displays (1532) the updated first data visualization on the first visualization card. This is illustrated in FIGS. 12C and 12D. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

In some implementations, generating the updated first data visualization includes modifying the first data visualization. In some implementations, generating the updated first data visualization includes taking the existing (e.g., initial) first data visualization and scaling and/or transforming it in some way (e.g., without having to build the updated data visualization from scratch).

In some implementations, when date/time filtering occurs, the computing device retains the filtered data but re-renders the data visualization (e.g., chart or line graph) without the filtered date/time span. In other words, the date/time filtering adjusts the temporal domain of the line chart. The initial data of the data visualization is retained, and the filtered portion is not displayed.

In some instances, the computing device 200 receives (1534) user selection of the second user-selectable interface element (e.g., the second action icon 570-2 in FIG. 12B). In response to the user selection, the computing device 200 generates (1536) an updated first data visualization, which includes an updated temporal axis with values spanning from (i) the date/time value corresponding to the split point to (ii) the ending date/time value. In some implementations, the updated first data visualization includes the date/time value corresponding to the split point. In some implementations, the updated first data visualization includes the ending date/time value. The computing device 200 displays (1538) the updated first data visualization on the first visualization card. This is illustrated in FIGS. 12G and 12H. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

In some instances, the computing device 200 receives (1540) user selection of the third user-selectable interface element (e.g., the third action icon 570-3 in FIG. 12B). In response to the user selection, the computing device 200 generates (1542) an updated first data visualization, which includes an updated temporal axis with values spanning from (i) the starting date/time value to the first date/time value corresponding to the split point. The computing device 200 generates (1544) a second data visualization, which includes a temporal axis with values spanning from (ii) the first date/time value to (ii) the ending date/time value. The computing device 200 simultaneously displays (1546) (i) the updated first data visualization on the first visualization card and (ii) the second data visualization on a second visualization card, adjacent to the first visualization card. This is illustrated in FIGS. 12I, 12J, and 12K. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

In some instances, after updating display of the first visualization card to include the first data visualization, the computing device 200 receives (1548) user interaction with the first data visualization on the first visualization card. For example, in some implementations, the user interaction includes user selection (e.g., via a mouse click) on a first portion of the first data visualization, holding the mouse button, and making a dragging motion (e.g., horizontally) while holding on to the mouse button (e.g., a brushing action).

In some implementations, the user interaction specifies (1550) a date/time range on a temporal axis of the first data visualization.

In some instances, the date/time range specified via the user interaction spans (1552) from a first date/time value to a second date/time value. For example, in some implementations, the first date/time value is a value that is after (e.g., later than) the starting date/time value. In some implementations, the second date/time value is a value that is before (e.g., earlier than) the ending date/time value.

In some implementations, in response to the user interaction from step 1548, the computing device 200 displays (1554) a plurality of user-selectable interface elements (e.g., the brushing icons 606-1 and 606-2 in FIGS. 13B and 13C) for filtering the date/time range of the first data visualization. The plurality of user-selectable interface elements includes (1556) a first user-selectable interface element (e.g., the first brushing icon 606-1 in FIG. 13B), which, when selected, retains data points of the first data visualization within the date/time range specified via the user interaction (e.g., within the brushed area). The plurality of user-selectable interface elements includes a second user-selectable interface element (e.g., the second brushing icon 606-2 in FIG. 13B), which, when selected, retains data points of the first data visualization outside the date/time range specified via the user interaction (e.g., outside the brushed area). For example, user selection of the second user-selectable interface element causes the areas that are outside the brushed areas to be displayed (e.g., in two adjacent visualization cards). The method improves user experience by presenting a user with a group of icons that would assist the user in the process of filtering a date/time range of a data visualization.

In some implementations, in response to user selection of the first user-selectable interface element (e.g., the first brushing icon 606-1 in FIG. 13B), the computing device 200 generates (1558) an updated first data visualization, which includes an updated temporal axis having values spanning from the first date/time value to the second date/time value. The computing device 200 displays (1560) the updated first data visualization on the first visualization card. This is illustrated in Fugues 13C and 13D. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

In some implementations, in response to user selection of the second user-selectable interface element (e.g., the second brushing icon 606-2 in FIG. 13B), the computing device 200 generates (1562) an updated first data visualization, which includes an updated temporal axis having values spanning from the starting date/time value to the first date/time value. The computing device 200 generates (1564) a second data visualization including a temporal axis with values spanning from the second date/time value to the ending date/time value. The computing device 200 simultaneously displays (1566) (i) the updated first data visualization on the first visualization card and (ii) the second data visualization on a second visualization card, adjacent to the first visualization card. This is illustrated in FIGS. 13F, 13G, and 13H. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

In some instances, the computing device 200 receives (1568) user interaction with the vertical axis of the first data visualization in the first visualization card. In response to the user interaction, the computing device 200 displays (1570) a plurality of user-selectable interface elements. The plurality of user-selectable interface elements includes (1572) a first user-selectable interface element (1), which, when selected, toggles between (i) a first vertical axis scale starting at zero (e.g., with values from zero to a maximum value) and (ii) a second vertical axis scale starting at a minimum value (e.g., with values from the minimum value to the maximum value). The plurality of user-selectable interface elements includes a second user-selectable interface element (2), which, when selected, toggles between (i) a third vertical axis scale with absolute values and (ii) a fourth vertical axis scale with relative values indexed relative to a first value (e.g., a y-coordinate value) appearing in the first data visualization.

In some instances, after updating display of the first visualization card to include the first data visualization, the computing device 200 receives (1574) user interaction with the temporal axis of the first data visualization on the first visualization card. In response to the user interaction, the computing device 200 displays (1576) a plurality of user-selectable interface elements (e.g., x-axis icons 536-1 and/or 536-2 in FIG. 11C). The plurality of user-selectable interface elements includes (1578) a first user-selectable interface element (e.g., first x-axis icon 536-1 in FIG. 11C), which, when selected, toggles between (i) a first temporal axis scale having absolute date/time values (e.g., absolute chronological dates and/or times) and (ii) a second temporal axis scale having relative dates relative to a first date in the first data visualization. The method improves user experience by presenting a user with a group of icons that assists the user in the process of transforming the temporal domains of a data visualization.

In some implementations, after updating display of the first visualization card to include the first data visualization, when the first scene includes a second visualization card adjacent to the first visualization card and the second visualization card having a second data visualization, the computing device performs (1580) steps, including: in response to user selection of the temporal axis of the second data visualization, the computing device 200 displays (1582) a user-selectable element (e.g., the second x-axis icon 536-2 in FIG. 11C). The computing device 200 receives (1584) user selection of the user-selectable element. In response to user selection of the user-selectable element, the computing device 200 generates (1586) an updated second data visualization having an updated temporal axis with data values that match (e.g., corresponds to, synchronizes with) data values of the temporal axis of the first data visualization. The computing device 200 displays (1588) the updated second data visualization. Providing visual feedback to the user (e.g., in response to user selection of an icon) enhances the operability of the device and makes the user-device interface more efficient (e.g., by helping the user to achieve an intended result by providing feedback indicative of an input that causes the device to generate the intended result and reducing user mistakes when operating/interacting with the device).

In some implementations, after updating display of the first visualization card to include the first data visualization, when the first scene includes a second visualization card adjacent to (e.g., to the right of or to the immediate right of) the first visualization card and the second visualization card has a second data visualization, the computing device performs (1590) steps including: in response to user selection of a vertical axis of the second data visualization, the computing device 200 displays (1592) a user-selectable element (e.g., the third y-axis icon 534-3 in FIG. 11C). The computing device 200 receives (1594) user selection of the user-selectable element. In response to user selection of the user-selectable element, the computing device 200 generates (1596) an updated second data visualization having an updated vertical axis with data values that match (e.g., corresponds to, synchronizes with) data values of the vertical axis of the first data visualization. The computing device 200 displays (1598) the updated second data visualization. Providing visual feedback to the user (e.g., in response to user selection of an icon) enhances the operability of the device and makes the user-device interface more efficient (e.g., by helping the user to achieve an intended result by providing feedback indicative of an input that will cause the device to generate the intended result and reducing user mistakes when operating/interacting with the device).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory stores a subset of the modules and data structures identified above. Furthermore, the memory may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for presenting time series metrics, comprising:
   at a computing device having a display, one or more processors, and memory storing one or more programs configured for execution by the one or more processors:
      displaying, in a graphical user interface, a canvas region that includes a first scene, the first scene having a first visualization card that displays a first data visualization, the first data visualization having a first temporal axis and spanning a first date-time range;
      receiving, via the graphical user interface, a first user interaction with the first data visualization that is displayed on the first visualization card, the first user interaction specifying a split point on the first temporal axis of the first data visualization;
      in response to receiving the first user interaction, displaying a plurality of user-selectable affordances, each of the user-selectable affordances corresponding to a respective option for modifying the first date-time range of the first data visualization, wherein the plurality of user-selectable affordances includes at least one of:
         a first user-selectable affordance that, when selected, retains data points of the first data visualization before the split point;
         a second user-selectable affordance that, when selected, retains data points of the first data visualization after the split point; and
         a third user-selectable affordance that, when selected, (i) retains data points of the first data visualization before the split point on the first visualization card and (ii) displays data points of the first data visualization after the split point on a second visualization card, adjacent to the first visualization card;
      receiving user selection of one of the plurality of user-selectable affordances, corresponding to a first option; and
      in response to receiving the user selection, generating an updated first data visualization, the updated first data visualization having an updated temporal axis and spanning an updated date-time range specified by the split point; and
      displaying the updated first data visualization on the first visualization card.

2. The method of claim 1, wherein the first data visualization is a line chart.

3. The method of claim 1, wherein:
   the first temporal axis of the first data visualization includes temporal values spanning from a starting date/time value to an ending date/time value; and
   the method further comprises:
      in response to user selection of the first user-selectable affordance:
         generating the updated first data visualization that includes the updated temporal axis with values spanning from (i) the starting date/time value to (ii) a date/time value corresponding to the split point; and
         displaying the updated first data visualization on the first visualization card.

4. The method of claim 1, wherein:
   the first temporal axis of the first data visualization includes temporal values spanning from a starting date/time value to an ending date/time value; and
   the method further comprises:
      in response to user selection of the second user-selectable affordance:
         generating the updated first data visualization that includes the updated temporal axis with values spanning from (i) a date/time value corresponding to the split point to (ii) the ending date/time value; and displaying the updated first data visualization on the first visualization card.

5. The method of claim 1, wherein:
the first temporal axis of the first data visualization includes temporal values spanning from a starting date/time value to an ending date/time value; and
the method further comprises:
in response to user selection of the third user-selectable affordance:
generating the updated first data visualization that includes the updated temporal axis with values spanning from (i) the starting date/time value to a first date/time value corresponding to the split point; and
generating a second data visualization that includes a temporal axis with values spanning from (ii) the first date/time value to (ii) the ending date/time value; and simultaneously displaying (i) the updated first data visualization on the first visualization card and (ii) the second data visualization on a second visualization card, adjacent to the first visualization card.

6. The method of claim 1, further comprising:
displaying, concurrently with the canvas region in the graphical user interface, a recommendation region that includes one or more data visualizations, each data visualization of the one or more data visualizations corresponding to a respective metric, of one or more metrics, of a data source, the respective metric having a respective temporal attribute.

7. The method of claim 6, further comprising:
prior to displaying the one or more data visualizations, generating the one or more data visualizations, including:
retrieving, for each data visualization of the one or more data visualizations, a metric definition for the respective metric corresponding to the respective data visualization.

8. The method of claim 1, further comprising:
receiving a second user interaction with a vertical axis of the first data visualization in the first visualization card; and
in response to receiving the second user interaction, displaying a plurality of user-selectable interface elements, including:
a first user-selectable interface element that, when selected, toggles between (i) a first vertical axis scale starting at zero and (ii) a second vertical axis scale starting at a minimum value; and
a second user-selectable interface element that, when selected, toggles between (i) a third vertical axis scale with absolute values and (ii) a fourth vertical axis scale with relative values indexed relative to a first value appearing in the first data visualization.

9. The method of claim 1, further comprising:
receiving a second user interaction with the first temporal axis of the first data visualization on the first visualization card; and
in response to receiving the second user interaction, displaying a plurality of user-selectable icons, including:
a first user-selectable icon that, when selected, toggles between (i) a first temporal axis scale having absolute date/time values and (ii) a second temporal axis scale having relative dates relative to a first date in the first data visualization.

10. The method of claim 1, further comprising:
in accordance with a determination that the first scene includes a second visualization card with a second data visualization that is displayed adjacent to the first visualization card:
in response to user selection of a temporal axis of the second data visualization, displaying a user-selectable element;
receiving user selection of the user-selectable element; and
in response to user selection of the user-selectable element:
generating an updated second data visualization having an updated temporal axis with data values that match data values of a temporal axis of the first data visualization; and
displaying the updated second data visualization.

11. The method of claim 1, further comprising:
in accordance with a determination that the first scene includes a second visualization card with a second data visualization that is displayed adjacent to the first visualization card:
in response to user selection of a vertical axis of the second data visualization, displaying a user-selectable element;
receiving user selection of the user-selectable element; and
in response to user selection of the user-selectable element:
generating an updated second data visualization having an updated vertical axis with data values that match data values of a vertical axis of the first data visualization; and
displaying the updated second data visualization.

12. A computing device, comprising:
a display;
one or more processors; and
memory coupled to the one or more processors, the memory storing one or more programs configured to be executed by the one or more processors, the one or more programs including instructions for:
displaying, in a graphical user interface, a canvas region that includes a first scene, the first scene having a first visualization card that displays a first data visualization, the first data visualization having a first temporal axis and spanning a first date-time range;
receiving, via the graphical user interface, a first user interaction with the first data visualization that is displayed on the first visualization card, the first user interaction specifying a split point on the first temporal axis of the first data visualization;
in response to receiving the first user interaction, displaying a plurality of user-selectable affordances, each of the user-selectable affordances corresponding to a respective option for modifying the first date-time range of the first data visualization, wherein the plurality of user-selectable affordances includes at least one of:
a first user-selectable affordance that, when selected, retains data points of the first data visualization before the split point;
a second user-selectable affordance that, when selected, retains data points of the first data visualization after the split point; and
a third user-selectable affordance that, when selected, (i) retains data points of the first data visualization before the split point on the first visualization card and (ii) displays data points of the first data visualization after the split point on a second visualization card, adjacent to the first visualization card;

receiving user selection of one of the plurality of user-selectable affordances, corresponding to a first option; and in response to receiving the user selection, generating an updated first data visualization, the updated first data visualization having an updated temporal axis and spanning an updated date-time range specified by the split point; and displaying the updated first data visualization on the first visualization card.

13. The computing device of claim 12, wherein:
the first temporal axis of the first data visualization includes temporal values spanning from a starting date/time value to an ending date/time value; and
the one or more programs further include instructions for:
in response to user selection of the first user-selectable affordance:
generating the updated first data visualization that includes the updated temporal axis with values spanning from (i) the starting date/time value to (ii) a date/time value corresponding to the split point; and
displaying the updated first data visualization on the first visualization card.

14. The computing device of claim 12, wherein:
the first temporal axis of the first data visualization includes temporal values spanning from a starting date/time value to an ending date/time value; and
the one or more programs further include instructions for:
in response to user selection of the second user-selectable affordance:
generating the updated first data visualization that includes the updated temporal axis with values spanning from (i) a date/time value corresponding to the split point to (ii) the ending date/time value; and
displaying the updated first data visualization on the first visualization card.

15. The computing device of claim 12, the one or more programs including instructions for:
displaying, concurrently with the canvas region in the graphical user interface, a recommendation region that includes one or more data visualizations, each data visualization of the one or more data visualizations corresponding to a respective metric, of one or more metrics, of a data source, the respective metric having a respective temporal attribute.

16. The computing device of claim 15, wherein the one or more programs further include instructions for:
prior to displaying the one or more data visualizations, generating the one or more data visualizations, including:
retrieving, for each data visualization of the one or more data visualizations, a metric definition for the respective metric corresponding to the respective data visualization.

17. The computing device of claim 12, wherein:
the first temporal axis of the first data visualization includes temporal values spanning from a starting date/time value to an ending date/time value; and
the one or more programs further include instructions for:
in response to user selection of the third user-selectable affordance:
generating the updated first data visualization that includes the updated temporal axis with values spanning from (i) the starting date/time value to a first date/time value corresponding to the split point; and
generating a second data visualization that includes a temporal axis with values spanning from (ii) the first date/time value to (ii) the ending date/time value; and simultaneously displaying (i) the updated first data visualization on the first visualization card and (ii) the second data visualization on a second visualization card, adjacent to the first visualization card.

18. A non-transitory computer-readable storage medium storing one or more programs, the one or more programs comprising instructions, which when executed by a computing device, cause the computing device to perform operations comprising:
displaying, in a graphical user interface, a canvas region that includes a first scene, the first scene having a first visualization card that displays a first data visualization, the first data visualization having a first temporal axis and spanning a first date-time range;
receiving, via the graphical user interface, a first user interaction with the first data visualization that is displayed on the first visualization card, the first user interaction specifying a split point on the first temporal axis of the first data visualization;
in response to receiving the first user interaction, displaying a plurality of user-selectable affordances, each of the user-selectable affordances corresponding to a respective option for modifying the first date-time range of the first data visualization, wherein the plurality of user-selectable affordances includes at least one of:
a first user-selectable affordance that, when selected, retains data points of the first data visualization before the split point;
a second user-selectable affordance that, when selected, retains data points of the first data visualization after the split point; and
a third user-selectable affordance that, when selected, (i) retains data points of the first data visualization before the split point on the first visualization card and (ii) displays data points of the first data visualization after the split point on a second visualization card, adjacent to the first visualization card;
receiving user selection of one of the plurality of user-selectable affordances, corresponding to a first option; and
in response to receiving the user selection, generating an updated first data visualization, the updated first data visualization having an updated temporal axis and spanning an updated date-time range specified by the split point; and
displaying the updated first data visualization on the first visualization card.

* * * * *